US011849053B2

(12) United States Patent
Nickels et al.

(10) Patent No.: US 11,849,053 B2
(45) Date of Patent: Dec. 19, 2023

(54) AUTOMATION OF USER IDENTITY USING NETWORK PROTOCOL PROVIDING SECURE GRANTING OR REVOCATION OF SECURED ACCESS RIGHTS

(71) Applicants: Colin Constable, Mariposa, CA (US); Jagannadh Vanguri, Telangana (IN); Atsign, Inc., San Jose, CA (US)

(72) Inventors: Kevin Nickels, San Jose, CA (US); Colin Constable, Mariposa, CA (US); Jagannadh Vanguri, Telangana (IN)

(73) Assignee: Atsign, Inc., San Jose, CA (US)

( * ) Notice: Subject to any disclaimer, the term of this patent is extended or adjusted under 35 U.S.C. 154(b) by 0 days.

(21) Appl. No.: 17/781,464

(22) PCT Filed: Jul. 7, 2021

(86) PCT No.: PCT/US2021/040628
§ 371 (c)(1),
(2) Date: Jun. 1, 2022

(87) PCT Pub. No.: WO2022/010978
PCT Pub. Date: Jan. 13, 2022

(65) Prior Publication Data
US 2023/0015819 A1 Jan. 19, 2023

Related U.S. Application Data

(60) Provisional application No. 63/105,755, filed on Oct. 26, 2020, provisional application No. 63/062,092, (Continued)

(51) Int. Cl.
*H04L 9/32* (2006.01)
*H04L 9/08* (2006.01)

(52) U.S. Cl.
CPC .......... *H04L 9/3271* (2013.01); *H04L 9/0825* (2013.01); *H04L 9/0894* (2013.01)

(58) Field of Classification Search
None
See application file for complete search history.

(56) References Cited

U.S. PATENT DOCUMENTS 8,594,632 B1 * 11/2013 Azizi .................... H04W 12/06
715/752
9,258,118 B1 2/2016 Roth et al.
(Continued)

OTHER PUBLICATIONS

International Search Report and Written Opinion in International Appln. No. PCT/US2021/040628, dated Dec. 2, 2021, 15 pages.
(Continued)

*Primary Examiner* — Bassam A Noaman
(74) *Attorney, Agent, or Firm* — Fish & Richardson P.C.

(57) ABSTRACT

The present disclosure involves systems, software, and computer implemented methods for user-controlled access control for user information. One example method includes sending an authentication request to authenticate as a requesting entity to a first decentralized resource directory of a providing entity. An authentication challenge is received, via the connection, from the providing entity, and in response to the authentication request, to store an authentication challenge value for an authentication challenge key in a second decentralized resource directory of the requesting entity. The authentication challenge value for the authentication challenge key is stored in the second decentralized resource directory. An authentication challenge response is sent to the providing entity requesting the providing entity to verify the authentication challenge. An indication is received from the providing entity indicating that the requesting entity is authenticated to the first decentralized resource directory as the requesting entity.

5 Claims, 82 Drawing Sheets

Related U.S. Application Data filed on Aug. 6, 2020, provisional application No. 63/049,460, filed on Jul. 8, 2020.

(56) References Cited

U.S. PATENT DOCUMENTS

| | | | |
|---|---|---|---|
| 9,571,480 B1* | 2/2017 | Asveren | H04L 9/3226 |
| 11,271,933 B1* | 3/2022 | Dee | H04L 9/3271 |
| 11,546,337 B2* | 1/2023 | Le | H04L 63/102 |
| 2004/0044727 A1 | 3/2004 | Abdelaziz et al. | |
| 2007/0118879 A1 | 5/2007 | Yeun | |
| 2008/0091615 A1* | 4/2008 | Choi | G06Q 20/3829 |
| | | | 705/71 |
| 2015/0178515 A1 | 6/2015 | Cooley et al. | |
| 2016/0182500 A1* | 6/2016 | Ligatti | H04L 63/0853 |
| | | | 713/156 |
| 2018/0367526 A1* | 12/2018 | Huang | H04L 63/083 |
| 2020/0252392 A1* | 8/2020 | Mullins | H04L 63/0838 |
| 2021/0288973 A1* | 9/2021 | Dimble | H04W 12/108 |

OTHER PUBLICATIONS

Li et al. "Research on CoAP Resource Directory Based on Blockchain." IEEE 4th Information Technology, Networking, Electronic and Automation Control Conference (ITNEC), May 2020, 1:1730-1735.
Ylonen et al., "Security of interactive and automated access management using Secure Shell (SSH)," National Institute of Standards and Technology, Oct. 2015, 50 pages.

* cited by examiner

```
@alice AtSign Protocol Server
...
@bob@lookup:profile@alice
data:atsign://friends.profile@alice
@bob@lookup friends.profile@alice
data:['Alice', 'tel:1-555-666-2000', 'http://socialnetwork1.com/aliceD', 'http://
socialnetwork2.com/alice123', 'mailto:alice@alice.com', 'atsign://workphone@alice']
```

FIG. 7

Sample sync response:
```
[{
"atKey": "naresh:lastname.me@jagan", — 4512
"operation": "+", — 4504
"opTime": "2020-08-23 12:59:12.695",
"commitID":8,
"value": "guru" — 4514
},
{
"atKey": "@naresh:firstname.me@jagan", — 4516
"operation": "*", — 4508
"opTime": "2020-08-23 13:02:14.196",
"commitId": 10,
"value": "naresh", — 4518
"metadata": {
"expiresAt": 1234, — 4520
"availableAt": 4567 — 4522
}
}
]
```

FIG. 45

Notification Verb — 5302
Notifies another secondary of some activity.

A notification can turn into some kind of action by the recipient.

Syntax: — 5304
notify:send <whom_to_notify>:<key>@<owner>
notify:send @kevin:phone@colin notify:list

Flow: — 5306

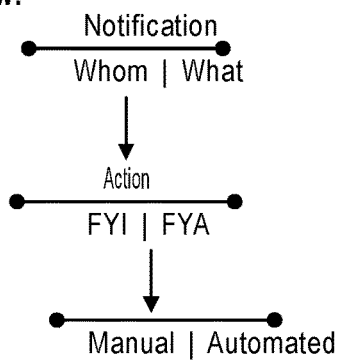

Notification
Whom | What
↓
Action
FYI | FYA
↓
Manual | Automated

Examples: — 5308

1. @Bob shares a persona with @alice and notifies her with the intent that she will lookup the new value
2. @Bob notifies of a new chat message
3. @Bob notifies of a new email message he sent

---

Notifications

@protocol can include a method for secondaries to inform certain events to other secondaries. "Notify" is the verb designed for notifications.

5310 — Features

1. Notifications should not spam the recipient
2. There can be a way to stream notifications to the apps so that they can react to them
3. Notifications can have an expiration
4. autoNotify
5. Change to a reference

AUTOMATION OF USER IDENTITY USING NETWORK PROTOCOL PROVIDING SECURE GRANTING OR REVOCATION OF SECURED ACCESS RIGHTS

CLAIM OF PRIORITY

This application is a National Stage Application under 35 USC § 120 to PCT Application Serial No. PCT/US2021/040628; filed Jul. 7, 2022; and published as WO 2022/010978 on Jan. 13, 2022; which claims priority under 35 USC § 119(e) to U.S. Provisional Patent Application Ser. No. 63/049,460, filed on Jul. 8, 2020; and also claims priority under 35 USC § 119(e) to U.S. Provisional Patent Application Ser. No. 63/062,092, filed on Aug. 6, 2020; and also claims priority under 35 USC § 119(e) to U.S. Provisional Patent Application Ser. No. 63/105,755, filed on Oct. 26, 2020, the entire contents each and together are hereby incorporated by reference.

TECHNICAL FIELD

The present disclosure relates to computer-implemented methods, software, and systems for user-controlled access control for user information.

BACKGROUND

Peer-to-peer (P2P) computing or networking is a distributed application architecture that can include partitioning of tasks between peer computing devices. Peers can form a peer-to-peer network of nodes. In a P2P environment, peers can make a portion of their resources, data, and/or metadata, such as processing power, disk storage or network bandwidth, directly available to other network participants, without requiring central coordination. Peers can be both suppliers and consumers of resources, in contrast to a traditional client-server model in which servers supply resources and clients consume resources.

SUMMARY

The present disclosure involves systems, software, and computer implemented methods for user-controlled access control for user information.

An example method includes: receiving, via a first connection and from a first requesting entity, an authentication request to authenticate the first requesting entity to a first decentralized resource directory of a providing entity, wherein the authentication request identifies the first requesting entity; generating, in response to the authentication request, an authentication challenge value and an authentication challenge key; providing, via the first connection and in response to the authentication request, an authentication challenge to the first requesting entity for the first requesting entity to store the authentication challenge value for the authentication challenge key in a second decentralized resource directory of the first requesting entity; receiving, via the first connection, a confirmation from the first requesting entity that the authentication challenge value has been stored for the authentication challenge key in the second decentralized resource directory of the first requesting entity; establishing a second connection with the second decentralized resource directory of the first requesting entity; sending, via the second connection, a first lookup request for a value stored for the authentication challenge key in the second decentralized resource directory; receiving, via the second connection and from the second decentralized resource directory, a first response value in response to the first lookup request; comparing the first response value to the authentication challenge value to determine whether the first response value matches the authentication challenge value; and in response to determining that the first response value matches the authentication challenge value, responding to the authentication request, via the first connection, with an indication that the first requesting entity is authenticated to the first decentralized resource directory.

Implementations may include one or more of the following features. In response to determining that the first response value does not match the authentication challenge value, the first connection can be dropped. A second lookup request for a value for a key stored in the first decentralized resource directory can be received, via the first connection and from the first requesting entity, while the first requesting entity is authenticated to the first decentralized resource directory. A determination can be made that the first requesting entity has been provided access to a first stored value for the key. The first stored value for the key can be retrieved and the first stored value can be provided as a second response value to the first requesting entity, in response to the second lookup request. A third lookup request can be received, via an unauthenticated third connection and from an unauthenticated second requesting entity, for a value for the key stored in the first decentralized resource directory. A publicly accessible value for the key can be retrieved and the publicly accessible value for the key can be provided as a third response value, to the second requesting entity, in response to the third lookup request. The first stored value for the key provided to the authenticated first requesting entity can be different from the publicly accessible value for the key. A fourth lookup request for a value for the key stored in the first decentralized resource directory can be received, via a third connection and from a third requesting entity while the third requesting entity is authenticated to the first decentralized resource directory. A determination can be made that the third requesting entity has been provided access to a third stored value for the key. The third stored value can be different from the first stored value and the publicly accessible value for the key. The third stored value for the key can be retrieved and provided as a third response value to the third requesting entity, in response to the fourth lookup request. A connection can be made, before sending the second lookup request, to a namespace directory to request connection information for the second decentralized resource directory. The connection information for the second decentralized resource directory can be used to establish the second connection. The authentication request and the second lookup request can be received from a user device associated with the first requesting entity. The authentication request and the second lookup request can be received from a server that services requests for the second decentralized resource directory. The authentication challenge value can be a randomly-generated identifier.

Another example method includes: sending, via a first connection, an authentication request to authenticate as a requesting entity to a first decentralized resource directory of a providing entity, wherein the authentication request identifies the requesting entity; receiving, via the first connection, from the providing entity, and in response to the authentication request, an authentication challenge to store an authentication challenge value for a authentication challenge key in a second decentralized resource directory of the requesting entity; storing, in the second decentralized resource directory, the authentication challenge value for the authentication challenge key; sending an authentication challenge response to the providing entity requesting the providing entity to verify the authentication challenge; and receiving an indication from the providing entity that the requesting entity is authenticated to the first decentralized resource directory as the requesting entity.

Implementations may include one or more of the following features. A first lookup request can be sent to the first decentralized resource directory for a value for a key stored in the first decentralized resource directory, while authenticated to the first decentralized resource directory and via the first connection. A first value for the key can be received, in response to the first lookup request, a first value for the key. A second lookup request can be sent, as an unauthenticated requesting entity, via a second connection, to the first decentralized resource directory for the value for the key stored in the first decentralized resource directory. A second value for the key can be received, in response to the second lookup request, with the second value being different from the first value. A connection can be made, before sending the authentication request, to a namespace directory to request connection information for the first decentralized resource directory. The connection information can be used by the second decentralized resource directory to establish the first connection. The authentication challenge value can be a randomly-generated identifier generated by the providing entity.

An example system includes: a user device of a first user; a first protocol server associated with the first user comprising a first decentralized resource directory; a second protocol server associated with a second user comprising a second decentralized resource directory; and a namespace directory. The user device is configured to send a first lookup request to the namespace directory for first connection information for the first protocol server. The namespace directory is configured to receive the first lookup request from the user device, determine the first connection information for the first protocol server, and provide the first connection information to the user device. The user device is further configured to use the first connection information to send a first authentication request to the first protocol server. The first protocol server is configured to receive the first authentication request, generate a key challenge, and send the key challenge to the user device in response to the first authentication request. the user device is further configured to generate a first key challenge response and send the first key challenge response to the first protocol server. The first protocol server is further configured to verify the first key challenge response and send a first authentication success indication to the user device. The user device is further configured to send a second lookup request to the first protocol server for a value of a requested key stored in the second decentralized resource directory. The first protocol server is further configured to receive the second lookup request and send a third lookup request to the namespace directory for second connection information for the second protocol server. The namespace directory is further configured to receive the third lookup request, determine the second connection information for the second protocol server, and send the second connection information to the first protocol server. The first protocol server is further configured to receive the second connection information and use the second connection information to send a second authentication request to the second protocol server. The second protocol server is configured to receive the second authentication request, generate an authentication challenge, and send the authentication challenge to the first protocol server. The first protocol server is further configured to receive the authentication challenge, store an authentication challenge value in the first decentralized resource directory for an authentication challenge key, and send a confirmation for the authentication challenge to the second protocol server. The second protocol server is further configured to receive the confirmation for the authentication challenge and send a fourth lookup request for third connection information, for the first protocol server, to the namespace directory. The namespace directory is further configured to receive the fourth lookup request, determine the third connection information for the first protocol server, and send the third connection information to the second protocol server. The second protocol server is further configured to use the third connection information to send a fifth lookup request to the first protocol server for a stored value for the authentication challenge key, receive the stored value for the authentication challenge key, verify the stored value for the authentication challenge key, and send a second authentication success indication to the first protocol server in response to a successful verification of the authentication challenge key that indicates successful authentication to the second protocol server as the first user. The first protocol server is further configured to receive the second authentication success indication and forward the second lookup request, to the second protocol server, on behalf of the user device. The second protocol server is further configured to receive the second lookup request, determine that the first user has access to the requested key, retrieve the value for the requested key, and send the value for the requested key to the first protocol server. The first protocol server is further configured to receive the value for the requested key and forward the value for the requested key to the user device. the user device is further configured to receive the value for the requested key.

Implementations may include one or more of the following features. The system can include a registration server. The user device can be configured to receive a shared secret from the registration server during a registration process and store the shared secret. The first protocol server can be configured to receive the shared secret from the registration server and store the shared secret. The shared secret can be used during a bootstrap process performed by the user device and the first protocol server. The shared secret can be used in a cryptographic response authentication mechanism. The user device can be further configured to generate, after the bootstrap process, a private key and a public key corresponding to the private key, store the private key on the user device, and send the public key to the first protocol server. The first protocol server can be further configured to receive the public key and store the public key at the first protocol server. The first protocol server can be further configured to use the public key to generate the key challenge. The user device can be further configured to use the private key to generate the first key challenge response. The first protocol server can be further configured to use the public key when verifying the first key challenge response.

Another example method includes: receiving, via a first connection and from a first requesting entity, an authentication request to authenticate the first requesting entity to a first decentralized resource directory of a providing entity, wherein the authentication request identifies the first requesting entity; generating, in response to the authentication request, an authentication challenge value and an authentication challenge key; providing, via the first connection and in response to the authentication request, an authentication challenge to the first requesting entity for the first requesting entity to store the authentication challenge value for the authentication challenge key in a second decentralized resource directory of the first requesting entity; receiving, via the first connection, a confirmation from the first requesting entity that the authentication challenge value has been stored for the authentication challenge key in the second decentralized resource directory of the first requesting entity; establishing a second connection with the second decentralized resource directory of the first requesting entity; sending, via the second connection, a first lookup request for a value stored for the authentication challenge key in the second decentralized resource directory; receiving, via the second connection and from the second decentralized resource directory, a first response value in response to the first lookup request; comparing the first response value to the authentication challenge value to determine whether the first response value matches the authentication challenge value; and in response to determining that the first response value matches the authentication challenge value, responding to the authentication request, via the first connection, with an indication that the first requesting entity is authenticated to the first decentralized resource directory.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 7 illustrates a session that includes use of an example profile and an example addressing scheme.

Onboarding and Initialization Options

Figure 14:
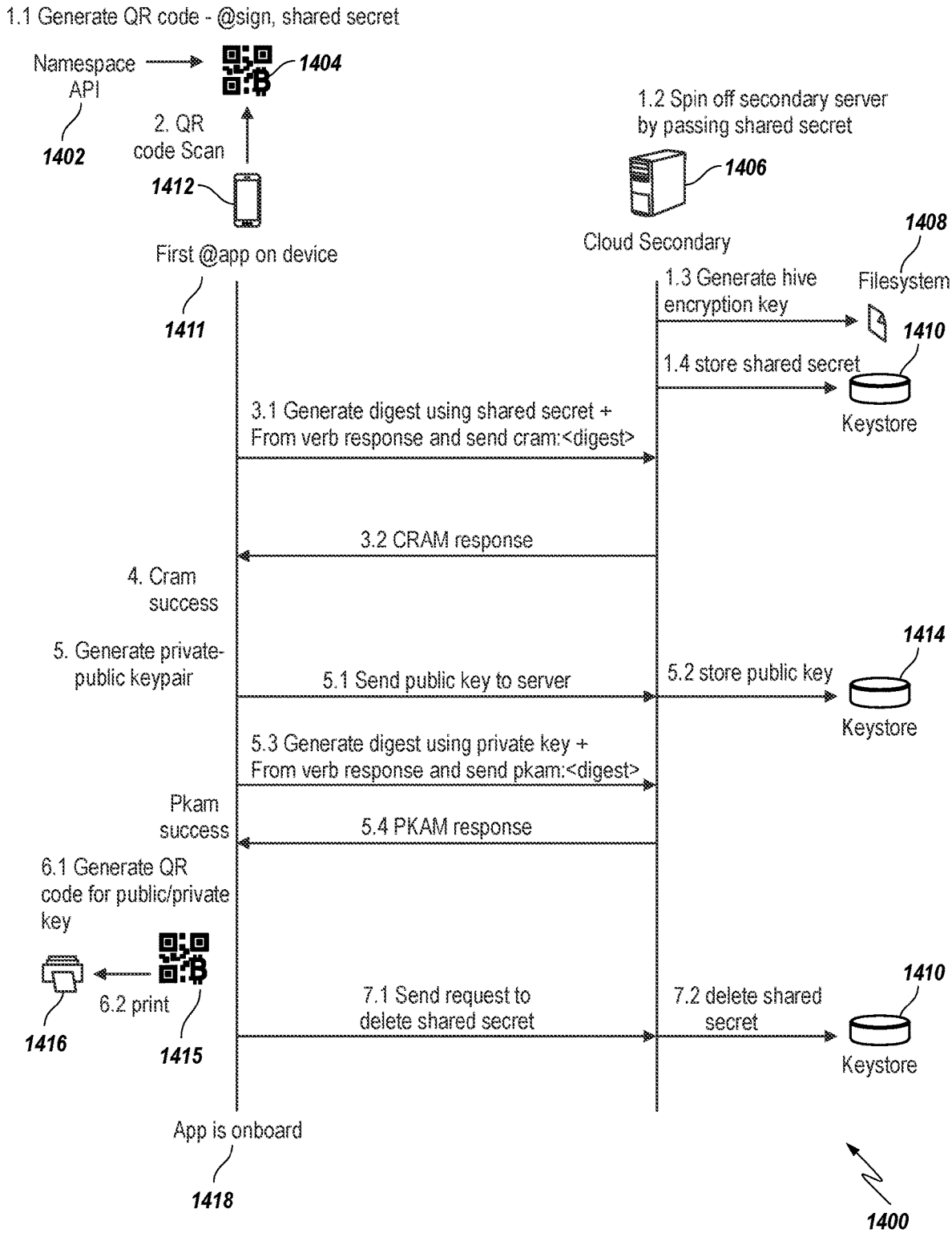

FIG. 14 is a flow chart of an example onboarding process.

Figure 15:
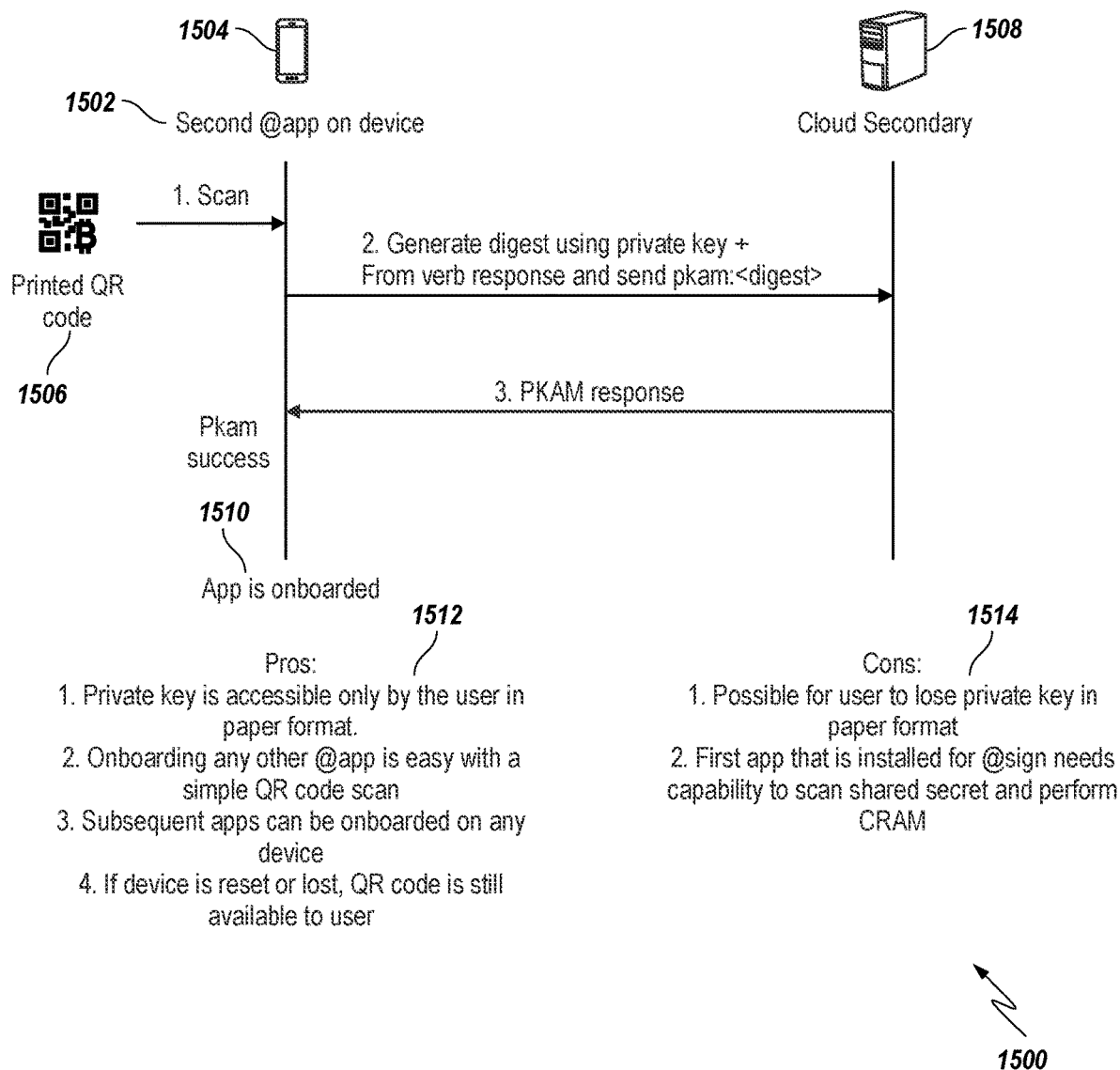

FIG. 15 is a flow chart of an example onboarding process for onboarding a second application.

Figure 16:
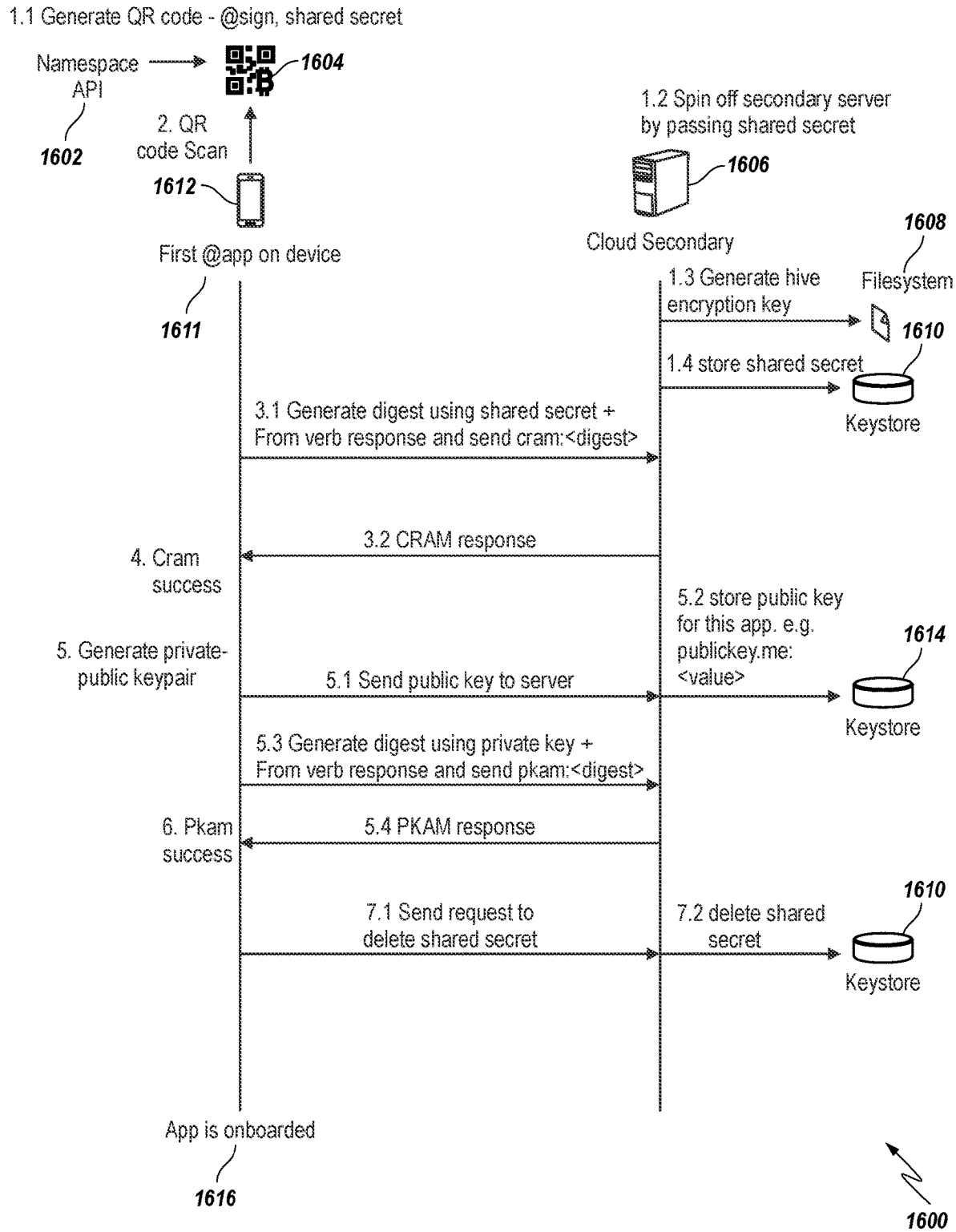

FIG. 16 is a flow chart of an example onboarding process using a separate private key per application.

Figure 17:
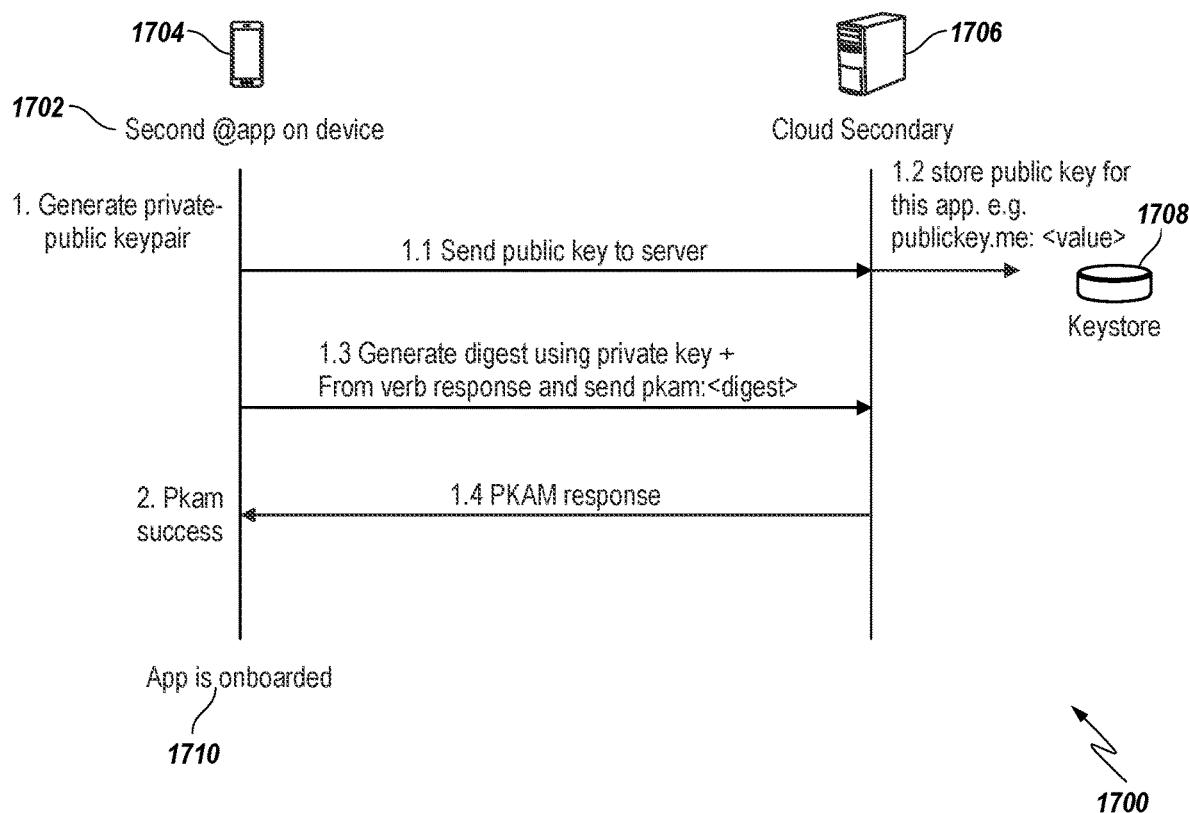

FIG. 17 is a flow chart of an example onboarding process for a second application using a separate private key per application.

Figure 18:
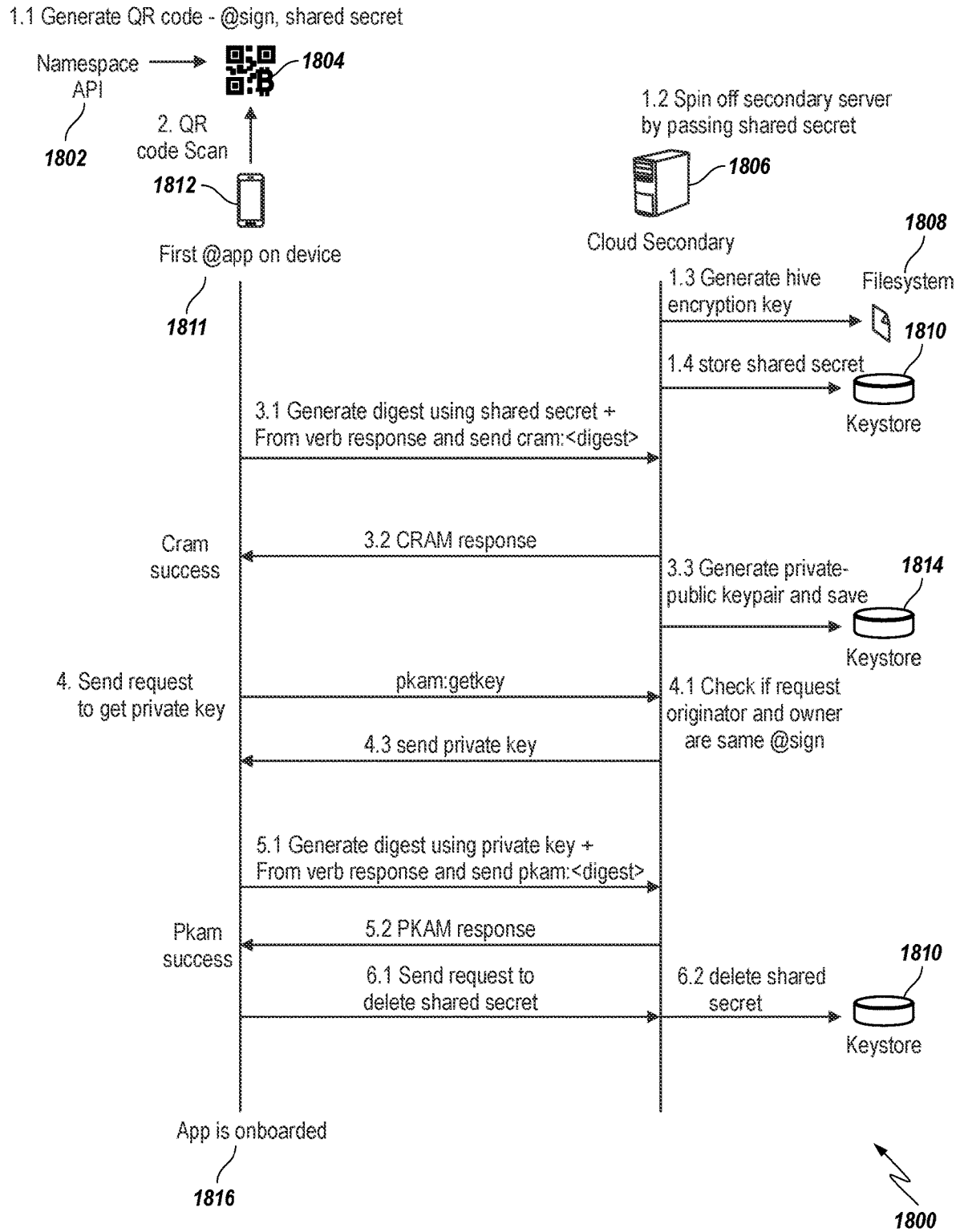

FIG. 18 is a flow chart of an example onboarding process using a server-based private key.

Figure 19:
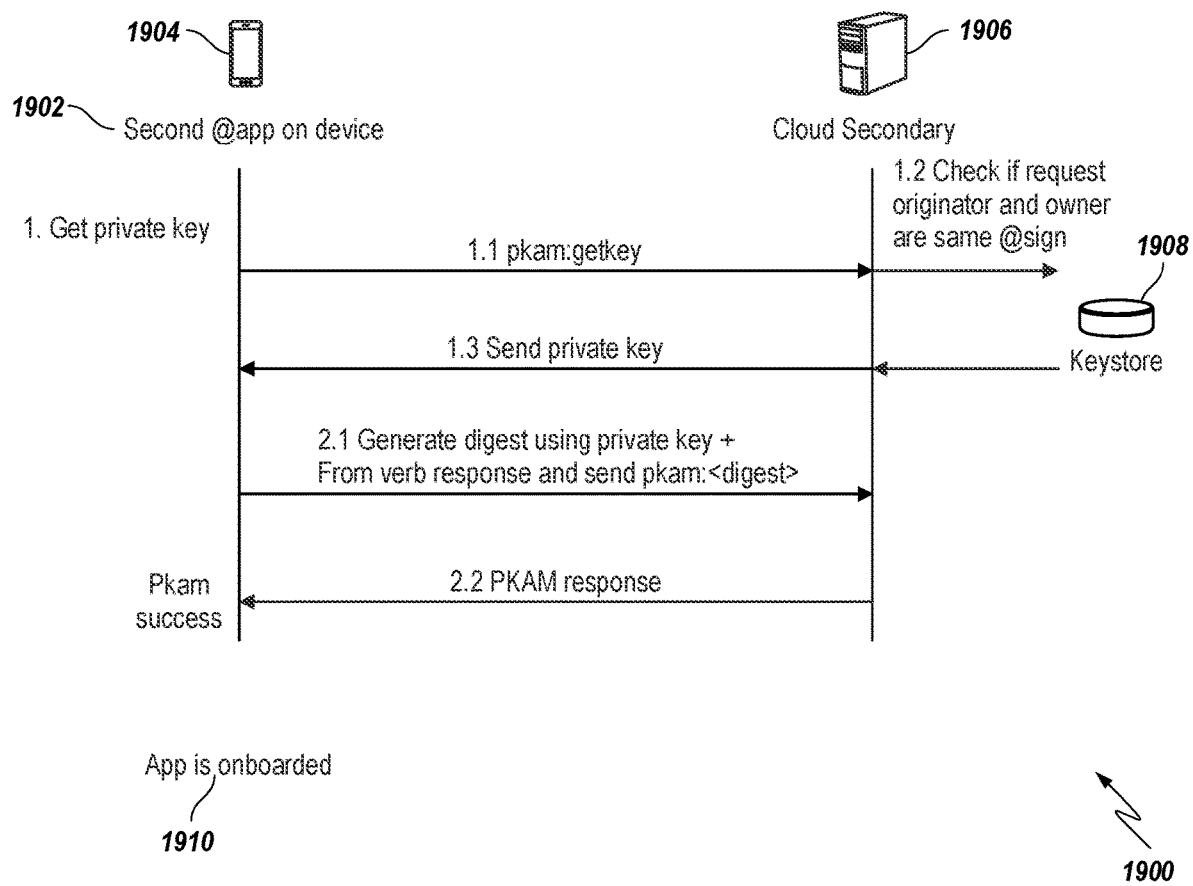

FIG. 19 is a flow chart of an example onboarding process for a second application using a server-based private key.

Figure 20A:
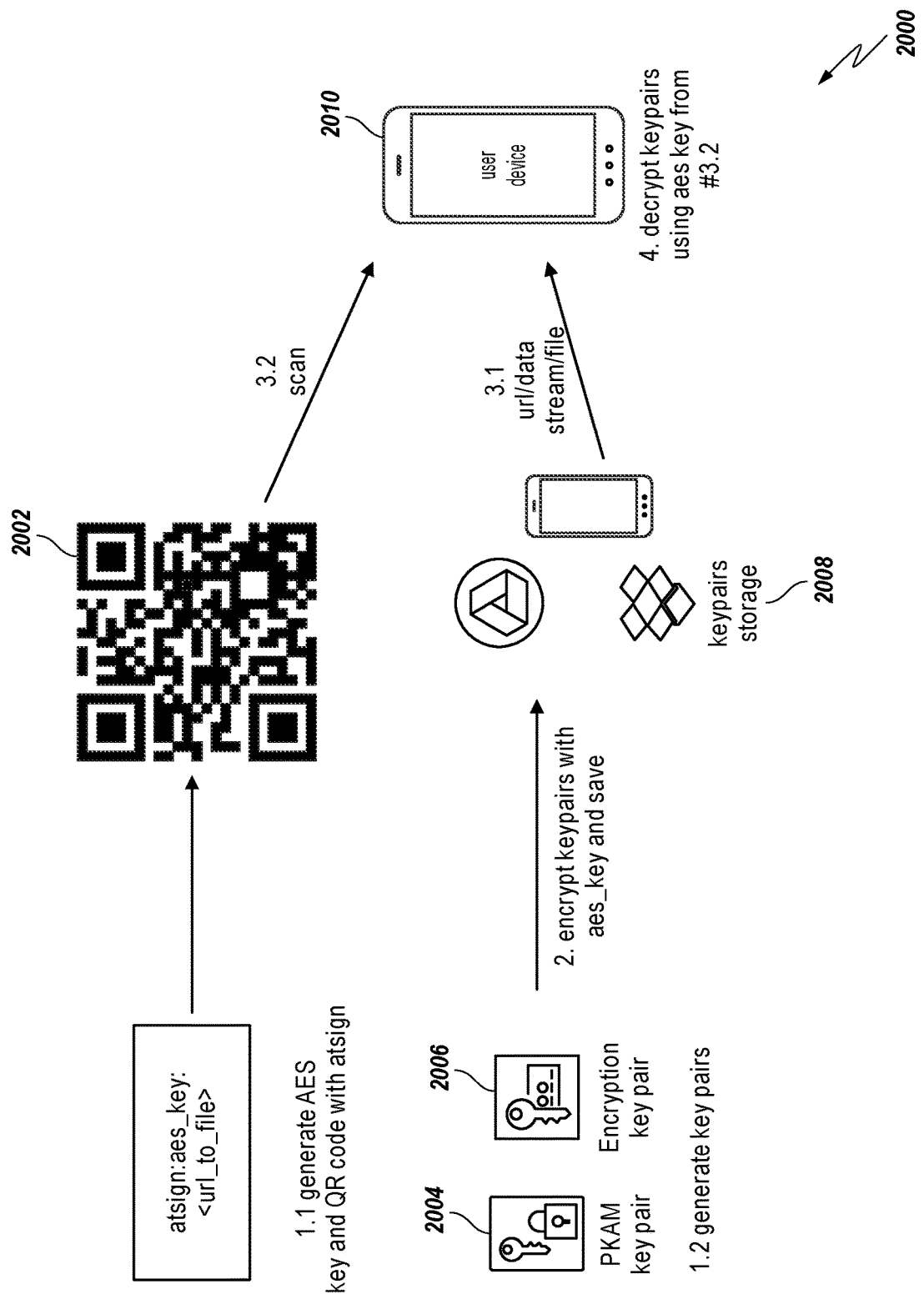

FIG. 20A illustrates an example system for onboarding a device/application.

Figure 20B:
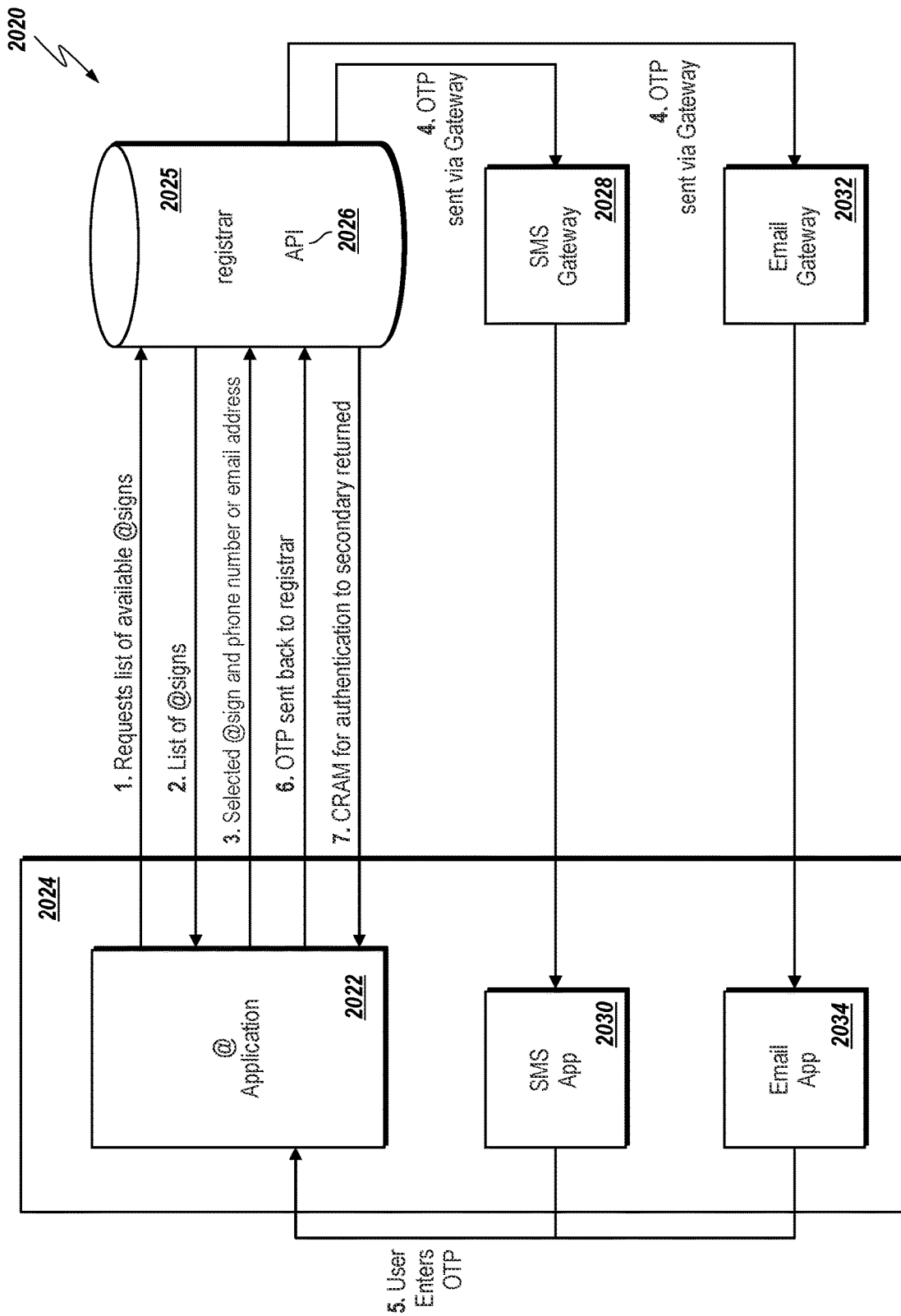

FIG. 20B illustrates an example system for onboarding a device/application using a registrar.

Figure 20C:
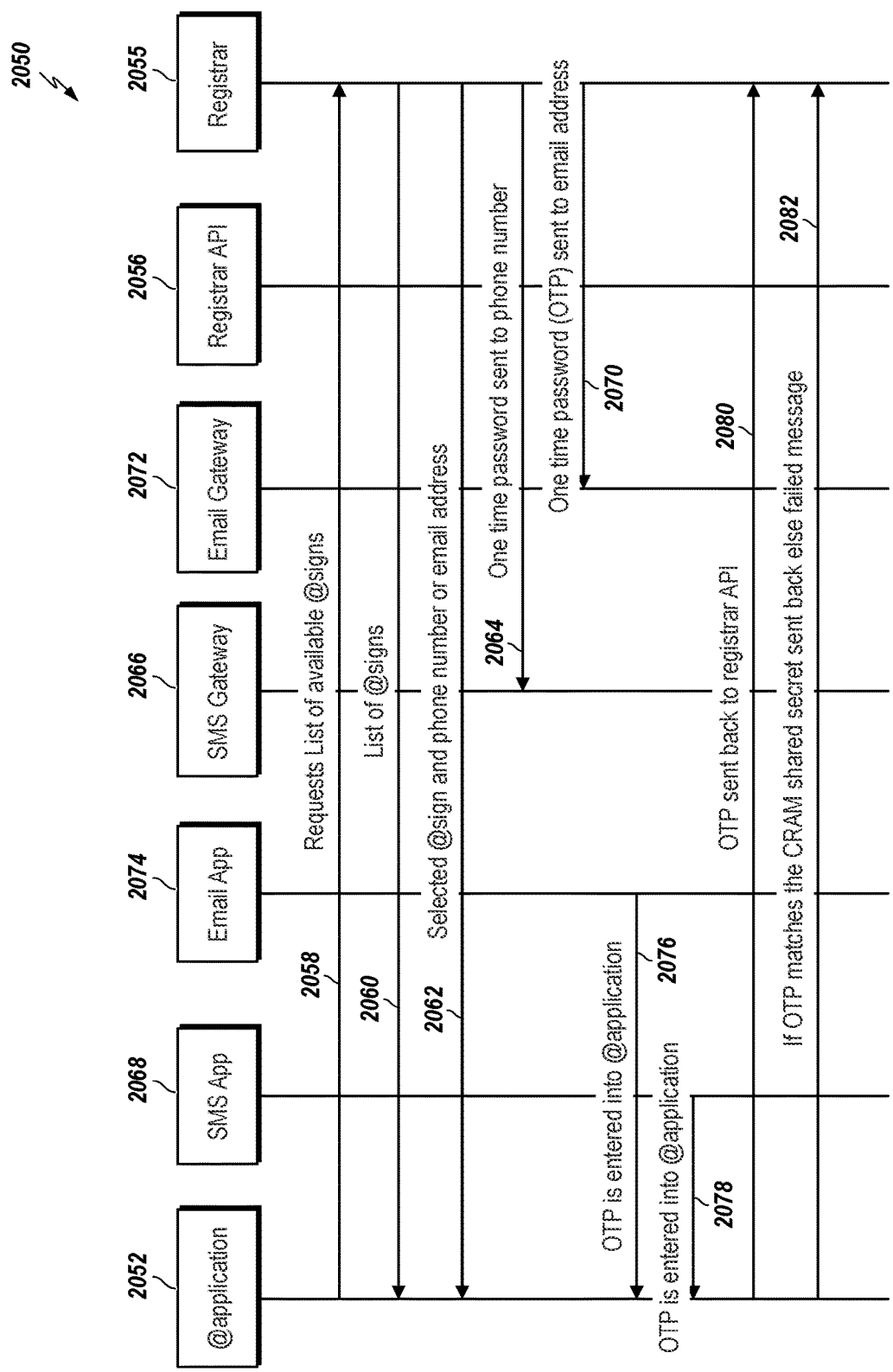

FIG. 20C is a flow chart of an example onboarding process for onboarding a device/application using a registrar.

Figure 21:
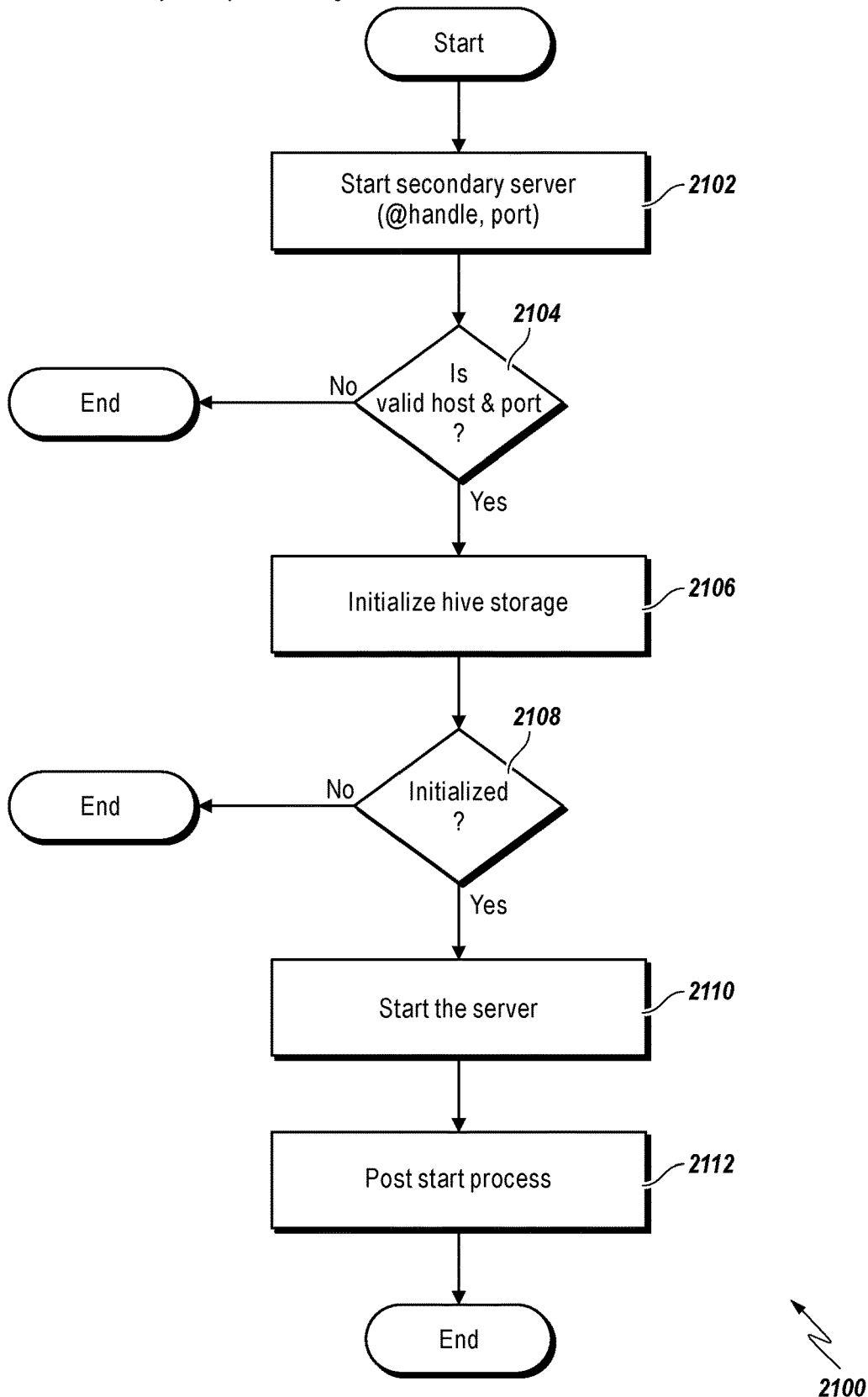

FIG. 21 is a flowchart of an example method for lifecycle management of a secondary server.

Figure 22:
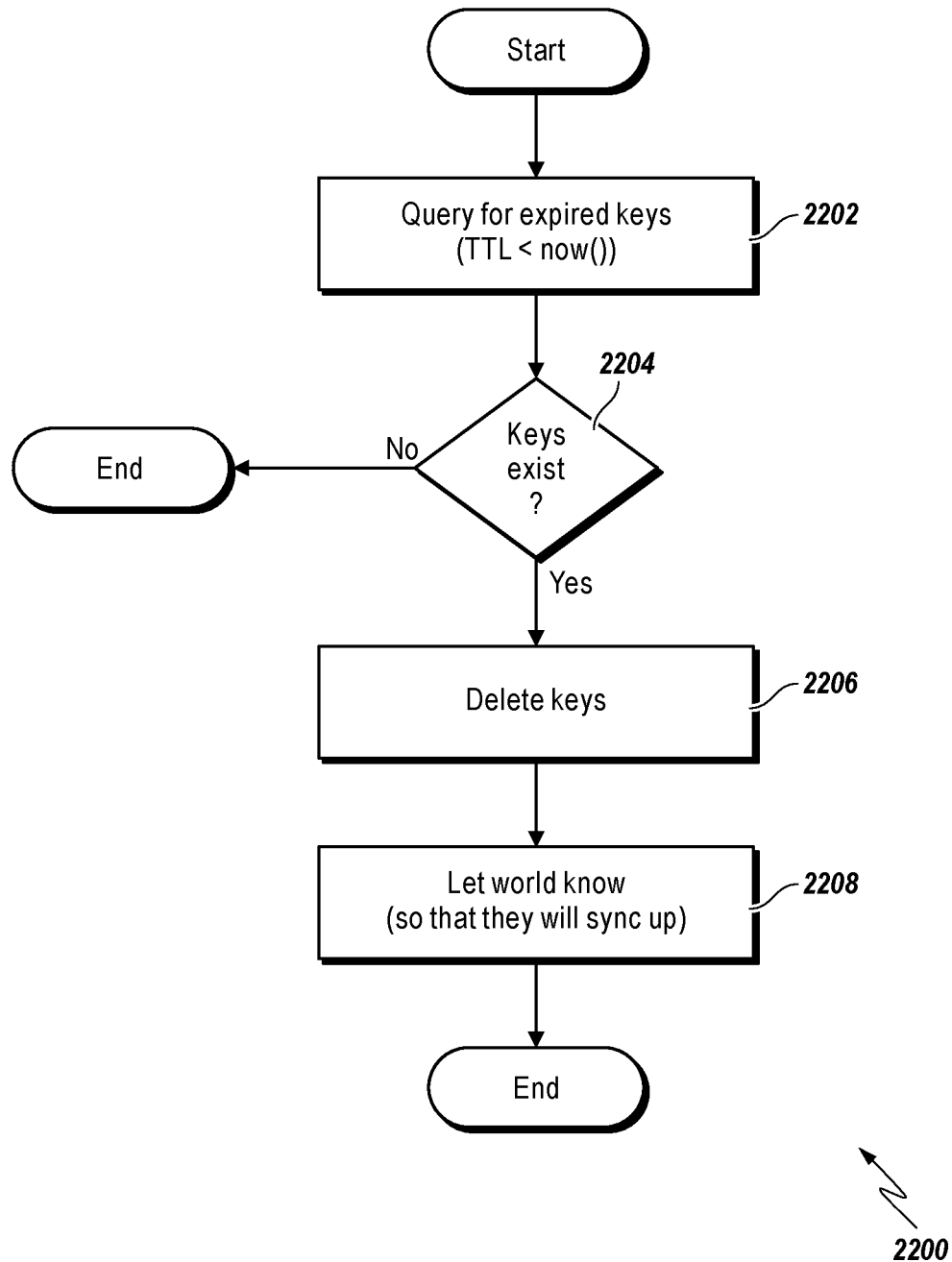

FIG. 22 is a flowchart of an example method for data expiration management.

Figure 23:
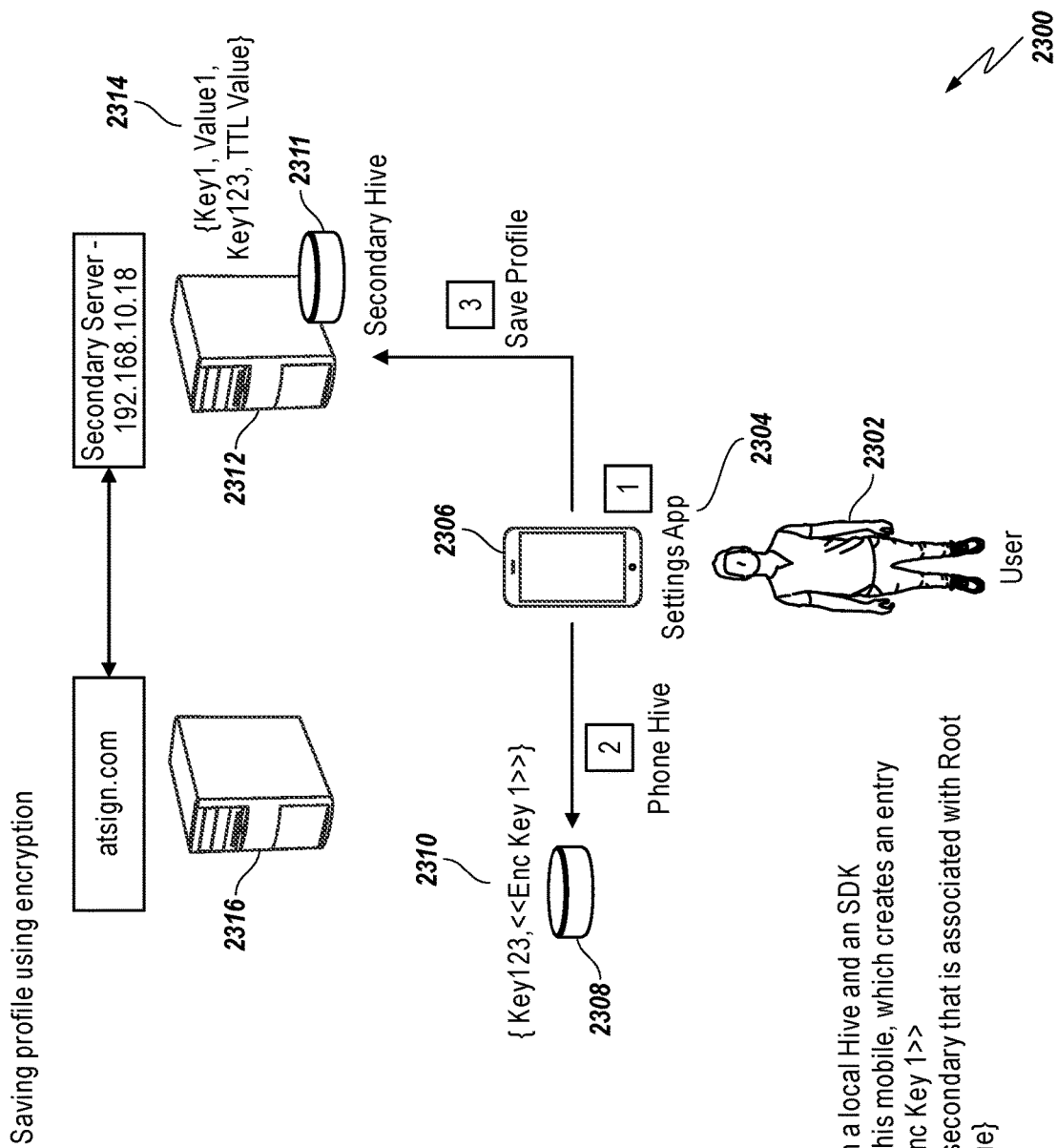

FIG. 23 illustrates an example system for saving a profile using encryption.

Figure 24:
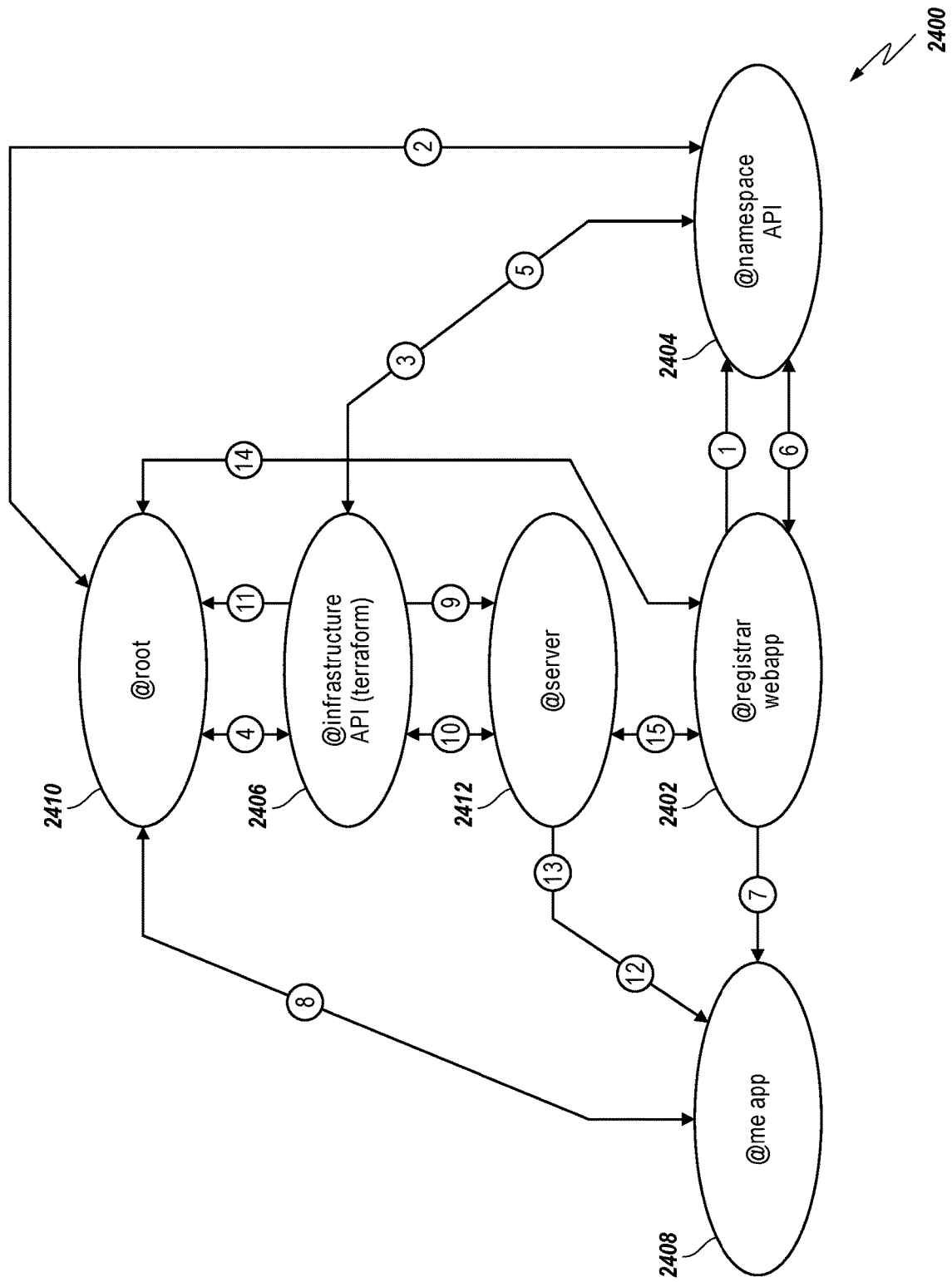

FIG. 24 illustrates a system for @sign activation.

Figure 25:

FIG. 25 illustrates @sign namespaces.

Streaming and File Transfers

Figure 26:
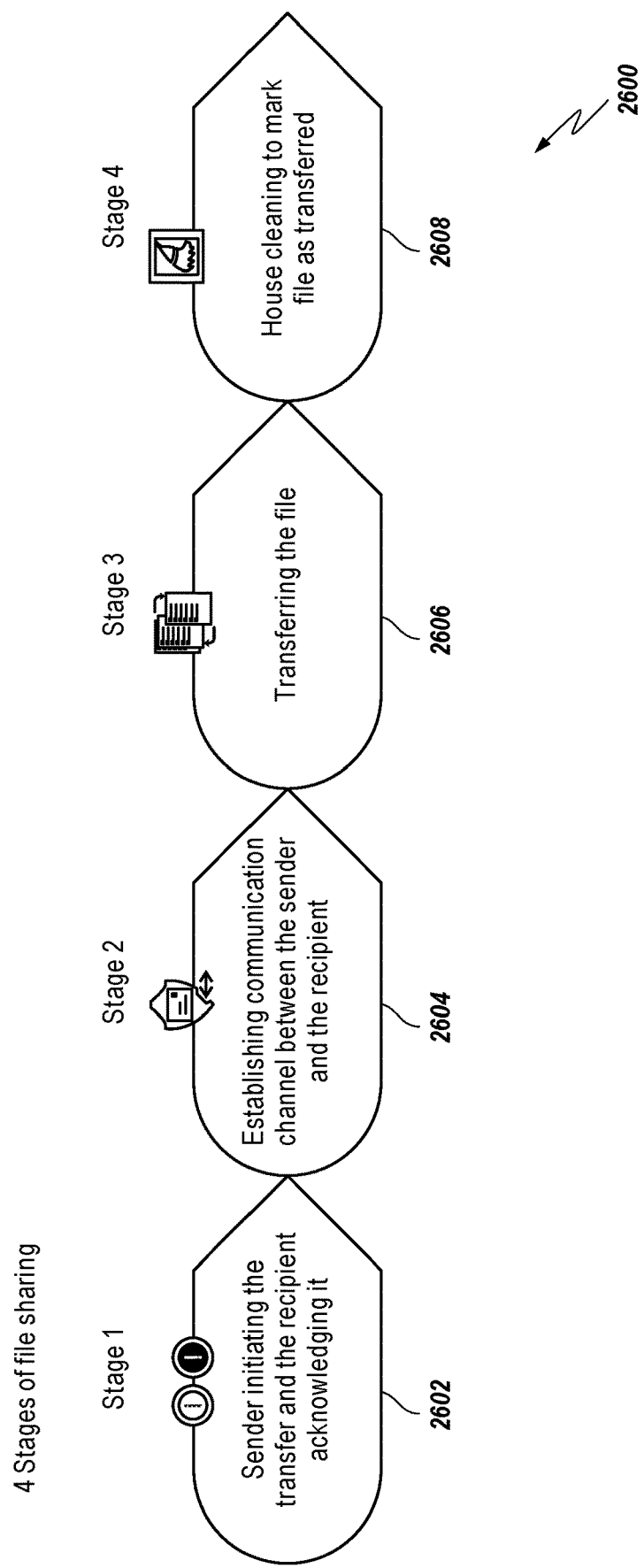

FIG. 26 illustrates a system that illustrates stages of protocol-enabled file sharing.

Figure 27:
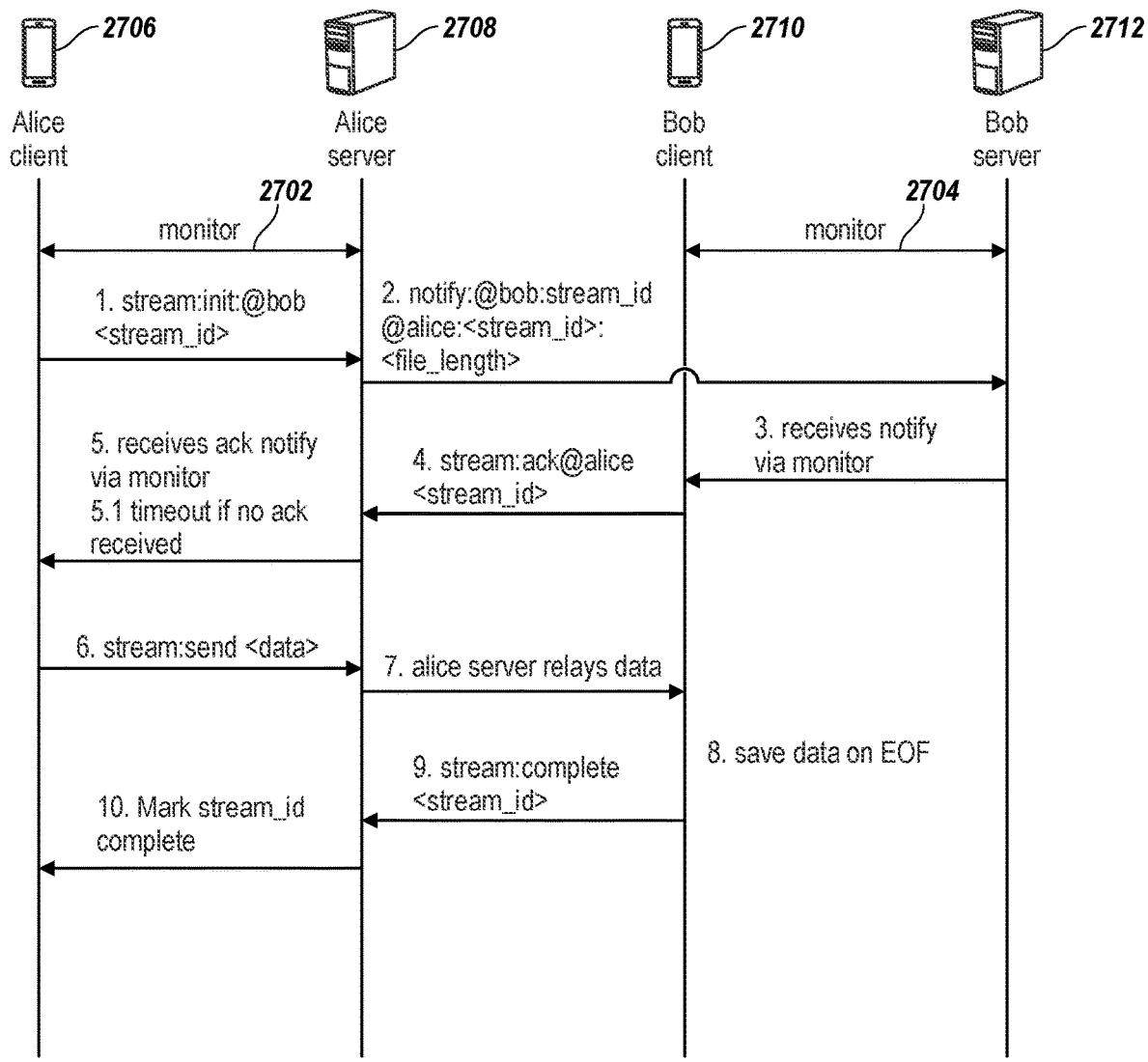

FIG. 27 is a flowchart of example streaming method.

Figure 28:
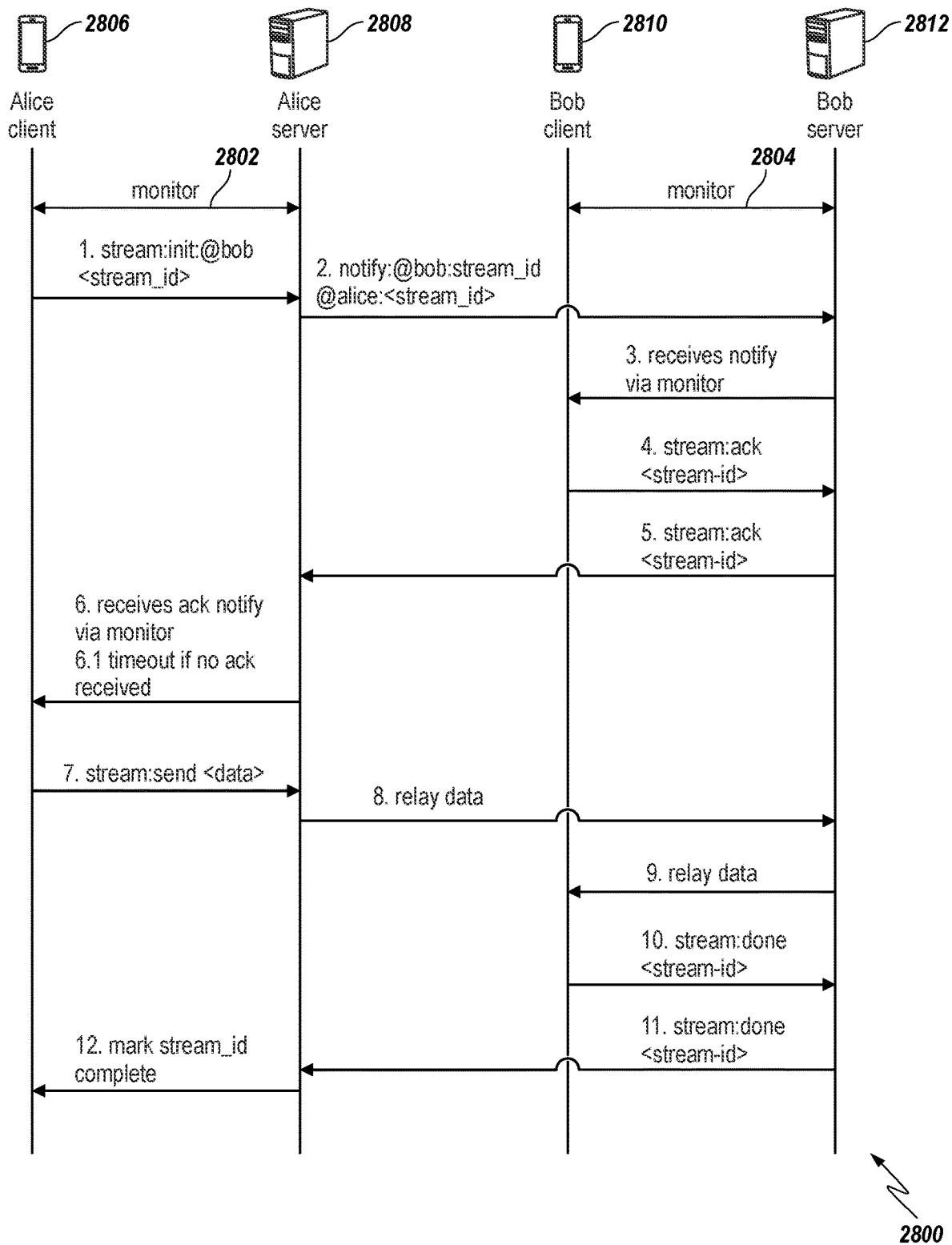

FIG. 28 is a flowchart of example streaming method using a server hop.

Figure 29:
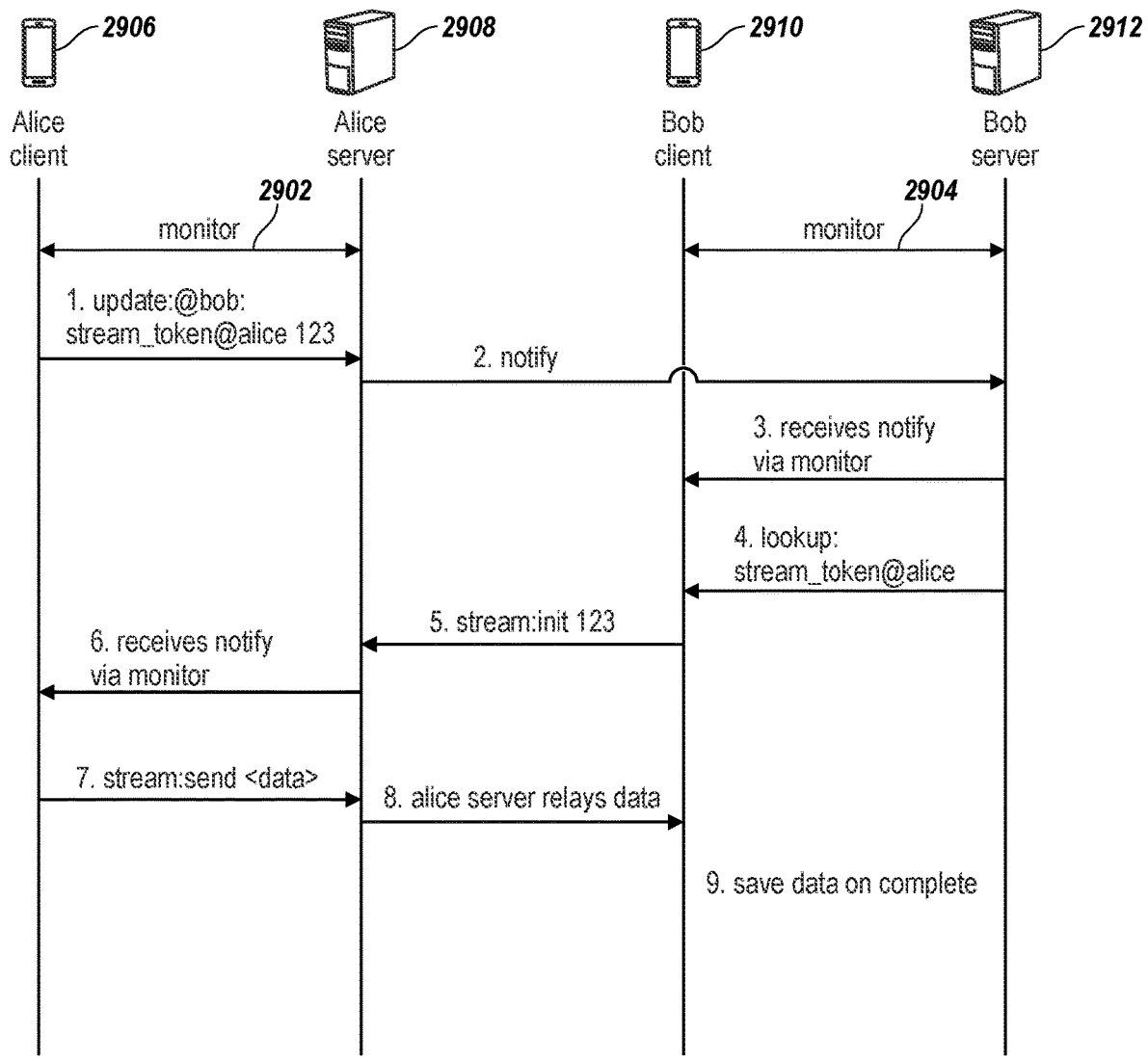

FIG. 29 is a flowchart of example streaming method using a token.

Figure 30:
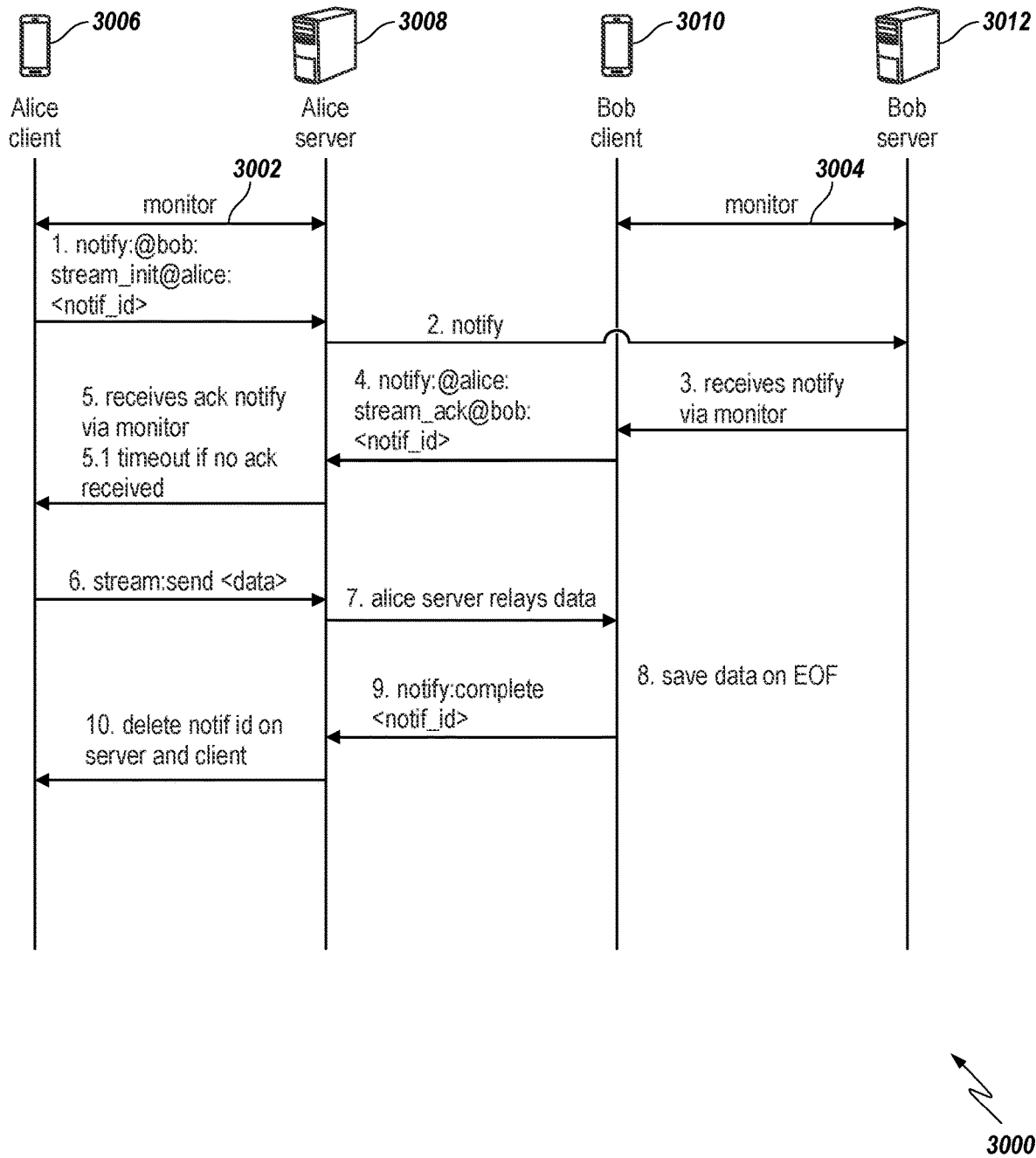

FIG. 30 is a flowchart of example streaming method.

Figure 31:
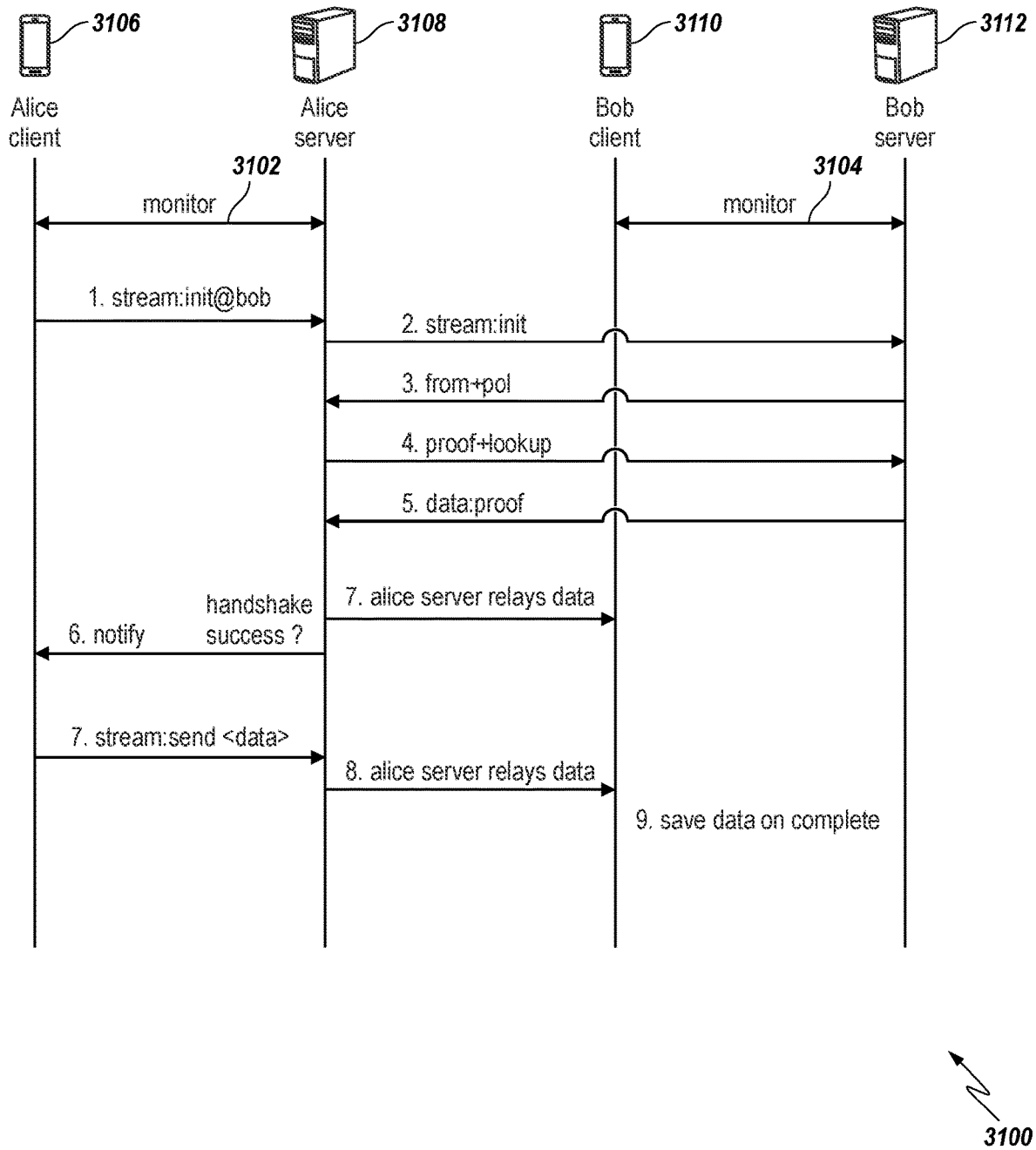

FIG. 31 is a flowchart of example streaming method using a proof of life approach.

Figure 32:
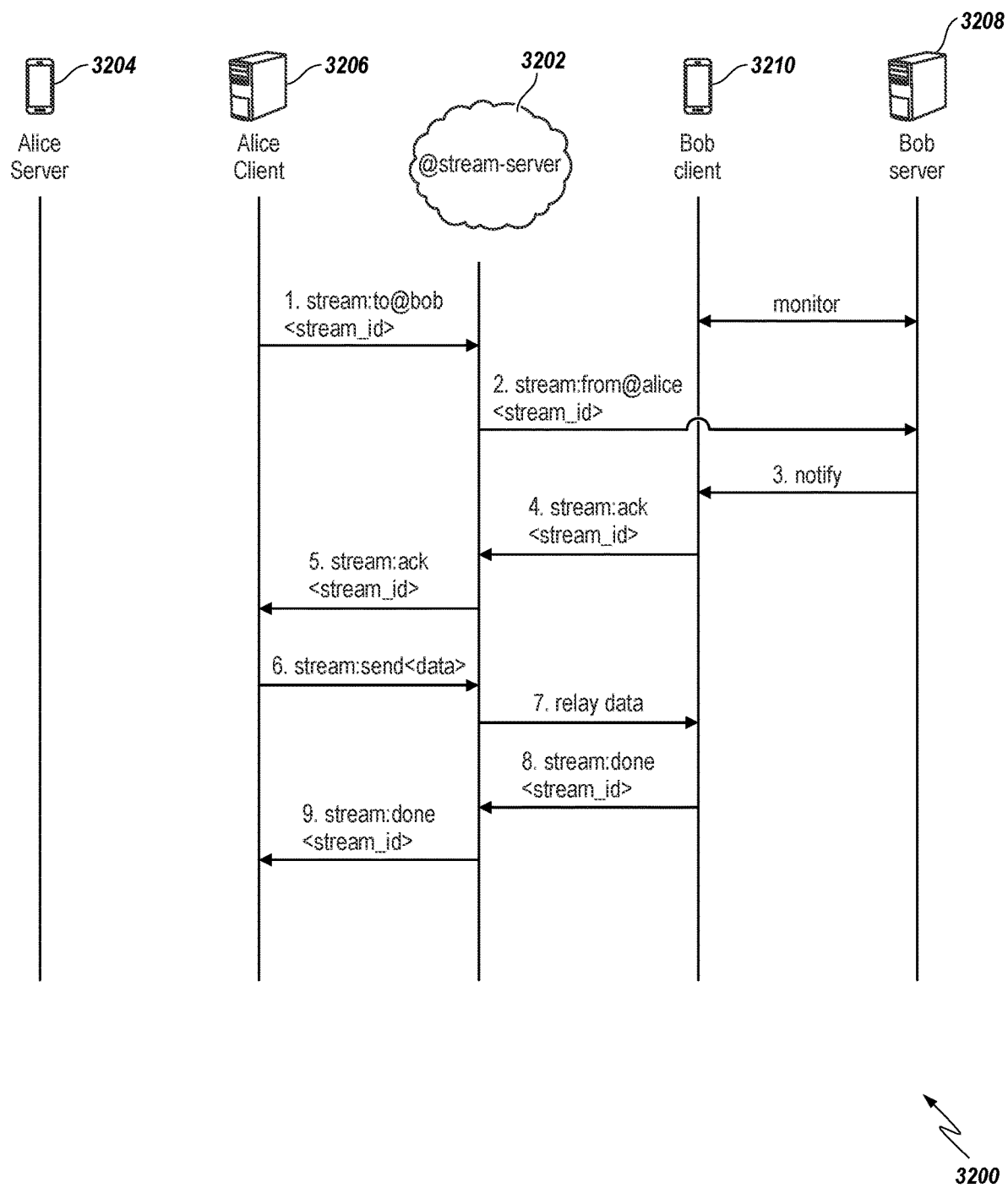

FIG. 32 is a flowchart of example streaming method using an intermediate streaming server.

Data Access, Sharing and Encryption

Figure 33:
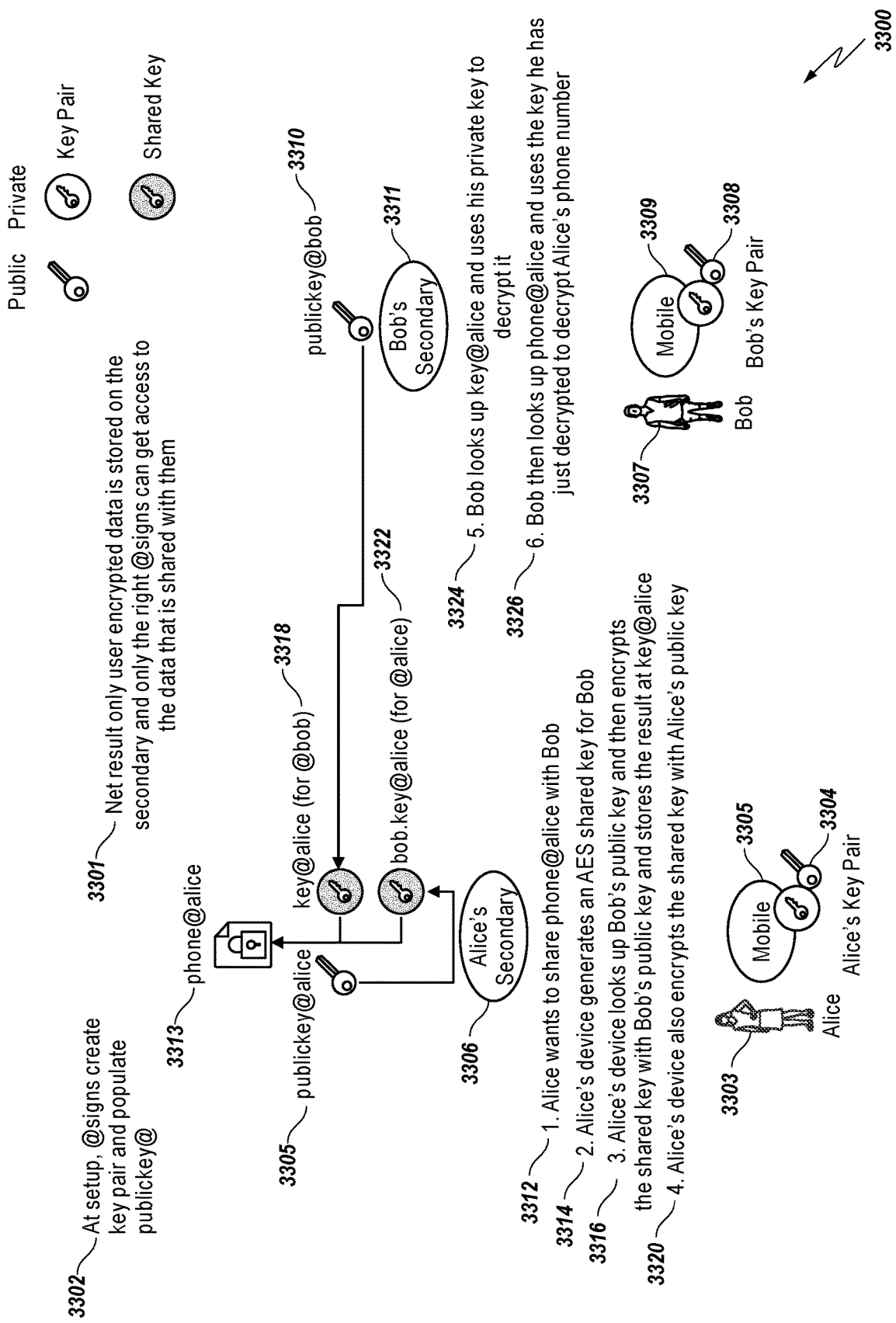

FIG. 33 illustrates an example system for use of encryption keys.

Figure 34:
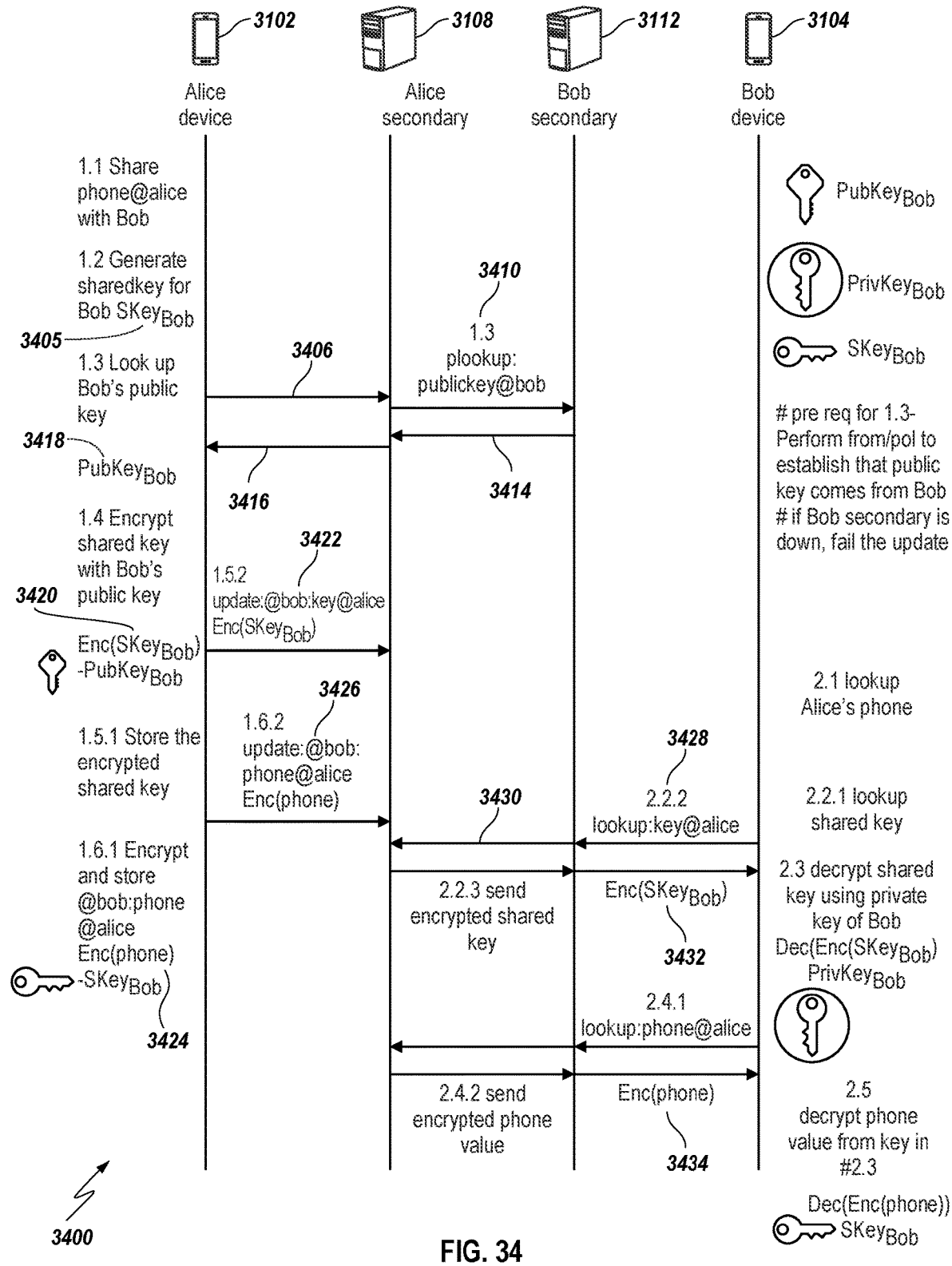

FIG. 34 illustrates an example system for use of encryption keys.

Figure 35:
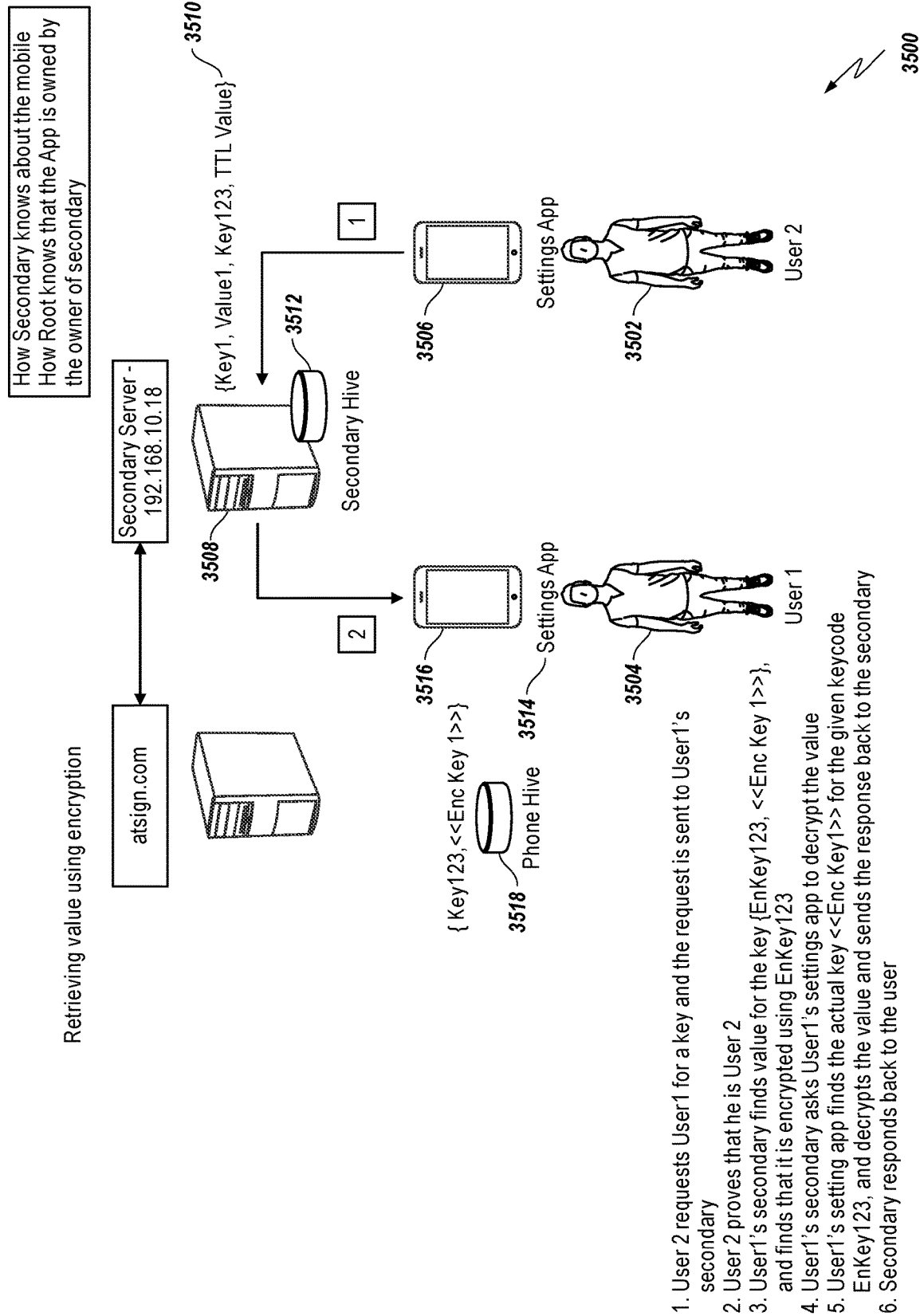

FIG. 35 illustrates an example system for key value retrieval.

Figure 36:
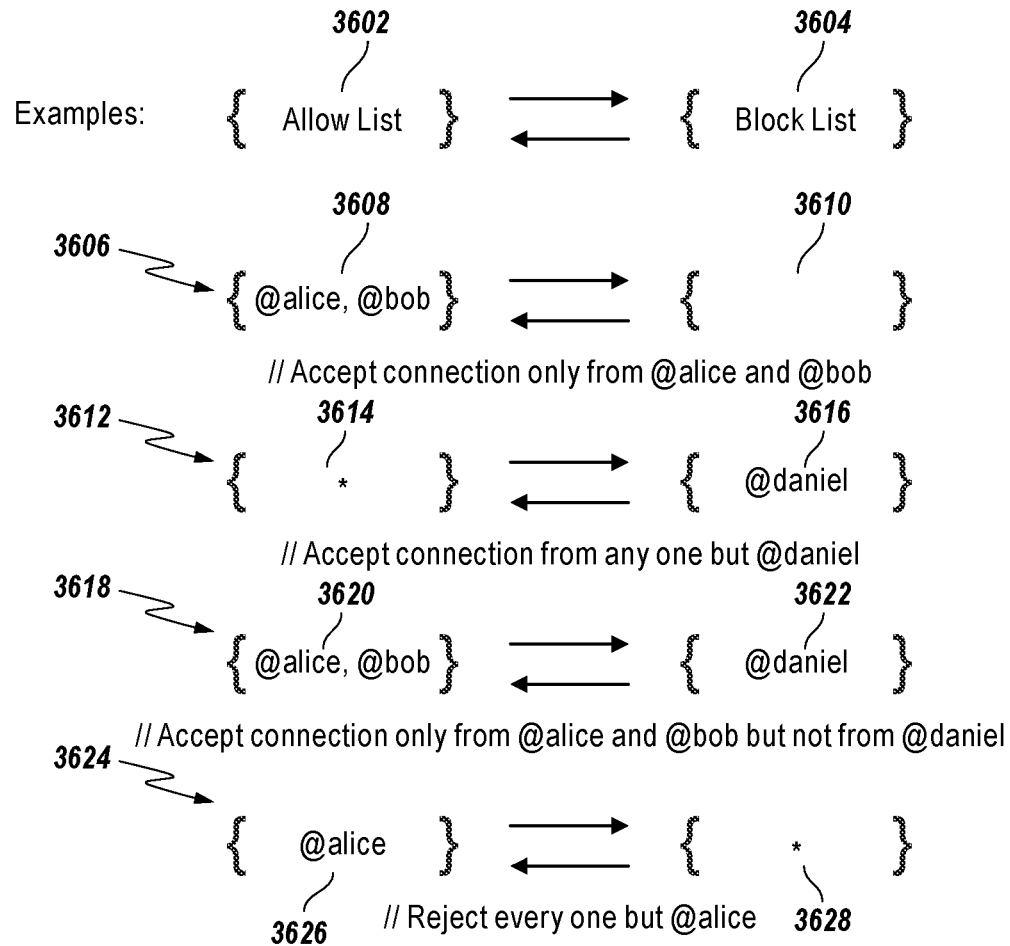

FIG. 36 illustrates approaches for spam protection.

Local and Secondary Server Synchronization

Figure 37:
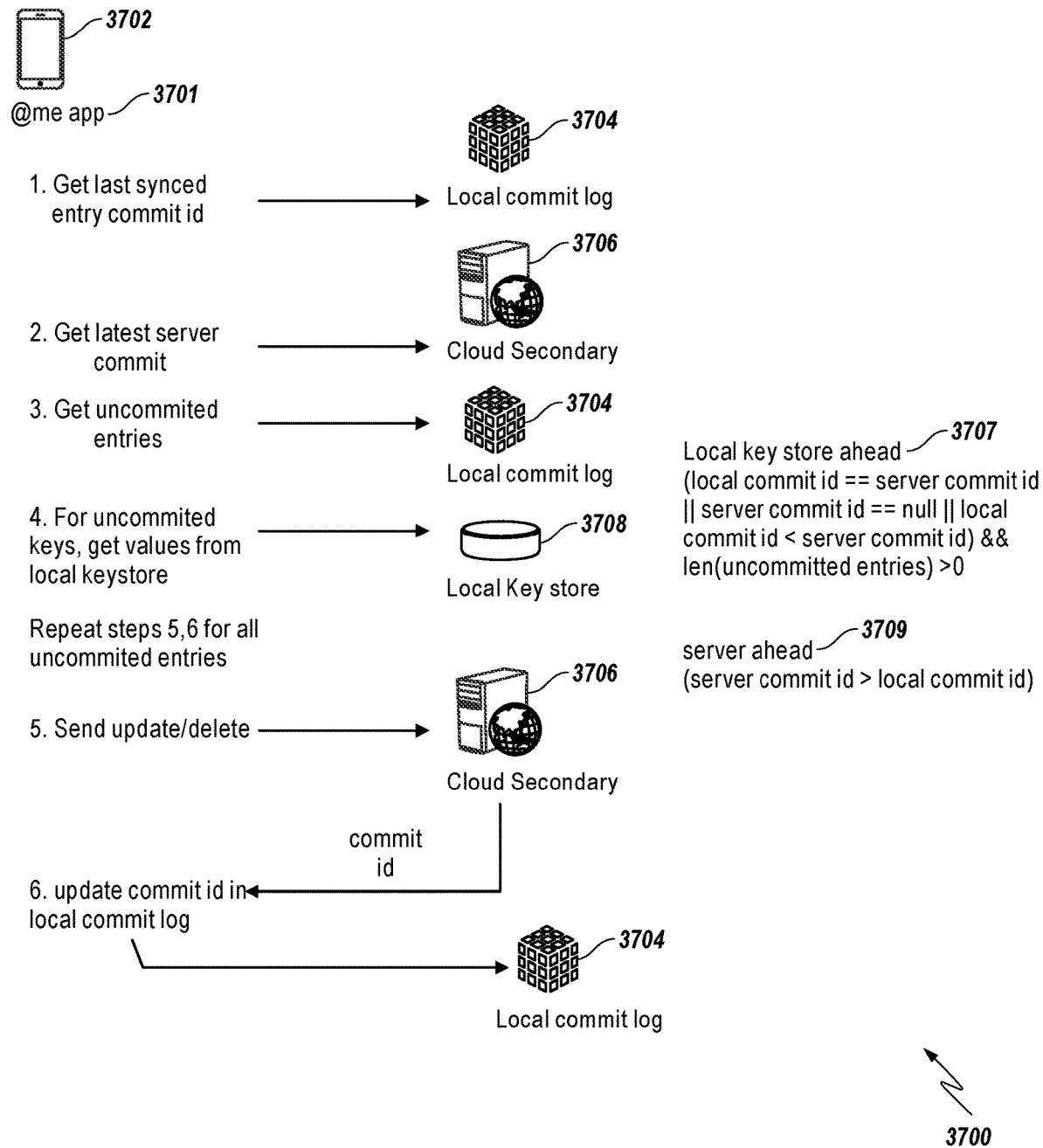

FIG. 37 illustrates example synchronization operations for synchronizing local and cloud persistence.

Figure 38A:
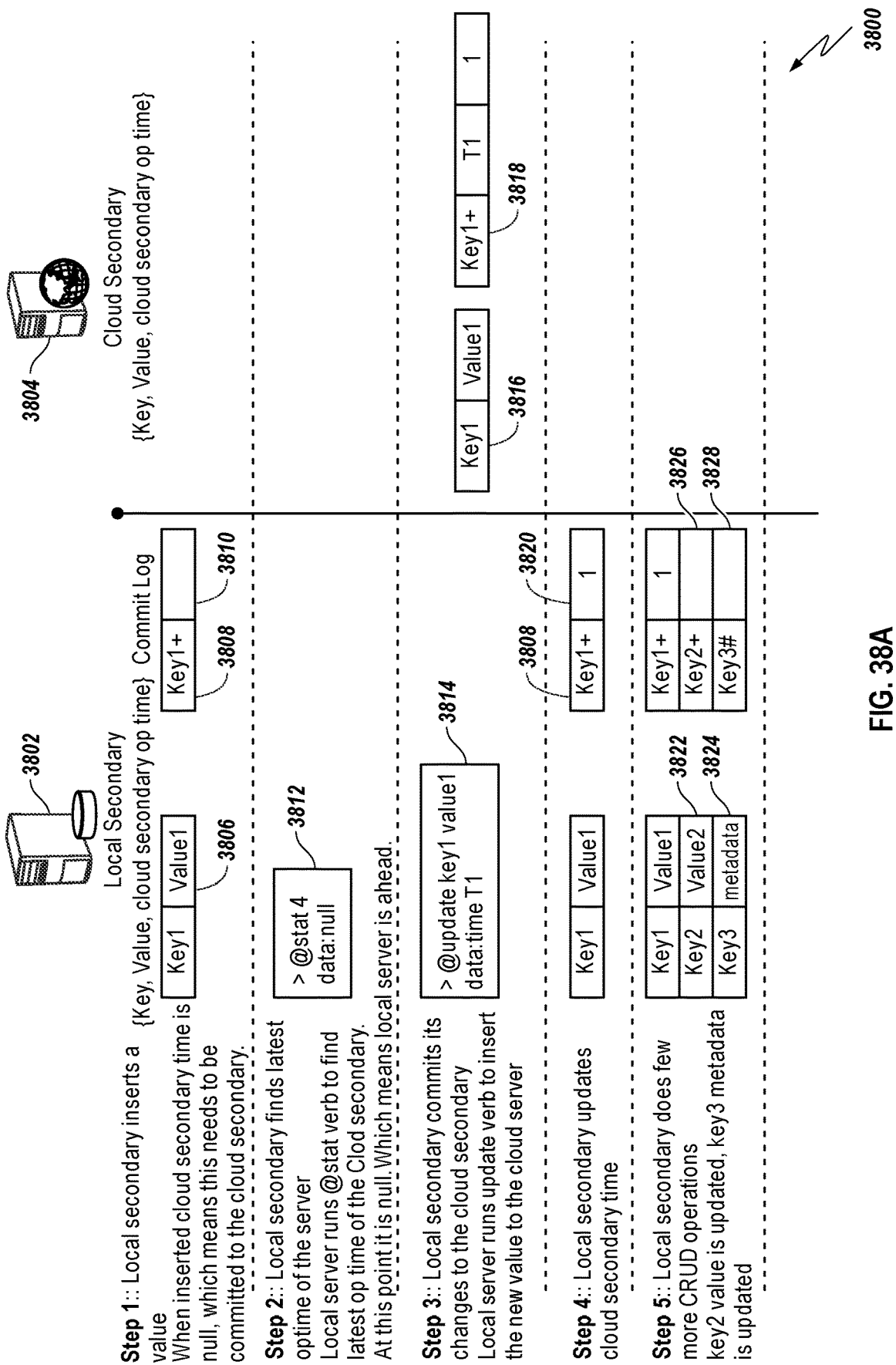
Figure 38B:
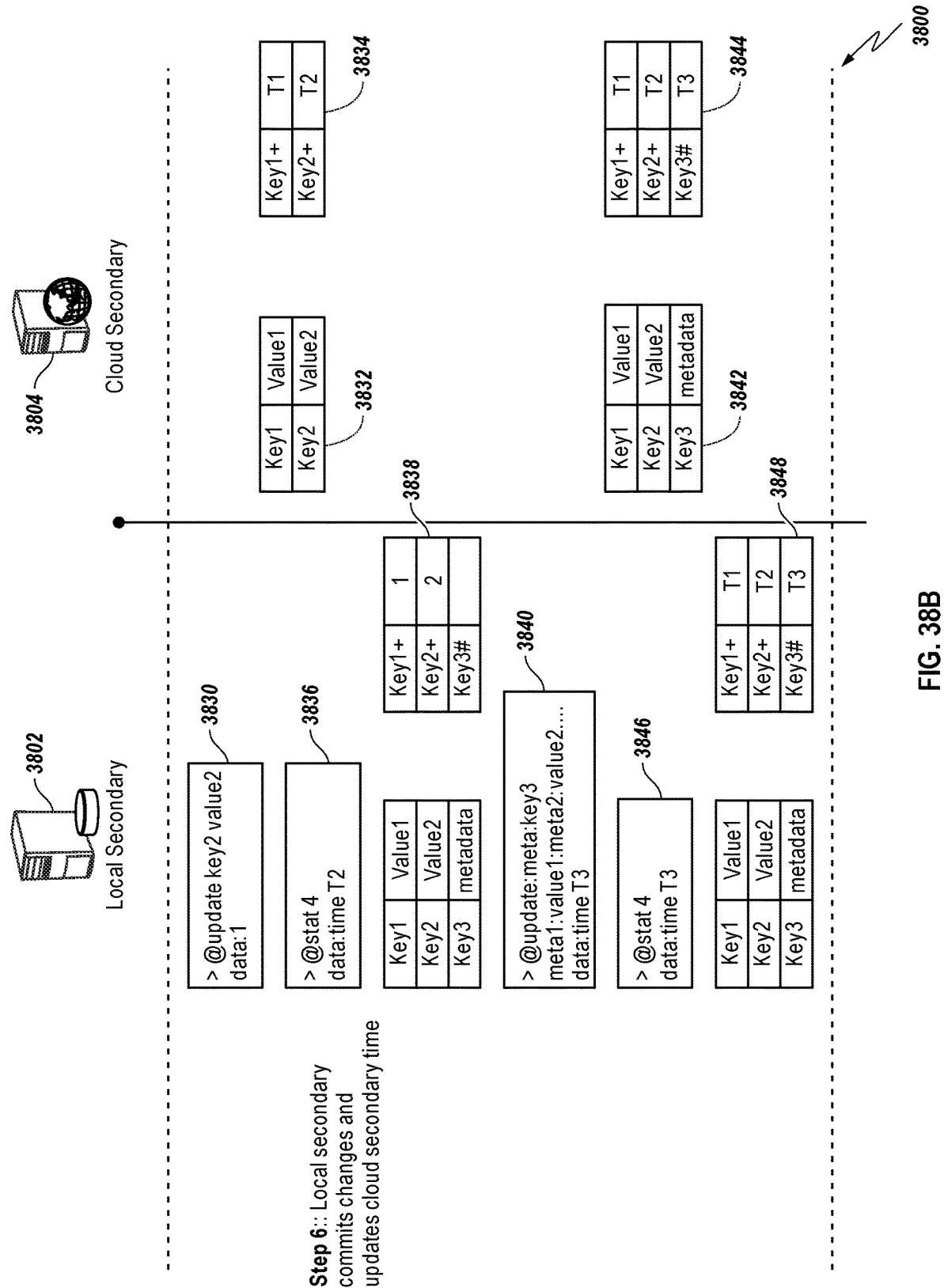
Figure 38C:
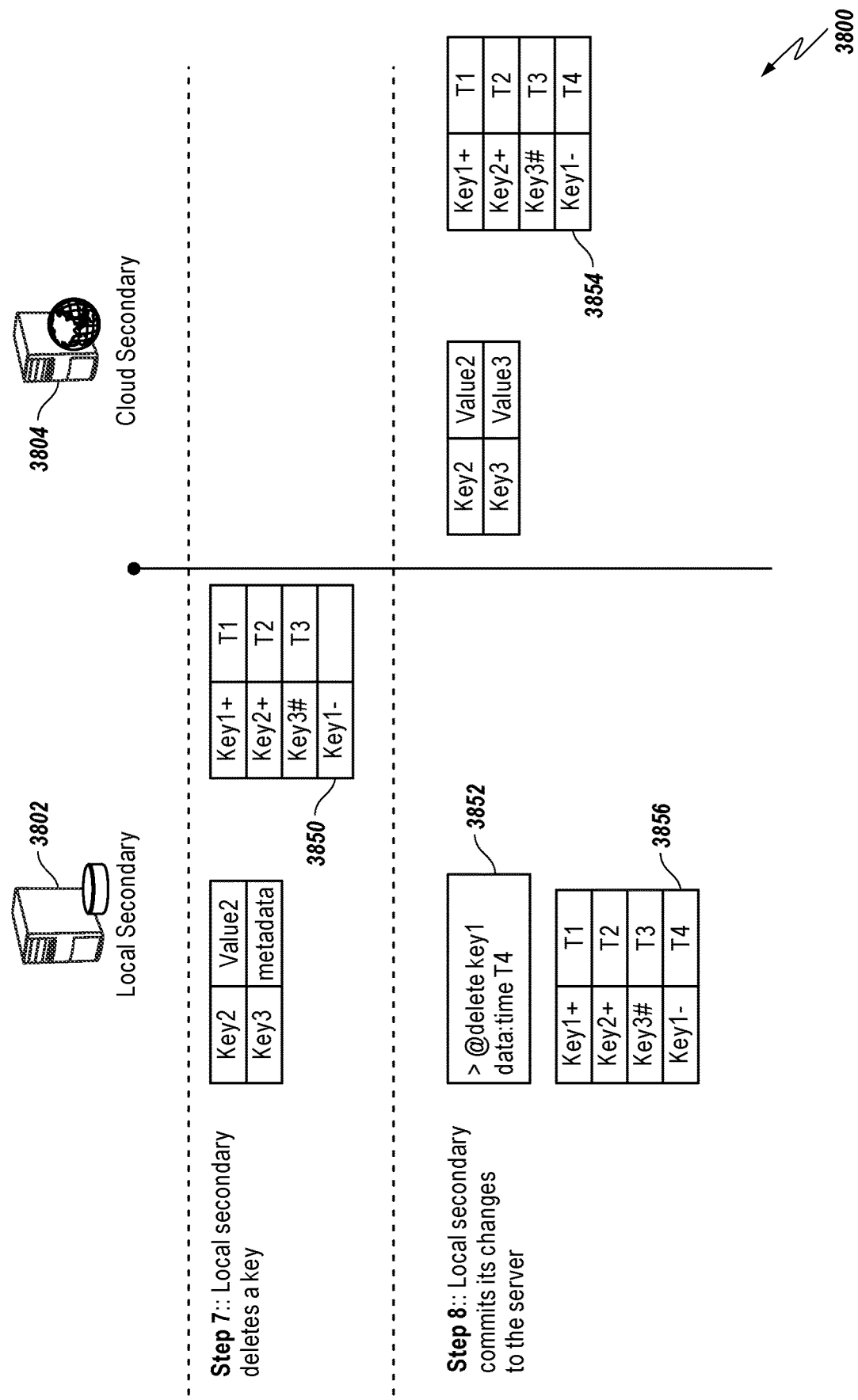

FIGS. 38A-C illustrate a synchronization scenario in which a local storage is ahead (update wise) of storage on a secondary server.

Figure 39:
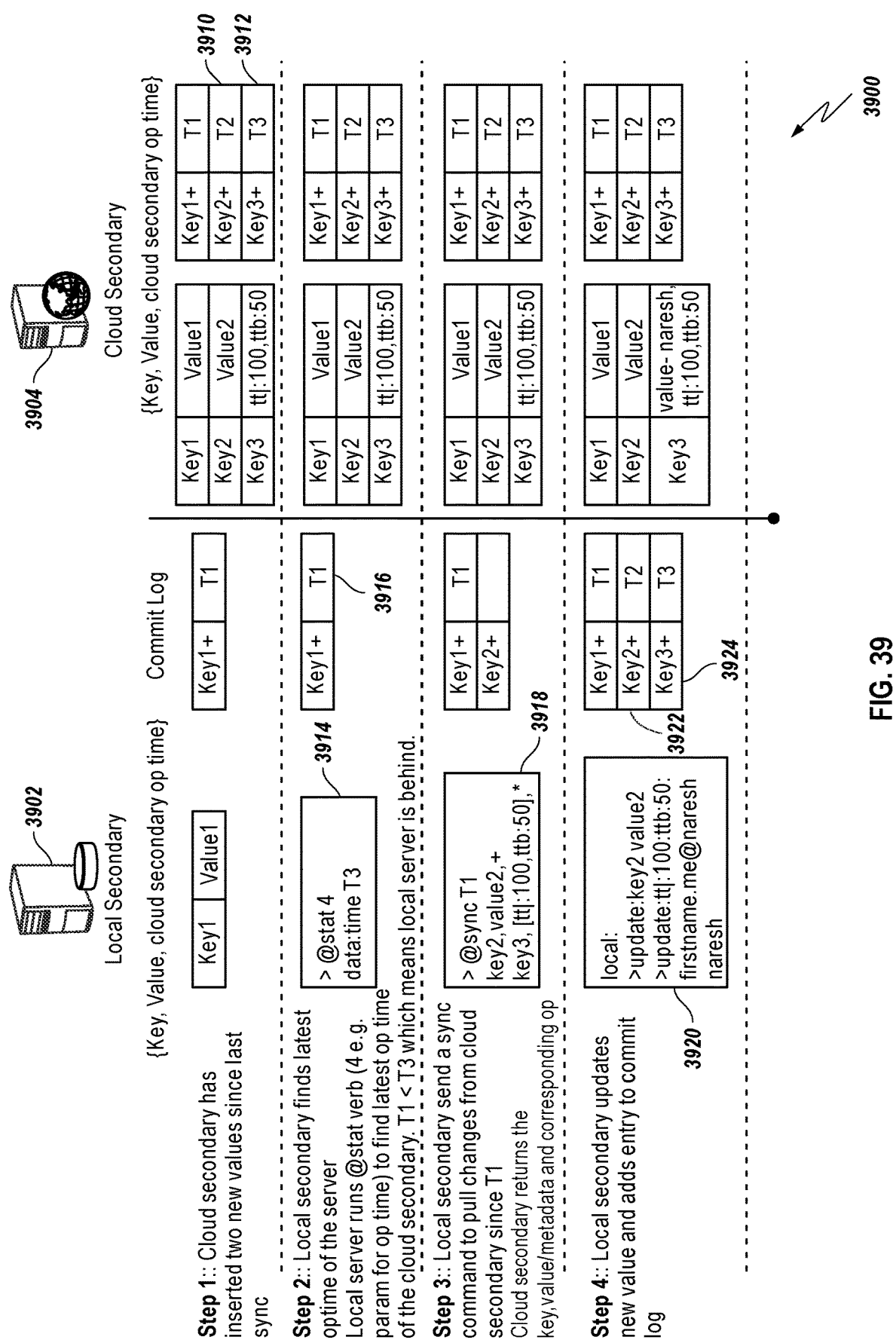

FIG. 39 illustrates a synchronization scenario in which a local storage is behind (update wise) storage on a secondary server.

Figure 40:
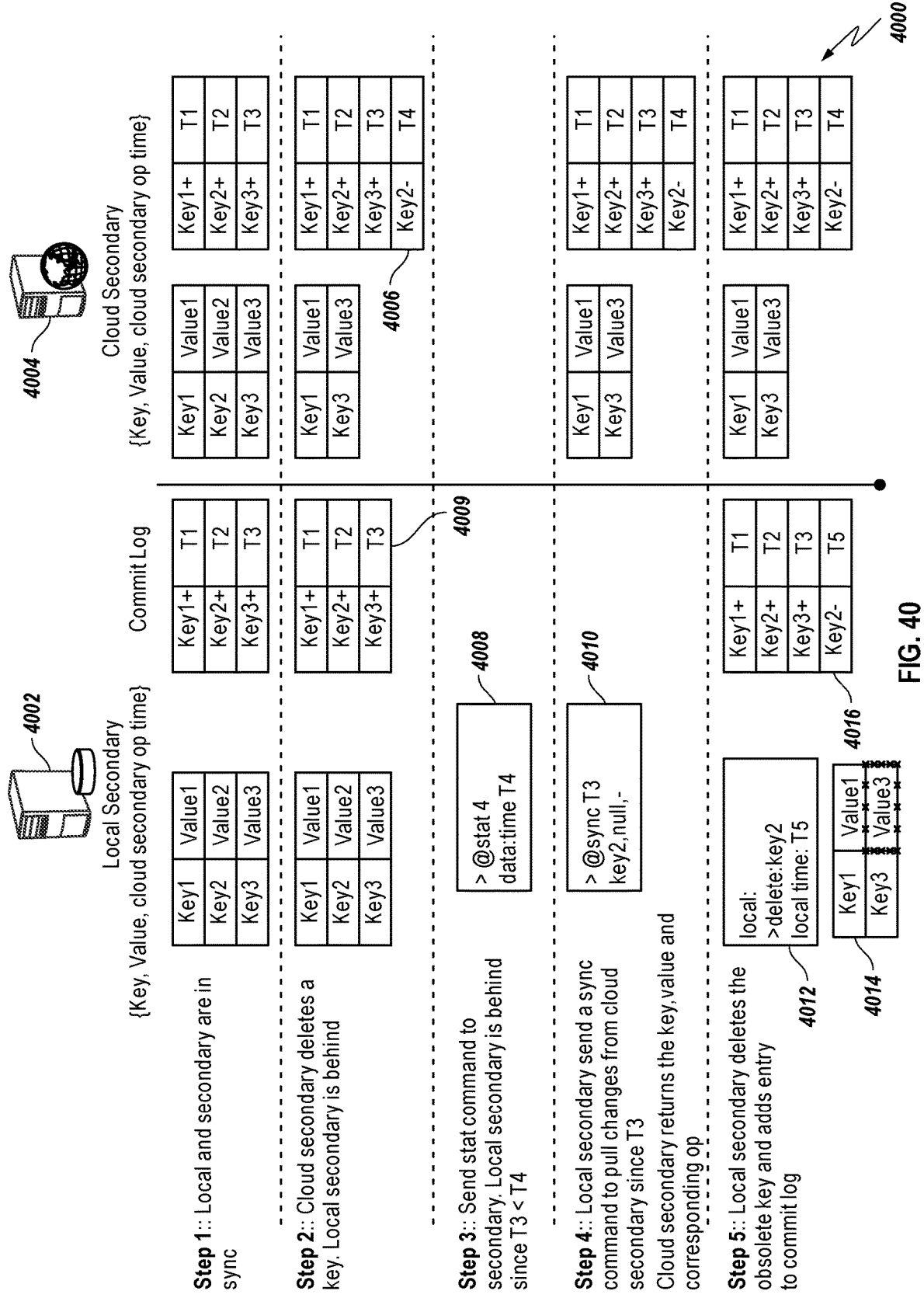

FIG. 40 illustrates a synchronization scenario in which a local storage becomes synchronized with a secondary server after data is deleted from the secondary server.

Figure 41:
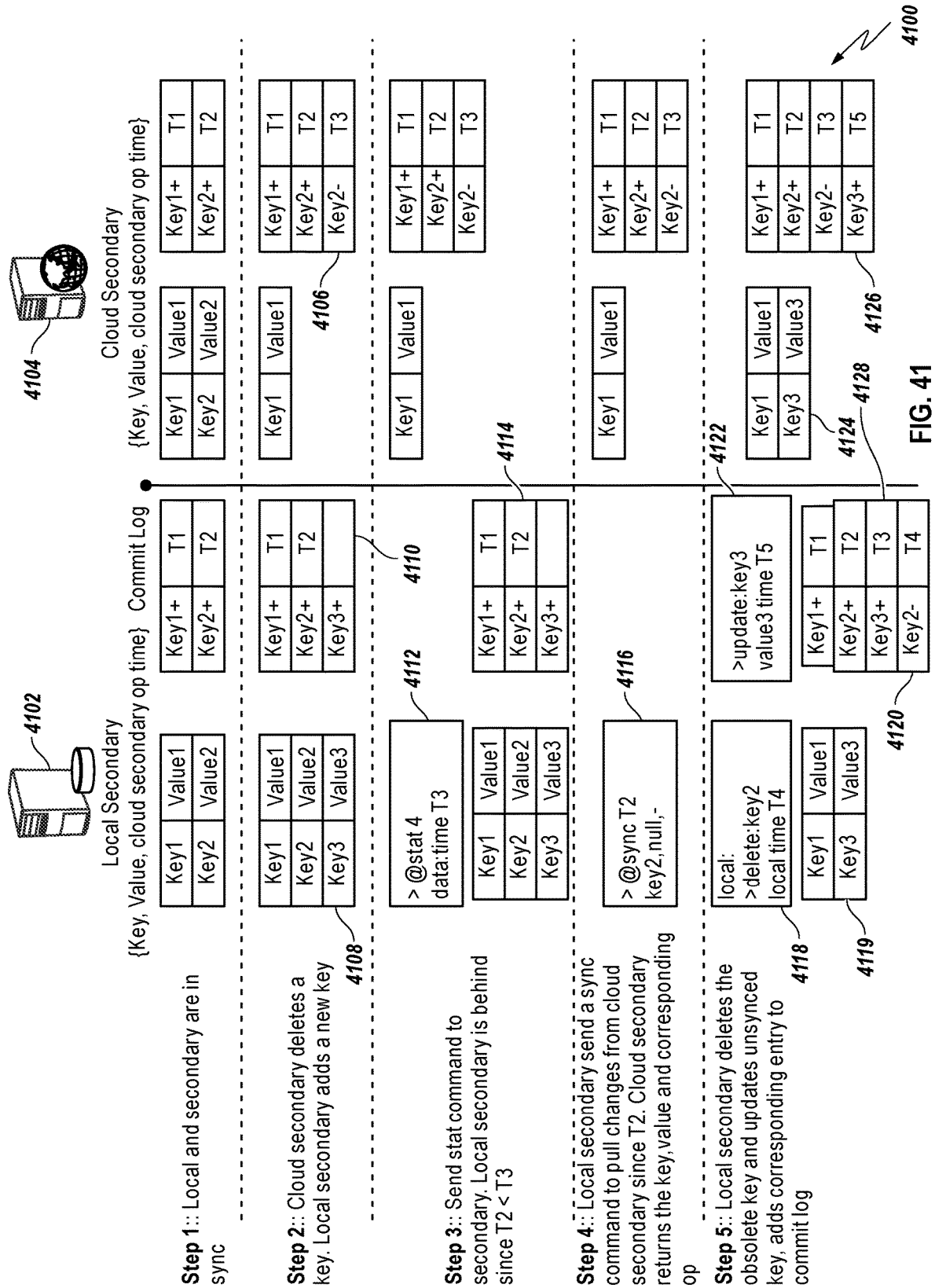

FIG. 41 illustrates a synchronization scenario in which a local storage becomes synchronized with a secondary server after data is deleted from the secondary server and added to the local storage.

Figure 42A:
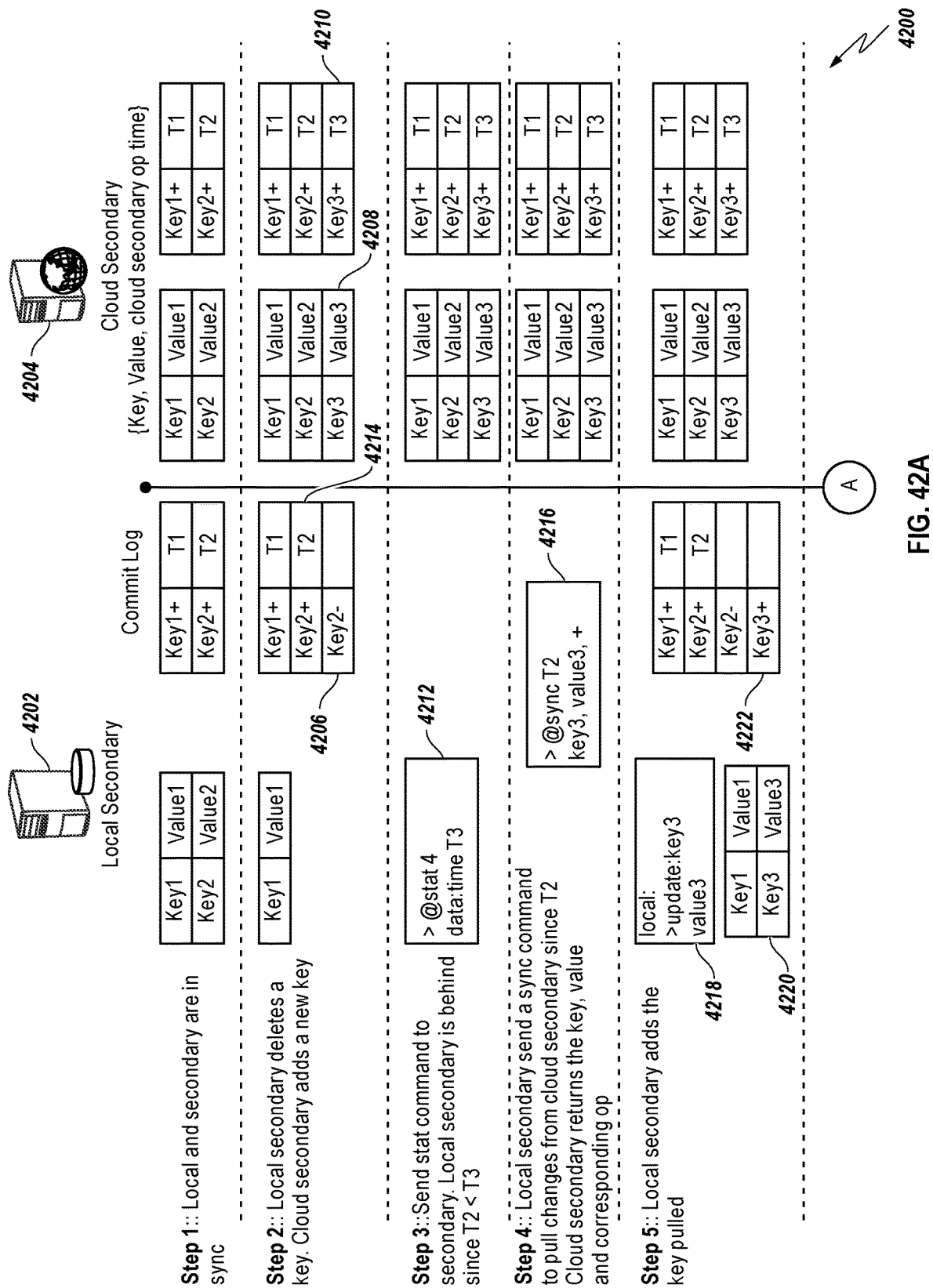
Figure 42B:
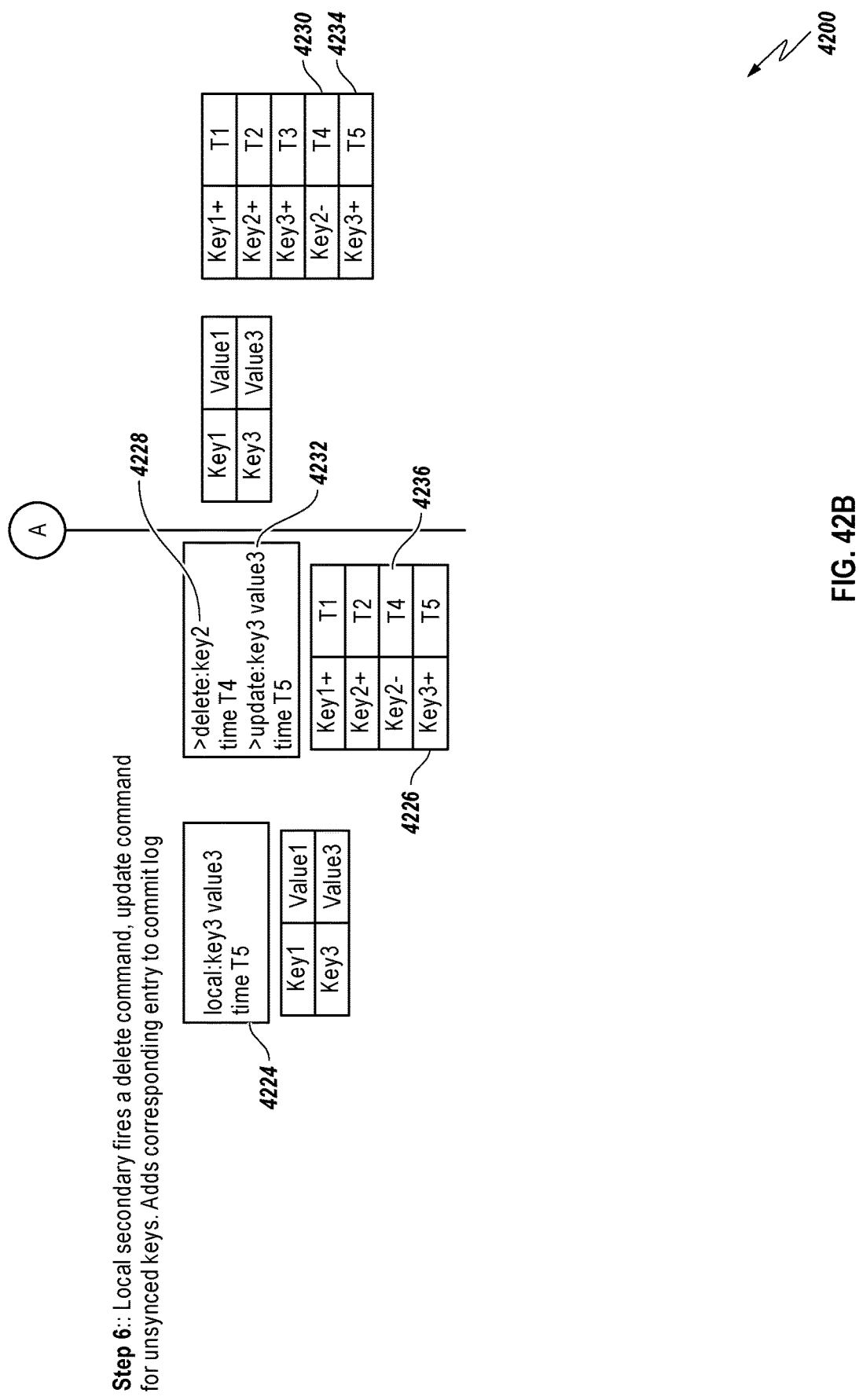

FIGS. 42A-B illustrate a synchronization scenario in which a local storage becomes synchronized with a secondary server after data is deleted from the local storage and added to the secondary server.

Figure 43:
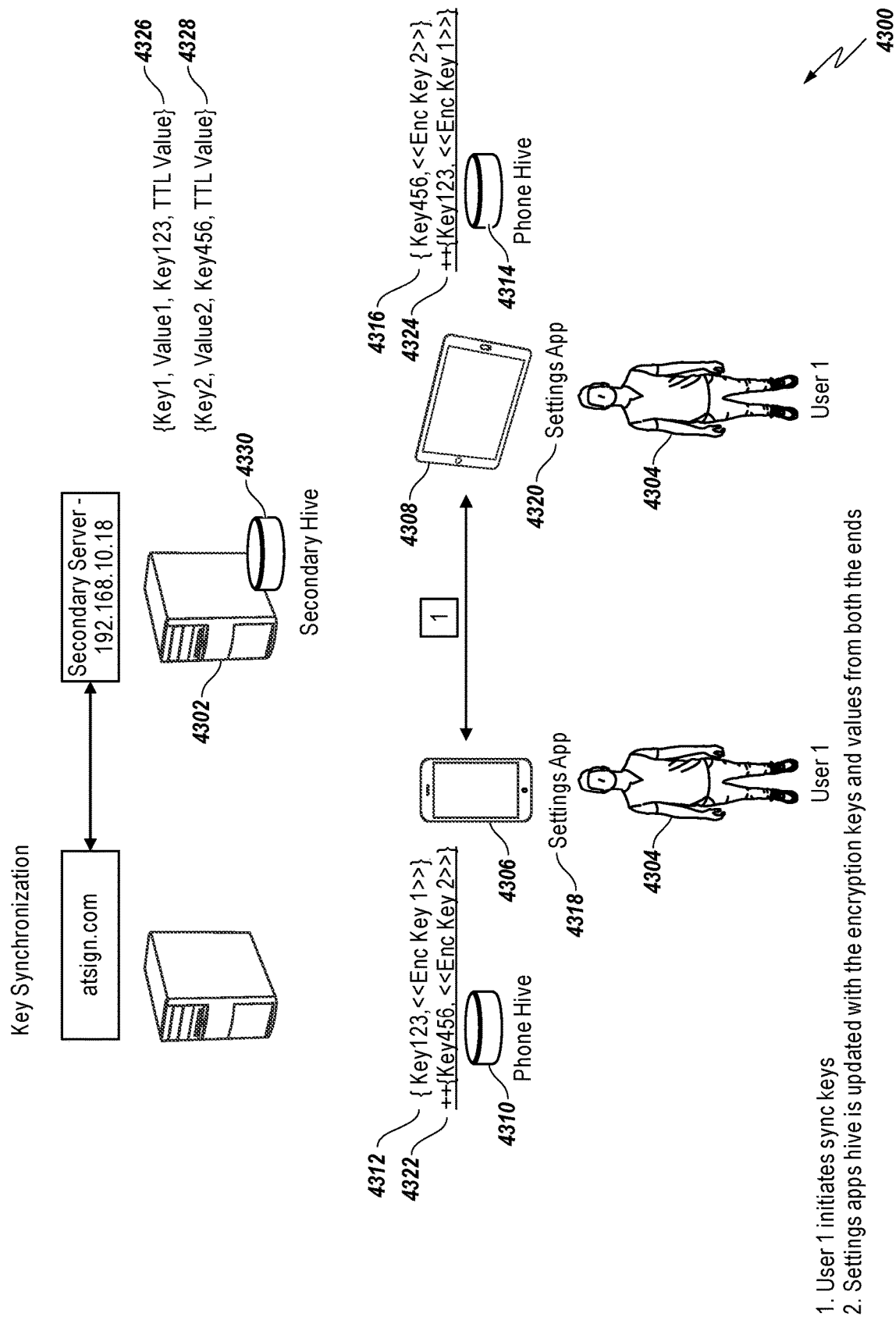

FIG. 43 illustrates an example system for synchronizing keys across user devices and a secondary server.

Figure 44A:
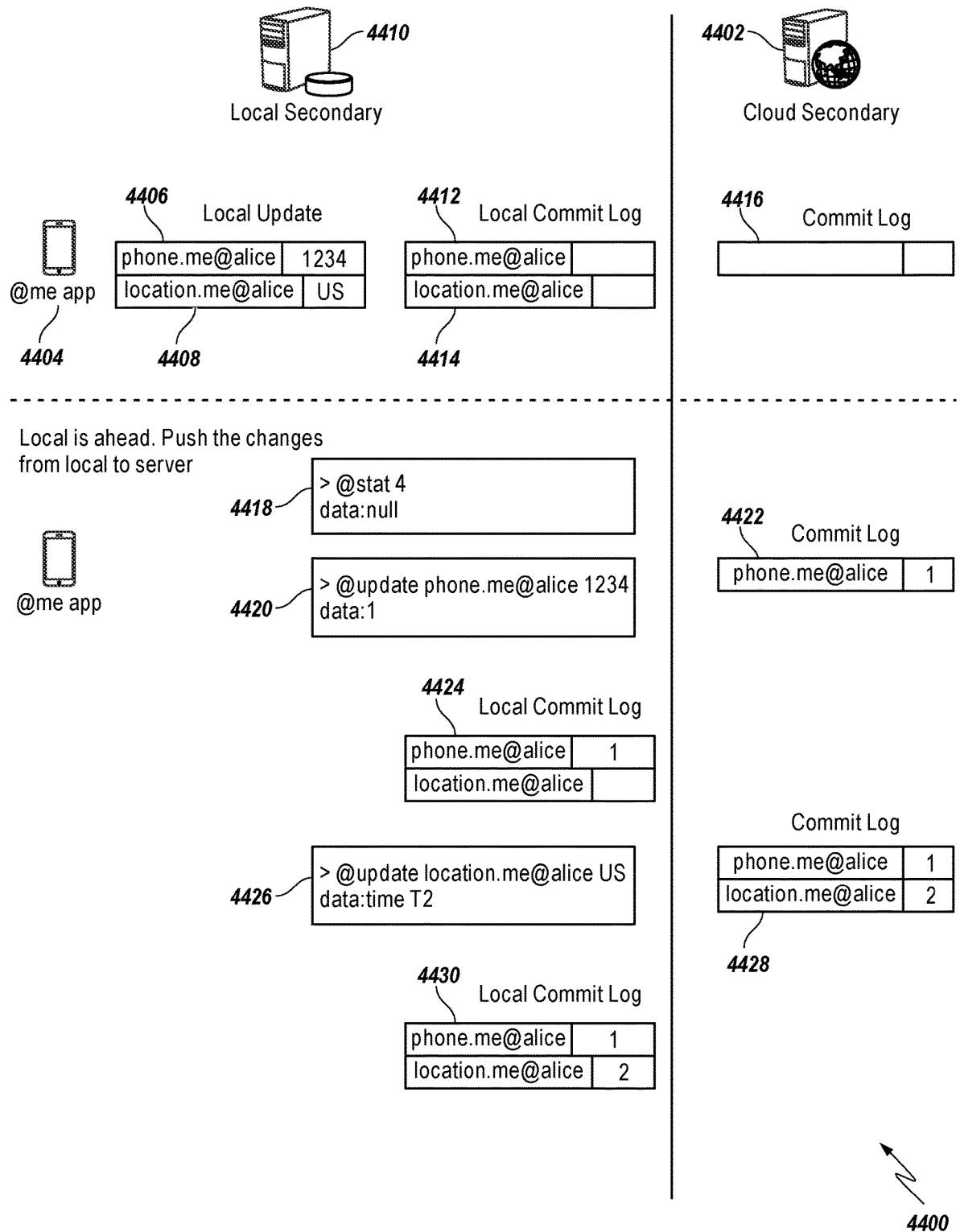
Figure 44B:
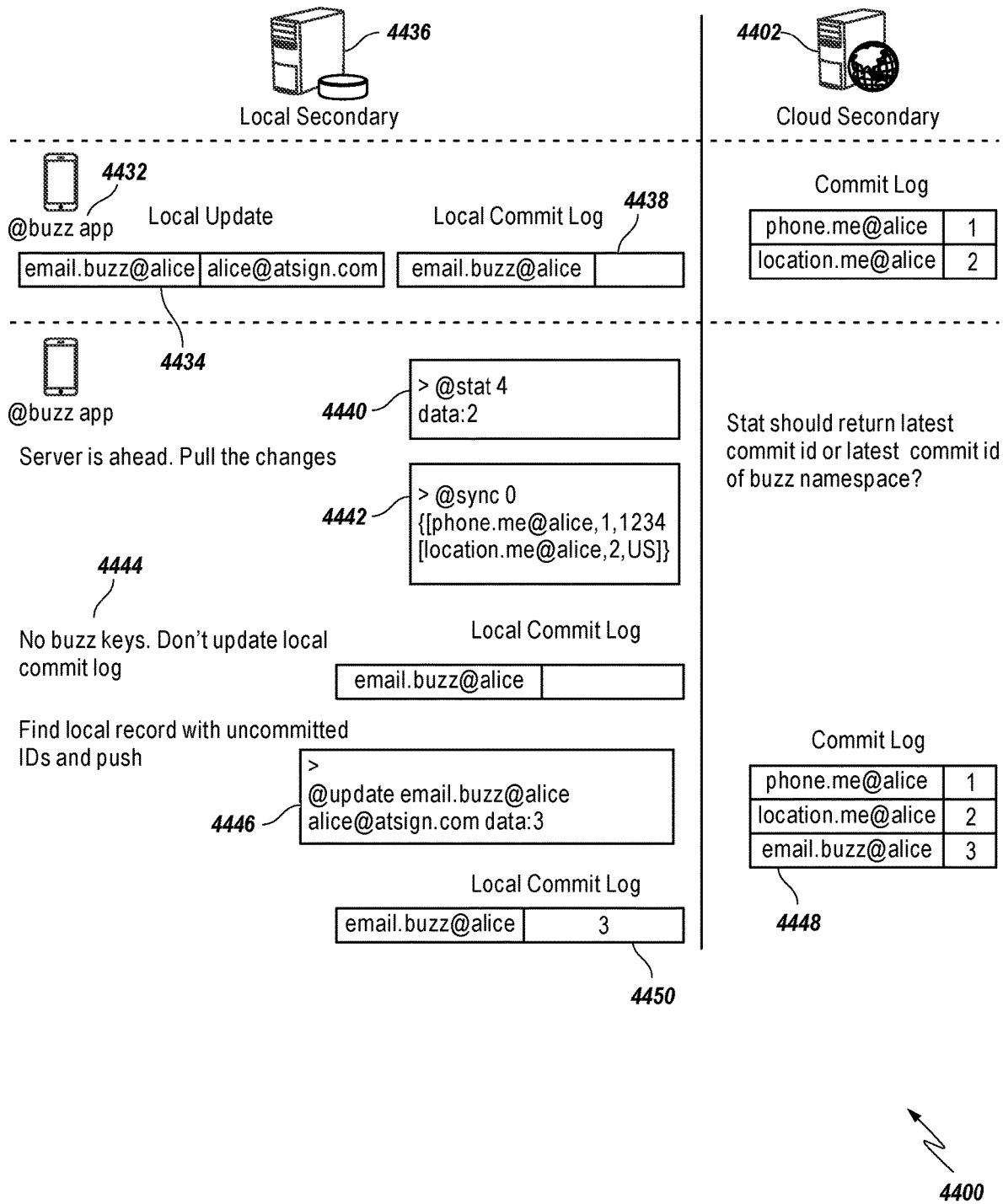

FIGS. 44A-B illustrate an example system for synchronizing keys across applications and a secondary server.

FIG. 45 illustrates an example sync response message.

Design

Figure 46:
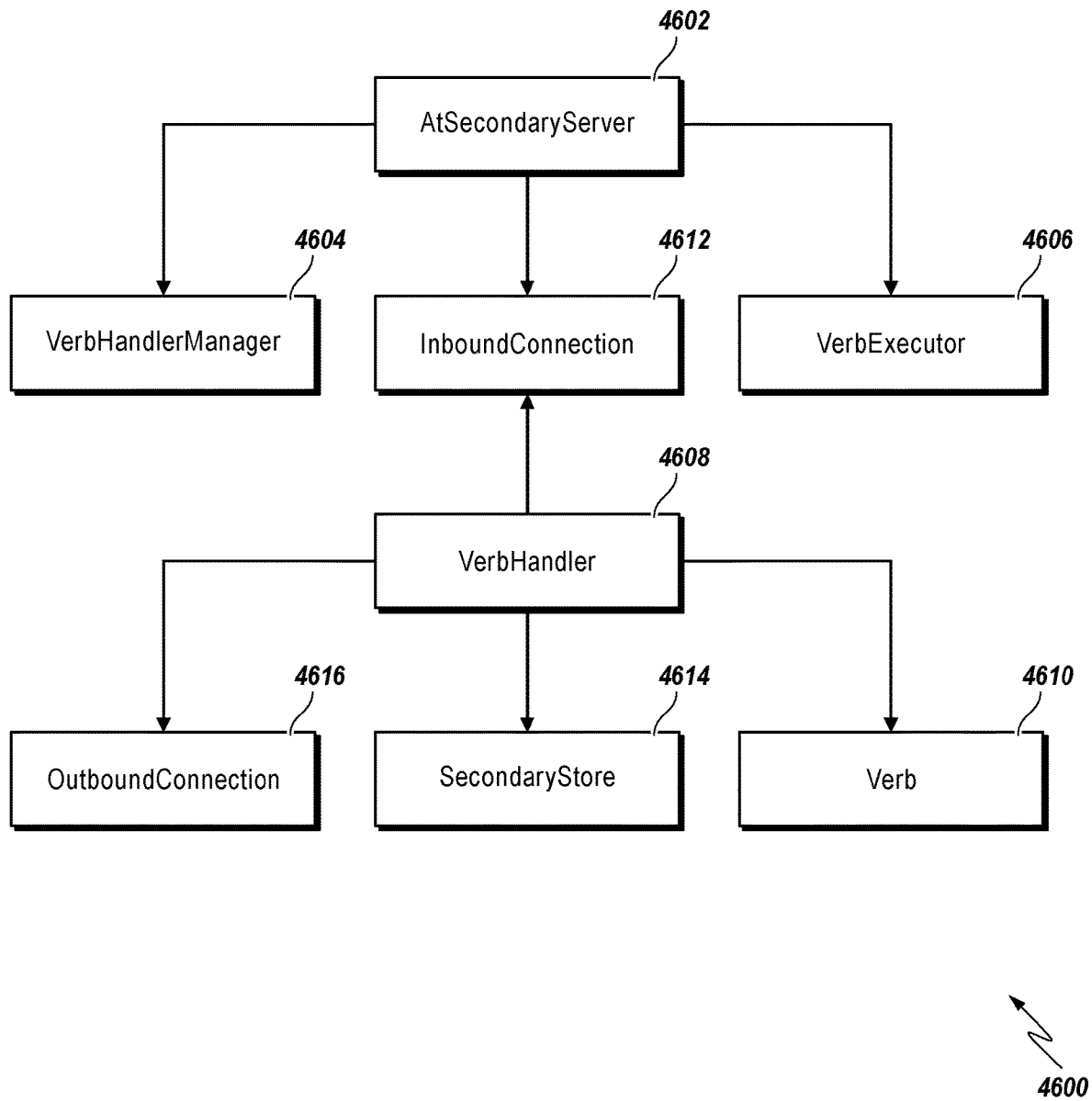

FIG. 46 illustrates example entities for verb handling.

Figure 47:
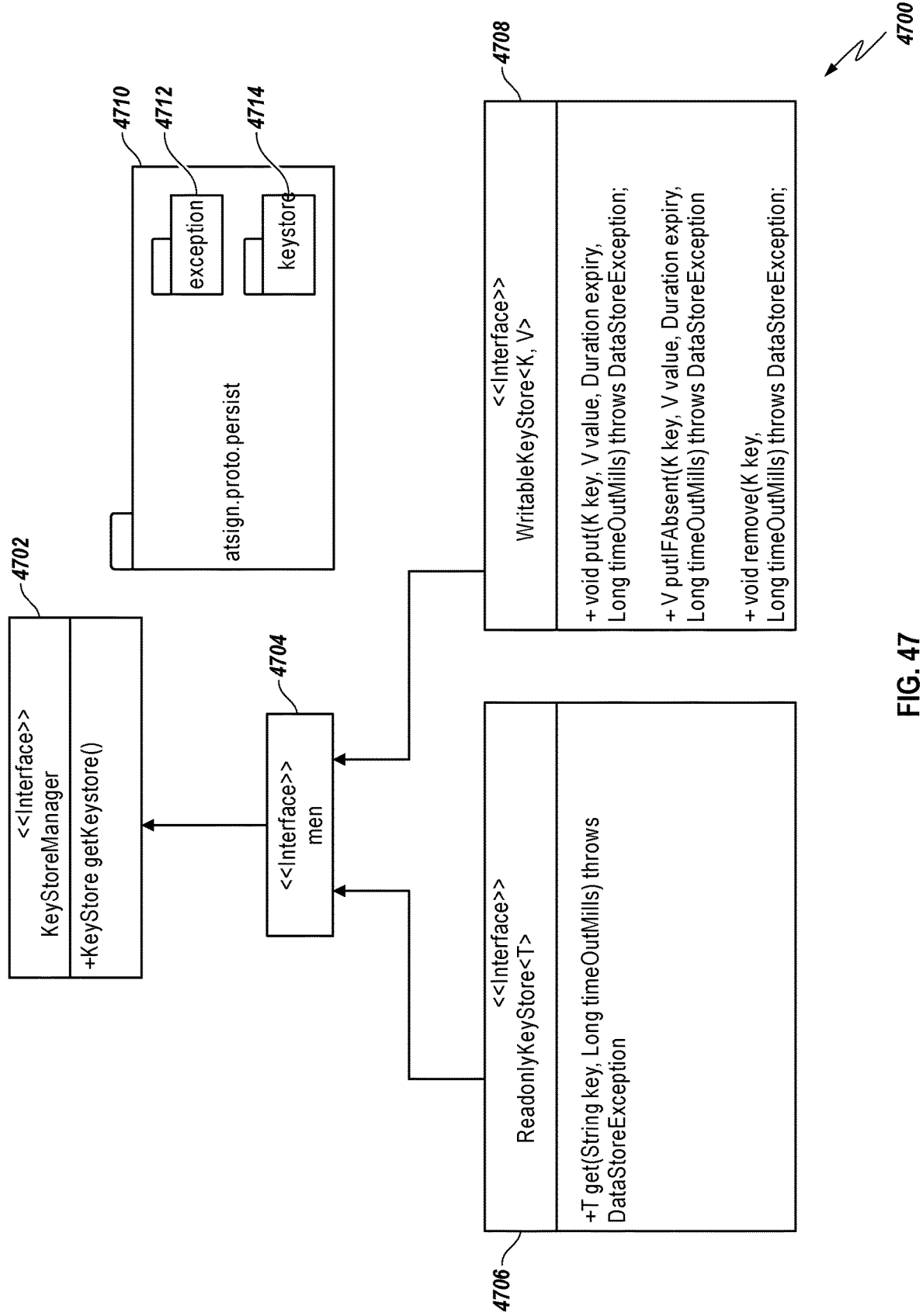

FIG. 47 illustrates an example class diagram.

Figure 48:
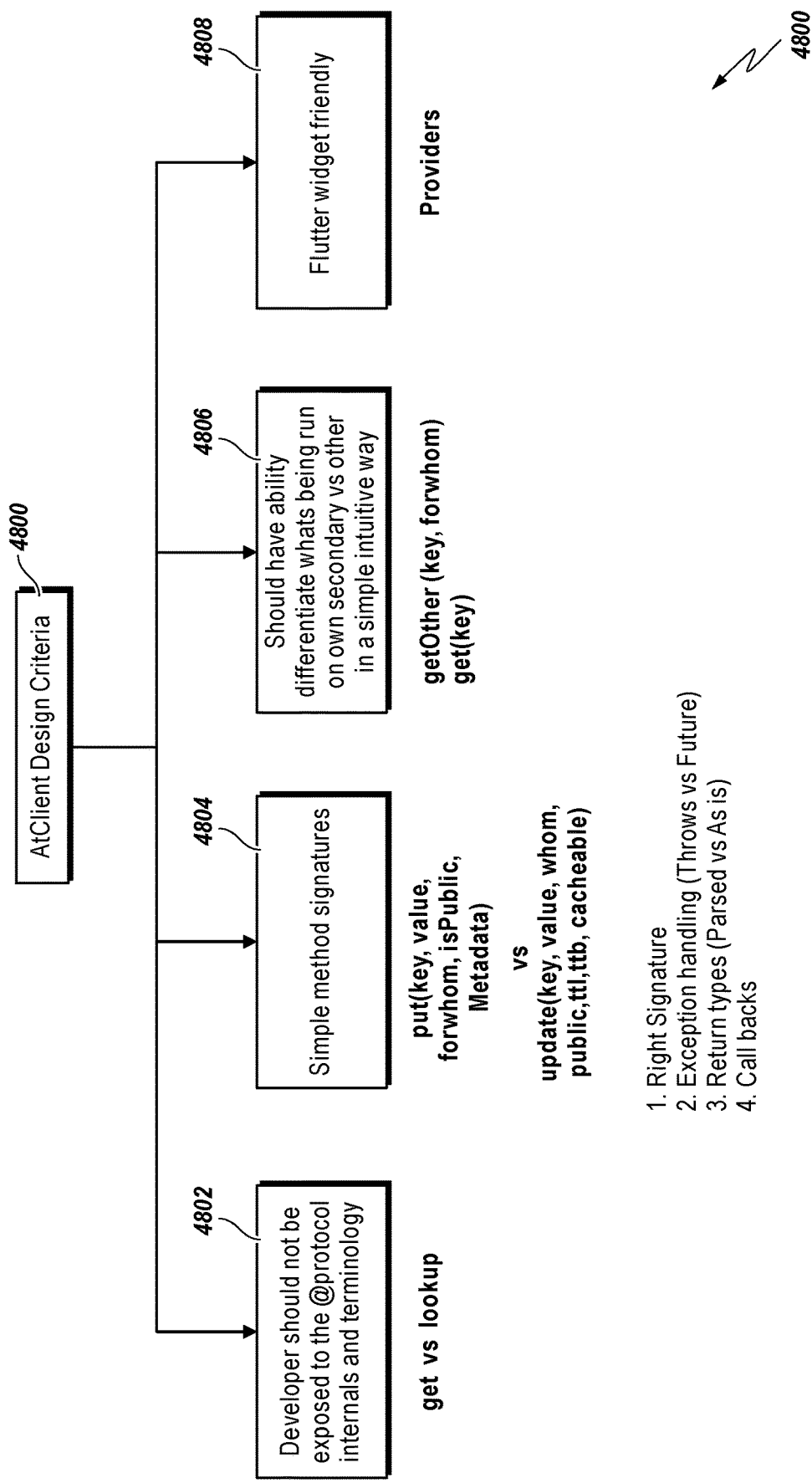

FIG. 48 illustrates client design criteria goals

Notifications

Figure 49:
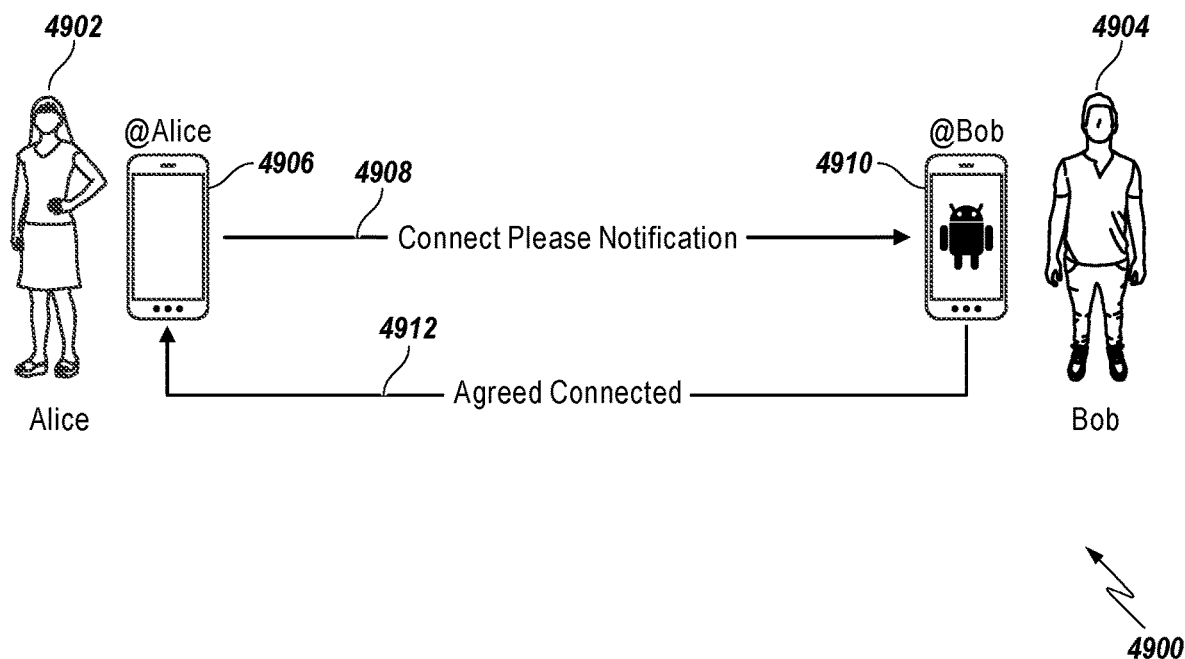

FIG. 49 illustrates an example system for an accept notification.

Figure 50:
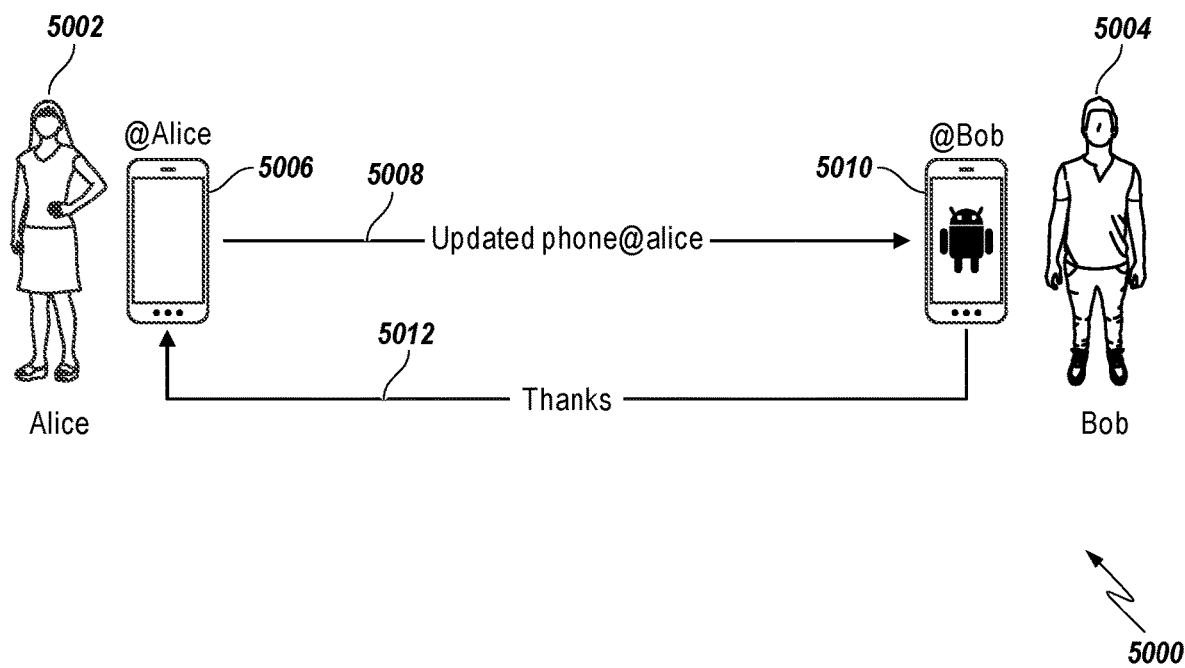

FIG. 50 illustrates an example system for an update notification.

Figure 51:
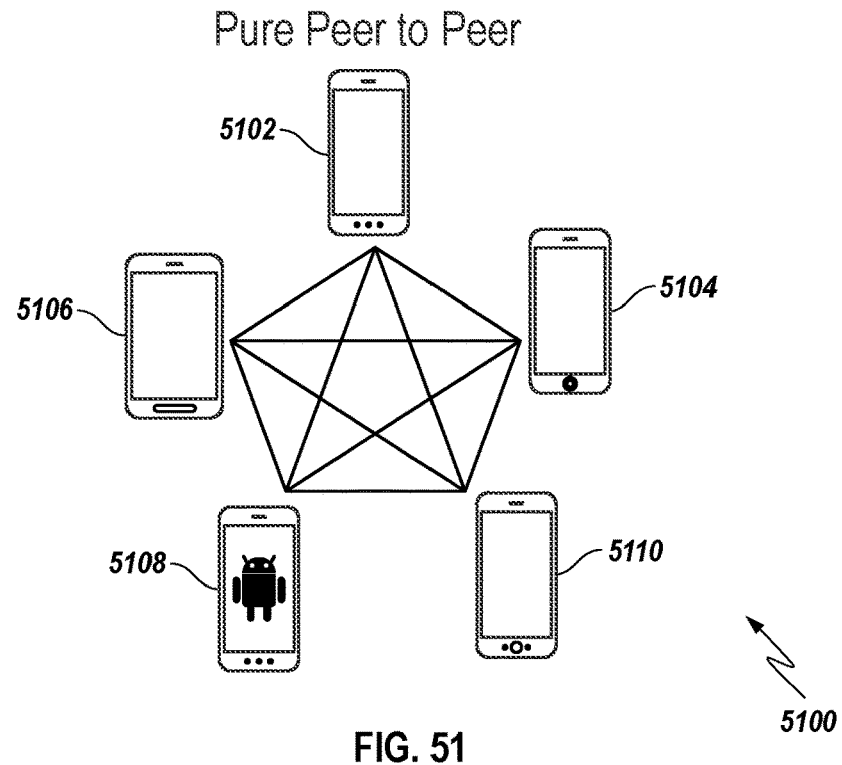

FIG. 51 illustrates a peer to peer network for group notifications.

Figure 52:
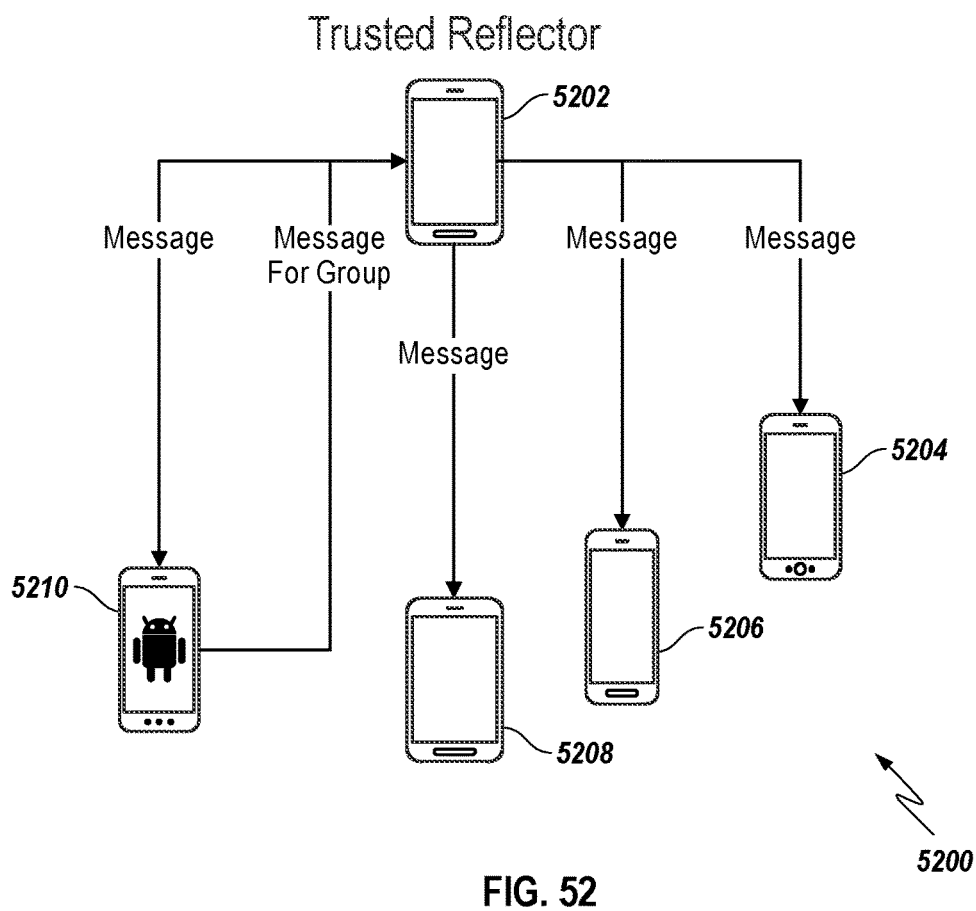

FIG. 52 illustrates an example reflector network.

FIG. 53 illustrates information describing a notification verb.

Figure 54:
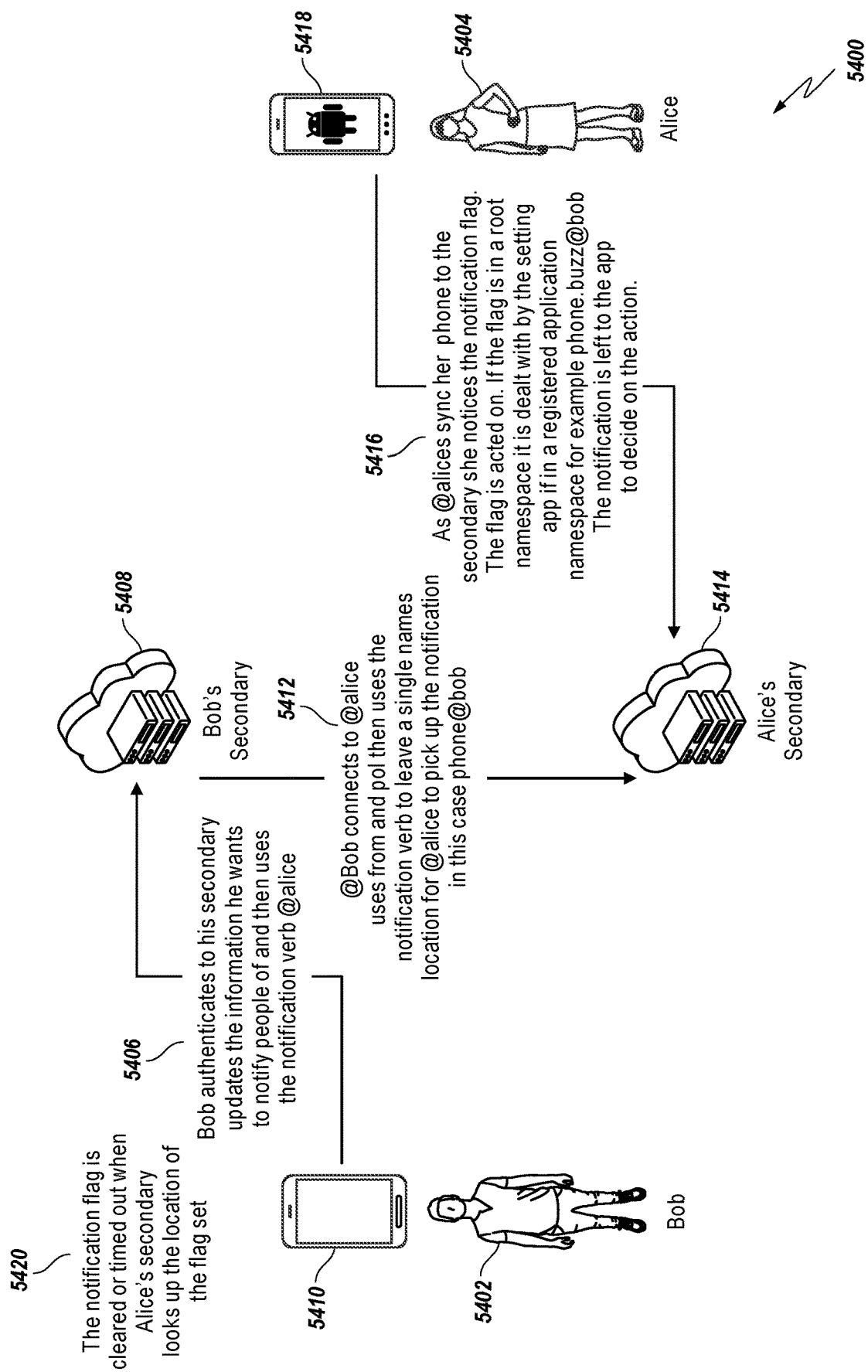

FIG. 54 illustrates an example system for notifications.

Figure 55:
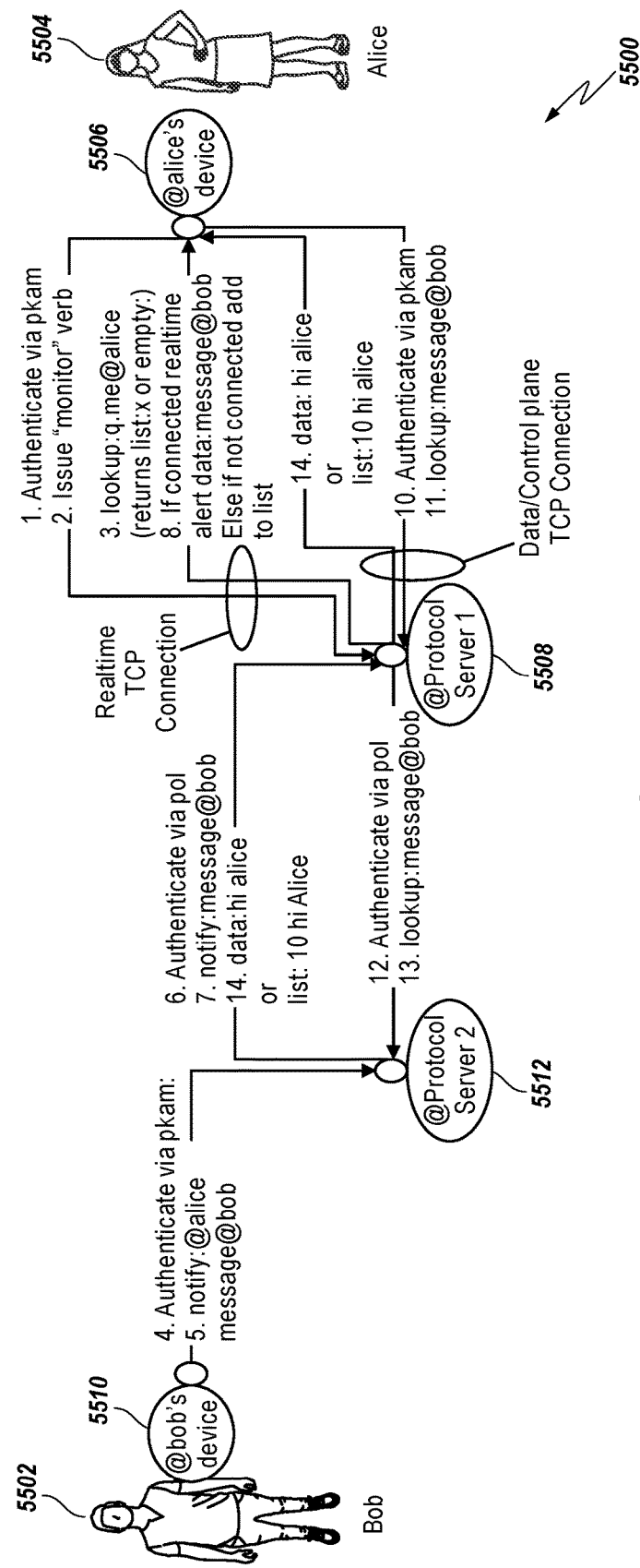

FIG. 55 illustrates an example system for notifications.

Example Applications

Figure 56:
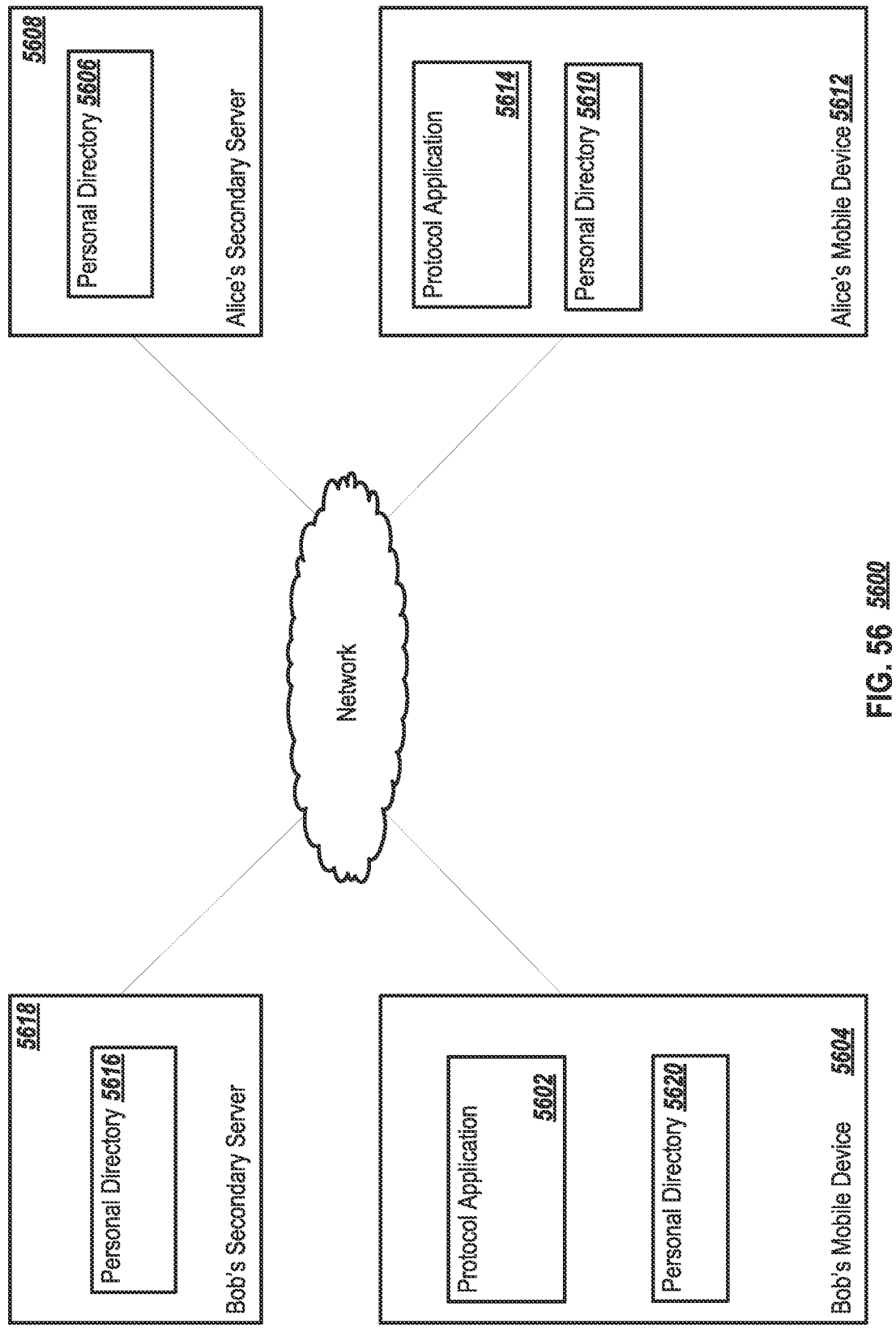

FIG. 56 illustrates an example system for P2P applications.

Figure 57A:
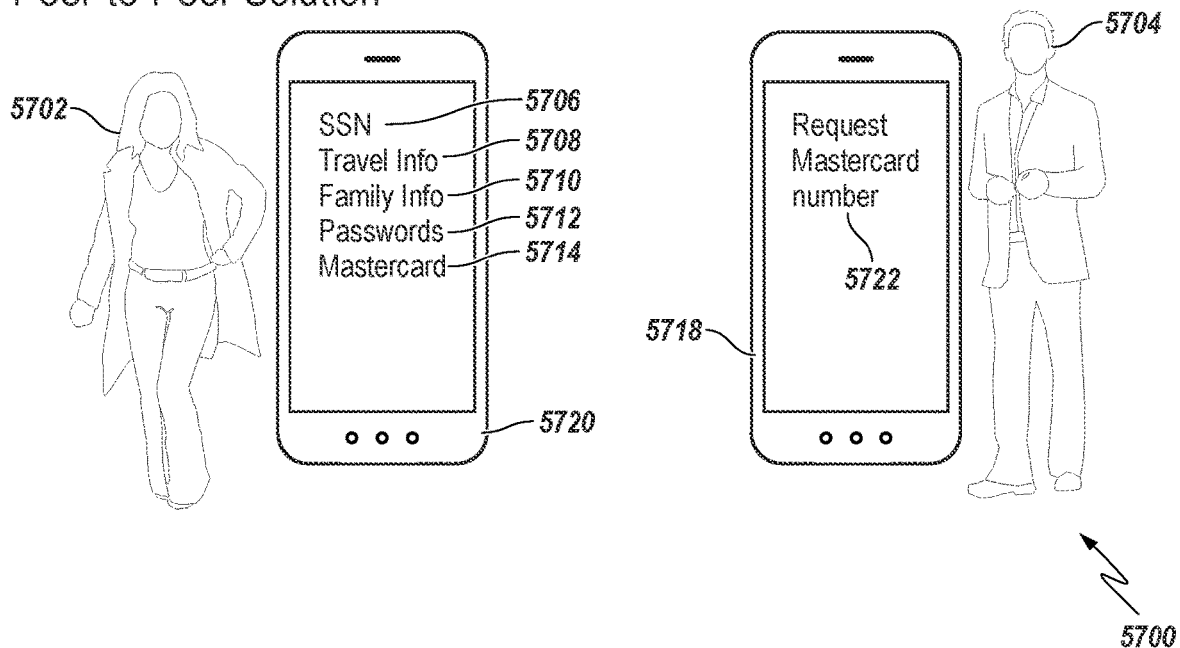
Figure 57B:
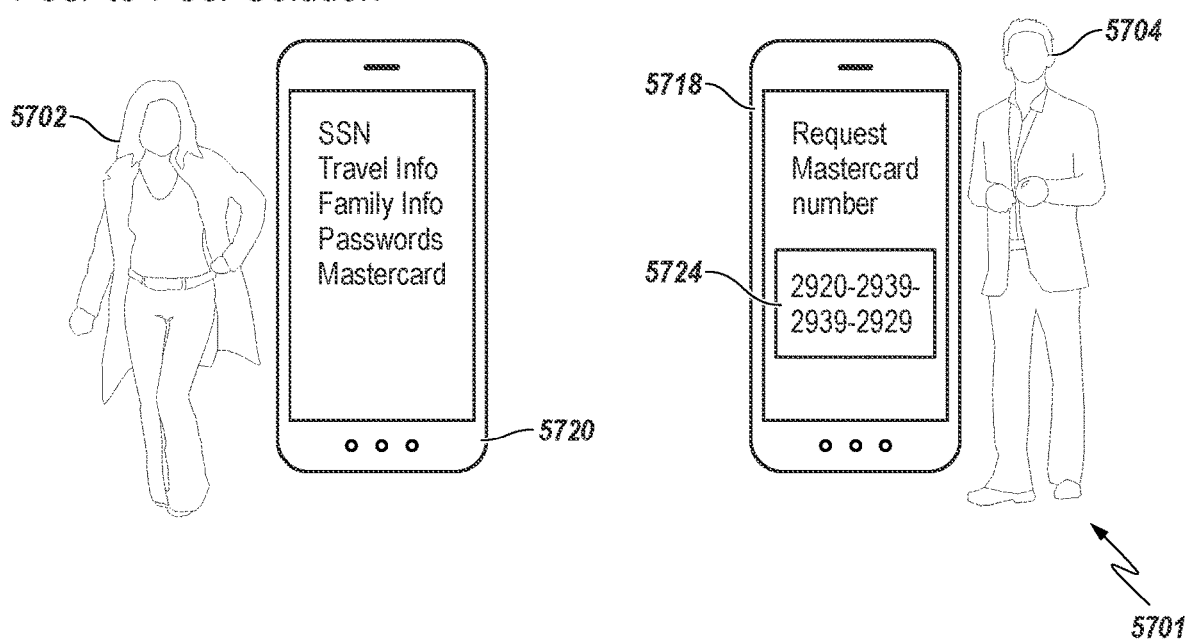

FIGS. 57A-B are conceptual diagrams that illustrate an example P2P application for sharing data between an executive and an executive assistant.

Figure 58:
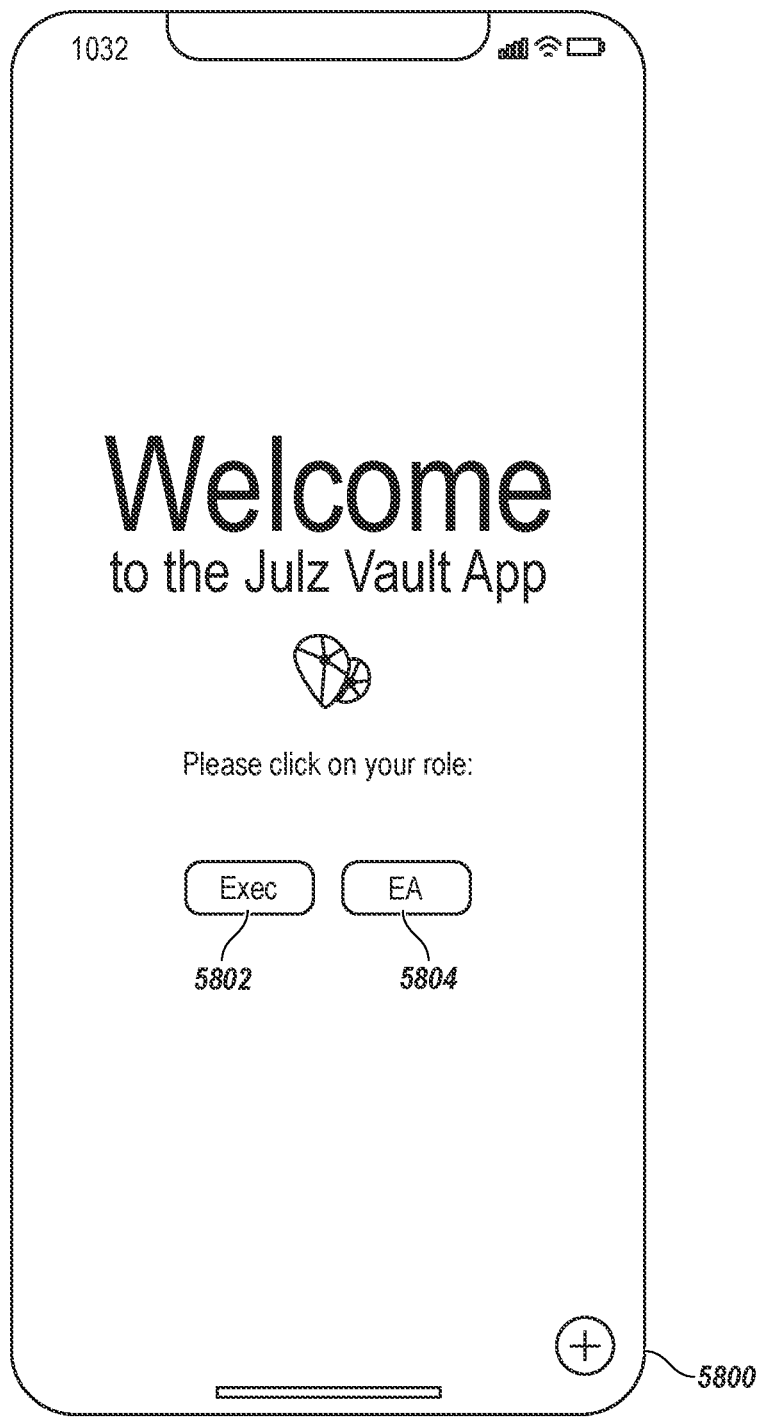

FIG. 58 illustrates an example configuration user interface for a P2P data sharing application.

Figure 59:
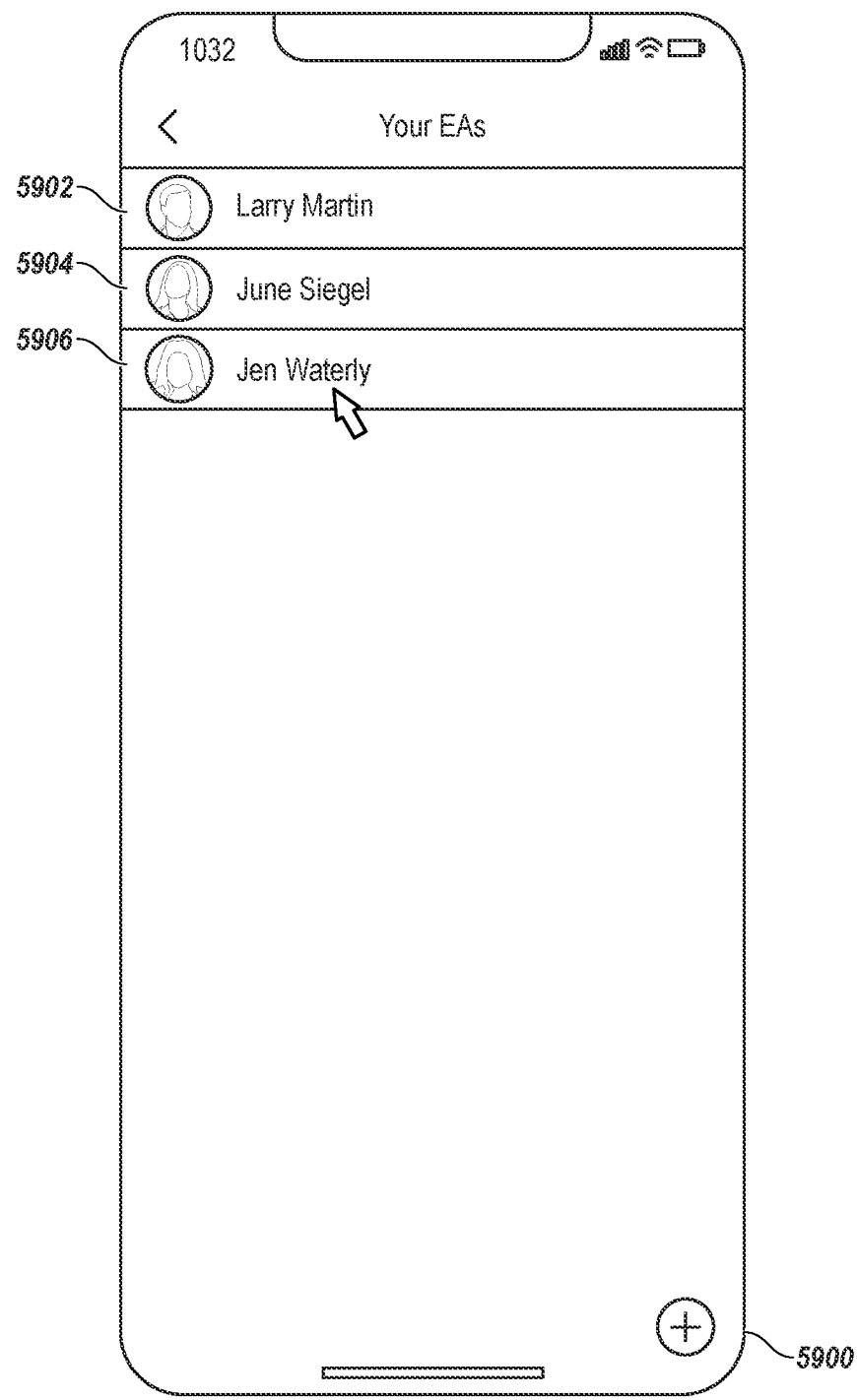

FIG. 59 illustrates an example executive assistant list user interface for a P2P data sharing application.

Figure 60:
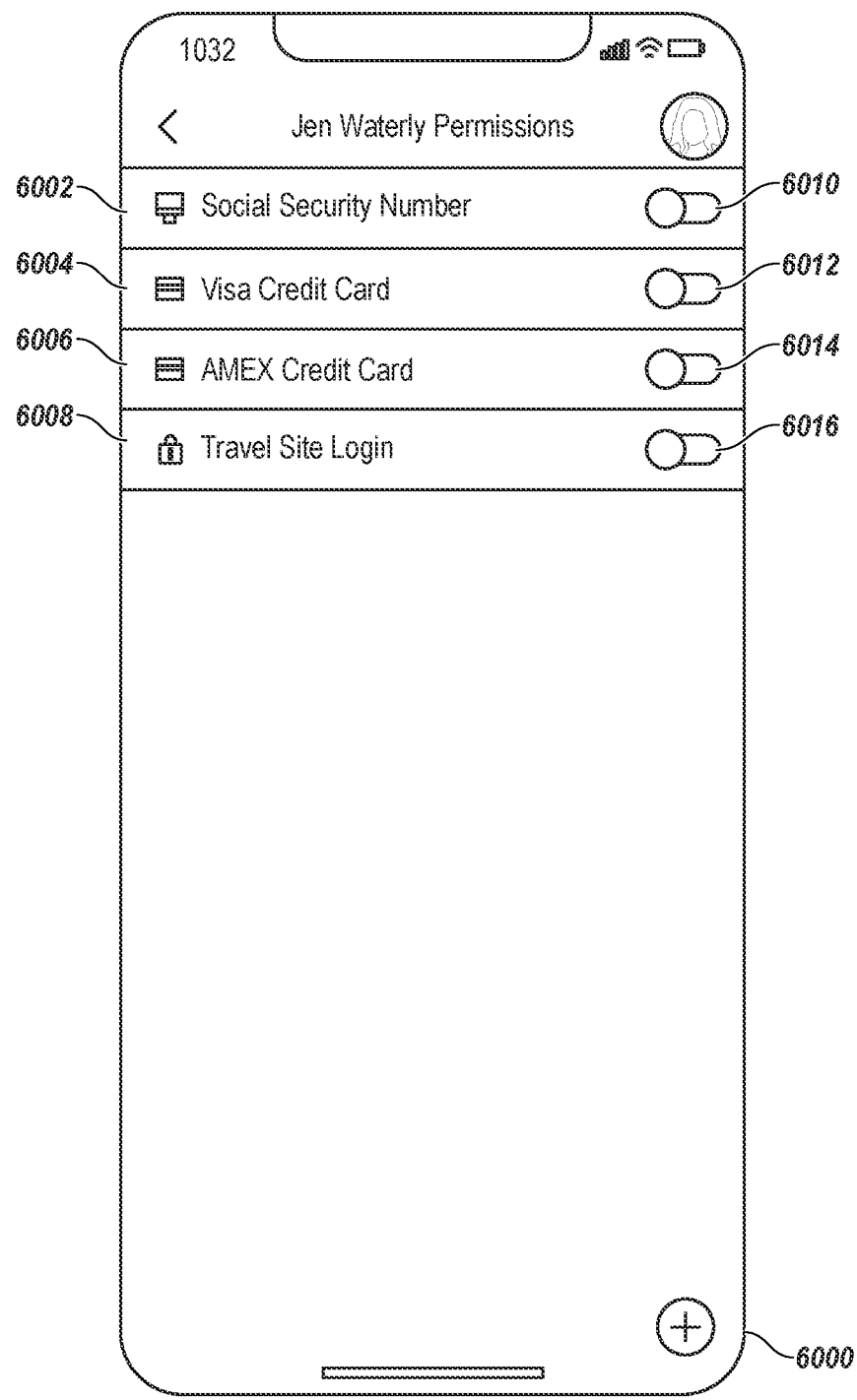

FIG. 60 illustrates an example executive assistant permissions user interface for a P2P data sharing application.

Figure 61:
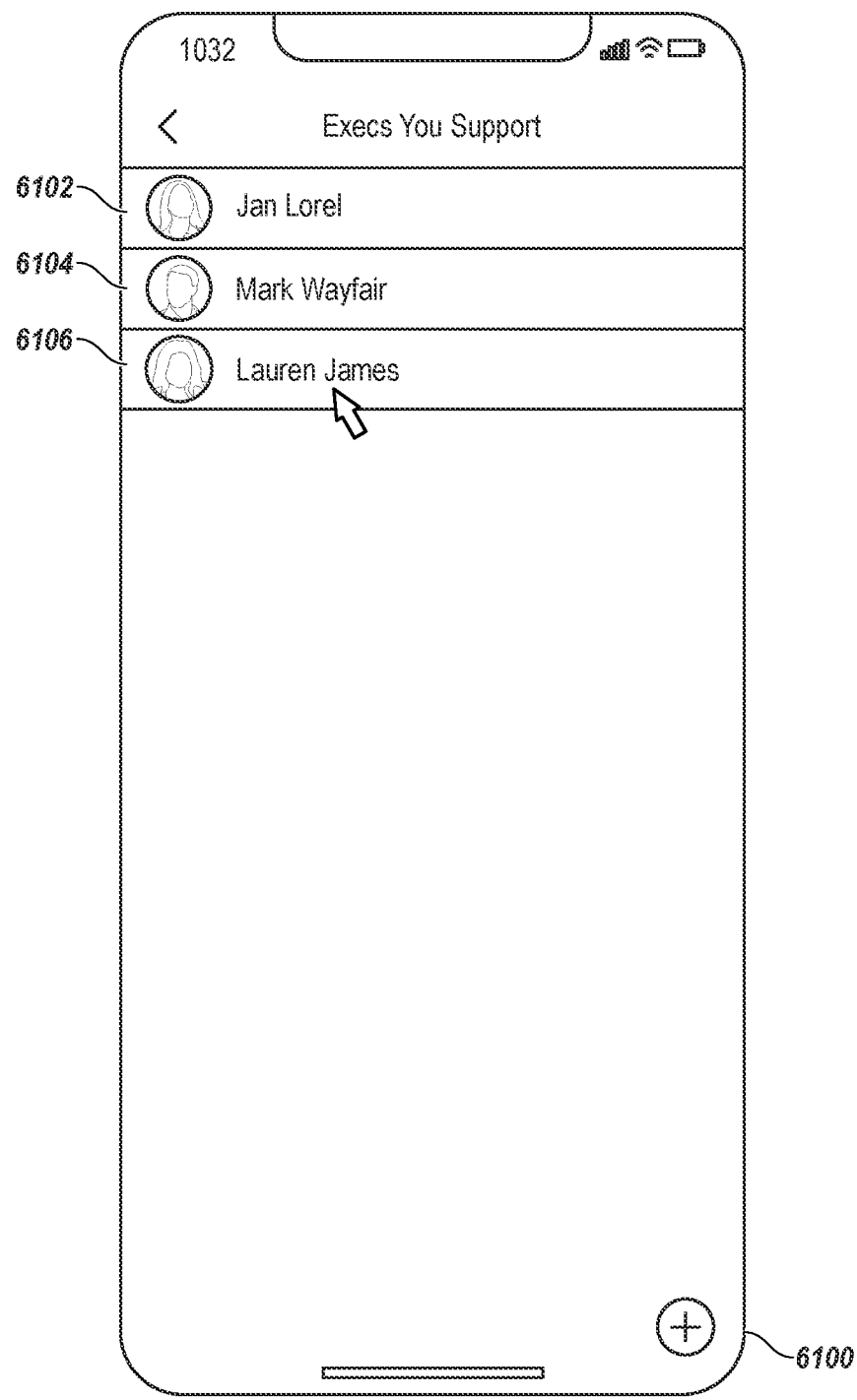

FIG. 61 illustrates an example executive list user interface for a P2P data sharing application.

Figure 62:
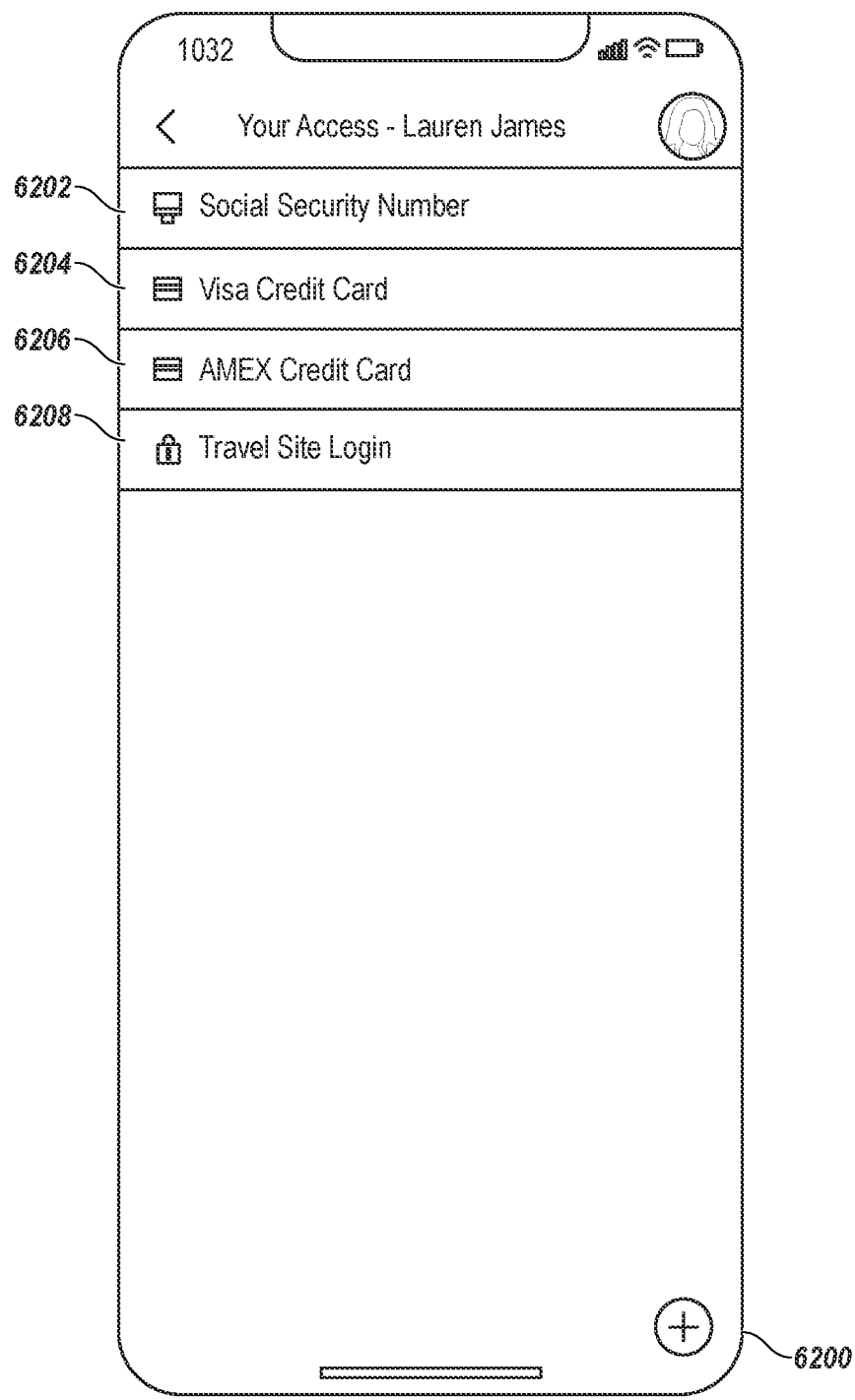

FIG. 62 illustrates an example data access user interface for a P2P data sharing application.

Figure 63:
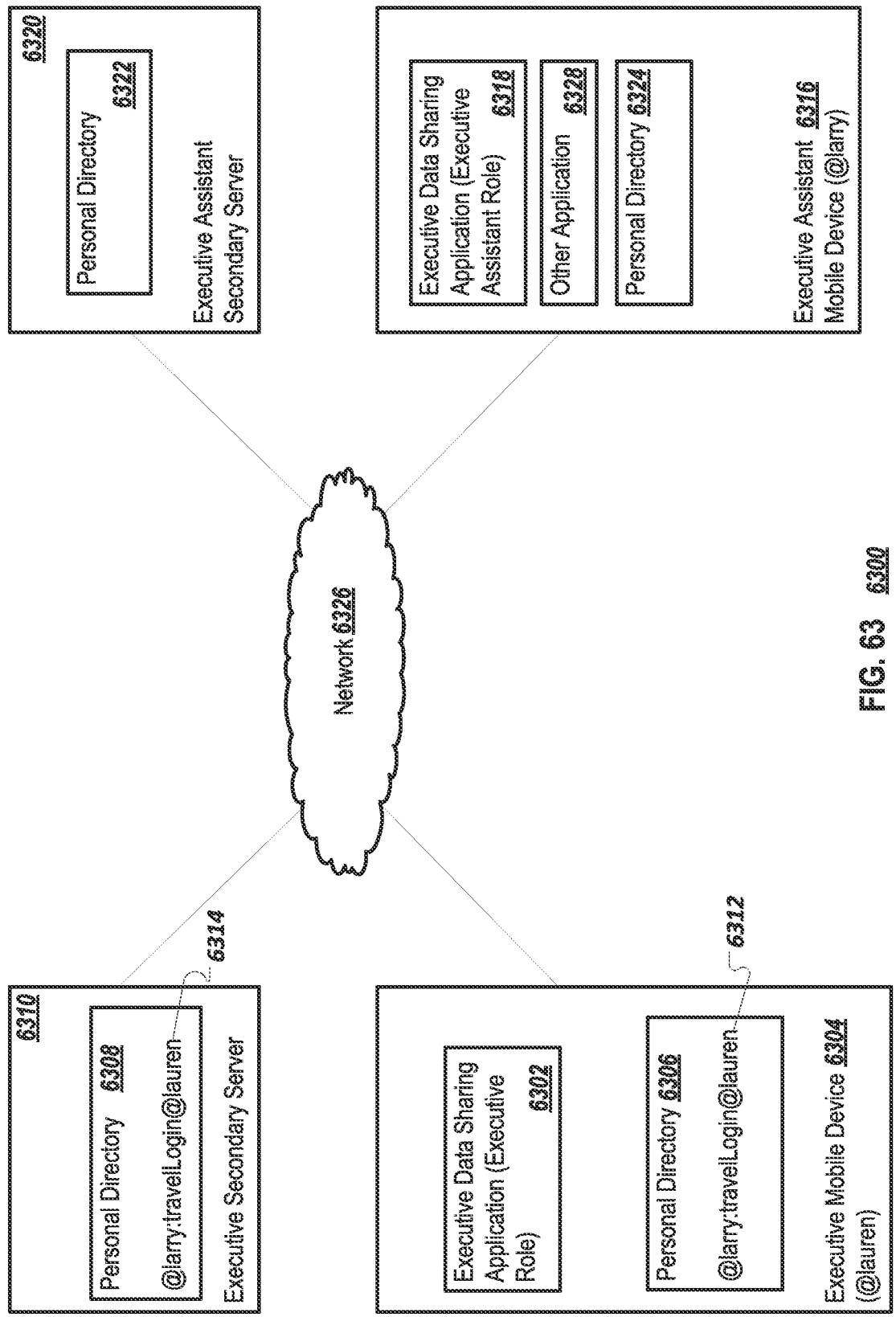

FIG. 63 is a block diagram illustrating an example system for execution of a P2P data sharing application.

Figure 64:
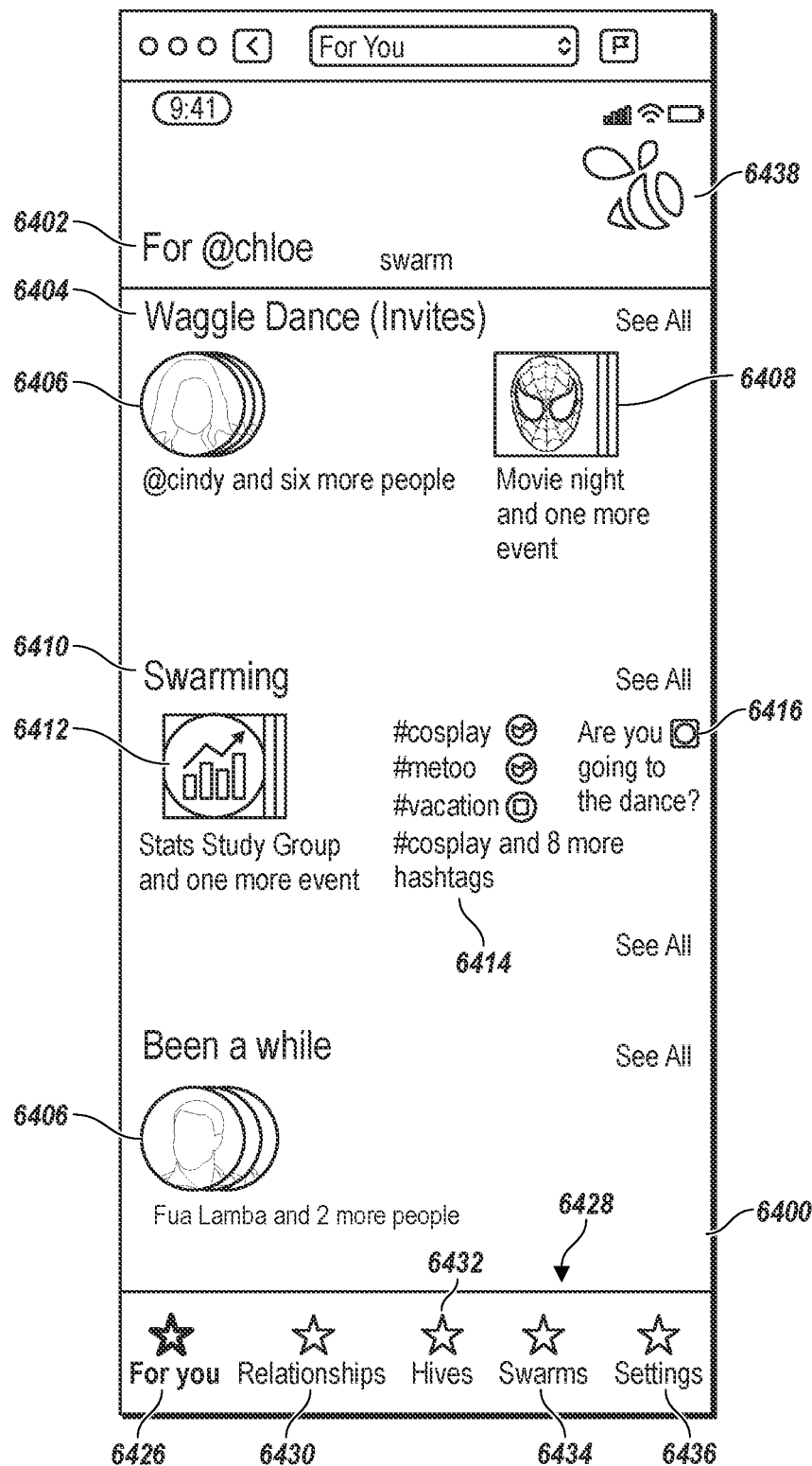

FIG. 64 illustrates a user interface for an improved contacts application.

Figure 65:
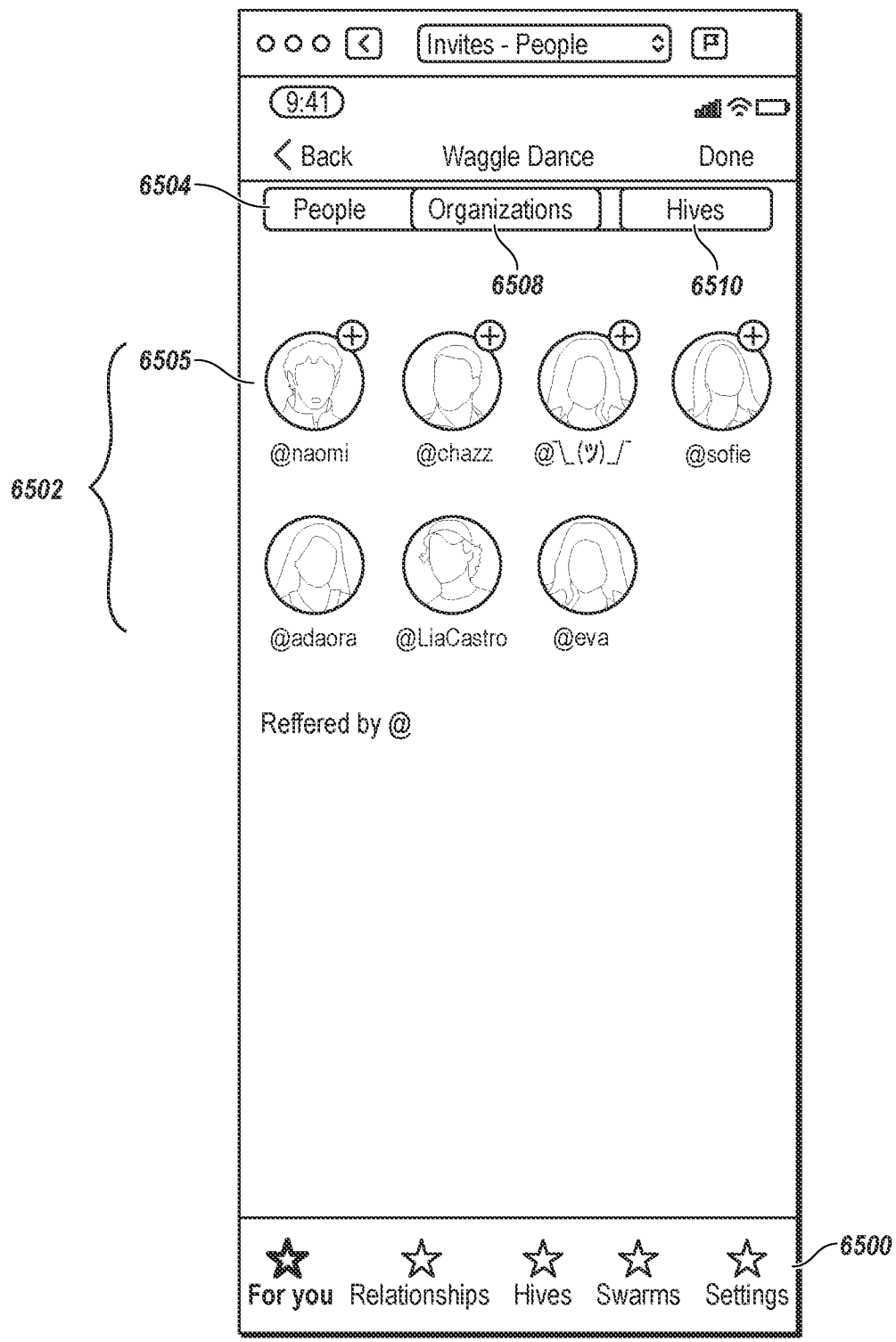

FIG. 65 illustrates an example invitation user interface for the improved contacts application.

Figure 66:
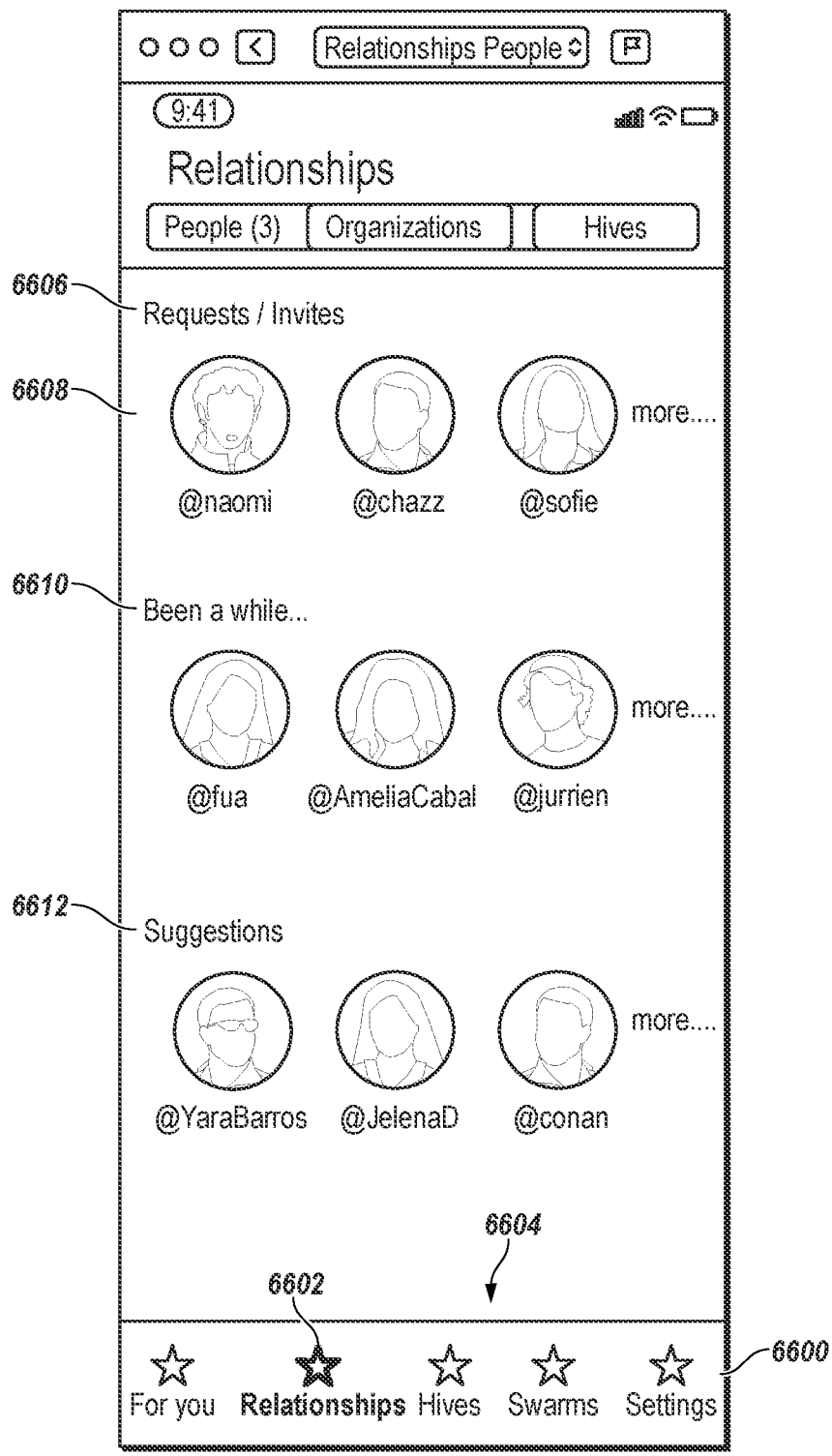

FIG. 66 illustrates an example relationship user interface for displaying relationship information for the improved contacts application.

Figure 67:
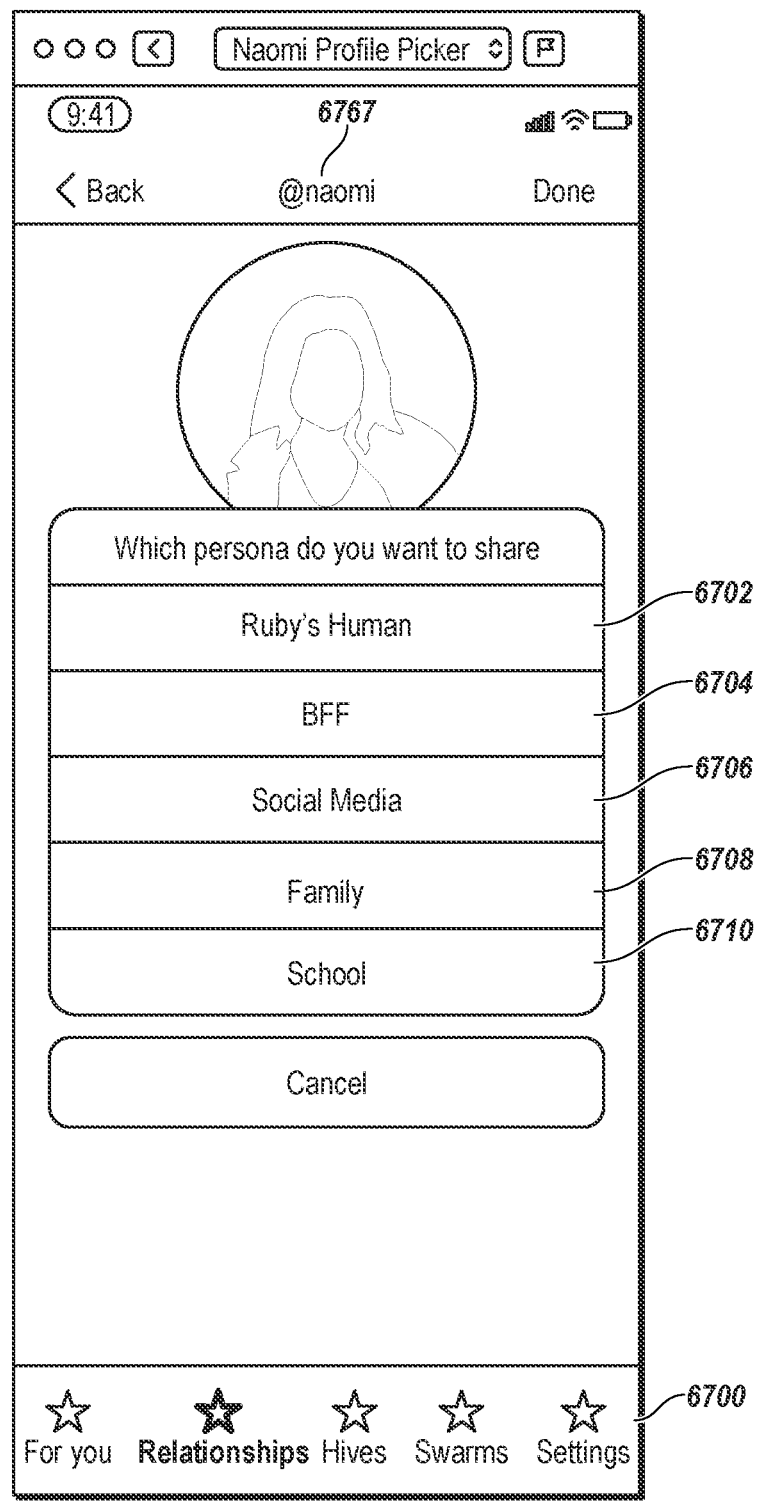

FIG. 67 illustrates an example persona selection user interface.

Figure 68:
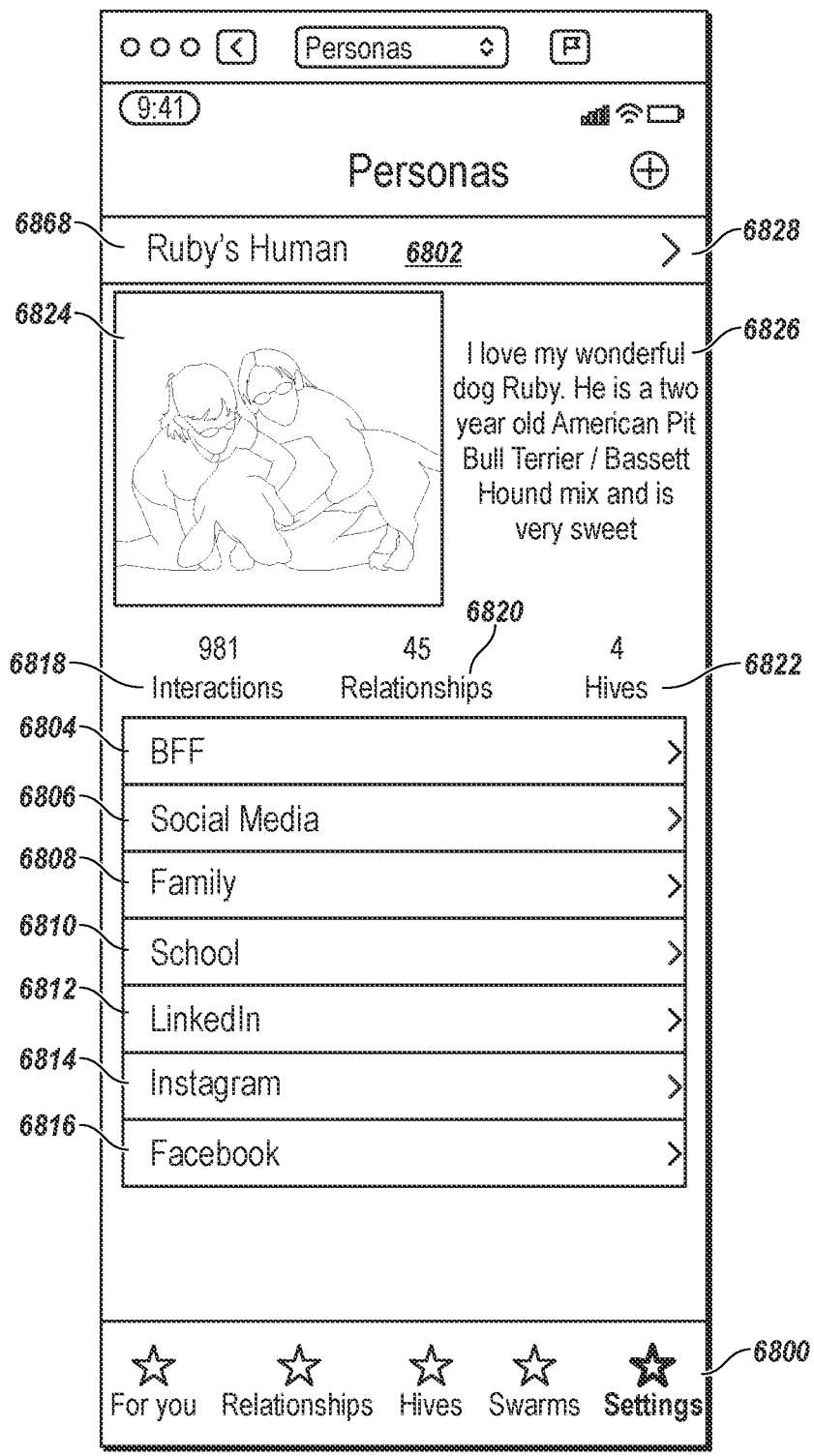

FIG. 68 illustrates an example user interface for viewing personas.

Figure 69:
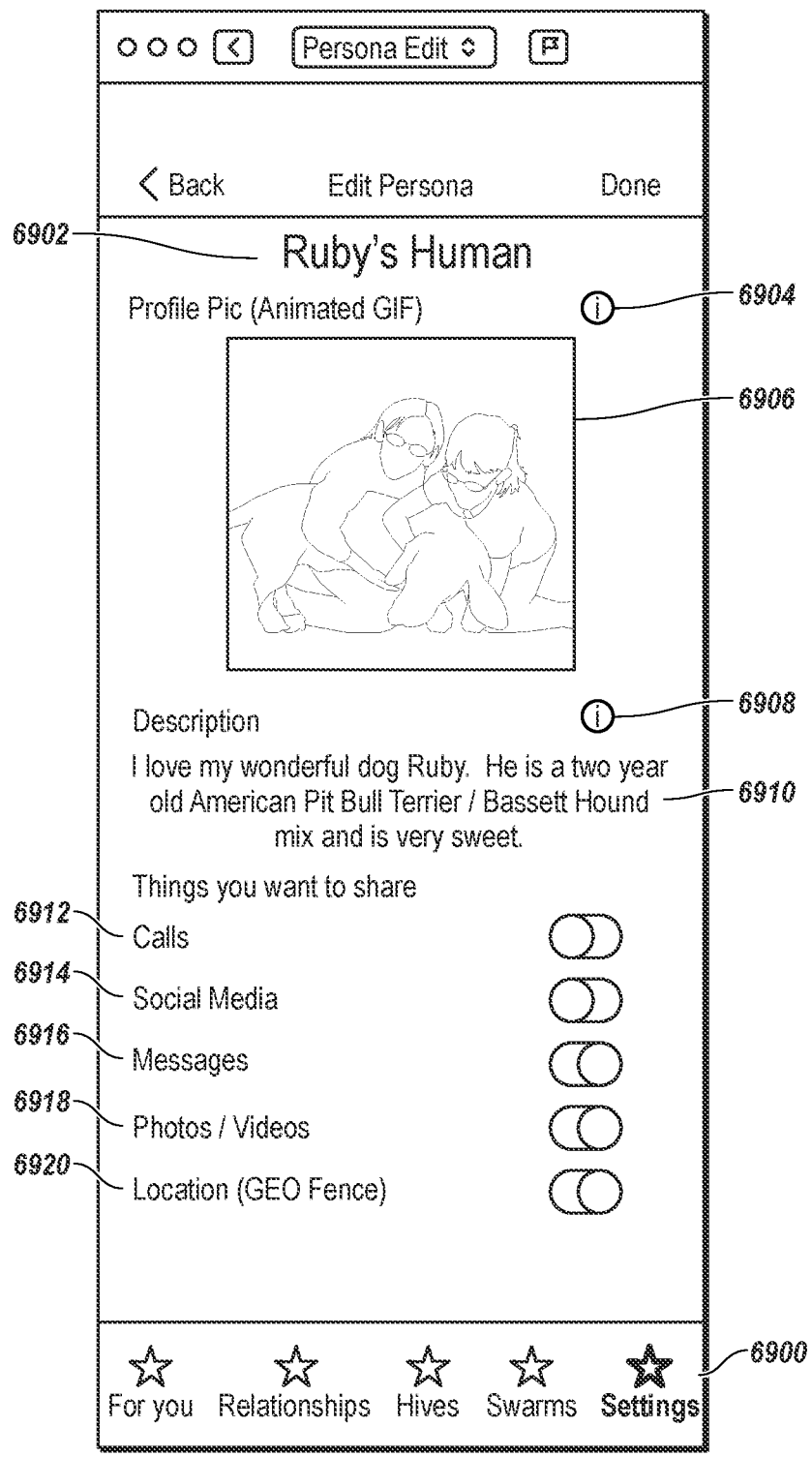

FIG. 69 illustrates an example persona user interface.

Figure 70:
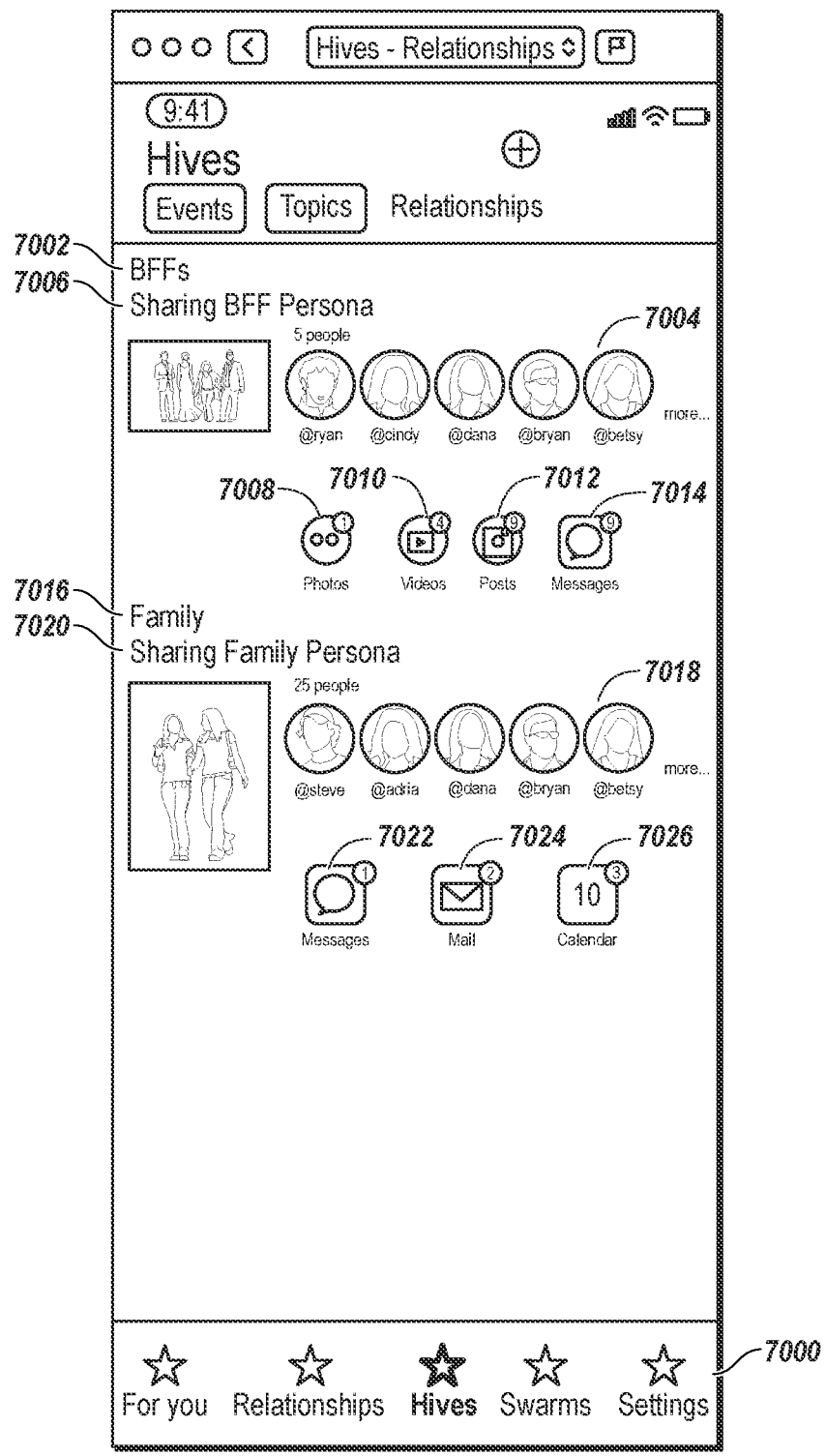

FIG. 70 illustrates an example relationships user interface.

Figure 71:
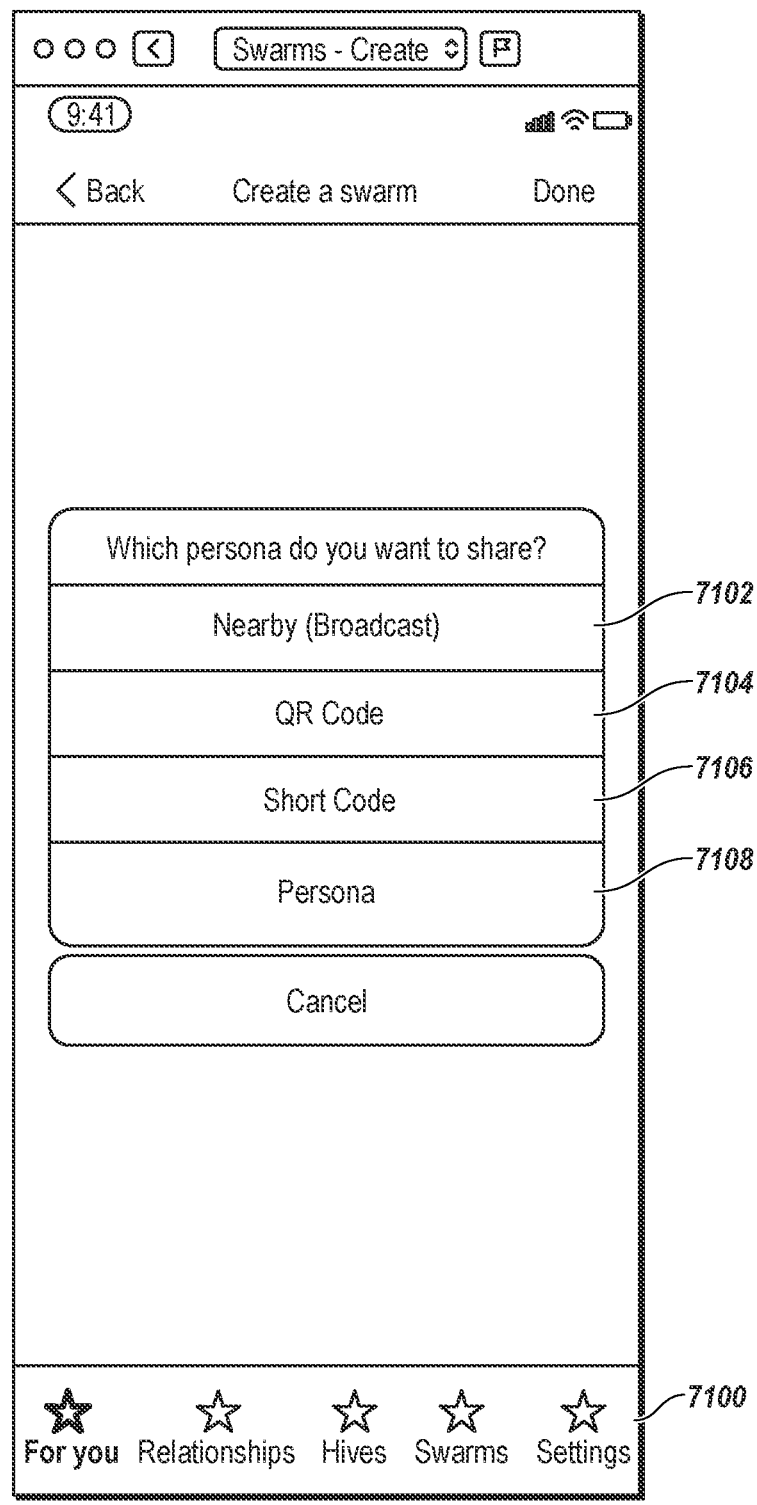

FIG. 71 illustrates an example group creation user interface.

Figure 72:
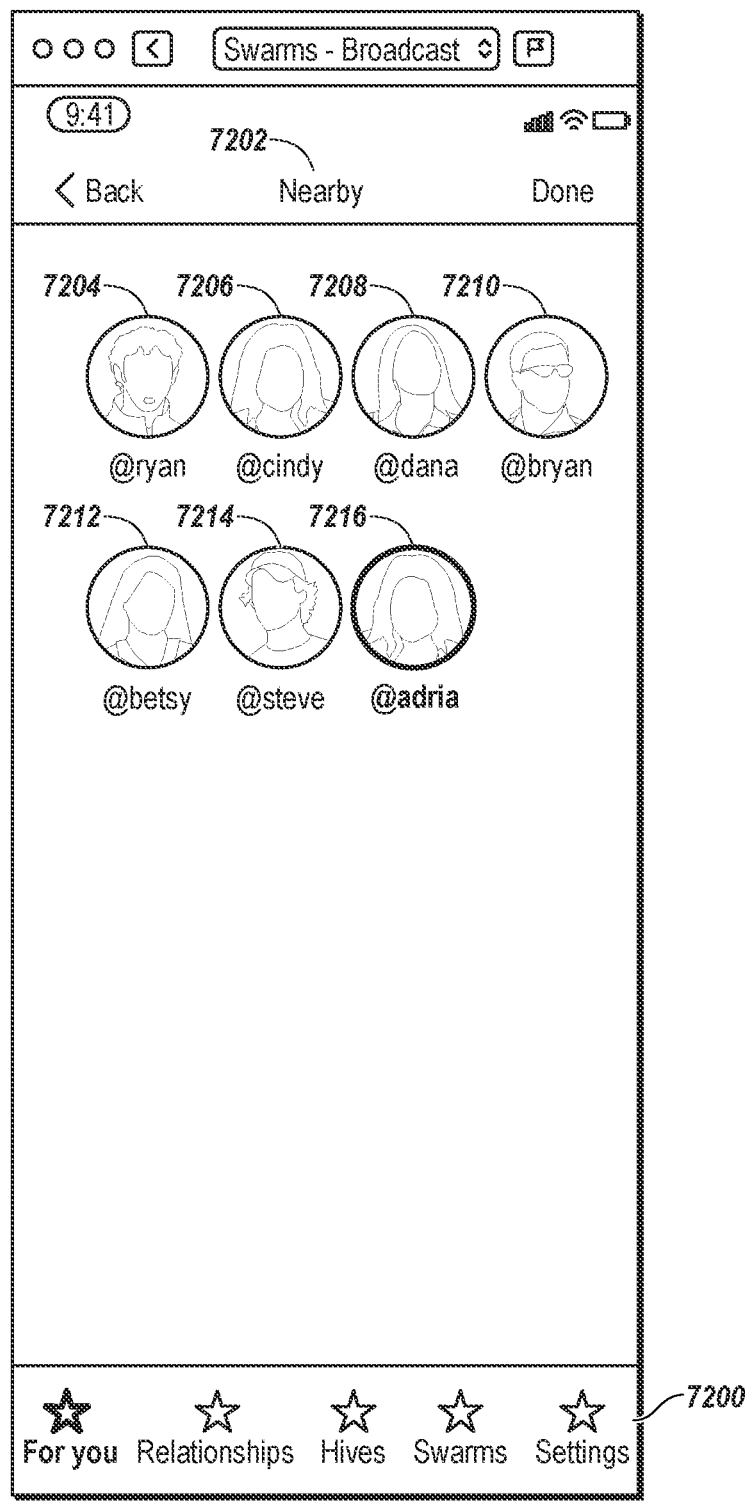

FIG. 72 illustrates an example group creation user interface.

Figure 73:
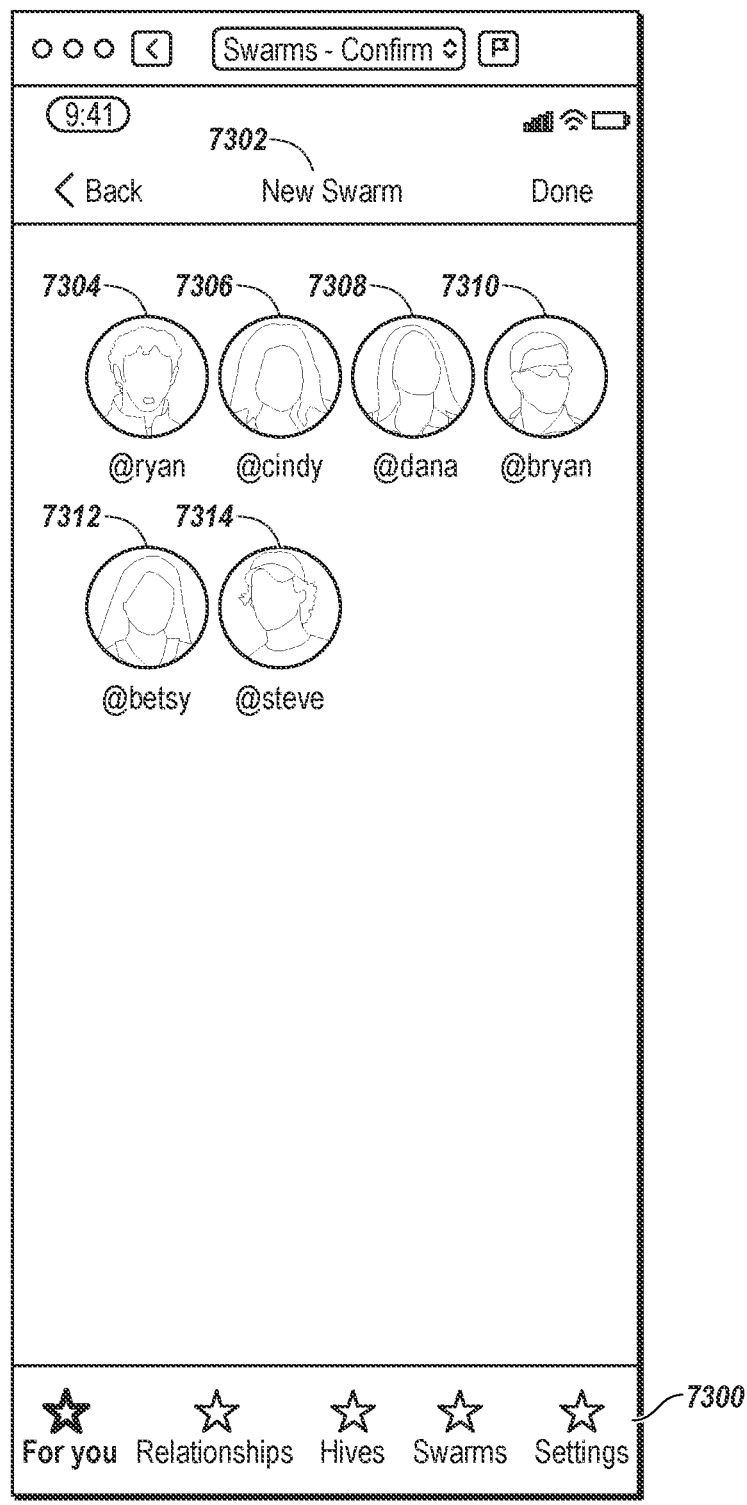

FIG. 73 illustrates an example group creation user interface

Figure 74:
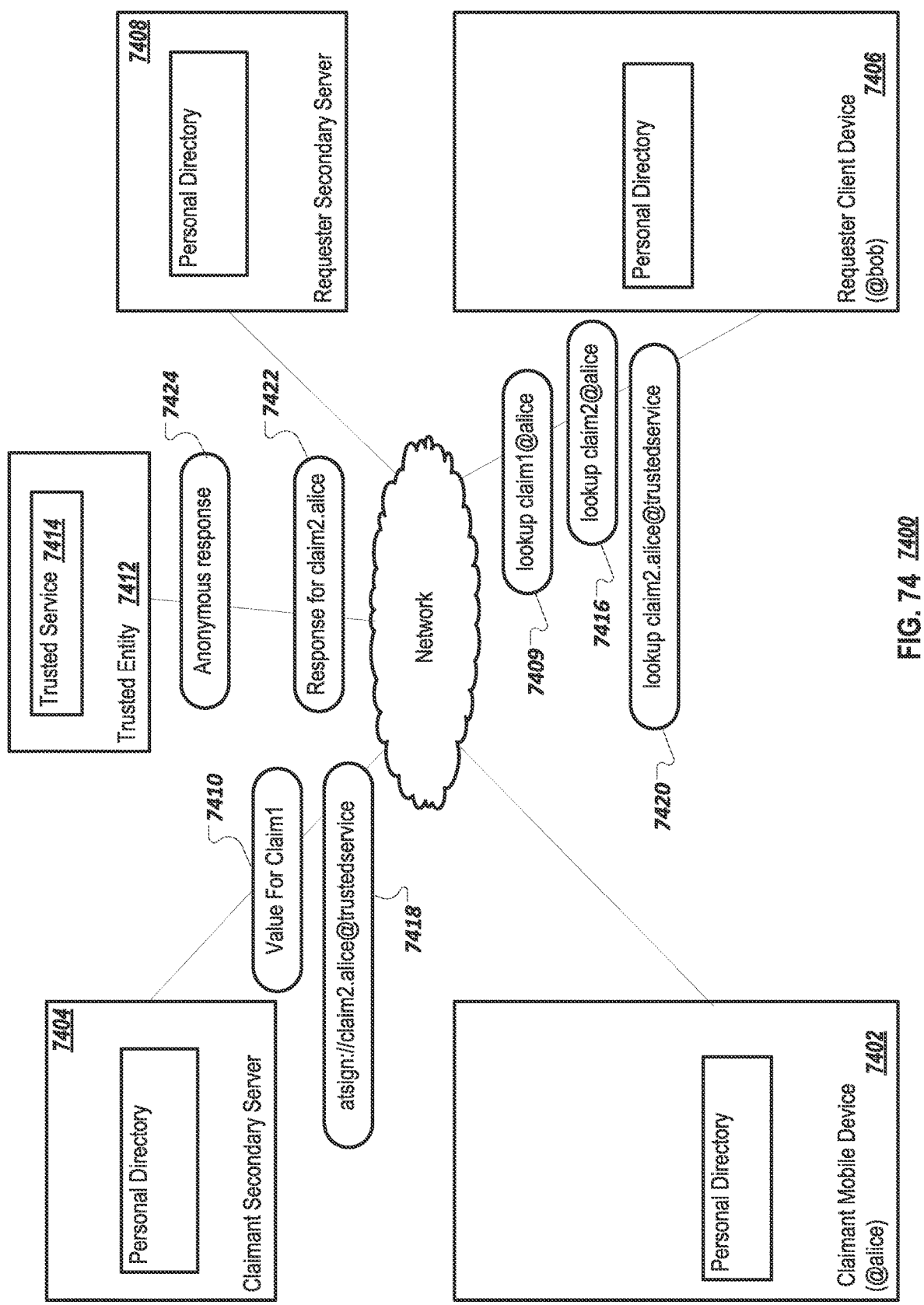

FIG. 74 illustrates an example system for attestations.

DETAILED DESCRIPTION

As the Internet has grown into every facet of modern life, some of the most problematic issues people face are managing their identities and securing their data. Additionally, website and application developers may have to manage the identity of people thereby assuming an associated risk of managing data of other parties and incurring associated hosting and infrastructure costs. Applications that are monetized through advertising that includes tracking and identifying users can further result in various privacy concerns.

To solve these and other problems, an improved and novel Internet Protocol (IP)-based communication protocol and system can be used to provide robust privacy controls for secure exchanges of information between entities. In particular, the solution provides protocol users with the ability to personally maintain and manage sharing of their personal information and data without reliance on a third-party service or application's settings and restrictions. The system includes a namespace directory, decentralized resource directories with secure key/value persistence, and a protocol (which can be referred to as the "@protocol") for communication between entities. Information, including both data and services, can be securely and privately exchanged over the protocol.

As used herein, "users" or "protocol users" refer to users of the @protocol. Each protocol user can be a person, and it follows that multiple users can be "people." A respective person can use the protocol, with any suitable device, including their own personal device, which can be referred to as a "user device," or "client device." In general, a computing device that participates in the protocol can be associated with a participating entity, which can be a person, a corporate or other broader entity, or a finer-grained entity such as a specific item or "thing" (such as an IoT (Internet of Things)) device. Each entity that uses the protocol can be represented by a handle, which can be referred to as an "@sign". Example @signs can include @alice and @bob. An @sign can be combined with a service. For example, sales@amco and myfurnace@alice refer to a sales service for the amco @sign and a myfurnace service for the @alice @sign, respectively. For a corporate or other entity, various handles can be supported, such as a handle for the entity itself (e.g., @amco), a handle for a general role for the entity (e.g., sales@amco), and a handle for specific users associated with the entity (e.g., alice.smith@amco).

The namespace directory can be used for storing a list of unique identifiers (e.g., "@signs") of protocol users together with routing information for the identifiers. Routing information can include, for example, a DNS (Domain Name System) location and IP port number of individual decentralized resource directory servers (which can be referred to as @sign servers) to which protocol requests can be routed.

A response to a data or service request can be provided by a decentralized resource directory server based on a secure key/value persistence of the decentralized resource directory. A request can include an indication of a requested data item or service, as well as a target entity of the request. For example, a service-related request can have a syntax of a form of "service@entity." Processing of a protocol request can include operations to ensure that both entities in an exchange are known to each other and that the request is permission checked before an appropriate response is determined and returned. Response information returned for a service@entity request can include or refer to (e.g., by value or by reference) information stored in a secure key/value persistence for the entity.

The @protocol can allow for a person or an entity to configure the person or entity's own data records to be either publicly accessible (e.g., available to anyone who is aware of a corresponding key) or to be private (e.g., with limited, controlled access) and require validation of a requesting entity for access, where only people or entities specified by the person or entity who owns the data records can access the data, or corresponding portions if limited by the person or entity. As described in more detail below, some keys for public data can be discovered/exposed using a scan while other keys may not be discoverable by a scan. Access control for private data can be hard coded into the system rather than as an overlay data structure. To access private data, a requesting entity can be required to first prove, using the @protocol, a claimed identity, so that access rights can be determined. Accordingly, a response to a private data request can be based on a validated identifier of the requestor, and responses can vary between different requesting entities based on their respective level of approved access. For example, a person can configure permissions so that a query sent to the person for the person's location can result in different responses of "USA," "Minnesota,", or an actual physical address, if sent from an unknown sender, a casual acquaintance, or a close friend, respectively, based on respective grants previously granted to respective entities. The person can also configure permissions for the location data so that no response is given to requests received from unknown senders.

The features of the protocol can form a unique Internet permissioning system for securely controlling access to data and services. Permissioned access can be controlled strictly by an owner of a specific private namespace granting access to data or service(s) of the owner. Access grants can be subject to revocation by the owner.

The permissioning system can provide various advantages. Several advantages relate to an enhanced level of control for people of their own personal information. For example, people are able to specify their own terms and conditions for the use of their data. Specified terms can be defined in a data-use license and/or terms of service document, for example. A person can specify in a data-use license that a particular data item can be looked up but not stored or replicated, for instance.

The @protocol is designed to only allow connections to occur when permission has been granted by the owner of each respective @sign handle. The response to a query, including whether to respond at all, as well as the payload of a response, is completely under the control of the owner of the @sign, which can allow for fine- or coarse-grained control of responses, which can include different responses to a same query to different users or entities. As a particular example, the protocol can enable a person, such as a person or user associated with the @sign of "@alice," to share information, such as email, websites, credit card numbers, location data, or preferences, to other people or entities, such as a person "@bob," under the complete control of and according to the personally-defined rules and permission of @alice alone.

Providing each person or entity control of their own information can improve user experiences in a variety of ways. For example, the described method of directly asking Internet users for their information can allow for new application experiences providing less annoyance for both the requester and the user to whom the request is sent. The @protocol, with a set of predefined verbs, which can be different in (e.g., extended for) particular implementations, and can provide an ease of use and intuitiveness for protocol users. The system can provide people, entities, and even physical items (e.g., "things")—or authorized users or persons associated therewith—a single location to manage digital information and a simple mechanism to allow others to request that information. Each protocol user, entity, or physical item can have and share a respective @sign, which can be used by others for future data requests. A simple @sign can be shared (e.g., on or as a business card, via text, email, or verbally, etc.), rather than separate items of information that may become outdated at some point. Sharing an @sign (e.g., @alice or sales@acme) can enable the contacting of Alice @alice or the sales role at AcmeCo, respectively, even if Alice's actual contact details change or if the actual person or people in the sales role at Acme company change.

Generally, the protocol provides a hierarchical and decentralized permissioning system for establishing security and trust as a core part of the Internet, whether between people or between people and entities (e.g., brands). Respective @sign servers can participate in the @protocol without being surveilled or managed by a central entity. Additionally, end-to-end encrypted P2P applications that exchange data using the @protocol can be used without being subject to centralized surveillance, since they do not communicate through centralized and shared backend servers. Rather, protocol-enabled P2P applications can communicate directly with other applications at the edge of the decentralized network after a connection between peers is established.

As another example, data managed by the system can be housed, for instance, in billions of independent @sign servers (which can be implemented as server devices and/or user devices), with each server storing data in a secure and encrypted manner. In contrast to a large database housed on a centralized system that may be vulnerable to a single security attack, any security attack that might be undertaken against the decentralized permissioning system would have to be performed separately against each @sign server, which would be cost and time prohibitive. Decentralized systems can be more trustworthy than a centralized system that has an inherently higher risk (and perhaps history) of data breaches for centrally-stored data. Historical security issues with centralized systems generally result in erosion of trust in the centralized system.

The @protocol is designed as a low-level, real-time internet permissions protocol. The permissions-based protocol is low-level in that it can prevent a transfer of secured data until permission is verified. Permissions are checked prior to any data transfer, and data is only transferred in response to a successful verification, thereby providing a near real time response that ensures current data, in some cases, without—or with reduced—caching. Application developers (and in some cases, application users) can specify caching parameters for an application, such as whether caching of data is intended or preferred, for instance.

The system supporting the @protocol is based on a global-scale architecture that is dependable as the system scales. Distributed @sign servers and an addressing scheme can support at least one hundred billion people, entities, and things, for example. Dependability is achieved based on architectural designs for confidentiality, integrity, and availability.

The open-source @protocol has a well-defined architecture and a reference implementation codebase that can be published to third party reviewers to facilitate code review and extensive security testing. The architecture is grounded in fundamental tenets of 1) distributing data when possible and centralizing data when necessary, 2) requiring permission for data access, and 3) empowering ownership of data. The @protocol provides a well-defined set of functionality that is extensible, enabling developers to add useful extensions and take advantage of the security and protection offered by the solution.

Application developers can beneficially leverage various aspects of the @protocol. With protocol-enabled applications, users own and control their own data, so applications can be automatically compliant with GDPR (General Data Protection Regulation), CCPA (California Consumer Privacy Act), and other current and future privacy regulations. With personal data used by an application being stored with the person, the person, and not an application provider, stores keys and other sensitive information, such as personally identifiable information (PII). There is no longer a reason for the developer to add warnings to forms or other areas of an application or site where the user is entering data, as may be required for other applications and prior solutions. Automatic privacy compliance can result in a more empowering, reassuring experience for the user and less effort for a developer, as well as an inherent security to the system from end to end.

User management, particularly of personal information, therefore, can be minimal (or non-existent) for an application developer, and can result in applications not needing an expensive backend infrastructure. Building an infrastructure to house and back up customer data can be a costly and time consuming part of application development. An application being developed to use the @protocol can save costs and time in getting the application to market, as compared to approaches that need development of a backend infrastructure, including security and storage. Fully decentralized P2P apps that have data stored on users' individual @servers may not require any backend infrastructure, for example, which can save substantial costs for the developer.

Liability for data breaches may no longer exist for an application when the application developer does not hold any of the user's data. If the developer chooses to have personal data hosted on personal servers, for example, the individual people can become responsible for their own data, with the developer using best practices and the described @protocol to request and receive access to the personal data. Developers therefore, may avoid a liability for sensitive personal data, and can limit the amount of collected and managed data held by the application.

Additionally, data management can be simplified, both for the developer and for the user. For example, password retrieval and out-of-date email addresses, if managed by the application developer, can create a large support burden for application providers. By using the @protocol, developers no longer have to develop functionality for and support password, login, and other personal data management. Once a user has an @ handle, they do not need to create a username or password for @protocol-compatible sites or applications—instead, they can simply use their @handle, and can verify themselves via the @protocol solution as described herein. Accordingly, the user can get started more easily with a new protocol-enabled application, resulting in a more satisfying user experience, which can benefit the developer as well as the user.

Figure 1:
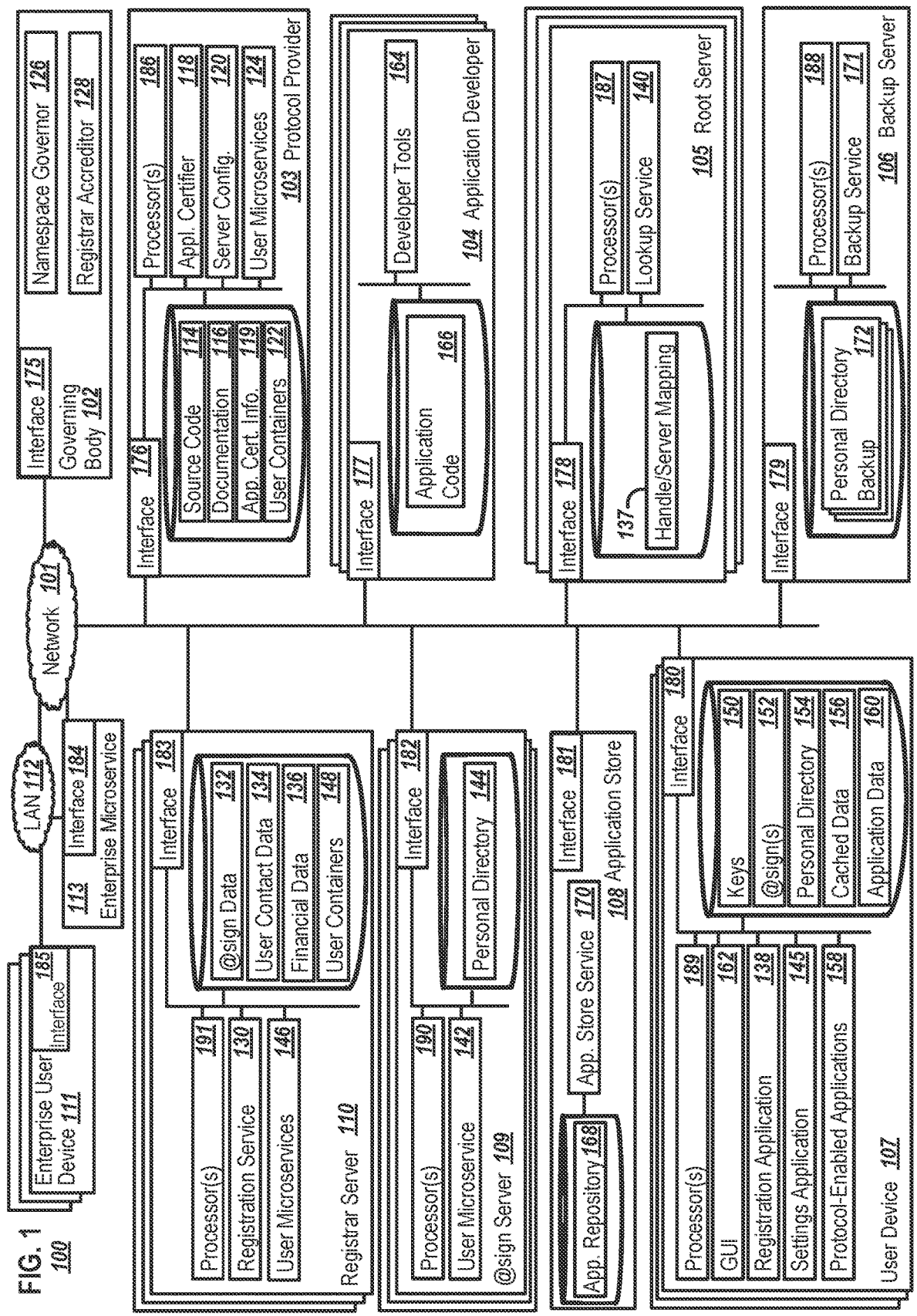
FIG. 1 is a block diagram illustrating an example system for user-controlled access control for user information.

FIG. 1 is a block diagram illustrating an example system 100 for user-controlled access control for user information. Specifically, the illustrated system 100 includes or is communicably coupled with various components that are connected by one or more public network(s) 101. For example, the system 100 includes a governing body 102, a protocol provider server 103, application developers 104, root servers 105, backup servers 106, user devices 107, an application store 108, protocol servers 109 (e.g., @sign servers), and registrar servers 110. Additionally, in some implementations, the system 100 includes enterprise user devices 111 that might not be directly connected to the public network(s) 101, but are, for example, on a local area network 112, behind a firewall in an enterprise, and connected to an enterprise microservice server 113 that is connected to the local area network 112 and the public network 101 that can do protocol exchanges on behalf of the enterprise user devices 111. Although shown separately, in some implementations, functionality of two or more systems or servers may be provided by a single system or server. In some implementations, the functionality of one illustrated system or server may be provided by multiple systems or servers.

The system 100 provides an ecosystem of compliant applications and services for granting or denying access rights in real time. The protocol, as implemented in the system 100, can create a network of trust with structured data on a global scale. The protocol can be built upon protocols of TCP/IP (Transmission Control Protocol/Internet Protocol), DNS, HTTP (HyperText Transfer Protocol) (e.g., with future browser enhancements) and SSL/TLS (Secure Sockets Layer/Transport Layer Security). Use of the protocol can result in secure sharing of data and services between @handle owners and applications as specified in @sign servers, if explicitly allowed by both parties of a transaction. The protocol can be used for a large number of use cases that can benefit from user controlled privacy access. The protocol supports both a public lookup (in which the party querying data does not have to prove who they are) and a private lookup that confirms the @sign of the entity asking for information and allows the owner of the data to decide what information to share. Public lookups in general can be used to confirm the existence of an @sign or access specific information that may be set to public access.

The protocol can be provided/developed by a protocol provider (shown interfacing with the system 100 by the protocol provider server 103). Although a single protocol provider server 103 is shown, the protocol provider can be associated with various types and numbers of servers. And while shown as a single entity, the protocol provider can include or encompass different entities, such as a non-profit organization/foundation tasked with promoting and supporting the protocol and/or a company that provides various services and policies for the protocol.

For example, the protocol provider server 103 can provide a source code distribution 114 and a documentation distribution 116, include an application certifier 118 that generates application certification information 119, and include a server configuration component 120 for configuring the root servers 105. As another example, the protocol provider server 103 can provide secondary user server infrastructure and services, using user containers 122 and user microservices 124. The components of the protocol provider server 103 are described in more detail below.

In some implementations, the protocol provider server 103 provides governance of the protocol namespace. In other implementations and/or at different points in time, governance can be provided by the governing body 102. The governing body 102 can be ICANN (Internet Corporation for Assigned Names and Numbers) or some other entity. The governing body 102 (and/or the protocol provider) can include a namespace governor 126 that governs the @sign namespace, including arbitration of namespace conflicts. The governing body 102 (and/or the protocol provider) can also include a registrar accreditor 128 for accreditation of registrars that can sell and maintain @signs and secondary server configurations.

In some implementations, the protocol provider (e.g., as the protocol provider server 103 or other servers or components) can act as a registrar. Other third party registrars can be supported in some implementations. For example, the registrar servers 110 can provide a registration service 130 that maintains @sign data 132 by performing the registering, provisioning, transferring, renewal, and deletion of @sign handles for users.

An @sign, such as @alice, is a unique identifier assigned to a user of the protocol. An @sign can be referred to as a handle, or an @sign handle, and can be a string of characters (e.g., Unicode characters) uniquely identifying a user and that is registered with a registrar. An @sign can serve as a personal or corporate brand. An expanded Unicode character set can support a wide variety of characters for creative @sign handle creation. Within the system 100, an @sign serves as an address that is resolvable by the root servers 105 to a secondary server endpoint, as described in more detail below.

The root servers 105 are an implementation of a global namespace directory for the system 100. The root servers 105 can store a list of unique identifiers (@signs) along with information for how to reach an @sign server that handles requests for a given @sign. For example, the root servers 105 can store and maintain mappings 137 that map @signs to location information for Internet-accessible user protocol microservices. Location information can be a DNS address plus a port number. The user protocol microservices, referred to herein as @sign servers, @servers, or protocol servers, implement individual, distributed, decentralized resource directories to which protocol requests are routed.

The root servers 105 can provide redirection to the @server for a particular @sign. For example, the root servers 105 can offer a centralized lookup service 140 that provides access to a single @sign namespace. Unlike DNS, the @sign namespace can be implemented without Top Level Domains (TLDs) or subdomains. The lookup service 140 can be intentionally minimal for efficiency, offering just two items of information: 1) whether a particular @sign exists; and 2) if the @sign exists, how the server for the @sign can be reached.

The lookup service 140 can support an @exit verb which can disconnect a connection with a requester. All other inputs to the lookup service 140 can be considered to be @sign lookup requests. Location information for @sign servers can be considered public information so the lookup service 140 can be configured to accept requests without requiring authentication. Users can first query the lookup service 140 for an Internet-addressable location of an @sign server before sending protocol requests to that @sign server.

In response to a lookup query, the lookup service 140 can respond with a null value (or simply ignore a request) if a requested @sign does not exist. If the requested @sign does exist, then the lookup service 140 can return the DNS name or address (e.g., a Fully Qualified Domain Name (FQDN)) of the @server and the IP port number for the requested @sign. If a DOS (Denial Of Service) attack is detected, the lookup service 140 can reduce response time for replying to requests and/or terminate connections or restart the lookup service 140. Other approaches for dealing with DOS attacks can be used. For example, the lookup service 140 can provide the IP address or other identifying information of an entity suspected of a DOS or other attack to upstream (or other) networks or entities, to either slow or delete DOS or other malicious traffic.

TCP ports can be used for scaling @sign server addresses. A TCP port can be used, in general, to identify a service. Port 80 is generally used to identify a web service, for example. Port numbers can generally be a value from 0 to 65535, with only a portion of those values reserved for traditional services. For example, IP version four (IPV4) and IP version six (IPV6) can support port numbers. By using otherwise unassigned or unused port numbers to identify a particular user microservice or @sign server, each unique IP address can be mapped to approximately 65,000 unique microservices, by combining the IP address with a port number. Port numbers thus can allow for scalability at a global scale, since an IP address plus port number scheme can support billions of uniquely-identified microservices.

In general, the root servers 105 can be designed to be cost effectively scaled to handle trillions of requests for billions of records. Root servers 105 can be architected to just provide the single lookup service 140 for the mappings 137, e.g., to include a minimum amount of information for fulfilling lookup requests. In-memory databases and other performance-improving approaches can be used. For example, multiple read-only copies or replicas (e.g., shards) of the mappings 137 can be used, and a given request can be hashed to identify a particular subset database in which to lookup a given @sign. For instance, a first mappings database can hold @signs starting with the letters "a" through "m" and a second mappings database can hold @signs starting the letters "n" through "z." As another example, DNS records for multiple root servers 105 can be used to share an overall load across the multiple root servers 105. For instance, traffic can be routed to a nearest and/or fastest root server 105, or a root server 105 with a lightest current load.

As yet another example, the root servers 105 can be configured so that read-only replicas serve the request load and a main root server 105 serves as the master. The main root server 105 can have a preconfigured DNS address (e.g., root.atsign.org). At least some of the root servers 105, including the master root server, can be configured, operated, and/or provided by the protocol provider. The protocol provider can manage a cluster of root servers, for example. The master root server and/or the protocol provider can maintain IP addresses of the various root servers. In some implementations, third party provider(s) can provide at least some of the read-only replica root servers. In some implementations, a third party representing a particular organization can deploy their own root server(s) for their organization, and maintain internal addressing for their own namespace that may also bridge to the global @sign namespace.

Referring again to the registrar servers 110, the @sign data 132 maintained by the registrar servers 110 can include information for user provisioned @signs. The @sign data 132 can also include information for reserved @signs, such as for countries, states, or @signs that correspond to registered trademarks. When a user deletes (e.g., gives up) an @sign, the registration service 130 can mark the @sign as available to other users or entities. Similarly, the registration service 130 can periodically determine @signs that have not been renewed, and identify the unrenewed @signs as available. Renewal dates can also be included in the @sign data 132. The registration service 130 can periodically determine, in general, which free and/or for-fee @signs are available.

The registrar servers 110 can maintain user contact data 134 for sending renewal reminders or other notices. Financial data 136 can include pricing data for vanity @signs and payment records for @sign purchase transactions. Registrars can store a minimum amount of personally identifiable information (PII), if any. In some implementations, registrars can provide some @sign handles for free and charge a fee for certain (e.g., desirable/vanity) @sign handles.

The registration service 130 can provide a registration application 138 to user devices 107, for example. The registration application 138 can be provided as an application to install on a given user device 107 or as a web site accessed by the user device 107. The registration application 138 can be used by users to provision @signs. For example, a user can use the registration application 138 to search for available @signs, view a list of available @signs, view a list of suggested @signs, check if a format of a desired @sign is valid, and view which vanity @signs are available and at what cost. Once an available @sign has been selected (or entered), the user can use the registration application 138 to register the @sign.

Registration can include providing payment to secure a particular @sign, such as for premium or otherwise desired or likely-to-be desired @signs, which may be associated with a cost. Payment can include, for example, an agreement to and payment of a yearly subscription fee. Payment information and details provided through the registration application 138 can be stored in the financial data 136.

Management and maintenance of @signs can be performed using the registration application 138. For example, users can use the registration application 138 to receive alerts about upcoming @sign renewals (as generated by the registration service 130), pay for a renewal, view a dashboard of assigned @signs and renewal dates, or delete (e.g., give up) an @sign. As another example, the user can use the registration application 138 to select an @sign to sell, set up advertising for the for-sale @sign (to be displayed to other potential users on a registration website, for example), or to transfer an @sign to another entity.

The registration application 138 can also be used to bind (or rebind) an @sign to server information for an @sign server. For example, @sign registration can include mapping the registered @sign to server information for an @sign server that can handle protocol exchanges for the @sign. The server information can be a single IP address (and possible port number) or a FQDN and (possible) port number. Using an IP address or a FQDN/port can have advantages and disadvantages.

For example, if a DNS address is used then the IP address mapped to the DNS address can be changed without changing a root entry. However, DNS can cache data meaning migration to a new IP address for an @sign could take hours or possibly days due to the distributed caching nature of DNS. If an IP address is used as the server information for an @sign an IP address update can be completed more quickly, since protocol guidelines can specify that resolvers or applications may cache IP addresses, for example, for up to 10 minutes. However, if an IP address is mapped directly to an @sign, the IP address for the @sign cannot be changed without contacting the registrar to request an update to a root entry. In some implementations, DNS is preferred over use of IP addresses.

The registrar server 110 can store @sign data for registered and bound @signs in the @sign data 132. The registrar server 110 can send a request to the root server 105 to create a root entry that maps the @sign to the server information for the @sign. In some implementations, @sign to server mapping information is only held in the root servers 105 (and not in the @sign data 132 maintained by the registrar).

Server information for @sign servers can refer to different types of devices and services. Essentially, an @sign server process can run on any device for which an IP address (and possible port number) given by the root server 105 is an Internet-routable address. For example, the protocol server 109 can be a dedicated (e.g., always-on) protocol-enabled device that can handle requests for a particular @sign. The protocol server 109 can execute a user microservice 142 for a particular @sign handle, providing access (based on assigned access rights) to a personal directory 144 that stores information for the @sign handle. The protocol server 109 can be a server device (managed by a third party), a user device (e.g., personal server) that is continuously connected to the network 101, an IoT (Internet of Things) device, or some other protocol-enabled, network-connected device.

As another example, a protocol service can run on a user device 107 (e.g., as implemented by a settings application 145 or another process). Since some user devices may be occasionally offline, the user device 107 can be mapped to a secondary server. The secondary server can be the protocol server 109 or can be a cloud-based user microservice provided, for example by the registrar, the protocol provider, or another entity. Third party providers can agree to comply with protocol guidelines before being allowed to act as a cloud provider for secondary server infrastructure.

As an example of cloud infrastructure, the protocol provider server 103 can provide the user microservices 124 as @sign server processes for users for access to user-specific user containers 122. Similarly, additionally, and/or alternatively, the registrar server 110 can provide user microservices 146 as @sign server processes for users for access to user-specific user containers 148. User containers 122 or 148 may be associated with TLS certificates. The TLS certificates may be associated with, for example, DNS information for the user microservice 124 or 146. The TLS certificates can be used to provide authentication of both server and client connections to the @protocol microservice and to communicated encrypted traffic. A user microservice 124 or 146, with its corresponding user container 122 or 148, respectively, can be uniquely addressable using an assigned IP address and port number, as configured for the associated @sign in a corresponding root server entry.

Container and microservice management, performed by the protocol provider server 103 and/or the registrar server 110, can include management and deployment of user containers, in a multi-tenant container orchestration system. For example, user container management can include starting, stopping, and restoring user containers, deploying a given user microservice 124 or 146 as part of a user activation/registration process, and monitoring health of user containers, including resource allocation and usage, with automatic resource scaling as necessary. User containers can be reconfigured and redeployed in the event of an outage or hardware failure, for example. Data stored in user containers 122 or 148 can be encrypted for security. Decryption keys are discussed in more detail below. Users who choose to use a secondary server implemented as a user microservice 124 or 146 can pay fee(s) (e.g., activation, subscription fees) to the protocol provider or the registrar, respectively, as part of a registration process.

Registration can also include a bootstrapping process in which a secondary server instance is cryptographically bound to a user device 107, such as during activation of the user device 107, using a shared secret. For example, the registration application 138 can present a code (e.g., a QR (Quick Response) code) that includes the shared secret. The user can use the registration application 138 (or a camera application or similar functionality) to scan the code or otherwise retrieve the secret key from the code. The secret key can be stored on the user device 107 in a keys area 150, preferably in a hardware trusted root on the user device 107.

The shared secret can also be provided (e.g., by the registrar server 110) to the secondary server (e.g., microservice) associated with the user's @sign, for storage in the user's personal directory managed by the secondary server. The shared secret can be used by the user device 107 to authenticate to the secondary server. For example, an authentication process can include a key challenge and a challenge response, using the shared secret (e.g., using a CRAM (Challenge Response Authentication Mechanism) process).

In some implementations, the shared secret is used to establish an authenticated connection between the user device 107 and the secondary server during activation and bootstrapping, with activation also including configuration of a public/private key pairing between the user device 107 and the secondary server. The user device 107 can generate a private key (and store the private key in the keys area 150) and a corresponding public key, for sharing with the secondary server, such as by using a RSA (Rivest—Shamir—Adleman) algorithm. Once a public/private key pairing has been established, the shared secret can be removed from the secondary server (and in some cases from the keys area 150). Removal of the shared secret from the secondary server can increase protection of encrypted user data on the secondary server, such as in a scenario where unauthorized access to the secondary server is somehow achieved. The public/private key pairing can be used for post-activation authentications of the user device 107 to the secondary server.

Once the user device 107 is activated and configured, the user device 107 is recorded (e.g., in the @sign data 132) as a registered device for updating data for the @sign handle to which the device 107 is registered. In some implementations, a given user device 107 can be registered as bound to multiple @signs. The user device 107 can store @sign handle(s) 152 for which the user device 107 is registered and corresponding public/private key pairs for each @sign.

The settings application 145 running on the user device 107 can act as a secondary server for a registered @sign handle, receiving and responding to protocol requests locally on the user device. The settings application 145 can provide access to data stored in a personal directory 154 on the user device 107, for example. When the user device 107 is bound to a secondary server, the settings application 145 can synchronize the personal directory 154 with a personal directory stored in the secondary server (e.g., in a user container 122 or 148). When data in the personal directory 154 (or the corresponding personal directory in the secondary server) is updated, a "sync" protocol verb can be automatically invoked that updates the corresponding personal directory, so that user device-based and cloud-based directories are kept synchronized. The user device 107 can be authenticated to the secondary server before a synchronization occurs. The user device 107 can cache secondary server connection information in cached data 156 and/or the user device 107 can obtain secondary server connection information from the root server 105.

Synchronization can include one or more of sending data from one directory to the corresponding directory, comparing received items to stored items, identifying items in the receiver's directory that may need updating, and identifying changes that may have occurred in the receiver's directory that may in turn need updating in the sender's directory. Comparison processing can use metadata that indicates changes, times of changes, etc.

Event-based synchronization for a network-connected user device 107 can ensure that changes occurring in one directory copy are reflected in the corresponding directory copy. If the user device 107 is occasionally offline, the user (and locally-installed applications) can still access the personal directory 154 on the user device 107 and any differences between the personal directory 154 and a secondary server directory copy can be automatically synchronized when the user device 107 comes back online.

If the user device 107 is offline, protocol exchanges can be routed to and handled by the secondary server. In some cases, for protocol exchanges that may require user permission, a notification/permission request can be sent by the secondary server to the user device 107. If the user device 107 is offline, the permission request can be queued and a corresponding application/protocol request can be held until the user device 107 is back online and the user is able to respond to the permission request. In some implementations, the secondary server can be configured to hold a limited number (e.g., one) of permission requests/notifications for the user/user device 107, so as to prevent a bad actor from overflowing the secondary server (or the user device 107) with permission requests or other notifications. As another example, the secondary server can utilize a block list to prevent spamming. Such block lists may be device- or user-specific, or may be used across the entire protocol.

The settings application 145 running on the user device 107 can enable a user of the user device 107 to configure access rights to data stored in the user's personal directory (e.g., in the personal directory 154 and in the mirrored secondary server copy). The user can make certain data public, private, or accessible only to certain users, or any other suitable limitations or restrictions. Other permissions applied to data can include whether data can be copied, shared, or used to derive other data. In general, access rights of various kinds can be granted or revoked using the settings application 145. Access rights can be stored in association with corresponding personal data, such as in the personal directory 154 (and synced with the secondary server copy).

As mentioned, the settings application 145 can serve protocol requests for user data, either from other protocol servers or from an application on the user device 107. In general, the settings application 145, along with the corresponding secondary server, can provide @sign server functionality for the user to enable the user device 107, and the user's @sign, as protocol participants. The settings application 145 can present notifications to the user and enable the user to respond to notifications. Notification responses or other protocol responses can be provided to a sending protocol-enabled participant. Notifications and responses can be sent and received in a P2P fashion, and thus can be free from surveillance by a third party. Notifications can be received by the setting application 145 or the corresponding secondary server automatically, without a need for polling as used in other protocols such as POP3 (Post Office Protocol 3) or IMAP (Internet Message Access Protocol).

In general, an @sign (e.g., protocol) server, whether running on a cloud server, dedicated hardware, or on a user device 107, can provide an addressable endpoint for protocol-based communication. Along with a first, centralized tier of root servers 105, protocol servers can provide a second, decentralized tier of the protocol architecture. While the root servers 105 can be configured to respond to simple @sign lookup requests, the more complex handling of protocol requests for data can be distributed to billions of separate decentralized resource directories (e.g., the protocol servers) that are responsible for responding to the requests. In other words, the protocol servers represent a fully decentralized set of personal service directories, with each protocol server configured to respond to lookup and other requests for a particular @sign. The response for a requested data item or service can come from a secure key/value persistence in the respective decentralized resource directory managed by the protocol server receiving the request.

The protocol request received at a protocol server can include a general syntax pattern of "service@entity" that includes both the data or service requested being included in addition to the entity identifier, with the request being directed to a decentralized resource directory instance for processing. The response data for a particular service@entity request can be stored in a secure key/value persistence for the receiving entity. The value stored for the request can either be stored by value or by reference. The service@entity protocol syntax can be a base for creating Uniform Resource Identifiers (URIs). The service@entity syntax, while forming a simple base pattern, can be extended, such as to include an identity of a requester (e.g., @bob:phone@alice, which can be provided to @bob by @alice in response to a request by @bob for information @alice has shared with @bob).

The decentralized nature of the protocol servers can further increase security. Sensitive data can be stored in, for example, billions of separate, secure decentralized resource directory microservices. Data within a given microservice can be securely stored in an embedded key/value persistence with values strongly encrypted. Accordingly, sensitive data across users is not centralized or stored in one place, which can be security weaknesses for other types of systems. Decentralized distribution of data can support system scaling and can also reduce an attack surface for bad actors to a minimal footprint, as compared to other approaches.

Storing data by reference can further increase data distribution and decentralization. With data being able to be stored either by value or by reference, a user's owned data can be distributed, using by-reference pointers, among various other systems, with access control (including encryption keys) still being stored and managed by the user's protocol server, which remains under the control of the user.

Other than decentralization, various other approaches can be used for securing protocol requests and secured data when implementing the @protocol. For example, secure transport channels, such as TLS over TCP/IP, can be used. As another example, connections can be validated, by servers and/or clients, using SSL certificates. For further security, different protocol messages can be hashed and/or encrypted. Personal data can be encrypted and/or signed cryptographically, and can be decrypted by requesting and obtaining, for example, a public key of the entity. Other examples include use of a blacklist. A blacklist is a list of @signs that is checked when a "from:" verb is received by a protocol server. If the sender of the from: verb is found in the blacklist, the connection is immediately dropped, for example to fulfill a protocol promise of preventing a known blocked @sign from having any interaction whatsoever with the protocol server apart from a public lookup (e.g., which does not use the from: verb). In addition to a blacklist, "allowed list(s)" or "whitelist(s)" can be maintained by a protocol server that are derived from shared data and include @signs to whom the shared data is shared.

Additionally, the protocol servers are designed to prevent outside surveillance. Data stored in a protocol server can only be accessed by the registrant and other users to which the registrant user has explicitly shared access. The protocol servers are specifically designed to control the granting or revoking of access rights to registrant's data and services in real-time, based on the user's permissions. Other tracking or access to a protocol server outside the protocol specification can be prohibited, even from the registrar server 110, the protocol provider server 103, or other components of the system 100.

The personalized decentralized resource directories provided by the various protocol servers can enable various types of applications, including P2P applications. For example, a user device 107 can include various protocol-enabled applications 158. The protocol-enabled applications 158, which can include installed and/or web-based applications, can retrieve an @handle from the settings application 145, request approval for access to data in the personal directory 154, and expose application data 160 to the settings application 145 (or the secondary server) for the user's protocol server to maintain permissions for the application data 160. Although shown separately from the personal directory 154, application data 160 can be stored in the personal directory 154 or linked from the personal directory 154.

In some implementations, a protocol-enabled application 158 (and/or the settings application 145) includes a resolver library which can make protocol requests on behalf of the protocol-enabled application 158. Protocol-enabled applications 158, through use of the resolver library and/or the settings application 145, can be configured to receive user input, translate user input into protocol commands, process protocol verb requests, provide protocol verb responses, and persist data. Data persisted by an application can be data shared by others, and can be stored in the application data 160, the personal directory 154 and/or the cached data 156. Data shared by others can have a TTL (Time to Live) setting, which limits how long the data from others may be accessible.

Data in the personal directory 154, the personal directory 144, or in secondary server personal directory copies can also have a TTL setting. As described below, a private lookup challenge value can be placed in a personalized directory with a TTL value. As another example, application and/or personalized directory data can have a "TTB" (e.g., Time unTil Birth, Time To Birth) setting, which can represent a duration value. Data with a TTB setting can be configured to become available in the application data or personalized directory after the duration has elapsed (e.g., sharing information with a TTB parameter can provide access to the information only after the TTB time has been reached). For example, important financial information might be stored in an @server that is to become accessible only at a defined time in the future for all recipients. The financial information can be public or private and might also be subject to other time based controls, such as TTL and TTR (Time To Refresh). For instance, data can have both a TTB and a TTL setting, which can result in a data item appearing after a TTB duration has expired, and disappearing after a TTL duration has expired. Data with a TTR setting can be refreshed when the interval value for the TTR setting is reached. TTL, TTB, and TTR settings, whether used separately or in combination(s), can enable flexible and powerful data access and privacy control capabilities.

Applications can present data in a GUI (Graphical User Interface) 162. As another example, the protocol-enabled applications 158 can include a shell application, in which a user can enter protocol commands, e.g., after connecting to a root server 105, or a protocol server. The user can enter anonymous commands to access publicly available information, and can authenticate to a given protocol server, to make an authenticated request for information.

A protocol-enabled application 158 can be a standalone application for managing personal data, or can be a P2P application that communicates with other P2P applications, over the network 101. End-to-end encrypted P2P applications can have an advantage of not being subject to surveillance as they do not need to communicate through backend servers, or send unencrypted information in the clear. Rather, P2P applications can communicate in a distributed fashion, directly between themselves, at the edge of the network 101.

The protocol provider can support the application developer community, by providing the source code distribution 114 and the documentation distribution 116. The source code distribution 114 can be an open source code repository, e.g., for reference implementations, and can be made available from the protocol provider server 103 (or another server of the protocol provider) or through another source code repository or channel. The source code distribution 114 can include code for a SDK (Software Development Kit) that can be used by application developers 104 to create protocol-enabled applications. Other source code examples include sample code for protocol exchanges, code for fully-developed sample applications, etc.

The documentation distribution 116 can include protocol specification information and documentation, discussion of example protocol exchanges, tutorials, or other types of documentation. In addition to source code and documentation, the protocol provider can provide binary distributions for development tools, sample applications, etc. In general, an overall repository managed or supported by the protocol provider can include items that can be used, tested, evaluated, contributed to, and extended by the application developer community.

Application developers 104 can use developer tools 164 provided by the protocol provider (or by other providers) to develop protocol-enabled applications. Application developers 104, in order to use the protocol, can first agree to terms of conduct published by the protocol provider, which can provide legal recourse. Application developers can review application certification guidelines included in the documentation distribution 116, to learn requirements for application certification. When an application is ready for certification, an application developer 104 can provide application code 166 (or another type of packaged application distribution) to the application certifier 118, for certification.

Application certification can include review and testing (e.g., by the application certifier 118 or by administrator(s)) of the application code 166, to check for compliance with protocol guidelines. Upon successful certification of an application, application certification information 119 can be stored for the certified application. As another example, certification information can be stored at an @sign server associated with the application. In some implementations, application certification can be validated in real time, such as by using a checksum validation. Upon receiving an application certification result, an application developer 104 (or the application certifier 118) may update code of the application so that, for example, a user interface of the application presents an indication of certification to a user.

As another example, application information stored for the application in an application repository 168 of the application store 108 can be updated so that prospective users can see the certification status of the application. A user device 107 can connect to an application store service 170 (e.g., using a web site or an installed application provided by the application store 108), to access various application discovery tools. For example, a user can use the application store service 170 to browse and/or search for protocol-enabled applications. As another example, the application store service 170 can provide application ratings and/or recommendations. Once a user selects an application, the application can be downloaded (e.g., to a user device 107) from the application repository 168. The application store 108 can be provided by or otherwise affiliated with the protocol provider. As another example, at least some other application stores can be provided by third party vendors.

In some implementations, the backup server 106 is included in the system 100, as a separate backup repository for protocol servers. For example, a backup service 171 can provide backup/restore access to personal directory backups 172. The personal directory backups 172 can hold non-key data, for example. In some implementations, backup services can be provided by secondary server providers (e.g., data may be backed up in the user containers 122 or 148). If a user chooses to use the backup server 106 or another backup mechanism, the user can be charged a fee for the backup services.

In some implementations, the enterprise user device 111 can be connected over the local area network 112 with the enterprise microservice server 113 that can act as a proxy for the enterprise user device 111 for network connectivity beyond the local area network 112. The enterprise user device 111 may be behind a corporate or other type of firewall, for example. The enterprise user device 111 can send a "plookup" (e.g., a proxied lookup) protocol verb to the enterprise microservice server 113, for protocol exchanges. Through use of the plookup verb, the enterprise microservice server 113 can contact other protocol servers for protocol exchanges to be performed on behalf of the enterprise user device 111. The enterprise microservice server 113 can be useful in large enterprise environments that prefer all lookups going through a single Internet-connected secondary server, or where only a single port (e.g., on the enterprise microservice server 113) is preferred to be opened through the firewall for protocol use, or for other cases where a minimizing of connections is desired. The enterprise microservice server 113 can support an internal, private @protocol system (that includes the enterprise user device 111 and other devices), that is located internally within the enterprise.

As used in the present disclosure, the term "computer" is intended to encompass any suitable processing device. Indeed, the illustrated devices and systems may be or include any computer or processing device such as, for example, a mobile device, a laptop, a blade server, a general-purpose personal computer (PC), Mac®, workstation, UNIX-based workstation, IoT device, or any other suitable device. In other words, the present disclosure contemplates computers other than general purpose computers, as well as computers without conventional operating systems. Further, the illustrated devices and systems may be adapted to execute any operating system, including Linux, UNIX, Windows, Mac OS®, Java™, Android™, iOS, Dart, Swift, Kotlin, or any other suitable operating system.

Interfaces 175, 176, 177, 178, 179, 180, 181, 182, 183 and 184 (referred to below as interfaces 175-184) are used by the governing body 102, the protocol provider server 103, the application developers 104, the root servers 105, the backup servers 106, the user devices 107, the application store 108, the protocol servers 109, the registrar servers 110, and the enterprise microservice server 113, respectively, for communicating with other systems in a distributed environment—including within the system 100—connected to the network 101. Additionally, the interface 185 enables the enterprise user device 111 to communicate on the LAN 112

(e.g., to other enterprise user devices 111 and/or to the enterprise microservice server 113. Generally, the interfaces 175-184 each comprise logic encoded in software and/or hardware in a suitable combination and operable to communicate with the network 101. More specifically, the interfaces 175-184 may each comprise software supporting one or more communication protocols associated with communications such that the network 101 or interface's hardware is operable to communicate physical signals within and outside of the illustrated system 100.

The protocol provider server 103, the root servers 105, the backup servers 106, the user devices 107, the protocol servers 109, and the registrar servers 110 may each respectively include one or more processors 186, 187, 188, 189, 190, or 191. Each processor 186, 187, 188, 189, 190, or 191 may be a central processing unit (CPU), a blade, an application specific integrated circuit (ASIC), a field-programmable gate array (FPGA), or another suitable component. Generally, each processor 186, 187, 188, 189, 190, or 191 executes instructions and manipulates data to perform the operations of the respective device. Specifically, each processor 186, 187, 188, 189, 190, or 191 executes the functionality required to receive and respond to requests from another device. Although not illustrated as including processors, the governing body 102, the application developer 104, the application store 108, the enterprise user device 111, and the enterprise microservice server 113 may each include (or be associated with device(s) that include) one or more processors.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Peri®, Dart, Swift, Kotlin, Go, Python, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Each of the devices or systems illustrated in FIG. 1 may include one or more memories (e.g., storage locations). Each memory may include any type of memory or database module and may take the form of volatile and/or non-volatile memory including, without limitation, magnetic media, optical media, random access memory (RAM), read-only memory (ROM), removable media, or any other suitable local or remote memory component. Each memory may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the system 100.

The user devices 107 may each generally be any computing device operable to connect to or communicate with other devices using a wireline or wireless connection, with different user devices 107 being similar or different types of devices in a particular implementation. In general, the user device 107 comprises an electronic computer device operable to receive, transmit, process, and store any appropriate data associated with the system 100 of FIG. 1. The user device 107 can each include one or more client applications, including the registration application 138, the settings application 145, and the protocol-enabled applications 158. A client application is any type of application that allows the user device 107 to request and view content on user device 107. In some instances, a client application may be an agent or client-side version of the one or more server applications running on a server.

The user device 107 is generally intended to encompass any client computing device such as a laptop/notebook computer, wireless data port, smart phone, personal data assistant (PDA), tablet computing device, one or more processors within these devices, or any other suitable processing device. For example, the user device 107 may comprise a computer that includes an input device, such as a keypad, touch screen, or other device that can accept user information, and an output device that conveys information associated with the operation of the client device itself or the system 100, including digital data, visual information, or the GUI 162.

The GUI 162 interfaces with at least a portion of the system 100 for any suitable purpose, including generating a visual representation of the registration application 138, the settings application 145, or the protocol-enabled applications 158. In particular, the GUI 162 may be used to view and navigate various Web pages. Generally, the GUI 162 provides a respective user with an efficient and user-friendly presentation of data provided by or communicated within the system 100. The GUI 162 may comprise a plurality of customizable frames or views having interactive fields, pull-down lists, and buttons operated by the user. The GUI 162 contemplates any suitable graphical user interface, such as a combination of a generic web browser, intelligent engine, and command line interface (CLI) that processes information and efficiently presents the results to the user visually.

There may be any number of user devices 107 associated with, or external to, the system 100. Additionally, there may also be one or more additional user devices 107 external to the illustrated portion of system 100 that are capable of interacting with the system 100 via the network 101. Further, the term "client", "client device" and "user" may be used interchangeably as appropriate without departing from the scope of this disclosure.

Figure 2A:
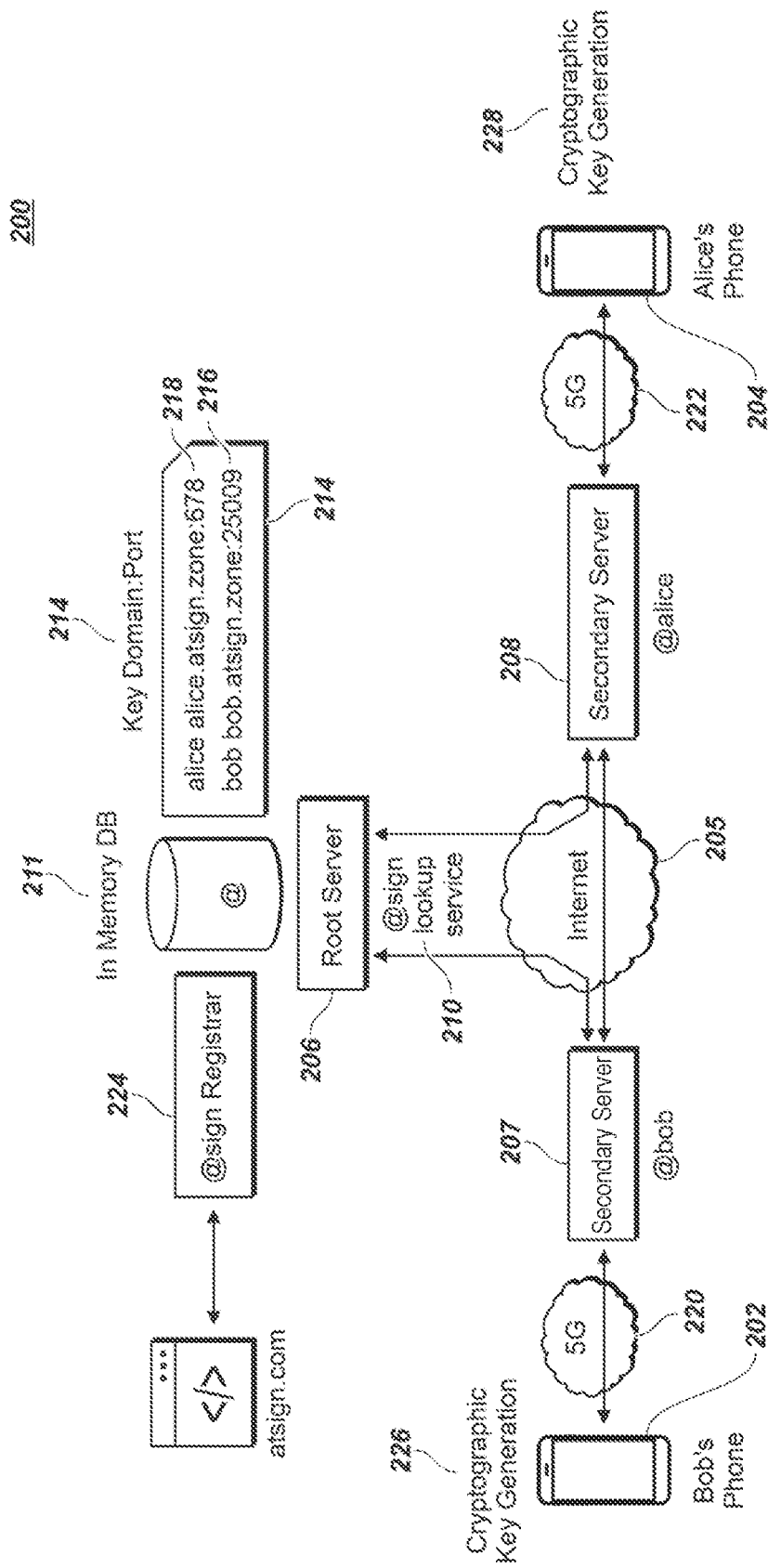
FIG. 2A is a block diagram illustrating an example system for user-controlled access control for user information.

FIG. 2A is a block diagram illustrating an example system 200 for user-controlled access control for user information. The system 200 may be similar to at least portions of the system 100, for example. The system 200 includes a user device 202 of a "Bob" user and a user device 204 of an "Alice" user. Various figures below describe various scenarios for data sharing and access between or by an example "Bob" and/or "Alice" user. As described below with respect to FIGS. 14-20C, the user devices 202 and 204 can be onboarded to the @sign platform. The @sign platform, as described above, can include a namespace directory and decentralized resource directory servers that communicate over a network 205 (e.g., the Internet).

The namespace directory can be implemented as a root server 206. Decentralized resource directory servers can be implemented as secondary servers, including a secondary server 207 for the user "Bob" and a secondary server 208 for the user "Alice." The root server 206 can provide a lookup service 210 that accepts lookup requests for secondary server information for a particular @sign. For example, the root server 206 can maintain, (e.g., in an in-memory database 211 (or other type of database), entries 212 that are in a "domain:port" format 214. For example, the entries 212 include an entry 216 for the secondary server 207 for the user "Bob" and an entry 218 for the secondary server 208 for the user "Alice."

The secondary servers 207 and 208 can each manage a decentralized resource directory for a respective user, such as using a secure key/value persistence. Each secondary server 207 and 208 can provide responses to requests for user data managed by the respective secondary server. The secondary servers 207 and 208 can correspond, for example, to the @sign server 109 of FIG. 1. For example, a same type of server can be referred to using different names in different implementations. For instance, @sign server, secondary server, protocol server, DESS (Distributed Edge Secondary Server), microserver, or other names can be given to a server that services an individual decentralized resource directory. As described in more detail below, individual decentralized resource directories can also be implemented locally on the user device 202 or 204, with synchronization performed as needed between the secondary server 207 or 208, respectively. For example, the secondary servers 207 and 208 can be cloud-based secondary servers and can communicate with the user device 202 or the user device 204 over a cellular (or other) network 220 or 222, respectively. In some implementations, a cloud secondary server such as the secondary server 207 and 208 can be referred to using the term "secondary" in that a secondary server manages a cloud-based individual decentralized resource directory that is secondary to (e.g., a backup to) a local individual decentralized resource directory that is local to a user client device.

As part of onboarding a respective user device 202 or 204, a shared secret shared between the user device 202 or 204 and the corresponding secondary server 207 or 208 can be provided (e.g., in various ways, as described below) to the user device 202 or 204 by a registrar 224. The shared secret can be used to establish a secured relationship between the user device 202 or 204 and the corresponding respective secondary server 207 or 208. Once a relationship has been established between the user device 202 or 204 and the corresponding respective secondary server 207 or 208, cryptographic key generation 226 or 228 can be performed on the user device 202 or 204, respectively, and use of cryptographic keys can replace use of the shared secret. The cryptographic key generation 226 and 228 can include generation of a public/private key pair. A generated private key can be stored on the user device 202 or 204 (e.g., in a hardware entrusted root). A generated public key can be shared by the user device 202 or 204 with the respective corresponding secondary server 207 or 208. Data sharing between the user device 202 or 204 and the corresponding respective secondary server 207 or 208 can be performed using the @protocol, as described below. Additionally, once configured, the secondary servers 207 and 208 can perform data sharing and data requests using the @protocol, over the network 205, with any protocol-enabled device. For example, private and public lookups and data sharing can be performed.

Figure 2B:
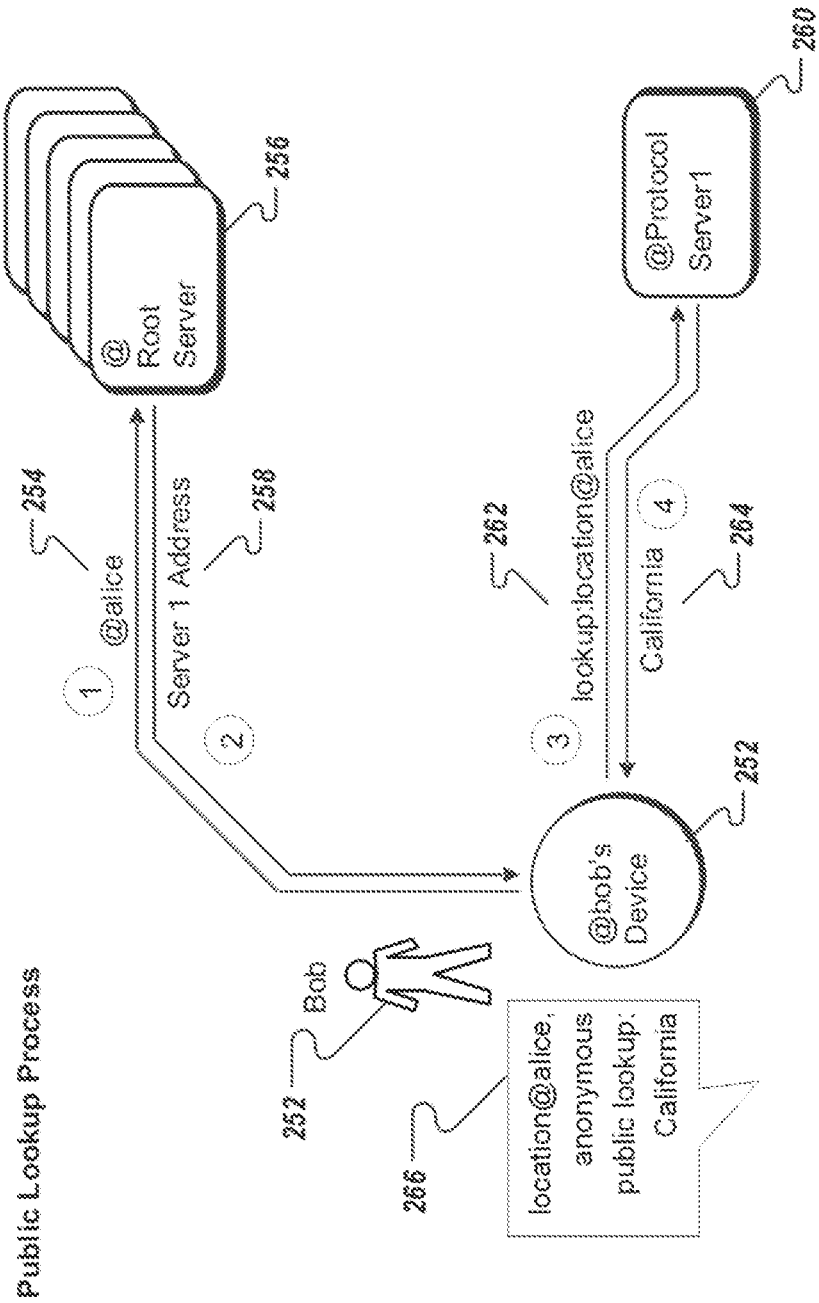
FIG. 2B is a block diagram illustrating an example system for a public lookup transaction.

FIG. 2B is a block diagram illustrating an example system 250 for a public lookup transaction. A public lookup can be performed on an @sign server without being authenticated to the @sign server. In this example, a user 251 ("Bob") wants to do a lookup for a location value for an @alice user.

The user 251 can perform the lookup using a device 252 (e.g., Bob's device, configured for or associated with an @bob user). The device 252 can include code for executing @protocol exchanges (e.g., as provided by a resolver library), among other protocol configurations.

In a first stage (e.g., illustrated as a circled "one"), the device 252 sends an "@alice" query 254 to a root server 256. A public lookup of an @sign can be performed without being authenticated to the root server 256. The root server 256 looks up server information for the @alice handle and, in stage two, returns server address information 258 to the device 252. The server address information 258 can include a server address and port number for a protocol server 260 that handles protocol requests for the @alice user.

In a third stage, the device 252 uses the server address information 258 to send a "location@alice" query 262 to the protocol server 260. The protocol server 260 can determine whether a "location" value is stored by the protocol server 260 and whether the location value is publicly accessible. The query 262 is an anonymous, unauthenticated (e.g., public) query, so the protocol server 260 can be configured to provide a response to the query 262 only if the protocol server 260 stores a public "location" value. In some implementations, if the protocol server 260 does not store a public location value, the protocol server 260 can provide a null (e.g., empty) response. Alternatively, if no public location value is stored, then the protocol server 260 can ignore the location@alice query 262 with no response provided.

In a fourth stage, in response to determining that a public location value is stored at the protocol server 260, the protocol server 260 sends a retrieved public location value of "California" to the device 252. A note 266 summarizes the transaction (i.e., the device 252 receiving the public location value of "California" 264 in response to the public-lookup "location@alice" query 262).

The lookup:location@alice query 262 is an example of a lookup protocol verb used to lookup a particular address in a particular @handle's namespace. The protocol server 260 can be configured to assume that any received value that ends with "@alice" is a lookup request, for example. As mentioned, an unauthenticated request is referred to as a public lookup, in which a requesting user does not have to prove who they are. Private, authenticated lookups are also supported, as described below.

Figure 3:
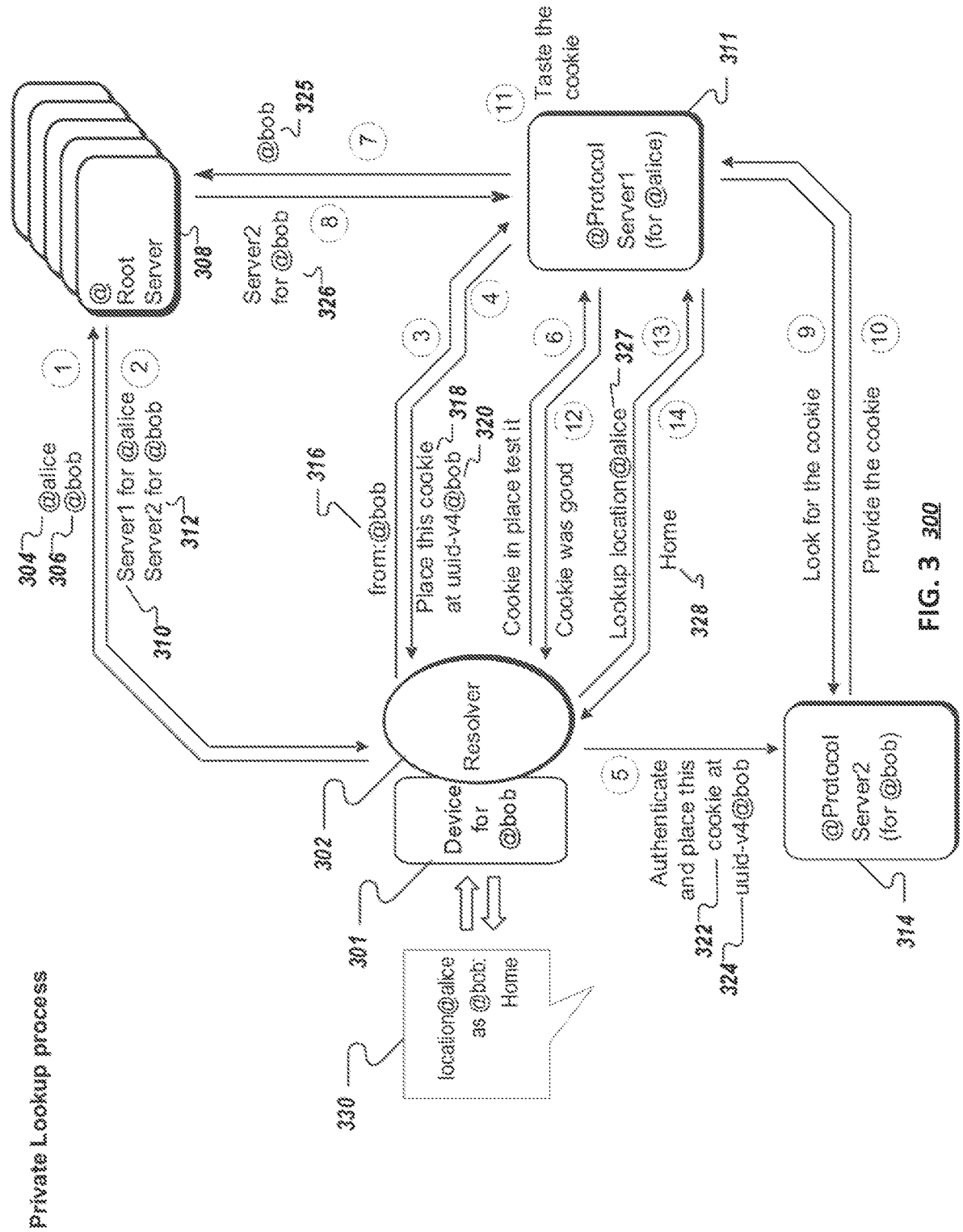
FIG. 3 is a block diagram illustrating an example system for a private lookup transaction.

FIG. 3 is a block diagram illustrating an example system 300 for a private lookup transaction. The @protocol includes an automated method for ensuring that an entity that is requesting some private information from another entity has proven that they are who they claim to be before the request is presented for processing. Failure of this proof can immediately cause the connection between the entities to be dropped. A "proof of life" or "pol" algorithm can be performed during a private lookup process.

A device 301, associated here with user @bob, can include a resolver 302. The resolver 302 can be a library included in (or otherwise used by) a protocol-enabled application. The resolver 302 can be configured to perform (among other tasks) a private lookup of information managed by a user with a handle of @alice. The resolver 302 can be included in an application that is running on the device 301 on behalf of the user @bob.

In a first stage, the resolver 302 sends an "@alice" query 304 and an "@bob" query 306 to a root server 308. The resolver 302 may or may not currently have access to server information for a protocol server for @bob, for example. To perform the pol algorithm as part of a private lookup for information managed by the @alice user, the resolver 302 can connect to protocol servers for both @alice and @bob.

In response to the @alice query 304 and the @bob query 306, the root server 308 looks up server information for the @alice and @bob handles and, in a second stage, returns, to the resolver 302, server address information 310 for a protocol server 311 for @alice and server address information 312 for a protocol server 314 for @bob, respectively.

In a third stage, the resolver 302 submits a "from:@bob" request 316 to the protocol server 311. The "from:@bob" request 316 is an example use of a from protocol verb that can be used to tell a protocol server what @handle is associated with a request. The pol algorithm can be initiated when a user submits a from verb that includes an @sign of the requester. The "from:@bob" request 316 includes the @sign "@bob" in this example.

In the pol algorithm, upon receiving a "from" request, the requested entity first returns a challenge asking the requestor to publish a defined secret in a defined secret location in the requestor's namespace and notify the requested entity when the defined secret is available at the defined location. For example, in a fourth stage, the protocol server 311, in response to the request 316, sends a challenge requesting the resolver 302 to place a cookie 318 at a particular address 320 on the protocol server 314. That is, proof of a requester's identity can be provided using an ability to place a cookie or other identifier at a specified place in the requester's @handle name space. For the resolver 302 to legitimately act on behalf of @bob, the resolver 302 should be able to authenticate to the protocol server 314 for @bob and place the requested cookie 318 at the requested address 320. The cookie 318 and the address 320 can be randomly-generated values generated by the protocol server 311 as part of the pol algorithm. The cookie 318 and the address 320 can be UUIDs (Universally Unique IDentifiers) or some other type of random value or identifier.

In a fifth stage, the resolver 302 authenticates to the protocol server 314 for @bob and places a cookie 322 (corresponding to the requested cookie 318) at an address 324 (corresponding to the requested address 320). The resolver 302 authenticates to the protocol server 314 before performing the placement of the cookie 322. Different approaches can be used for authenticating to the protocol server 314.

For example, the resolver 302 can first indicate to the protocol server 314 that the resolver 302 is acting on behalf of the @bob user (e.g., using a "from:@bob" command). The protocol server 314 can respond with a challenge for the resolver 302. The resolver 302 can respond to the challenge, using for example, a CRAM verb or a PKAM (Public Key Authentication Mechanism) verb. The CRAM verb uses a shared secret, while the PKAM verb uses a public/private key approach. Authentication is discussed in more detail below with respect to FIG. 4A.

After successfully authenticating to the protocol server 314, the resolver 302 can submit an update request to the protocol server 314 to place the cookie 322 at the address 324. An update verb can be used to place a new value or update an existing value on the protocol server 314, for example. Placing the cookie 322 at the address 324 can prove to the protocol server 311 that the resolver 302 is in fact acting on behalf of the @bob user.

In a sixth stage, the resolver 302 sends an indication to the protocol server 311 that the requested cookie is in place on the protocol server 314 and available for testing by the protocol server 311. For example, the resolver 302 can send a pol verb to the protocol server 311. The pol verb can be used to signal the protocol server 311 to check for (e.g., look up) the cookie 318 on the protocol server 314.

In a seventh stage, the protocol server 311 sends an "@bob" query 325 to the root server 308 (or to another root server) requesting protocol server information for the @bob handle.

In response to the @bob query 325, the root server 308 looks up server information for the @bob handle and, in an eighth stage, returns, to the protocol server 311, server address information 326 for the protocol server 314 for @bob.

In a ninth stage, the protocol server 311 looks for the cookie 318 at the address 320 on the protocol server 314. Looking for the cookie can include sending a lookup request for a value on the protocol server 314 at the address 320.

In a tenth stage, the protocol server 314 provides the cookie value 322 stored at the address 324 to the protocol server 311, in response to the lookup request sent by the protocol server 311.

In an eleventh stage, the protocol server 311 "tastes" the cookie received from the protocol server 314. That is, the protocol server 311 compares the cookie 318 sent in the proof challenge to the cookie 322 that was actually stored at the address 320 on the protocol server 314 (and sent to the protocol server 311 by the protocol server 314). If the cookie 318 does not match the cookie 322, the protocol server 311 can determine that the resolver 302 has failed the proof of life challenge. The protocol server 311 can drop a connection with the resolver 302, simply not respond to the pol verb sent by the resolver 302 in the sixth stage, or return an error code to the resolver 302 that indicates a failure of the pol attempt. Similarly, the protocol server 311 can drop a connection, ignore the pol verb, or send an error code to the resolver 302 if the cookie 318 was simply not found on the protocol server 314.

In a twelfth stage, in response to a successful retrieval and test of the cookie 322, the protocol server 311 sends an indication of pol success to the resolver 302, indicating that the resolver 302 has successfully authenticated to the protocol server 311 as the user @bob.

In a thirteenth stage, the resolver 302 sends, using the authenticated connection, a "lookup location@alice" request 327 to the protocol server 311. The protocol server 311 can determine that a value specific to @bob is stored by the protocol server 311 for the location@alice address.

In a fourteenth stage, the protocol server 311 returns a value of "Home" 328 to the resolver 302, in response to the lookup request 327. A note 330 summarizes the private lookup transaction, of the resolver 302 receiving the location value of "Home" 328, in response to the private (e.g., as @bob) lookup "location@alice" request 327. That is, the value of "Home" has been shared with the @bob user and is provided in response to location@alice requests sent by the @bob user or an application acting on behalf of @bob, in contrast to a publicly accessible location value 214 of "California" that is returned in response to location@alice requests sent by unauthorized users (or by users to which a private/custom location value is not shared).

Figure 4A:
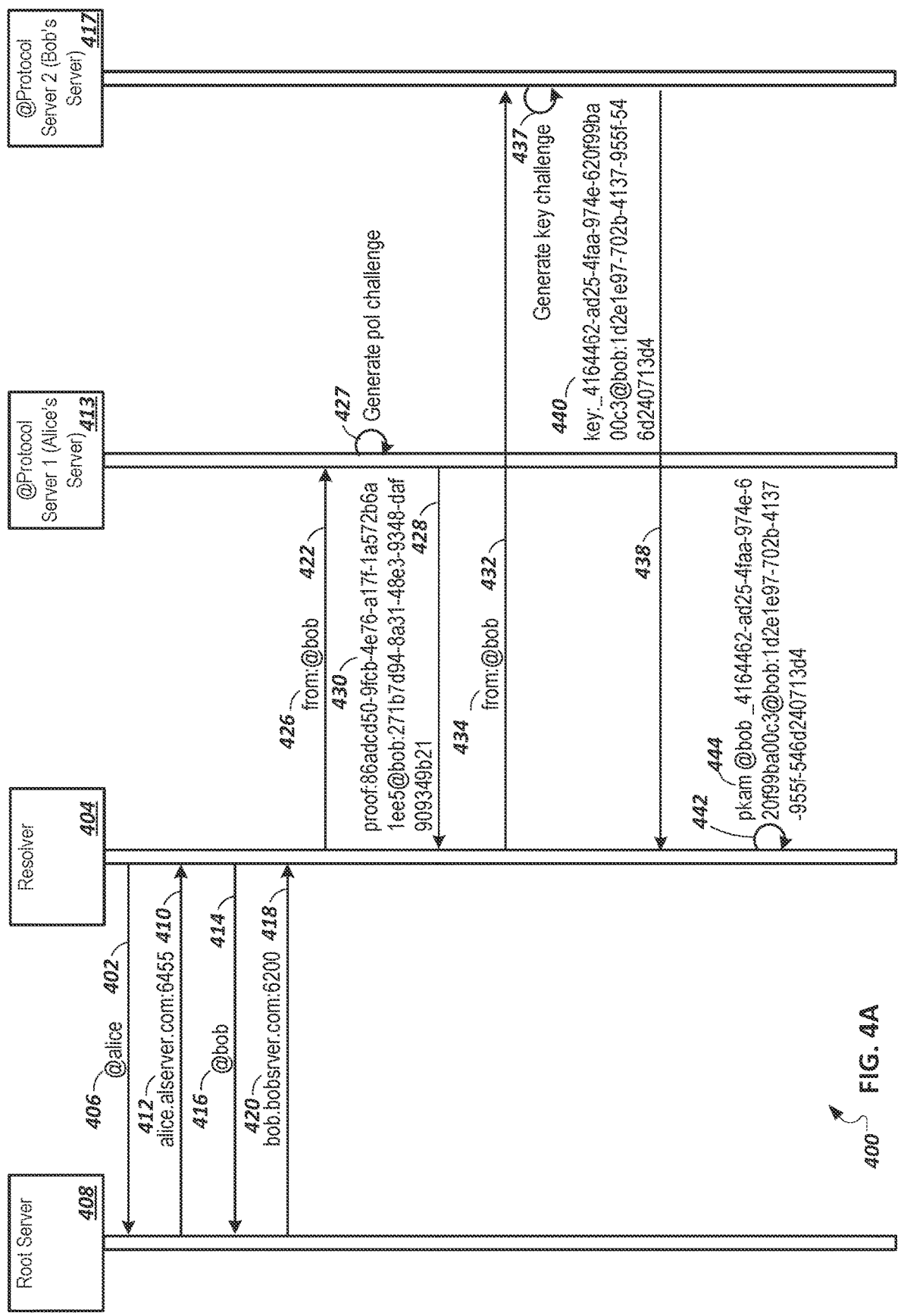
FIGS. 4A and 4B are a combined swim lane diagram illustrating an example method for a private lookup transaction.
Figure 4B:
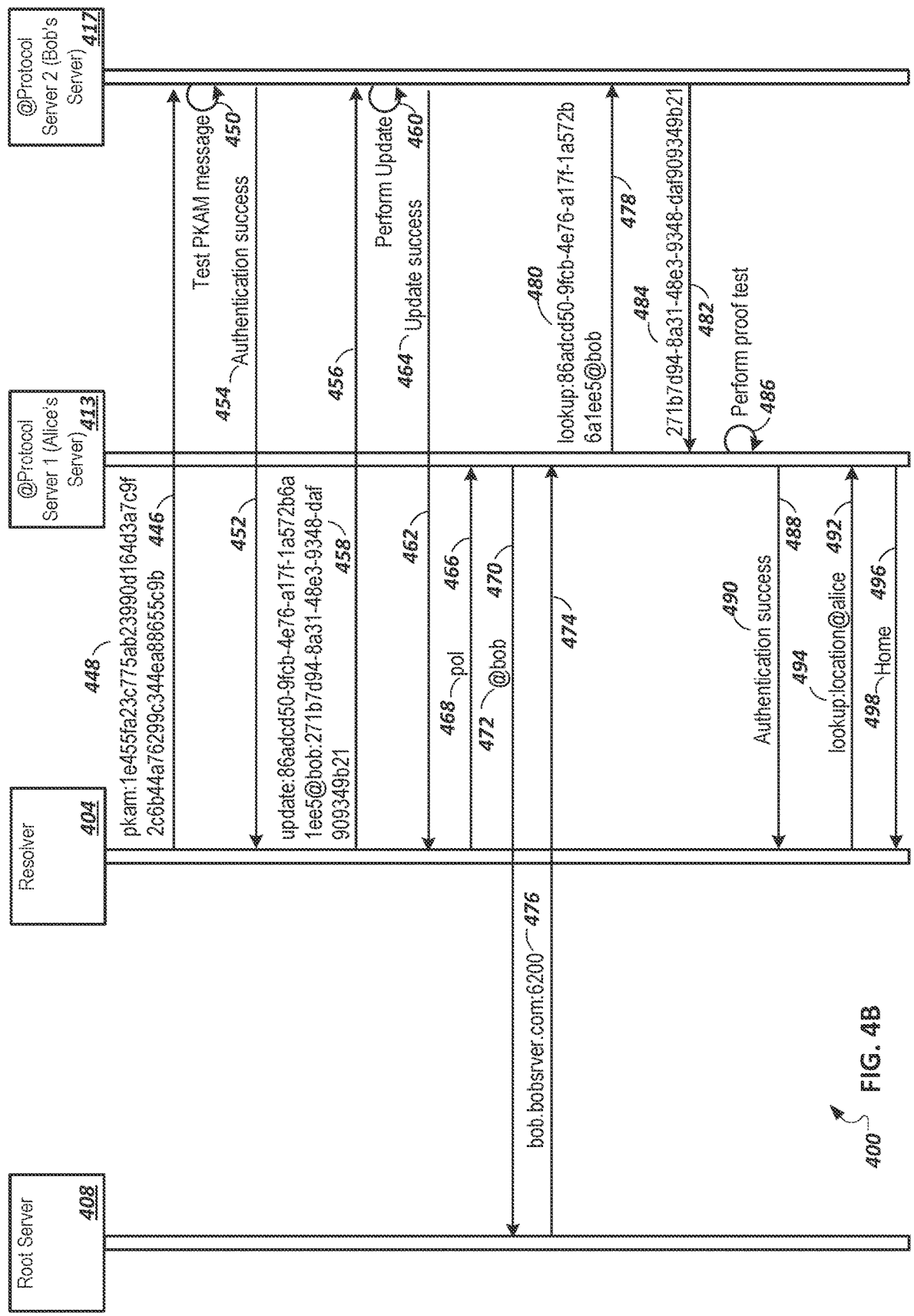

FIGS. 4A and 4B are a combined swim lane diagram illustrating an example method 400 for a private lookup transaction. Similar to the private lookup illustrated in FIG. 3, the method 400 can describe a user "Bob" with a handle of "@bob" performing a private lookup of information maintained by a user "Alice" with a handle of "alice."

As shown in FIG. 4A at 402, a resolver 404 sends a query 406 of "@alice" to a root server 408. At 410, the root server 408 sends a response 412 to the query 406 of "alice.alserver- .com:6455" that includes a server and port number of Alice's server 413. Bob can use an application that includes, implements, or accesses the resolver 404 to submit a query for Alice's server information, if Bob (or the application) does not have Alice's server information cached. If Bob (or Bob's application) does not have his own server information cached, the resolver 404 can, at 414, send a query 416 of "@bob" to the root server 408 to obtain server information for Bob's server 417. For example, at 418, the root server 408 sends a response 420 of "bob.bobserver.com:6200" in response to the query 414.

In general, the root server 408 can respond to a query for an @sign with a single IP address and port or a single fully qualified domain name (FQDN) and port number. The returned port number can identify the @protocol service and a particular user's server. The root server 408 can respond with a null value (or simply ignore a request) if the root server 408 does not have server information for a particular requested @sign.

At 422, the resolver 404 connects to Alice's server 413 and sends a "from:@bob" message 426 to Alice's server 413. As discussed above, a "from" request can indicate to a requested entity what @handle the requester claims to be. The message 426 can indicate to Alice's server 413 that the resolver 404 is claiming to be associated with the @bob user.

At 427, in response to the message 426, Alice's server 413 generates pol challenge information. For example, Alice's server 413 can generate a first random value and a second random value to be used in a challenge sent to the resolver 404.

At 428, Alice's server 413 responds to the message 426 by sending a pol challenge 430. The pol challenge 430 is a proof challenge that requests the resolver 404 to place a first identifier (e.g., a UUID) "271b7d94-8a31-48e3-9348-da1909349b21" at a randomly-generated address of "86adcd50-9fcb-4e76-a17f-1a572b6a1ee5" on Bob's server 417. If the resolver 404 is authorized to act on behalf of @bob, the resolver 404 should be able to successfully perform the requested challenge. Although the illustrated pol challenge 430 uses a "proof" keyword (e.g., proof verb), other keywords can be used. For instance, in some implementations, a "data" keyword is used rather than a "proof" keyword. Likewise, for other protocol verbs or syntax, different variations can be used, in different implementations.

At 432, the resolver 404 sends a "from:@bob" message 434 to Bob's server 417 to attempt to authenticate to Bob's server 417. Similar to the message 426, the message 434 is indicating to Bob's server 417 that the resolver 404 is claiming to be acting on behalf of the @bob user.

At 437, Bob's server 417 generates key challenge information.

At 438, Bob's server 417 sends a key challenge 440 to the resolver 404. As shown, if a user, application, or process issues a "from:@bob" verb to the server associated with the @bob user, the server for @bob can issue a key challenge, whereas the server for @bob can issue a proof challenge in response to a from: verb from a user other than the @bob user. As discussed above, the resolver 404 can respond to the key challenge 440 using a CRAM verb, a PKAM verb, or some other type of authentication response.

At 442, the resolver 404 (or another process, on behalf of the resolver 404) executes a PKAM command 444 to create a signed version of the key challenge 440 using a private key for the @bob user. If the resolver 404 is legitimately configured to represent the @bob user, the resolver 404 has access to the private key for the @bob user. With the PKAM approach, Bob's server 417 is configured to have access to the public key for the @bob user.

Referring now to FIG. 4B, at 446, the resolver 404 sends a PKAM message 448 to Bob's server 417. The PKAM message 448 includes a signed version of the key challenge 440 that was created by the PKAM command 444.

At 450, Bob's server 417 tests the PKAM message 448. For example, Bob's server 417 can check to see if the signed version of the key challenge 440 is accurate by testing the signed version of the key challenge 440 using the public key for the @bob user.

At 452, in response to a successful test of the PKAM message 448, Bob's server 417 sends an indication 454 of authentication success to the resolver 404.

At 456, the resolver 404 sends, while authenticated on Bob's server 417 as @bob, an update request 458 to Bob's server 417 to place the first random value "271b7d94-8a31-48e3-9348-daf909349b21" included in the pol challenge 430 at the randomly-generated address of "86adcd50-9fcb-4e76-a17f-1a572b6a1ee5" included in the pol challenge 430.

The update protocol verb enables a user or process authenticated on a given @sign server to update entries in that @sign namespace. A general format of the payload for an update verb is: [public/@sign]:key@[@yourname] value. An example update request is "update:public:email@alice alice.bloggs@emailXXX.com," which can create a public record for an email@alice address with a value of "alice.bloggs@emailXXX.com." An example of updating a value shared to a certain user is "update:@bob:email@alice alice@personalemail.org." A delete verb can be used by an authenticated user or process to delete an entry on an @sign server. For example, "delete:public:email@alice" and "delete:@bob:email@alice" requests can be sent to delete the entries mentioned in the previous two examples.

Continuing with FIG. 4B, at 460, Bob's server 417 performs an update of Bob's personal directory based on the update request 458. In some implementations, a cookie placed on Bob's server based on the update request 458 is configured with a timeout value. For example, the cookie can have a TTL (Time To Live) value set to one minute. After one minute has passed, Bob's server 417 can delete the cookie (or mark the cookie as invalid). A timeout value, combined with generation of random values such as UUIDs, can result in a negligible likelihood of a namespace clash (e.g., of another application or user placing a same cookie value at a same location). From a perspective of other entities other than the resolver 404 and Bob's server 417, the update request 458 essentially results in the placing of an unknowable value at an unknowable location. A likelihood of another user or application knowing (or learning) the random cookie value or the random location can be substantially negligible. In some implementations, Bob's server cryptographically signs the cookie using a private key associated with the @bob user before placing an encrypted cookie at the address requested by Alice's server 413. Alice's server 413 can decrypt the signed cookie, as described below.

At 462, Bob's server 417 sends an indication 464 of a successful update to the resolver 404. At 466, the resolver 404 sends a pol request 468 to Alice's server 413. The pol request 468 can be used to signal Alice's server 413 that Bob's server 417 is ready for Alice's server 413 to verify the pol challenge 430.

At 470, Alice's server 413 sends a query 472 of "@bob" to the root server 408 to obtain server information for Bob's server 417. At 474, the root server 408 sends a response 476 of "bob.bobserver.com:6200" in response to the query 472.

At 478, Alice's server 413 sends a lookup request 480 to Bob's server 417 to look up the value at the address Alice's server included in the pol challenge 430.

At 482, Bob's server 417 sends a value 484 to Alice's server 413 in response to the lookup request 480. The value 484 is retrieved by Bob's server 417 as the value of the 86adcd50-9fcb-4e76-a17f-1a572b6a1ee5@bob address on Bob's server 417.

At 486, Alice's server 413 performs a proof test. Alice's server 413 can compare the value 484 to the value Alice's server 413 included in the pol challenge 430. In implementations in which Bob's server 417 cryptographically signs the value Alice's server 413 included in the pol challenge 430, before storing a digitally-signed value on Bob's server 417, Alice's server 413 can decrypt the signed value using a public key for the @bob user, before comparing a decrypted value to the value included in the pol challenge 430. Alice's server 413 can obtain the public key for @bob by doing a lookup for publickey@bob, for example.

At 488, in response to a successful proof test, Alice's server 413 sends an indication 490 of authentication success to the resolver 404. The resolver 404 is now authenticated as the @bob user on Alice's server 413. Alice's server 413 has concluded that the resolver 404 is in fact acting on behalf of the @bob user as claimed by the resolver in the "from:@bob" message 426.

At 492, the resolver 404, while in an authenticated state with respect to Alice's server 413, sends an authenticated lookup request 494 to Alice's server 413.

At 496, Alice's server 413 sends a user-specific value 498 to the resolver 404, in response to the authenticated lookup request 494. The user-specific value 498 is an example of a polymorphic response. Alice's server can send different values in response to a same lookup location@alice request, based on whether the sender is anonymous or based on the identity of the sender.

Figure 5:
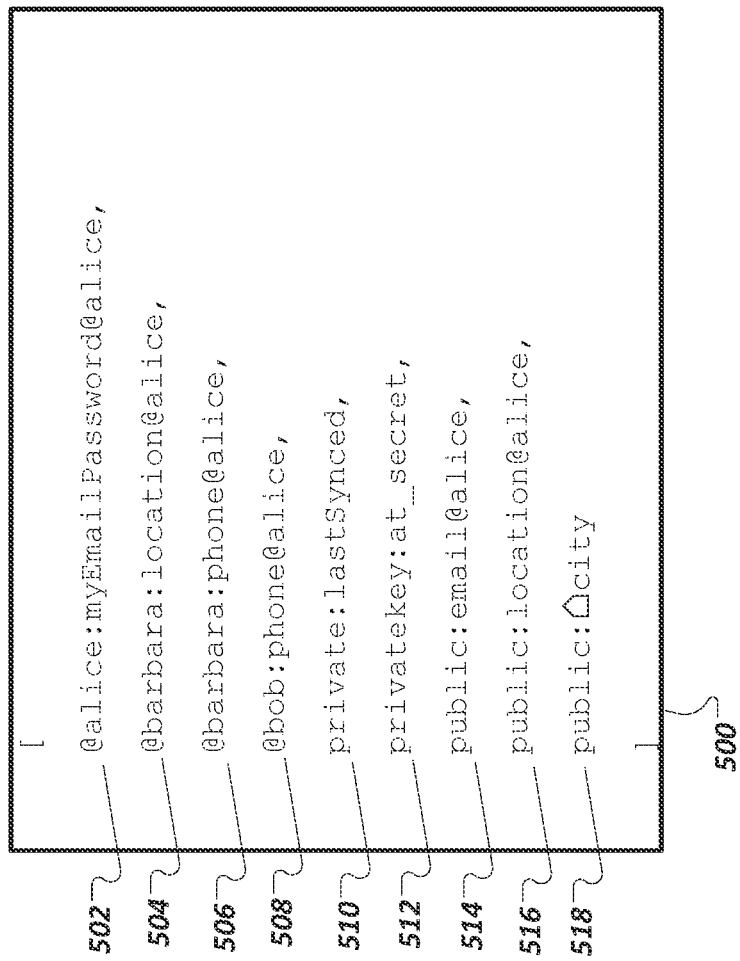
FIG. 5 illustrates example keys of values stored in a user's personal directory.

FIG. 5 illustrates example keys 500 of values stored in a user's personal directory. The user's personal directory, for example, may be similar to the personal directory 144 and/or the personal directory 154 of FIG. 1. The keys 500 can be for a user Alice, with an address of @alice. A key 502 can be for an email password that Alice saves for herself only. Other keys can be for values that are shared with specific users. For example, a key 504 can be for a location value that is shared with an @barbara user, a key 506 can be for a phone number that is shared with @barbara, and a key 508 can be for a phone number that is shared with an @bob user. The phone number shared with @barbara can be a different phone number than the phone number shared with @bob. An item of data can be shared to multiple users (e.g., a group of users). A respective grant for the item of data can be granted to each user in the group, for example.

Keys 510 and 512 are for private (e.g., internal) synchronization and private-key values, respectively. The keys 500 may be stored on Alice's device (e.g., a mobile device), for example, and the keys 510 and 512 may be relevant for protocol activity on the device. Keys 514 and 516 can be for a publicly published email address and location values, respectively.

The key 518 can be for a public "home city" value. Rather than use the word "home" in the key 518, the key 518 includes a symbolic house character. Keys (and values and @sign handles) can be a combination of characters from a Unicode character set, for example. For instance, Unicode can support 137,994 characters covering 150 modern and historic scripts (e.g., beyond the Latin script), at least 64 languages, as well as multiple symbol sets, including emoji and graphical characters. Accordingly, users have significant flexibility for being creative with selecting keys, values, and their @handle address.

Some rules can be defined for legal @handle addresses, however. For instance, white space characters and certain predefined control characters and punctuation characters can be defined as illegal for an @handle address. Additionally, @handle addresses can be case insensitive, so that "@alice" and "@Alice" refer to the same @sign and same user.

Figure 6A:
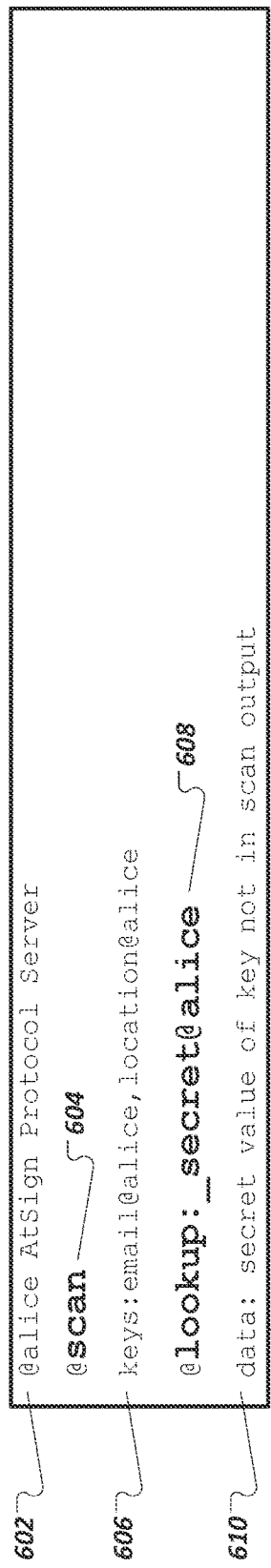
FIG. 6A-C illustrates example uses of a scan verb.
Figure 6B:
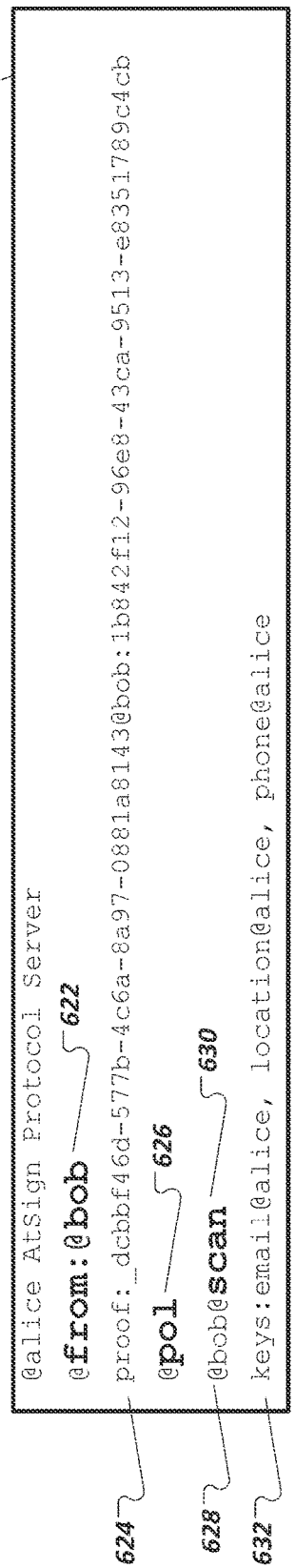
Figure 6C:
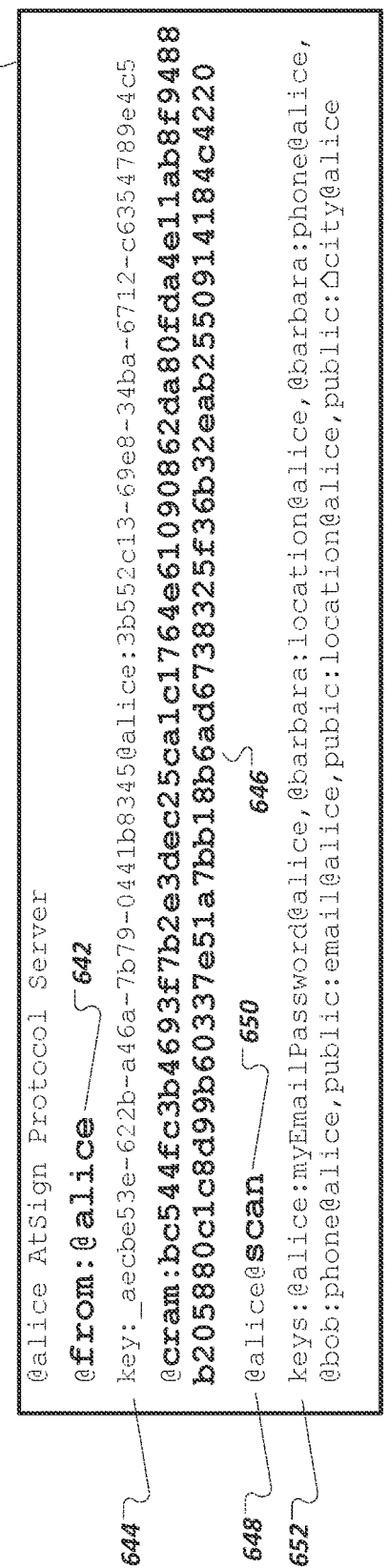

FIGS. 6A-6C illustrate example uses of a scan verb. The scan protocol verb can be used to scan available @-addresses (e.g., keys) for a user or application either at a public level or once a pol process has been completed. The scan verb can be used to discover and harvest available @-addresses. As shown by a message 602 in FIG. 6A, a connection has been established (by a particular user or application) to Alice's protocol server.

A scan verb 604 is entered (or otherwise sent) to Alice's server. In response to the scan verb 604, Alice's server determines available @-addresses for a current unauthenticated state. That is, given the unauthenticated state of the connection, Alice's server can identify and return, in a response 606, publicly available @-addresses on Alice's server. For instance and as shown in the response 606, publicly available @-addresses include "email@alice" and "location@alice."

In some implementations, a server can exclude certain @-addresses from being included in a response to a scan verb. For example, addresses that begin with a special character (or characters), such as "_", can be excluded. Addresses that begin with "_" can be considered secret, in that they are not included in a scan response but can be looked up if known. For instance, a lookup request 608 for "secret@alice" can be responded to with an output 610. A service address that starts with "_" can be publicly available for lookup only if the requesting entity is aware of the service address. The entity providing the service can selectively share the service address, for example. The service address can be or include a value, such as a long and/or random string of characters, which would be impractical for other entities to determine. For example, an @bob user can store a location value for a party at an example service address of _partyforbob_14445aa444fc@bob. Bob can share the address with those who are invited to the party. Other entities who are not aware of the service address would not know that a value is stored at that service address.

As shown in FIG. 6B, a user Bob has entered a "from:@bob" command 622 while connected to Alice's server, and in response to a proof challenge 624, has entered a pol command 626 (e.g., after placing a requested identifier at a requested location on Bob's server). An "@bob@" prompt 628 indicates that the pol command 626 was successful and that Bob is now authenticated as Bob on Alice's server. While authenticated as Bob, a scan command 630 can result in output 632 that lists @-addresses on Alice's server that are available to Bob, including "email@alice," "location@alice," and "phone@alice" addresses. The output 632 includes the public keys described above with respect to FIG. 6A as well as a "phone@alice" key of a phone number value that has been shared by Alice with Bob.

As shown in FIG. 6C, Alice has entered a "from:@alice" command 642 while connected to Alice's server, and in response to a key challenge 644, has entered a CRAM command 646 (e.g., after determining a correct digest to include with the CRAM command 646). An "@alice@"

prompt 648 indicates that the CRAM command 646 was successful and that Alice is now authenticated as Alice on Alice's server. While authenticated as Alice, a scan command 650 can result in output 652 that lists @-addresses on Alice's server, including "@alice: myEmailPassword@alice," "@barbara:location@alice," "@barbara:phone@alice," "@bob:phone@alice," "public: email@alice," "public:location@alice," and "public:△ city@alice".

FIG. 7 illustrates a session 700 that includes use of an example profile and an example addressing scheme. A message 702 indicates that a connection has been made to a server for a user @alice. After an authentication process (not shown), a prompt 704 indicates that a user @bob has authenticated to the server for @alice. In response to submission of a "lookup:profile@alice" command 706, an output 708 of "data:atsign://friends.profile@alice" is displayed.

The "atsign://friends.profile@alice" value in the output 708 is an example of a URL (Uniform Resource Locator) pattern that includes an "atsign://" scheme 710 prepended to a URI of "friends.profile@alice". The scheme 710 can identify an @ protocol for further parsing and resolution of the friends.profile@alice URI. The URI can be provided to a protocol-enabled application, for example, and the application can know how to parse the URI to further resolve friends.profile@alice. Schemes and URIs are discussed in more detail below.

In the session 700, a lookup command 712 is entered to resolve the friends.profile@alice URI. An output 714 is provided that includes contents of a friends.profile profile that the @alice user maintains (e.g. for close acquaintances). A profile can represent a persona, and can be a collection of information, shared with certain designated users. The friends.profile profile for @alice can include various items of information that the @alice user desires to share with a group of people, such as a first name, a phone number, social networking user names or addresses, and one or more email addresses. A user can configure different personas, by defining different profiles and sharing (e.g., enabling access to) the different profiles to different users. The @alice user may define a different profile for family or for work acquaintances, for example. While personas are described, profiles, or collections of information organized under a given address, can be used for other organizational purposes. A collection of information can include multiple items of information, separated by commas, as shown.

The friends.profile profile includes a URL of "atsign:// workphone@alice", which is another example of a URL that includes an atsign scheme. The workphone@alice URI can be further resolved, by looking up the workphone@alice URI on the server of @alice, to "mailto:alice@work.com", for example. In general, use of the atsign scheme can enable reference pointers that point to other information and can result in the chaining together of responses when a given service@atsign pattern is resolved. For instance, an "atsign://email@alice" URI might resolve, for a given request, to "atsign://email.work@alice," which may further (and eventually) resolve to "mailto:alice@work.com". Chaining of responses can include use of URLs with different schemes in the responses so they can be parsed appropriately (e.g. "mailto://", "https://", or "atsign://" links, to name a few examples).

An atsign:// URI can resolve to a URL that points, for example, to image or video content that is stored in a server other than a user's secondary server. The URL or another value stored in user's personal directory can include a key that can be used to decrypt encrypted externally-stored content, for example.

Figure 8:
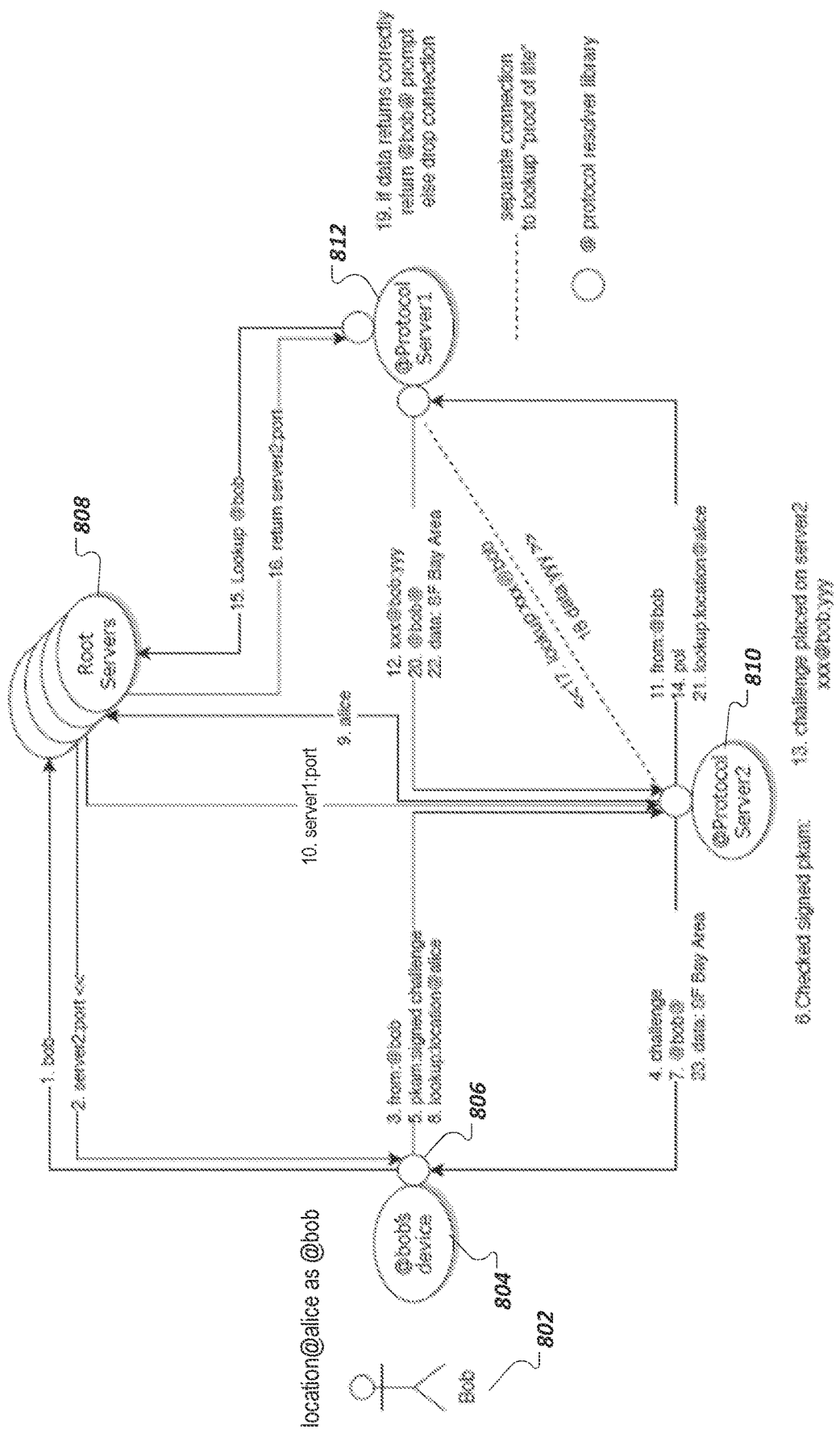
FIG. 8 is a block diagram illustrating an example system for a private lookup transaction.

FIG. 8 is a block diagram illustrating an example system 800 for a private lookup transaction. The system 800 is similar to the system 300, but the system 800 includes a different approach performed by a user's protocol server in contacting another protocol server on behalf of the user (or the user's application). In the example of FIG. 8, a user Bob 802 with a handle of @bob uses a device 804 to initiate an authenticated lookup of a location@alice address.

In a first stage (e.g., denoted with a "1."), a resolver 806 on the device 804 sends a query of "bob" to a root server 808, to obtain server information for a protocol server for the @bob handle. In a second stage, the root server 808 returns server information having a pattern of "server2:port"—e.g., a server and port number of a protocol server 810 that is mapped to the @bob handle.

In a third stage, the resolver 806 sends a "from:@bob" query to the protocol server 810. In a fourth stage, the protocol server 810 responds to the "from:@bob" query with an authentication challenge. In a fifth stage, the resolver 806 (or another program, or Bob using another program) generates a signed challenge response. The signed challenge response is sent by the resolver 806 to the protocol server 810. In a sixth stage, the protocol server 810 tests the signed challenge response, to determine whether the signed challenge response is valid with respect to the challenge sent to the resolver 806 in the fourth stage.

In a seventh stage, in response to determining that the signed challenge response is valid, the protocol server 810 sends an indication (e.g., "@bob@") to the resolver 806 to indicate that the resolver 806 has been authenticated to the protocol server 810 (e.g., as @bob). The "@bob@" indicator can correspond to a changing of a connection prompt for a connection between the resolver 806 and the protocol server 810. A connection prompt of "@" can indicate an unauthenticated connection and a connection prompt of "@bob@" can indicate a connection authenticated as the user @bob.

In an eighth stage, the resolver 806 sends a "lookup: location@alice" query to the protocol server 810, using the authenticated connection. The protocol server 810 can perform a look up of the "location@alice" address on behalf of the resolver 806 (e.g., on behalf of @bob). The protocol server 810 may first need to obtain server information for a protocol server 812 that is mapped to the @alice handle.

In a ninth stage, the protocol server 810 sends a query of "alice" to the root server 808 (or to another root server). In a tenth stage, the root server 808 (or another root server to which the "alice" query was sent) sends server information for the protocol server 812 (e.g., of a pattern of "server1: port") to the protocol server 810, in response to the "alice" query.

In an eleventh stage, the protocol server 810 sends a "from:@bob" message to the protocol server 812. In a twelfth stage, the protocol server 812 responds to the "from: @bob" request by sending a challenge to the protocol server 810. The challenge is of a form of "xxx@bob:yyy", which represents a challenge/request for the protocol server 810 to set an "xxx@bob" address to a value of "yyy".

In a thirteenth stage, in response to the challenge from the protocol server 812, the protocol server 810 updates, on the protocol server 810, an "xxx@bob" address to the value of "yyy". In a fourteenth stage, the protocol server 810 sends a proof-of-life (e.g., "pol") message to the protocol server 812, to indicate to the protocol server 812 that the requested challenge has been performed. The protocol server 810 is claiming that the protocol server 810 has successfully performed the requested challenge, as the @bob user.

In a fifteenth stage, the protocol server 812 begins a process of validating whether the protocol server 810 successfully performed the requested challenge. The protocol server 812 can perform a public lookup on the protocol server 810 to determine whether the requested address was updated with the requested value. The protocol server 812 may first need to obtain server information for the protocol server 810 before performing the lookup. For example, in the fifteenth stage, the protocol server 812 sends a request to look up server information for the @bob user to the root server 808. In a sixteenth stage, the root server 808 returns server information for the protocol server 810 (e.g., of a pattern of "server2:port") to the protocol server 812.

In a seventeenth stage, the protocol server 812 establishes a separate connection with the protocol server 810 (e.g., different from the connection used in the eleventh, twelfth, thirteenth, and fourteenth stages). The protocol server 812 sends a "lookup:xxx@bob" request, over the separate connection, to the protocol server 810. In an eighteenth stage, the protocol server 810, in response to the "lookup: xxx@bob" request, retrieves a "yyy" stored at the "xxx@bob" address and sends a "data:yyy" response to the protocol server 812.

In a nineteenth stage, the protocol server 812 performs a test to determine whether the "data:yyy" value received from the protocol server 810 matches a requested "yyy" value that was included in the challenge sent to the protocol server 810 in the twelfth stage. If the test fails, the protocol server 812 can drop connection(s) to the protocol server 810. If the test succeeds, the protocol server 812 can, in a twentieth stage, return an indication (e.g., "@bob@") to the protocol server 810 over the first connection to indicate to the protocol server 810 that the protocol server 810 has been authenticated as the @bob user on the protocol server 812.

In a twenty-first stage, the protocol server 810 sends a "lookup:location@alice" request to the protocol server 812 as a request that has been authenticated as corresponding to the @bob user. In a twenty-second stage, the protocol server 812 retrieves a location@alice value (e.g., "SF Bay Area") that has been specifically shared with the @bob user. The protocol server 812 sends a "data: SF Bay Area" response to the protocol server 810. In a twenty-third stage, the protocol server 810 forwards the "data:SF Bay Area" response to the resolver 806, for example, for presentation to the user Bob 802 and/or for use by an application on the device 804.

Figure 9A:
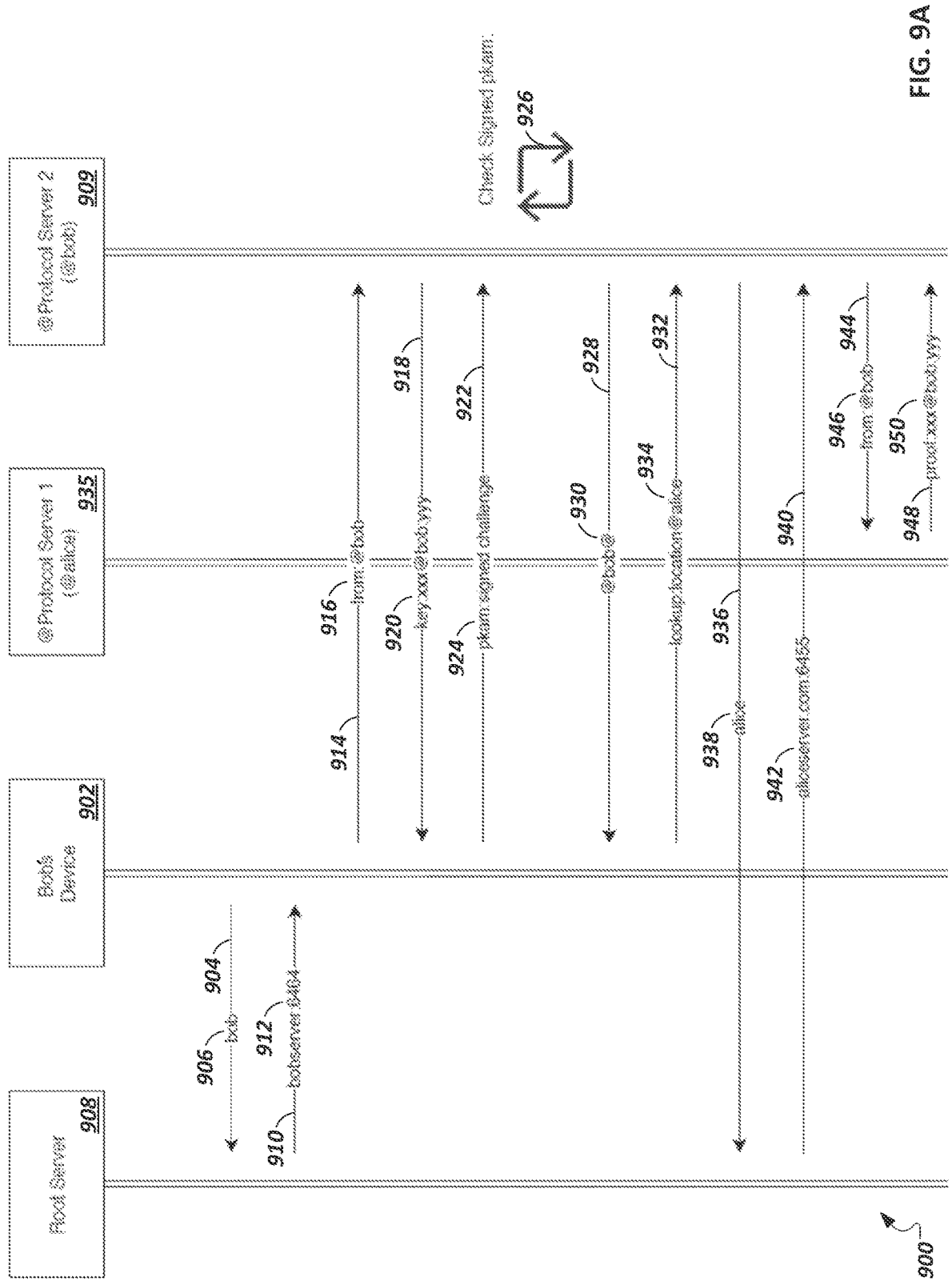
FIGS. 9A-9B are a combined swim lane diagram illustrating an example method for a private lookup transaction.
Figure 9B:
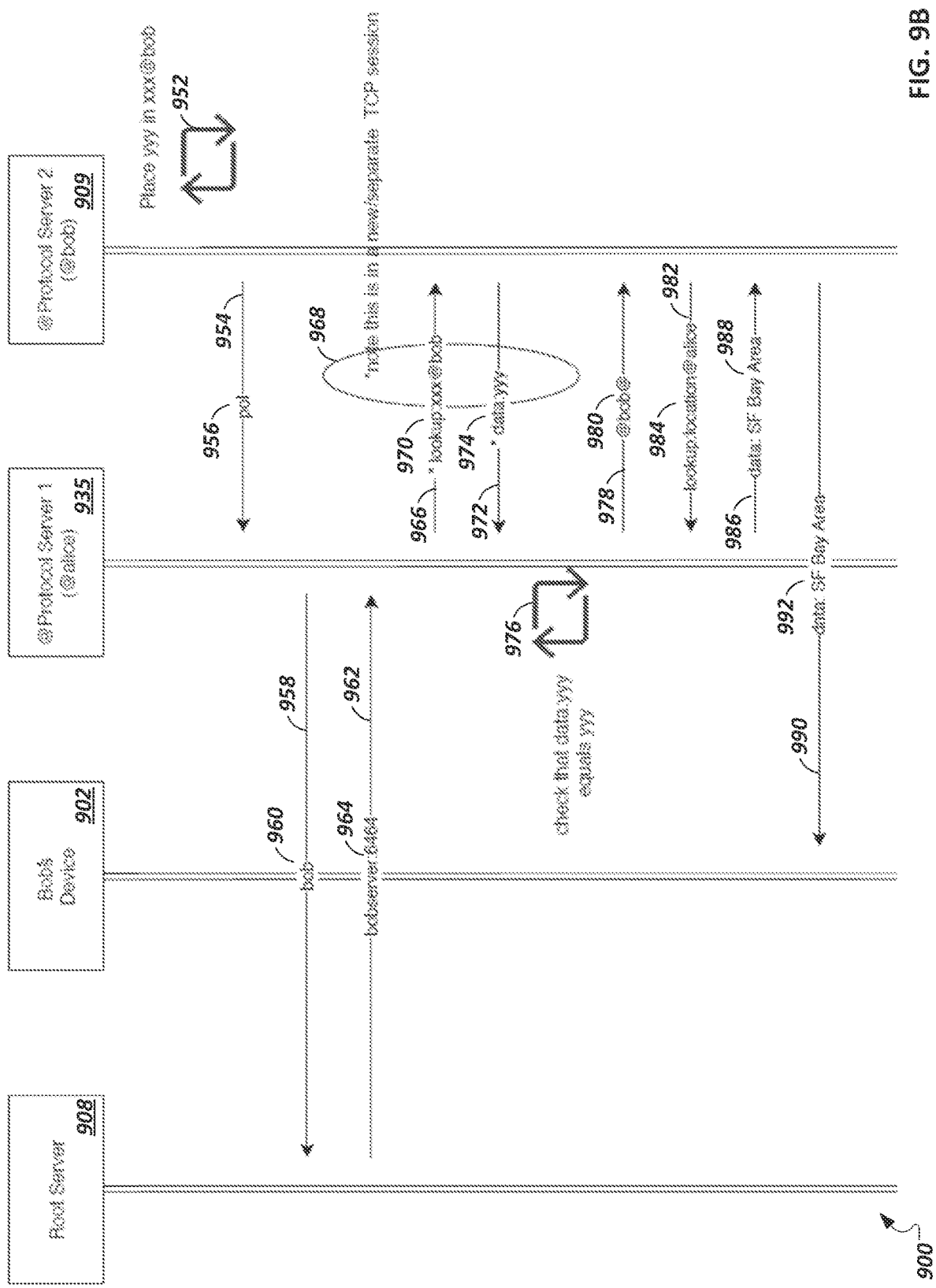

FIGS. 9A and 9B are a combined swim lane diagram illustrating an example method 900 for a private lookup transaction. The method 900 is similar to the method 400, but method 900 uses a different approach of a user's protocol server contacting another protocol server, on behalf of the user (or the user's application). In the example of FIGS. 9A-9B, a user Bob with a handle of @bob can use a device 902 to initiate an authenticated lookup of a location@alice address.

At 904, the device 902 sends a query of "bob" 906 to a root server 908, to obtain server information for a protocol server 909 for the @bob handle.

At 910, the root server 908 returns server and port information 912 of "bob server:6464" to the device 902, in response to the query 906.

At 914, the device 902 sends a "from:@bob" query 916 to the protocol server 909.

At 918, the protocol server 909 responds to the "from: @bob" query 916 with an authentication challenge 920. The authentication challenge 920 is of a form of "key:xxx@bob: yyy".

At 922, the device 902 generates a signed challenge response 924 (e.g., using a PKAM command) and sends the signed challenge response 924 to the protocol server 909.

At 926, the protocol server 909 tests the signed challenge response, to determine whether the signed challenge response 924 is valid with respect to the challenge 918.

At 928, in response to determining that the signed challenge response 924 is valid, the protocol server 909 sends an indication 930 (e.g., "@bob@") to the device 902 to indicate that the device 902 has been authenticated to the protocol server 909 (e.g., as @bob).

At 932, the device 902 sends a "lookup:location@alice" query 934 to the protocol server 909, using the authenticated connection. The protocol server 909 can perform a look up of the "location@alice" address on behalf of the device 902 (e.g., on behalf of @bob). The protocol server 909 may first need to obtain server information for a protocol server 935 that is mapped to the @alice handle.

At 936, the protocol server 909 sends a query 938 of "alice" to the root server 908.

At 940, the root server 908 sends server information 942 (e.g., of "aliceserver.com:6455") for the protocol server 935 to the protocol server 909, in response to the "alice" query 938.

At 944, the protocol server 909 sends a "from:@bob" message 946 to the protocol server 935.

At 948, the protocol server 935 responds to the "from: @bob" message 946 by sending a challenge 950 to the protocol server 909. The challenge 950 has a pattern of "xxx@bob:yyy", which represents a challenge/request for the protocol server 909 to set an "xxx@bob" address to a value of "yyy".

Referring now to FIG. 9B, at 952, in response to the challenge 950 from the protocol server 935, the protocol server 909 updates, on the protocol server 909, an "xxx@bob" address to the value of "yyy".

At 954, the protocol server 909 sends a proof-of-life (e.g., "pol") message 956 to the protocol server 935, to indicate to the protocol server 935 that the requested challenge has been performed. The protocol server 909 is claiming that the protocol server 909 has successfully performed the requested challenge, as the @bob user.

The protocol server 935 can begin a process of validating whether the protocol server 909 performed the requested challenge. The protocol server 935 can perform a public lookup on the protocol server 909 to determine whether the requested address was updated with the requested value. The protocol server 935 may first need to obtain server information for the protocol server 909. For example, at 958, the protocol server 935 sends a request 960 to look up server information for the @bob user to the root server 908.

At 962, the root server 908 returns server and port information 964 (e.g., "bobserver:6464") for the protocol server 909 to the protocol server 935.

At 966, in a new session 968, the protocol server 935 sends a "lookup:xxx@bob" request 970 to the protocol server 909.

At 972, the protocol server 909, in response to the "lookup:xxx@bob" request 970, retrieves a "yyy" value stored at the "xxx@bob" address and sends a "data:yyy" response 974 to the protocol server 935.

At 976, the protocol server 935 performs a test to determine whether the "data:yyy" value received from the protocol server 909 matches a requested "yyy" value that was included in the challenge 950.

At 978, in response to the test succeeding, the protocol server 935 can return an indication 980 (e.g., "@bob@") to the protocol server 909 to indicate to the protocol server 909 that the protocol server 909 has been authenticated as the @bob user on the protocol server 935.

At 982, the protocol server 909 sends a "lookup: location@alice" request 984 to the protocol server 935 as a request that has been authenticated as corresponding to the @bob user.

At 986, the protocol server 935 retrieves a location@alice value (e.g., "SF Bay Area") that has been specifically shared with the @bob user and sends a "data:SF Bay Area" response 988 to the protocol server 909.

At 990, the protocol server 909 send a "data:SF Bay Area" value 992 to the device 902, for example, for presentation to the user Bob and/or for use by an application on the device 902.

Figure 10:
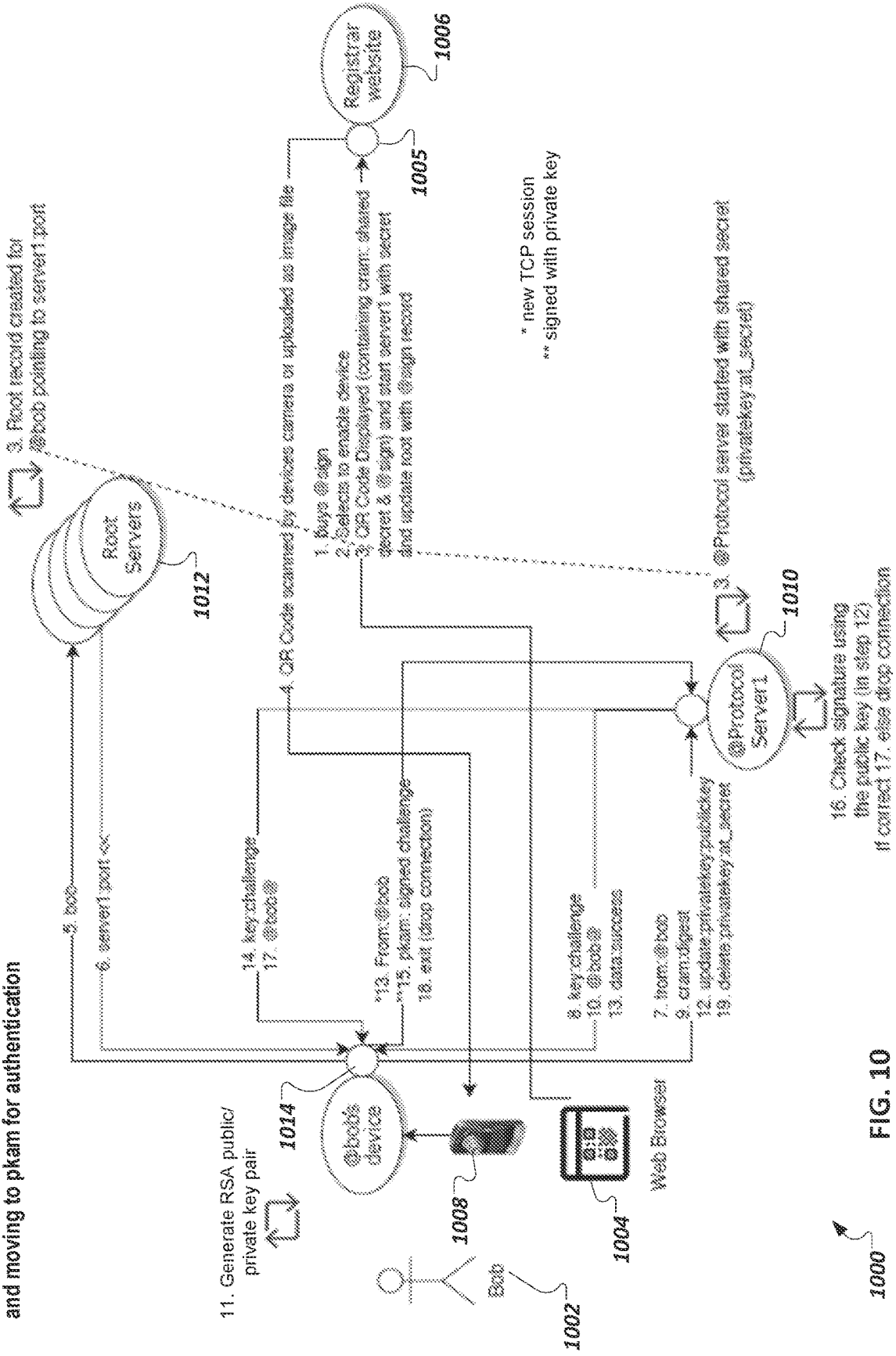
FIG. 10 is a block diagram illustrating an example system for configuring a device for protocol exchanges.

FIG. 10 is a block diagram illustrating an example system 1000 for configuring a device for protocol exchanges. In a first stage of a configuration process, a user Bob 1002 uses, for example, a web browser 1004 to connect to a registrar web server 1005 that provides a registrar website 1006. The user Bob 1002 can use the registrar website 1006 to purchase an @sign handle (e.g., @bob). In a second stage, the user Bob 1002 uses the registrar website 1006 to select enabling of a device 1008 (e.g., @bob's device) for using the protocol.

In a third stage, the registrar web server 1005 provides a code (e.g., a QR code) for display in the web browser 1004. The code can include a CRAM shared secret mapped to the @bob handle. The registrar web server 1005 (or another server or system) can provide the shared secret to a protocol server 1010 that can handle protocol requests for the @bob handle. A protocol service can be initiated on the protocol server 1010 (e.g., at a particular port). The registrar web server 1005 (or another server or system) can provide server/port information for the protocol service running on the protocol server 1010 to a root server 1012, for creation of a root record that maps the @bob handle to the protocol server 1010.

In a fourth stage, the user Bob 1002 uses the device 1008 to scan the presented QR code. The shared secret included in the QR code can be stored on the device 1008, such as in a hardware trusted root.

In a fifth stage, a settings application 1014 running on the device 1008 sends a "bob" query to the root server 1012, to obtain protocol server information for the @bob handle. In a sixth stage, the root server 1012 sends server information (e.g., "server1:port") for the protocol server 1010 to the settings application 1014.

In a seventh stage, the settings application 1014 sends a "from:@bob" message to the protocol server 1010, to attempt to authenticate to the protocol server 1010. In an eighth stage, the protocol server 1010 generates and sends key challenge information to the settings application 1014. In a ninth stage, the settings application 1014 uses the shared secret and the key challenge to generate a digest. The digest can be included in a CRAM message that is sent to the protocol server 1010 in response to the key challenge.

In a tenth stage, the protocol server 1010 determines whether the CRAM message (and digest) are correct, and in response to determining that the key challenge has been successfully met, provides an indicator (e.g., "@bob@") to the settings application 1014 to communicate that the settings application 1014 has been successfully authenticated to the protocol server 1010 as @bob.

In some implementations, the device 1008 uses a CRAM approach for initial setup/bootstrapping, but then moves to a PKAM approach for post setup authentication for protocol exchanges. For instance, in an eleventh stage, the settings application 1014 generates a public/private key pair (e.g., a RSA (Rivest—Shamir—Adleman) public/private key pair). In a twelfth stage, the settings application 1014 sends an update command to store a public key of the private key/public key pair on the protocol server 1010.

In a thirteenth stage, the settings application 1014 sends another "from:@bob" message to the protocol server 1010, in a new, second (separate) session (e.g., second connection) with the protocol server 1010. In a fourteenth stage, the protocol server 1010 generates and sends, over the second connection, key challenge information to the settings application 1014. In this case, rather than responding to the key challenge using a CRAM message, the settings application 1014 can use the private key of the public/private key pair using a PKAM approach. For example, in a fifteenth stage, the settings application 1014 uses a PKAM command to generate a signed challenge that is signed with the private key. The signed challenge is sent by the settings application 1014, over the second connection, to the protocol server 1010. In some implementations, the settings application 1014 adds a client identifier (e.g., a client UUID) to the challenge information and then signs the combination of the challenge and the client identifier. Adding the client identifier can prevent malicious attacks (e.g., spoofing attacks, replay attacks).

In a sixteenth stage, the protocol server 1010 tests the signed challenge by using the public key received from the settings application 1014. The protocol server 1010 can extract the key challenge information from the combination of the challenge and the client identifier, for example. If the test fails, the protocol server 1010 can drop the connection to the settings application 1014. If the test succeeds, the protocol server 1010 can, in a seventeenth stage, return an indication (e.g., "@bob@") to the settings application 1014, over the second connection, to indicate to the settings application 1014 that the settings application 1014 has been authenticated as the @bob user on the protocol server 1010. By receiving the successful authentication indication, the settings application 1014 can determine that the device 1008 has been configured properly for future protocol exchanges with the protocol server 1010. In an eighteenth stage, the settings application 1014 can send an exit command, over the second connection, to the protocol server 1010, as a request to close the second connection.

In a nineteenth stage, the settings application 1014 can, over a first (e.g., still open) connection with the protocol server 1010, send a delete command to delete the shared secret that was previously stored on the protocol server 1010. The protocol server 1010 can delete the shared key from the protocol server 1010, in response to the delete request. As mentioned, future authentication requests can use a PKAM approach and can be verified using the public key for @bob now stored on the protocol server 1010.

Figure 11A:
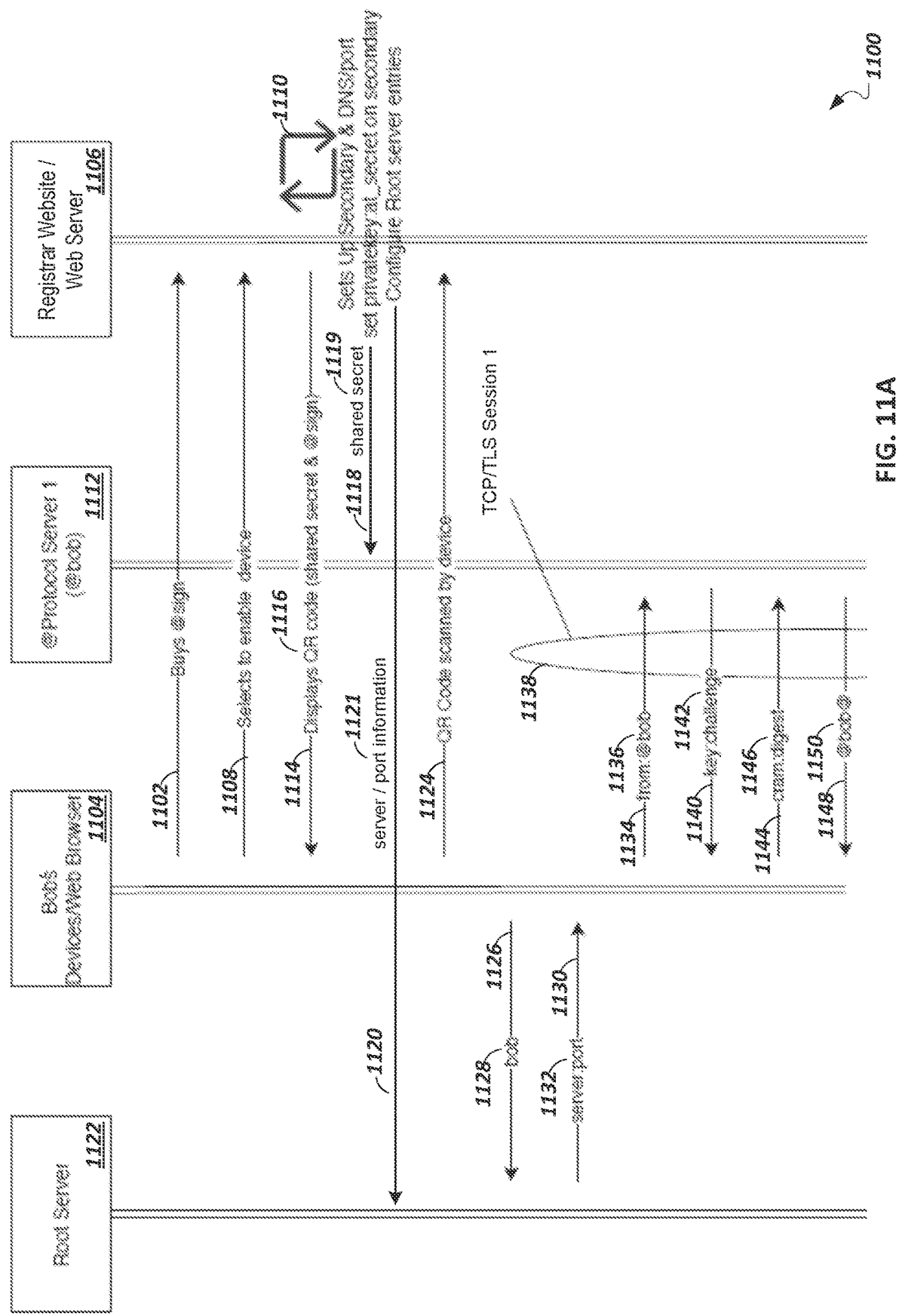
FIGS. 11A-11B are a combined swim lane diagram illustrating an example method for configuring a device for protocol exchanges.
Figure 11B:
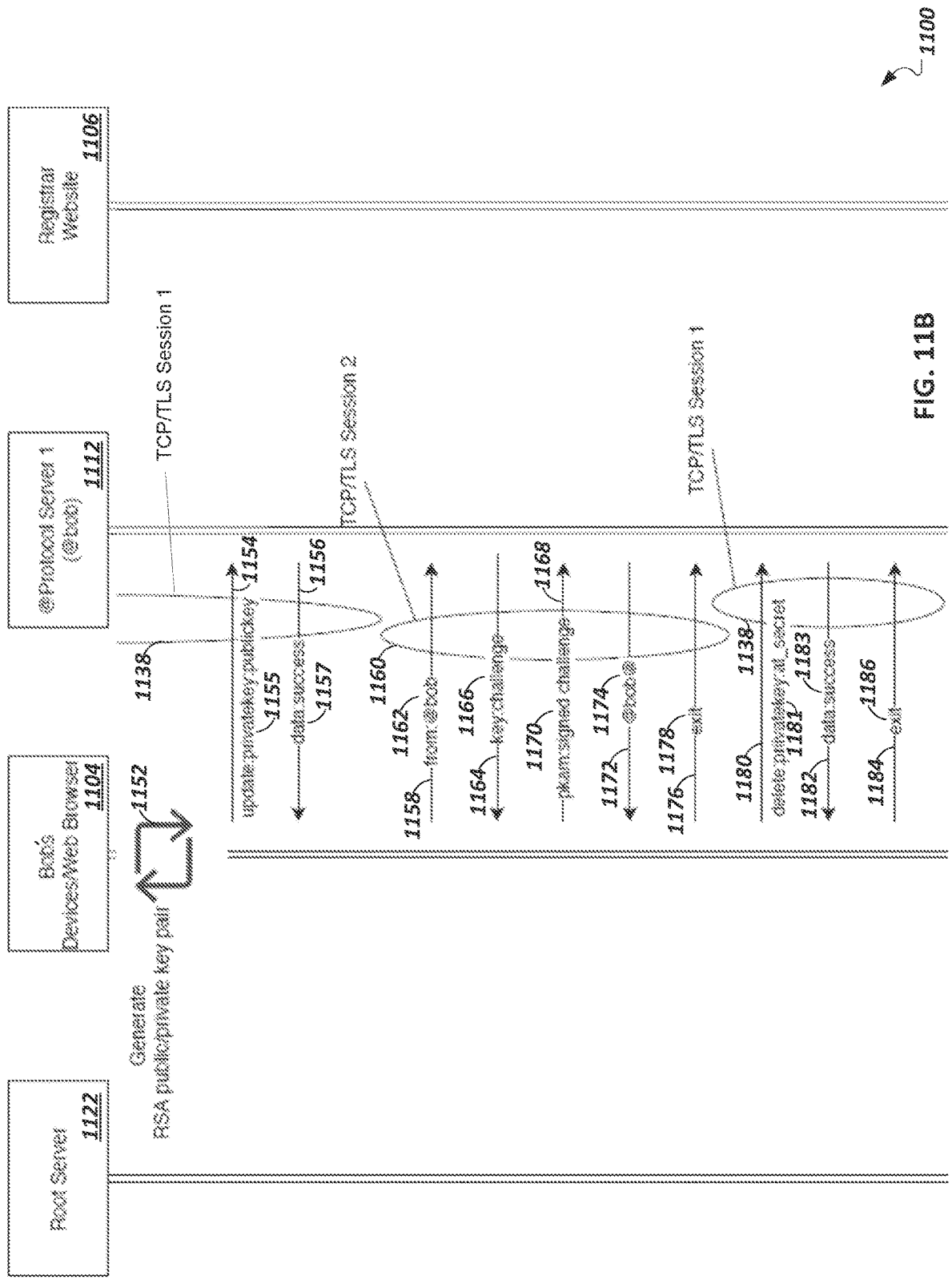

FIGS. 11A and 11B are a combined swim lane diagram illustrating an example method 1100 for configuring a device for protocol exchanges. At 1102, a user Bob uses a device 1104 (e.g., a web browser running on the device 1104) to connect to a registrar web server 1106 that provides a registrar website, to purchase an @sign handle (e.g., @bob).

At 1108, Bob uses the registrar website to select enabling of the device 1104 for using the protocol.

At 1110, the registrar web server 1106 generates a shared secret key that can be shared (e.g., for a bootstrap process) between the device 1104 and a protocol server 1112.

At 1114, the registrar web server 1106 provides a code 1116 (e.g., a QR code) for display on the device 1104. The code 1116 can include a shared secret mapped to the @bob handle.

At 1118, the registrar web server 1106 sends a request to the protocol server 1112 for the protocol server 1112 to store a secret key 1119 on the protocol server 1112. A protocol service can be initiated on the protocol server 1112 (e.g., at a particular port).

At 1120, the registrar web server 1106 provides server/port information 1121 for the protocol server 1112 to a root server 1122, for creation of a root record that maps the @bob handle to the protocol server 1112.

At 1124, Bob uses the device 1104 to scan the presented QR code 1116 that was received from the registrar web server 1106. The secret key included in the QR code 1116 can be stored on the device 1104, such as in a hardware trusted root.

At 1126, the device 1104 sends a "bob" query 1128 to the root server 1122, to obtain protocol server information for the @bob handle.

At 1130, the root server 1122 sends server information 1132 (e.g., in a "server:port" format) for the protocol server 1112 to the device 1104.

At 1134, the device 1104 sends a "from:@bob" message 1136 to the protocol server 1112 in a first TCP/TLS session 1138 to attempt to authenticate to the protocol server 1112.

At 1140, the protocol server 1112 generates and sends key challenge information 1142 to the device 1104.

At 1144, the device 1104 uses the shared secret and the key challenge information 1142 to generate a CRAM message 1146 with an included digest that is sent to the protocol server 1112 in response to the key challenge information 1142.

At 1148, the protocol server 1112 determines whether the CRAM message 1146 (and digest) are correct, and, in response to determining that the key challenge has been successfully met, provides an indicator 1150 (e.g., "@bob@") to the device 1104 to communicate that the device 1104 has been successfully authenticated to the protocol server 1112 as @bob.

In some implementations, the device 1104 uses a CRAM approach for initial setup/bootstrapping but then moves to a PKAM approach for post setup authentication for protocol exchanges. Referring now to FIG. 11B, at 1152, the device 1104 generates a public/private key pair (e.g., a RSA public/private key pair), to be used for future PKAM operations.

At 1154, the device 1104 sends an update command 1155 to the protocol server 1112 to request storage of a public key of the private key/public key pair on the protocol server 1112.

At 1156, the protocol server 1112 sends a success indicator 1157 to the device 1104 to indicate that the update command 1155 was processed successfully.

At 1158, the device 1104 sends, in a second TCP/TLS session 1160, another "from:@bob" message 1162 to the protocol server 1112.

At 1164, the protocol server 1112 generates and sends, in the second session, key challenge information 1166 to the device 1104. In this case, rather than responding to the key challenge using a CRAM message, the device 1104 can use the private key of the public/private key pair using a PKAM approach.

For example, at 1168, the device 1104 uses a PKAM command to generate a signed challenge 1170 that is signed with the private key. The signed challenge 1170 is sent by the device 1104 to the protocol server 1112.

At 1172, the protocol server 1112 tests the signed challenge 1170 by using the public key received from the device 1104. If the test fails, the protocol server 1112 can drop the connection with the device 1104. If the test succeeds, the protocol server 1112 can return an indication 1174 (e.g., "@bob@") to the device 1104 to indicate that the device 1104 has been authenticated as the @bob user on the protocol server 1112. By receiving the successful authentication indication, the device 1104 can determine that the device 1104 has been configured properly for future protocol exchanges with the protocol server 1112.

At 1176, the device 1104 sends an exit command 1178 to the protocol server 1112, as a request to end the second TCP/TLS session 1160.

At 1180, the device 1104 sends a delete command 1181, using a connection for the still open TCP/TLS session 1138, to delete the shared secret that was previously stored on the protocol server 1112. The protocol server 1112 can delete the shared key from the protocol server 1112, in response to the delete command 1181. The shared key can be removed from the protocol server 1112 so that a malicious entity that somehow accesses the protocol server 1112 can't obtain the shared secret from the protocol server 1112. At 1182, the protocol server 1112 sends an indication 1183 of a successful deletion to the device 1104.

At 1184, the device 1104 sends an exit command 1186 to the protocol server 1112, as a request to end the first TCP/TLS session 1138.

Figure 12:
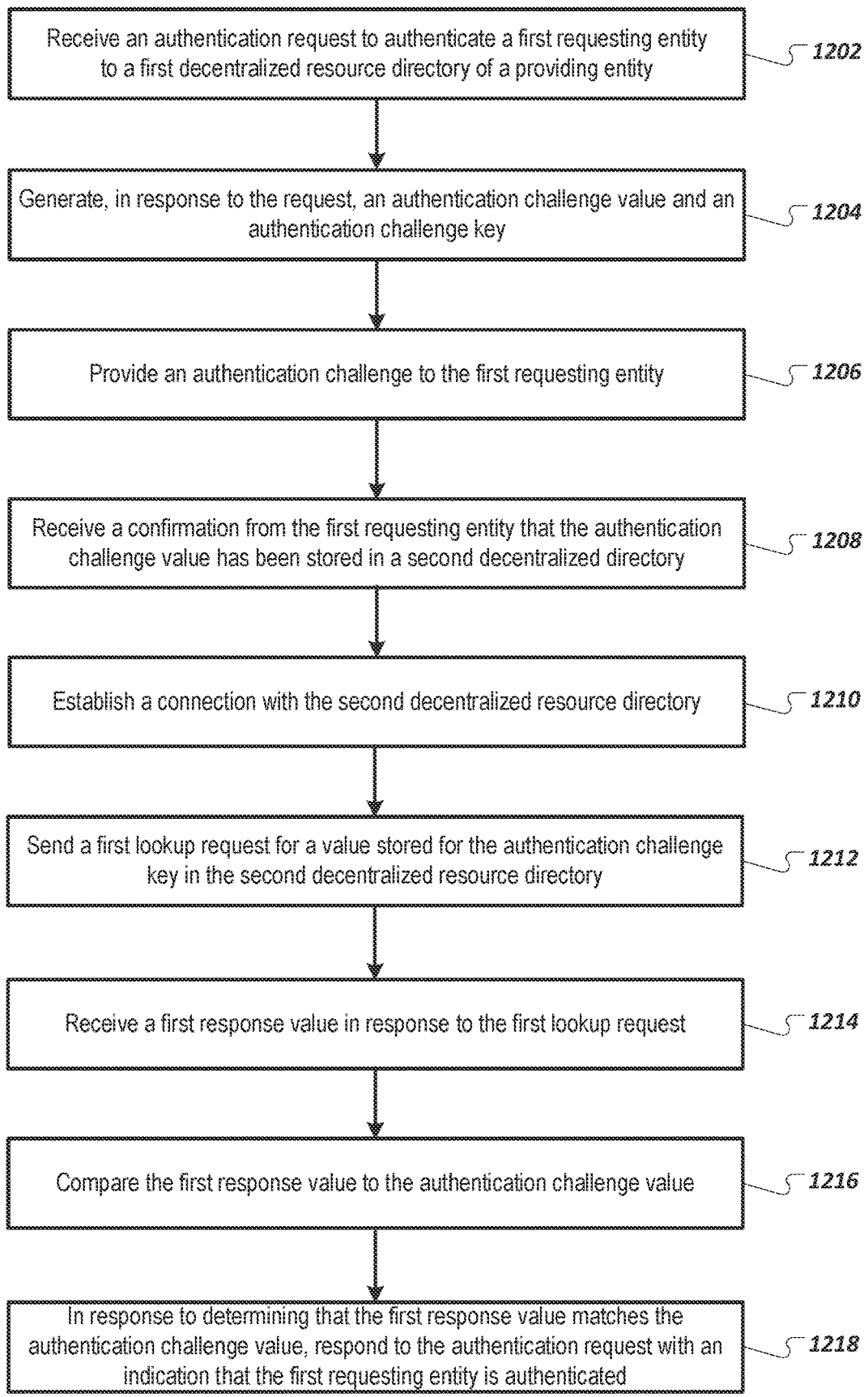
FIG. 12 is a flowchart of an example method for receiving and responding to a protocol request for user information.

FIG. 12 is a flowchart of an example method 1200 for receiving and responding to a protocol request for user information. It will be understood that method 1200 and related methods may be performed, for example, by any suitable system, environment, software, and hardware, or a combination of systems, environments, software, and hardware, as appropriate. In some implementations, the method 1200 is executed by one or more components of the system 100 described above with respect to FIG. 1. For example, the method 1200 can be executed by the settings application 145, the protocol server 109, or the user microservice 146 of FIG. 1. As another example, the method 1200 can be executed by the protocol server 311 of FIG. 3 or the protocol server 413 of FIG. 4.

At 1202, an authentication request is received, via a first connection and from a first requesting entity, to authenticate the first requesting entity to a first decentralized resource directory of a providing entity. The authentication request identifies the first requesting entity.

At 1204, an authentication challenge value and an authentication challenge key are generated, in response to the authentication request.

At 1206, an authentication challenge is provided, via the first connection and in response to the authentication request, to the first requesting entity for the first requesting entity to store the authentication challenge value for the authentication challenge key in a second decentralized resource directory of the first requesting entity.

At 1208, a confirmation is received, via the first connection and from the first requesting entity, that the authentication challenge value has been stored for the authentication challenge key in the second decentralized resource directory of the first requesting entity.

At 1210, a second connection is established with the second decentralized resource directory of the first requesting entity.

At 1212, a first lookup request is sent, via the second connection, for a value stored for the authentication challenge key in the second decentralized resource directory.

At 1214, a first response value is received, via the second connection and from the second decentralized resource directory, in response to the first lookup request.

At 1216, the first response value is compared to the authentication challenge value to determine whether the first response value matches the authentication challenge value.

At 1218, in response to determining that the first response value matches the authentication challenge value, the authentication request is responded to, via the first connection, with an indication that the first requesting entity is authenticated to the first decentralized resource directory. As another example, in response to determining that the first response value does not match the authentication challenge value, the first connection can be dropped.

While not illustrated in FIG. 12, it should be noted that a second lookup request can be received, via the first connection and from the first requesting entity, while the first requesting entity is authenticated to the first decentralized resource directory, for a value for a key stored in the first decentralized resource directory. A determination can be made that the first requesting entity has been previously provided access to a first stored value for the key. The first stored value for the key can be retrieved and provided as a second response value to the first requesting entity, in response to the second lookup request.

Similarly, a third lookup request can be received, via an unauthenticated third connection and from an unauthenticated second requesting entity, for a value for the key stored in the first decentralized resource directory. A determination can be made that the key is publicly accessible. A publicly accessible value for the key can be retrieved and provided as a third response value, to the second requesting entity, in response to the third lookup request. The first stored value for the key provided to the authenticated first requesting entity can be different from the publicly accessible value for the key.

In another example, a fourth lookup request can be received, via a third connection and from a third requesting entity while the third requesting entity is authenticated to the first decentralized resource directory, for a value for the key stored in the first decentralized resource directory. A determination can be made that the third requesting entity has been provided access to a third stored value for the key, where the third stored value is different from the first stored value and the publicly accessible value for the key. The third stored value can be retrieved and provided as a third response value to the third requesting entity, in response to the fourth lookup request.

Figure 13:
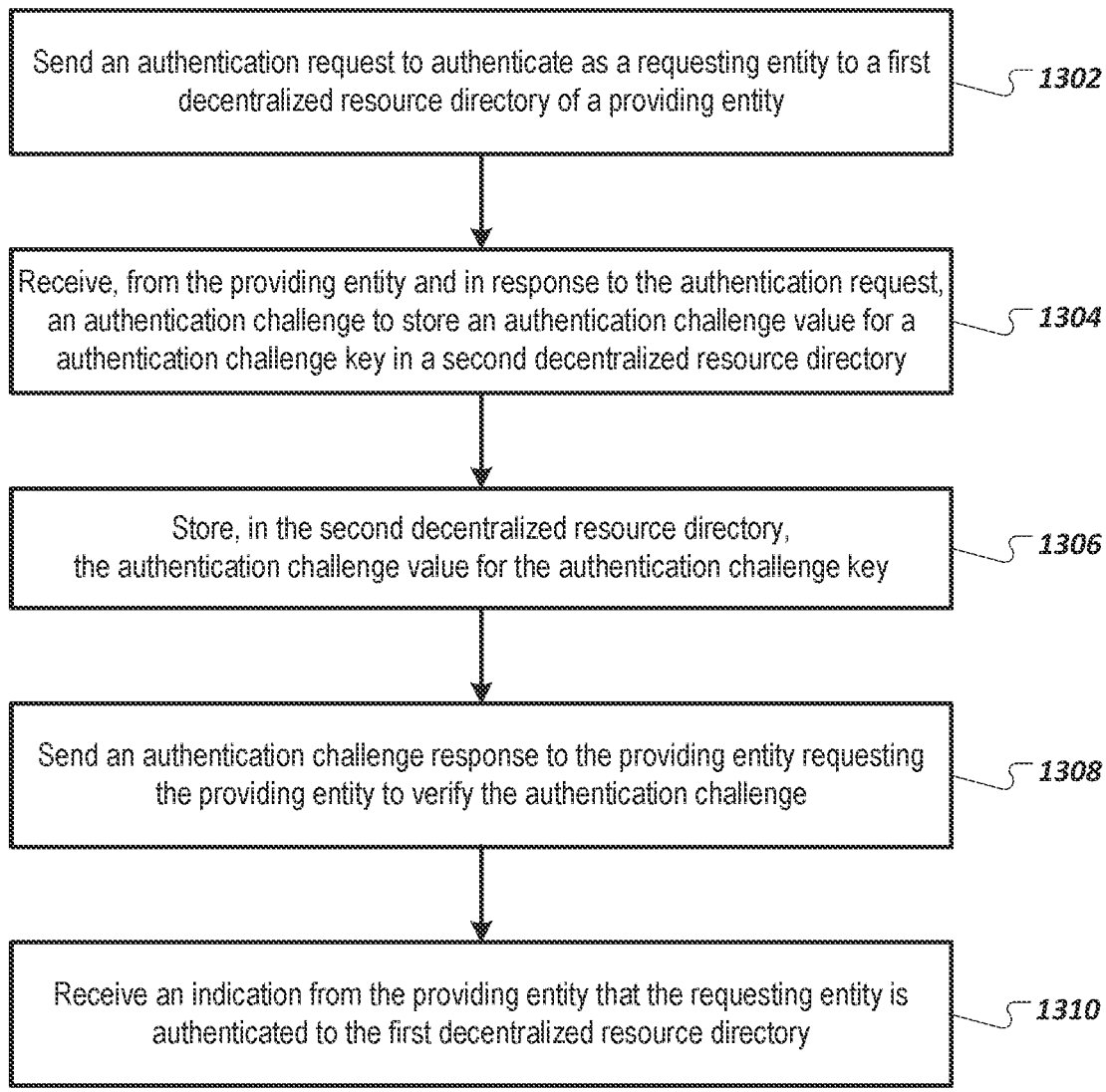
FIG. 13 is a flowchart of an example method for providing a protocol request for user information.

FIG. 13 is a flowchart of an example method 1300 for providing a protocol request for user information. It will be understood that method 1300 and related methods may be performed, for example, by any suitable system, environment, software, and hardware, or a combination of systems, environments, software, and hardware, as appropriate. In some implementations, the method 1300 is executed by one or more components of the system 100 described above with respect to FIG. 1. For example, the method 1300 can be executed by the settings application 145, the protocol server 109, or the user microservice 146 of FIG. 1. As another example, the method 1300 can be executed by the protocol server 314 of FIG. 3 or the protocol server 417 of FIG. 4.

At 1302, an authentication request is sent, via a first connection, to authenticate as a requesting entity to a first decentralized resource directory of a providing entity. The authentication request identifies the requesting entity.

At 1304, an authentication challenge is received, via the first connection, from the providing entity, and in response to the authentication request, to store an authentication challenge value for a authentication challenge key in a second decentralized resource directory of the requesting entity.

At 1306, the authentication challenge value for the authentication challenge key is stored in the second decentralized resource directory.

At 1308, an authentication challenge response is sent to the providing entity requesting the providing entity to verify the authentication challenge.

At 1310, an indication is received from the providing entity that the requesting entity is authenticated to the first decentralized resource directory as the requesting entity.

In some instances, a first lookup can be sent, while authenticated to the first decentralized resource directory and via the first connection, to the first decentralized resource directory for a value for a key stored in the first decentralized resource directory. A first value for the key can be received, in response to the first lookup request.

As another example, a second lookup request can be sent, where the second lookup request is sent as an unauthenticated requesting entity and via a second connection to the first decentralized resource directory for the value for the key stored in the first decentralized resource directory. A second value for the key can be received, in response to the second lookup request, where the second value is different from the first value.

Onboarding and Initialization Options

Various approaches can be used to onboard an application and/or a device for use with the @protocol. For example, QR codes, both onscreen and printed, can be used. As another example, private keys can be assigned per user or per application, and can be stored, for example, on the user's device or on a server. Further details are described in examples below.

A user/device can be onboarded such that no entities other than the @sign user (e.g., entities such as the governing body 102, the protocol provider server 103, application developers 104, root servers 105, backup servers 106, registrars 110, or other entities) can access user data without the owner's permission. The system can be designed such that it is provably true that only the owner has control of their data. For example, encryption keys used by the decentralized resource directories are never stored in a place accessible to anyone other than the owner. For that purpose, the @protocol can use a hardware trusted root, typically found on the owner's personal devices (e.g. mobile phone) only accessible by the user. Such protections can be also combined with device-level security. The @protocol can also support backing up and synchronizing keys across multiple devices of a user.

The initialization/bootstrapping of keys for decentralized resource directories and, more specifically, for secure key/value persistence can include a mechanism for generating an encryption key upon startup so that the encryption key is not stored in a central location. An encryption key can be kept in an owner's directory, but can be itself encrypted with the public key of a requester by the owner of the underlying data in response to the owner determining to accept a data request. In summary, the system can be designed such that any data stored in an owner's directory is impossible to see in an unencrypted form unless explicit permission has been granted by the data owner. Initialization and use of encryption keys is described in more detail below.

FIG. 14 is a flow chart of an example onboarding process 1400. In step 1.1, a namespace API 1402 is used (e.g., by a registrar application) to generate a QR code 1404 and a shared secret for an @sign. In step 1.2, the shared secret is shared with a secondary server 1406. In step 1.3, the secondary server 1406 generates a hive encryption key. The hive encryption key can be used when storing data in a file system 1408 on the secondary server 1406. In step 1.4, the secondary server 1406 stores the shared secret in a keystore 1410.

In step 2, a user uses a first application 1411 on a user device 1412 to scan a presentation of the QR code 1404. In step 3.1, the first application 1411 generates a digest using the shared secret and sends the digest to the secondary server 1406. The digest can be made using a CRAM command, for example. In step 3.2, the secondary server 1406 sends a CRAM response message to the device 1412.

In step 4, the first application 1411 can determine whether the CRAM response indicates authentication success. In step 5, the first application 1411 generates a private/public key pair. In step 5.1, the device 1412 sends the public key to the secondary server 1406. In step 5.2, the secondary server stores the public key in a keystore 1414. The keystore 1414 can be a same or different keystore than the keystore 1410. In step 5.3, the first application 1411 generates a digest using the private key (e.g., using a pkam command) and sends the digest to the secondary server 1406. In step 5.4, the secondary server 1406 sends a PKAM response to the device 1412.

In step 6.1, the first application 1411 generates a QR code 1415 that includes the public/private key pair. In step 6.2, the QR code is sent to a printer 1416 for printing. In step 7.1, the device 1412 sends a request to the secondary server 1406 for deletion of the shared secret. In step 7.2, the secondary server deletes the shared secret from the keystore 1410, in response to the deletion request. As indicated by a note 1418, at the end of the process 1400, the first application 1411 is onboarded on the device 1412. A printout of the QR code 1415 can be used to onboard another application to the device 1412, as described below with respect to FIG. 15.

FIG. 15 is a flow chart of an example onboarding process 1500 for onboarding a second application 1502, e.g., on a device 1504, for example after onboarding a first application (e.g., the first application 1411 described above with respect to FIG. 14). In step 1, the user uses the second application 1502 to scan a printed QR code 1506 (e.g., a code generated during an onboarding process for a first application). In step 2, the second application 1502 generates a digest using a private key of a private/public key pair stored on the device 1504, e.g., using a PKAM command. The digest is sent to a secondary server 1508. In step 3, the secondary server 1508 sends a PKAM response to the device 1504. The second application 1502 can determine whether the PKAM response indicates authentication success. If the PKAM response indicates authentication success, the second application 1502 can be successfully onboarded on the device 1504, as indicated by a note 1510.

A notes area 1512 lists advantages of using a paper QR code for onboarding additional applications to a device. For example, advantages can include 1) that a private key is accessible only by the user who has the paper QR code, 2) onboarding second (and additional) applications is a simple, shorter process (as compared to a first onboarding process), 3) subsequent applications can be onboarded to other devices of the user, and 4) if a device is reset or lost, a paper QR code can still be used to onboard an application (e.g., on a next device). A notes area 1514 lists potential considerations for using a paper QR code approach, as compared to alternative approaches described herein. For instance, the user may lose the paper version. As another example, while onboarding subsequent applications can involve a simple QR code scan, a first onboarded application may be required to perform additional steps, such as scanning a shared secret QR code and performing, for example, a CRAM operation.

FIG. 16 is a flow chart of an example onboarding process 1600 using a separate private key per application. In step 1.1, a namespace API 1602 is used (e.g., by a registrar application) to generate a QR code 1604 and a shared secret for an @sign. In step 1.2, the shared secret is shared with a secondary server 1606. In step 1.3, the secondary server 1606 generates a hive encryption key for use when storing data in a file system 1608 on the secondary server 1606. In step 1.4, the secondary server 1606 stores the shared secret in a keystore 1610.

In step 2, a user uses a first application 1611 on a user device 1612 to scan a presentation of the QR code 1604. In step 3.1, the first application 1611 generates a digest using the shared secret and sends the digest to the secondary server 1606. The digest can be made using a CRAM command, for example. In step 3.2, the secondary server 1606 sends a CRAM response message to the device 1612.

In step 4, the first application 1611 can determine whether the CRAM response indicates authentication success. In step 5, the first application 1611 generates a first private/public key pair that includes a first public key and a first private key for the first application 1611. In step 5.1, the device 1612 sends the first public key to the secondary server 1606. In step 5.2, the secondary server 1606 stores the first public key in a keystore 1614. The keystore 1614 can be a same or different keystore than the keystore 1610. In step 5.3, the first application 1611 generates a first digest using the first private key (e.g., using a pkam command) and sends the first digest to the secondary server 1606. In step 5.4, the secondary server 1606 sends a PKAM response to the device 1612.

In step 6, the device 1612 determines whether the PKAM response indicates authentication success. In step 7.1, the device 1612 sends a request to the secondary server 1606 for deletion of the shared secret. In step 7.2, the secondary server 1606 deletes the shared secret from the keystore 1610, in response to the deletion request. As indicated by a note 1616, at the end of the process 1600, the first application 1611 is onboarded on the device 1612. Subsequent applications can be onboarded using a specific public/private key pair for each application.

FIG. 17 is a flow chart of an example onboarding process 1700 for a second application using a separate private key per application. The process 1700 can be performed for a second application 1702 on a device 1704. In step 1, the second application 1702 generates a second private/public key pair that includes a second public key and a second private key for the second application 1702. In step 1.1, the device 1704 sends the second public key to a secondary server 1706. In step 1.2, the secondary server 1706 stores the second public key in a keystore 1708. The keystore 1708 can be a same or different keystore than a keystore used to store a first public key (e.g., for a first application). In step 1.3, the second application 1702 generates a second digest (e.g., different from a first digest created by a first application) using the second private key (e.g., using a pkam command) and sends the second digest to the secondary server 1706. In step 1.4, the secondary server 1706 sends a PKAM response to the device 1704.

In step 2, the device 1702 determines whether the PKAM response indicates authentication success. As indicated by a note 1710, at the end of the process 1700, the second application 1702 is onboarded on the device 1704. Subsequent applications, after the first and second applications, can be onboarded using a specific public/private key pair for each application. Advantages of using a private key per application, as compared to having a second application scan a QR code printed by a first application, can include avoiding a need to maintain or use a printed QR code. Additionally, subsequent applications for a user after a first application can be onboarded onto any device of the user. Considerations for using the private key per application approach can include considering an overhead of maintaining a private key per application. Also, if a user loses a device, the user may no longer have access to the private key stored on the device. The first onboarded application, with the private key per application approach, can have a capability to scan a shared secret and perform a CRAM method.

FIG. 18 is a flow chart of an example onboarding process 1800 using a server-based private key. In step 1.1, a namespace API 1802 is used (e.g., by a registrar application) to generate a QR code 1804 and a shared secret for an @sign. In step 1.2, the shared secret is shared with a secondary server 1806. In step 1.3, the secondary server 1806 generates a hive encryption key for use when storing data in a file system 1808 on the secondary server 1806. In step 1.4, the secondary server 1806 stores the shared secret in a keystore 1810.

In step 2, a user uses a first application 1811 on a user device 1812 to scan a presentation of the QR code 1804. In step 3.1, the first application 1811 generates a digest using the shared secret and sends the digest to the secondary server 1806. The digest can be made using a CRAM command, for example. In step 3.2, the secondary server 1806 sends a CRAM response message to the device 1812. The first application 1811 can determine whether the CRAM response indicates authentication success. In step 3.3, the secondary server 1806 generates a first private/public key pair that includes a first public key and a first private key for the first application, and saves the first public key and the first private key in a keystore 1814. The keystore 1814 can be a same or different keystore than the keystore 1810.

In step 4, the device 1812 sends a pkam request to retrieve the first private key to the secondary server 1806. In step 4.1, the secondary server 1806 verifies the pkam request by determining whether the sender of the pkam request and an owner of the stored first private key correspond to the same @sign. In step 4.3, in response to a successful verification, the secondary server 1806 sends the first private key to the device 1812.

In step 5.1, the first application 1811 generates a first digest, e.g., using a pkam command, using the received first private key, and sends the first digest to the secondary server 1806. In step 5.2, the secondary server 1806 sends a pkam response to the device 1812. The first application can determine whether the pkam response indicates an authentication success. In step 6.1, the device 1812 sends a request to the secondary server 1806 for the secondary server 1806 to delete the shared secret. In step 6.2, the secondary server 1806 deletes the shared secret from the keystore 1810, in response to the deletion request. As indicated by a note 1816, at the end of the process 1800, the first application 1811 is onboarded on the device 1812.

FIG. 19 is a flow chart of an example onboarding process 1900 for a second application using a server-based private key. In step 1, a second application 1902 on a device 1904 (e.g., different from a first application already onboarded onto the device 1904) retrieves a second private key from a secondary server 1906 (e.g., the second private key being different from a first private key previously retrieved by the first application). For example, in step 1.1, the device 1904 sends a pkam request to retrieve the second private key to the secondary server 1906. In step 1.2, the secondary server 1906 verifies the pkam request by determining whether the sender of the pkam request and an owner of the stored second private key correspond to the same @sign. In step 1.3, in response to a successful verification, the secondary server 1906 sends the second private key to the device 1904.

In step 2.1, the first application 1911 generates a second digest, e.g., using a pkam command, using the received second private key, and sends the second digest to the secondary server 1906. The second digest is different from a first digest generated by the first application. In step 2.2, the secondary server 1906 sends a pkam response to the device 1912. The second application 1902 can determine whether the pkam response indicates an authentication success. As indicated by a note 1910, at the end of the process 1900, the second application 1902 is onboarded on the device 1912. Advantages of the server-based private key approach can be that a printed QR code does not need to be created or maintained and respective applications don't need to generate a private key.

FIG. 20A illustrates an example system 2000 for onboarding a device/application. In step 1.1, a shared key is generated for an @sign and is embedded into a QR code 2002. In step 1.2, a pkam key pair 2004 and an encryption key pair 2006 are generated. In step 2, the pkam key pair 2004 and the encryption key pair 2006 are encrypted using the shared key as encrypted key pairs, and stored in a key pairs storage 2008. In step 3.1, the encrypted key pairs are streamed to a user device 2010. In step 3.2, the QR code 2002 is scanned by the user device 2010, thereby enabling the user device 2010 to obtain the shared key. In step 4, the user device 2010 decrypts the key pairs received in step 3.1 using the shared key obtained in step 3.2. The decrypted key pairs can be stored on the user device 2010.

FIG. 20B illustrates an example system 2020 for onboarding a device/application using a registrar. A user may wish to onboard a settings application 2022 on a device 2024 of the user. The settings application 2022 can communicate with a registrar 2025 using an API 2026 provided by the registrar 2025. For example, in a first step, the settings application 2022 sends a request to the registrar 2025 (e.g., using the API 2026) for a list of available @signs. In a second step, the registrar 2025 sends a list of available @signs to the device 2024 for presentation in the settings application 2022. As another example, the settings application 2022 can query the registrar 2025 regarding availability of a specific @sign, rather than request a list of available @signs. The user can select an available @sign, based on information or a response received from the registrar 2025. The user can select an option in the settings application 2022 to onboard the settings application 2022 using an email or SMS (Short Message Service) verification, rather than other approaches such as QR code scanning.

In a third step, the settings application 2022 sends a selected @sign and a user phone number or user email address to the registrar 2025. As a first option for a fourth step, if the registrar 2025 receives a user phone number from the settings application 2022, the registrar 2025 can generate an OTP (One Time Password) and provide the OTP to a SMS gateway 2028. The SMS gateway 2028 can be used to send a SMS message with the OTP to the device 2024. The SMS message with the OTP can be displayed on the device 2024 using a SMS application 2030. As a second option for the fourth step, if the registrar 2025 receives a user email from the settings application 2022, the registrar 2025 can generate an OTP and provide the OTP to an email gateway 2032. The email gateway 2032 can be used to send an email message with the OTP to the device 2024. The email message with the OTP can be displayed on the device 2024 using an email application 2034.

In a fifth step, the user views the OTP using either the SMS application 2030 or the email application 2034 and then enters the OTP into the settings application 2022. In a sixth step, the settings application 2022 sends the OTP to the registrar 2025. In a seventh step, the registrar 2025 sends a CRAM shared secret, for authentication to the secondary server of the user, to the settings application 2022. The shared secret can be used as described above (e.g., to create and send a digest to the secondary server of the user).

FIG. 20C is a flow chart of an example onboarding process 2050 for onboarding a device/application using a registrar. A user may wish to onboard a settings application 2052 on a device of the user. The settings application 2052 can communicate with a registrar 2055 using an API 2056 provided by the registrar 2055. For example, at 2058, the settings application 2052 sends a request to the registrar 2055 (e.g., using the API 2026) for a list of available @signs. At 2060, the registrar 2055 sends a list of available @signs to the device 2024 for presentation in the settings application 2052. As another example, the settings application 2052 can query the registrar 2055 regarding availability of a specific @sign, rather than request a list of available @signs. The user can select an available @sign, based on information or a response received from the registrar 2055. The user can select an option in the settings application 2052 to onboard the settings application 2052 using an email or SMS (Short Message Service) verification, rather than other approaches such as QR code scanning.

At 2062, the settings application 2052 sends a selected @sign and a user phone number or user email address to the registrar 2055. If the registrar 2055 receives a user phone number from the settings application 2052, the registrar 2055 can, at 2064, generate an OTP and provide the OTP to a SMS gateway 2066. The SMS gateway 2066 can be used to send a SMS message with the OTP to the device of the user. The SMS message with the OTP can be displayed on the device using a SMS application 2068. As another example, if the registrar 2055 receives a user email from the settings application 2052, the registrar 2055 can, at 2070, generate an OTP and provide the OTP to an email gateway 2072. The email gateway 2072 can be used to send an email message with the OTP to the device of the user. The email message with the OTP can be displayed on the device using an email application 2074.

At 2076, if the device receives the OTP from the email gateway 2072, the user views the OTP using the email application 2074 and then enters the OTP into the settings application 2052. As another example, at 2078, if the device receives the OTP using the SMS gateway 2066, the user views the OTP using the SMS application 2068 and then enters the OTP into the settings application 2052. At 2080, the settings application 2052 sends the OTP to the registrar 2055. At 2082, the registrar 2055 sends a CRAM shared secret, for authentication to the secondary server of the user, to the settings application 2052. The shared secret can be used as described above (e.g., to create and send a digest to the secondary server of the user).

FIG. 21 is a flowchart of an example method 2100 for lifecycle management of a secondary server.

At 2102, the secondary server is started. The secondary server can be associated with a particular IP address (which may be mapped to a host name) and port, for example.

At 2104, a determination is made as to whether the host and port are valid. If either or both of the host and port are not valid, the method 2100 can end (e.g., and an administrator can be notified so as to troubleshoot host and/or port issues).

At 2106, if the host and port are valid, hive storage at the secondary server is initialized. For example, secret management tasks can be initiated, a storage area can be initialized, and various adapters for different types of data can be registered. As another example, one or more expiration tasks can be scheduled, such as for managing data that has a TTL setting. For instance, an expiration task can invalidate or delete expired data when TTL time points are reached.

At 2108, a determination is made as to whether all initialization steps have completed successfully. If not all initialization steps have been completed successfully, the method 2100 can end (e.g., and an administrator can be notified so as to troubleshoot initialization issues).

At 2110, if all initialization steps have been completed successfully, a server process can be started. For instance, a secure connection can be created and a listening task can be initiated.

At 2112, a post-start process can be initiated, which can include, for example, storing of a secret for the user associated with the secondary server.

FIG. 22 is a flowchart of an example method 2200 for data expiration management.

At 2202, a query is performed for expired keys in a hive storage area of a secondary server. For example, keys that have a TTL timestamp less than a current timestamp can be identified.

At 2204, a determination is made as to whether any expired keys were returned from the query. If no expired keys were returned from the query, the method 2200 can end.

At 2206, if at least one expired key was returned from the query, then the returned expired key(s) can be deleted from the hive storage on the secondary server.

At 2208, one or more notifications can be sent to notify of deletion of the expired key(s). For example, one or more parties may have been subscribed to receive notices. As another example, a notification can be sent to a settings application (e.g., and/or one or more client applications) on a user device of a user associated with the secondary server.

FIG. 23 illustrates an example system 2300 for saving a profile using encryption. In a first stage, a user 2302 installs a settings application 2304 on a user device 2306. Installing the settings application 2304 can result in a local hive storage (e.g., local storage) 2308 and a SDK (Software Development Kit) being installed on the user device 2306.

In a second stage, the user 2302 uses the settings application 2304 to generate an encryption key and store the encryption key in an entry 2310 in the local hive storage 2308.

In a third stage, the user creates keys, for example, using one or more protocol applications. The keys can be saved to secondary storage 2311 on a secondary server 2312 (and, optionally, also to the local hive storage 2308). For example, an entry 2314 in the secondary storage 2311 includes a key, a key value, an encryption key, and, optionally, a TTL value. The secondary server 2312 is associated with (e.g., known to) a root server 2316.

FIG. 24 illustrates a system for @sign activation. In a first stage (e.g., a circled "1"), in response to an @sign user providing an input on an @registrar web application 2402 (or other user interface) as a request to activate their @sign, the @registrar web application 2402 can start an @sign activation process for the @sign. The activation process can include an HTTPS call to a @namespace API 2404 that can be, for example, a POST command such as "POST:@sign, APIkey, options". Options may relate to location, provider, or other optional features.

In a second stage, the @namespace API 2404 receives and validates the activation request received from the @registrar web application 2402. For example, the @namespace API 2404 can validate formatting of the @sign and determine whether the @sign is reserved, banned, or already activated.

As shown in FIG. 25, banned @signs 2502 can include a list of offensive words that can be banned from use. Banned @signs 2502 are not available for purchase or use with the @protocol. Reserved @signs 2504 can be for trademarks that, while valid for use, may create infringement and can therefore be withheld except for use by an owner of the trademark. Registered @signs 2506 have been purchased (or otherwise reserved) but not activated, deployed or added to an @root server. Activated @signs 2508 have been purchased, activated, deployed and added to @root server(s).

Returning to FIG. 24, if the @sign is improperly formatted or is reserved, banned, or already activated, the @namespace API 2404 can return an error to the @registrar web application 2402. The @namespace API 2404 can generate a CRAM shared secret, generate a QR code that includes the shared secret and the @sign, and generate a URL that can be used for retrieving a QR code image.

In a third stage, the @namespace API 2404 calls an appropriate @infrastructure API to create a new @server. For example, the following POST command can be sent from the @namespace API to an infrastructure API component 2406: "HTTPS POST:@sign, APIkey, CRAM shared secret".

In a fourth stage, the infrastructure API component 2406 receives and validates the activation request received from the @namespace API 2404. In some implementations, the infrastructure API component 2406 can perform similar formatting or banned/reserved/active tests on the requested @sign as done by the @namespace API 2404. Other validation operations can be performed.

In a fifth stage, the infrastructure API component 2406 returns a validation response to the @namespace API 2404 that indicates validation success or failure. In response to validation success, the infrastructure API component 2406 can begin asynchronous deployment of an @server for the requested @sign (e.g., as described in more detail below for stages nine, ten, and eleven).

In a sixth stage, the @namespace API 2404 returns a response to the @registrar web application 2402 regarding activation of the @sign. If validation steps have thus far been successful, the response sent to the @registrar web application 2402 can indicate validation success and can include QR image data that includes the shared secret and the requested @sign. If validation steps have not all been successful, the response sent to the @registrar web application 2402 can include an indication of validation failure.

In a seventh stage, the @registrar web application 2402 can process the response received from the @namespace API 2404, which can include displaying an error message in the case of an error response or displaying the QR code image (e.g., using a received image URL). The user can be prompted to scan the QR code using a settings application 2408 (e.g., an @me application).

In an eighth stage, the settings application 2408 scans the QR code displayed in the @registrar web application 2402 and then begins a polling process of sending polling messages to an @root server 2410 to determine (based on a response from the @root server 2410) when an @server 2412 has been successfully registered.

As mentioned, stages nine, ten, and eleven may have been occurring, or may occur, asynchronously after successful validation by the infrastructure API component 2406. For example, in a ninth stage, the infrastructure API component 2406 can create a new container for the @sign in the @sign server 2412 using the CRAM secret. In a tenth stage, the infrastructure API component 2406 can monitor the new @server 2412 to determine when the new @server 2412 is online. In an eleventh stage, the infrastructure API component 2406 can send an update message to the @root server 2410 indicating the online status of the @server 2412.

In a twelfth stage, the setting application 2408 can locate (e.g., by the polling process) an @root entry for the @server 2412 at the root server 2410. The settings application 2408 can also poll the @server 2412 to determine when the @server 2412 is ready for a CRAM to PKAM initialization.

In a thirteenth stage, after the @server 2412 is ready for the CRAM to PKAM initialization, the settings application 2408 initializes a PKAM credentials process (e.g., creation of a private key/public key pair with the public key only on the @server 2412). The CRAM shared key can be deleted by the @server 2412 after the PKAM credentials are configured.

In a fifteenth stage, the @registrar web application 2402 can determine/track status of the activation by looking up and locating a root entry for the @server 2412 at the @root server 2410.

In a sixteenth stage, the @registrar web application 2402 can perform a scan of the @server 2412 to determine that the @server 2412 is active. Upon successful detection of an active @server 2412, the @registrar web application 2402 can present an activation success message for the user.

In some implementations, the @namespace API 2404 can periodically poll the @server 2412, for example, to check to see if the @server 2412 is no longer online or if the CRAM shared secret is no longer stored at the @server 2412. If the @server 2412 is no longer online or if the CRAM shared secret is no longer stored at the @server 2412, QR code data can be deleted. In some implementations, the infrastructure API component 2406 can periodically check to see if the @server 2412 is still active or if an activation has failed to complete. In response to a failed activation or an inactive @server 2412, the infrastructure API component 2406 can delete the @sign:location from the @root server 2410, perform removal activities for the @server 2412, and return a port that was used for the @server 2412 to an available pool of port numbers.

Streaming and File Transfers

Some previously-developed applications can suffer from limitations of only working between devices of the same platform and/or only over a LAN connection. An @file_sharing application can be provided with/by the @protocol and can support file transfer without requiring e-mail or a mass storage device. The @protocol file sharing feature can be a secure, surveillance-free application that can work between all devices and locations by virtue of the following features/aspects of the @protocol: 1) an ability to locate a user's device using the @protocol namespace directory; 2) a permissioning system's ability to control access between the entities; 3) an ability to encrypt file contents; and 4) a use of P2P communications between devices that prevents surveillance.

FIG. 26 illustrates a system 2600 that illustrates stages of protocol-enabled file sharing. In a first stage 2602, a sender initiates a file transfer and a recipient acknowledges the transfer. In some implementations, some acknowledgements are automatically sent by a recipient. Transfer initiation can have a timeout, whereby a transfer is cancelled if a recipient does not respond. In some implementations, parallel transfers from multiple users to a same recipient are supported.

In a second stage 2604, a communication channel is established between the sender and the recipient. In some cases, a preconfigured connection can exist between a particular sender and recipient, and the preconfigured connection can be identified without needing to be re-established.

In a third stage 2606, the file is transferred from the sender to the recipient.

In a fourth stage, housecleaning tasks are performed, such as marking a file as transferred. The file can be marked as transferred to prevent or warn about a duplicate transfer. In some cases, a file-complete notification and/or acknowledgement are communicated over the channel.

In general, different approaches can be used for file transfers or general streaming content from one protocol user to another. For example, server hop(s), tokens, notifications, proof of life, and/or intermediate servers can be used. Streaming data, e.g., from an @bob user to an @alice user can pose various challenges. For example, each user may be at different locations (e.g., perhaps in different countries), at a same location, on a same network (e.g., same WiFi network), or on different networks. Streaming can involve using a device (either a user device or an intermediary device) that has a dedicated IP address. As another example, streaming can involve using user's secondary servers. However, some secondary servers may be configured as micro servers (e.g., not specifically designed for streaming a large amount of data), so avoiding bottlenecks when transferring data at scale, using secondary servers, can be a point of consideration. Further details of streaming approaches are discussed below.

FIG. 27 is a flowchart of example streaming method 2700. In preconfiguration steps 2702 and 2704 monitoring processes are established between an Alice client (e.g., for an @alice user) 2706 and Alice's secondary server 2708 and between Bob's client 2710 (e.g., for an @bob user) and Bob's secondary server 2712, respectively.

In step 1, Alice's client 2706 sends a stream initialization message to Alice's server 2708 that includes a stream identifier. In step 2, Alice's server 2708 sends a notification message about the stream to Bob's secondary server 2712, that includes the stream identifier and a file length value. In step 3, Bob's server 2712 sends a notification message, which can be sent using a preconfigured monitoring process, to Bob's client 2710. In step 4, Bob's client 2710 sends an acknowledgement message to Alice's server 2708.

In step 5, Alice's client 2706 receives the acknowledgement (which can be received using a preconfigured monitoring process). As noted in step 5.1, Alice's client 2706 can receive a timeout event if the acknowledgement is in fact not received. In step 6, after receiving the acknowledgement, Alice's client 2706 streams data for the file to Alice's secondary server 2708. In step 7, Alice's secondary server 2708 relays received streaming data to Bob's client 2710. In step 8, Bob's client 2710 saves the data (e.g., to a file system) when an EOF (end of file) is reached in the received streaming data. In step 9, Bob's client 2710 sends a stream complete message (that includes the stream identifier) to Alice's secondary server 2708. In step 10, Alice's secondary server 2708 sends marks the stream as completed and sends a stream complete message to Alice's client 2706. Alice's client 2706 can also mark the stream as completed.

FIG. 28 is a flowchart of example streaming method 2800 using a server hop. In preconfiguration steps 2802 and 2804 monitoring processes are established between an Alice client (e.g., for an @alice user) 2806 and Alice's secondary server 2808 and between Bob's client 2810 (e.g., for an @bob user) and Bob's secondary server 2812, respectively.

In step 1, Alice's client 2806 sends a stream initialization message to Alice's server 2808 that includes a stream identifier.

In step 2, Alice's server 2808 sends a notification message about the stream to Bob's secondary server 2812, that includes the stream identifier and a file length value.

In step 3, Bob's server 2812 sends a notification message, which can be sent using a preconfigured monitoring process, to Bob's client 2810.

In step 4, Bob's client 2810 sends an acknowledgement message to Bob's secondary server 2812.

In step 5, Bob's secondary server 2812 sends an acknowledgement message to Alice's secondary server 2808.

In step 6, Alice's secondary server 2808 sends an acknowledgement message to Alice's client 2806. As noted in step 6.1, Alice's client 2806 can receive a timeout for the stream if an acknowledgement is in fact not received.

In step 7, Alice's client 2806 streams data for the file to Alice's secondary server 2808.

In step 8, Alice's secondary server 2808 relays stream data to Bob's secondary server 2812.

In step 9, Bob's secondary server 2812 relays stream data to Bob's client 2810.

In step 10, Bob's client 2810 sends a stream-done message to Bob's secondary server 2812.

In step 11, Bob's secondary server 2812 sends a stream-done message to Alice's secondary server 2808.

In step 12, Alice's secondary server 2808 sends a stream-done message to Alice's client 2806. Alice's client 2806 can mark the stream transfer as completed.

FIG. 29 is a flowchart of example streaming method 2900 using a token. In preconfiguration steps 2902 and 2904 monitoring processes are established between an Alice client (e.g., for an @alice user) 2906 and Alice's secondary server 2908 and between Bob's client 2910 (e.g., for an @bob user) and Bob's secondary server 2912, respectively.

In step 1, Alice's client 2906 sends an update request to Alice's secondary server 2908 to update a stream token for an intended stream.

In step 2, Alice's secondary server 2908 sends a notification of the intended stream to Bob's secondary server 2912.

In step 3, Bob's server 2912 sends a notification message, which can be sent using a preconfigured monitoring process, to Bob's client 2910.

In step 4, Bob's client 2910 sends a lookup request to Bob's secondary server, for looking up the stream token for the intended stream. Bob's secondary server 2912 can look up the stream token, from Alice's secondary server 2908.

In step 5, Bob's client 2910 sends a stream initialization message to Alice's secondary server 2908.

In step 6, Alice's secondary server 2908 sends a notification to Alice's client 2906.

In step 7, Alice's client streams data for the stream to Alice's secondary server 2908.

In step 8, Alice's secondary server 2908 relays streamed data to Bob's client 2910.

In step 9, Bob's client 2910 saves the streamed data, e.g., to a file system on Bob's client 2910, when the stream transfer is complete.

FIG. 30 is a flowchart of example streaming method 3000. In preconfiguration steps 3002 and 3004 monitoring processes are established between an Alice client (e.g., for an @alice user) 3006 and Alice's secondary server 3008 and between Bob's client 3010 (e.g., for an @bob user) and Bob's secondary server 3012, respectively.

At step 1, Alice's client 3006 sends a notification (including a particular notification identifier) of an intended stream, to Alice's secondary server 3008.

In step 2, Alice's secondary server 3008 sends a notification to Bob's secondary server 3012.

In step 3, Bob's secondary server 3012 sends a notification message, which can be sent using a preconfigured monitoring process, to Bob's client 3010.

In step 4, Bob's client 3010 sends an acknowledgement (including the notification identifier) of the intended stream to Alice's secondary server 3008.

In step 5, Alice's secondary server 3008 forwards the acknowledgement message to Alice's client (e.g., using the preconfigured monitoring process). As indicated in step 5.1, Alice's client 3006 can receive a timeout for the intended stream if in fact an acknowledgment is not received.

In step 6, Alice's client 3006 streams data to Alice's secondary server 3008.

In step 7, Alice's secondary server 3008 relays streamed data to Bob's client 3010.

In step 8, Bob's client saves the streamed data, e.g., in a file system, when the end of the stream is reached.

In step 9, Bob's client 3010 sends a stream complete notification (including the notification identifier) to Alice's secondary server 3008.

In step 10, Alice's secondary server 3008 sends the stream complete notification to Alice's client 3006. The stream can be marked as complete on Alice's client 3006 and on Alice's secondary server, or tracking entries that include the notification identifier can be deleted (e.g., based on stream completion).

FIG. 31 is a flowchart of example streaming method 3100 using a proof of life approach. In steps 3102 and 3104 monitoring processes are established between an Alice client (e.g., for an @alice user) 3106 and Alice's secondary server 3108 and between Bob's client 3110 (e.g., for an @bob user) and Bob's secondary server 3112, respectively.

In step 1, Alice's client 3106 sends a stream initialization message to Alice's secondary server 3108.

In step 2, Alice's secondary server 3108 forwards a stream initialization message to Bob's secondary server 3112.

In step 3, Bob's secondary server 3112 sends a from message to Alice's secondary server 3108 to initiate a pol challenge.

In step 4, Alice's secondary server 3108, as part of the pol challenge, sends a proof challenge for Bob's secondary server to lookup a requested item on Bob's secondary server 3112 placed by Alice's secondary server 3108.

In step 5, Bob's secondary server 3112 performs the requested lookup and sends the looked-up data, as proof for the pol challenge, to Alice's secondary server 3108.

In step 6, in response to confirming the pol challenge, Alice's secondary server 3108 sends a notification of a server-to-server handshake success (e.g., the successful pol challenge) to Alice's client 3106.

In step 7, Alice's client 3106 streams data to Alice's secondary server 3108.

In step 8, Alice's secondary server 3108 relays streamed data to Bob's client 3110. In step 9, Bob's client saves the streamed data, e.g., in a file system, upon detecting an end of stream.

FIG. 32 is a flowchart of example streaming method 3200 using an intermediate streaming server 3202. The intermediate streaming server 3202 can be used, rather than a secondary server 3204 for an @alice user, when the @alice user desires to stream data to an @bob user.

In step 1, Alice's client 3206 sends a stream:to@bob streaming message to the intermediate streaming server 3202 regarding an intent to stream data to the @bob user.

In step 2, the intermediate streaming server 3202 sends a stream:from@alice message to Bob's secondary server 3208.

In step 3, Bob's secondary server 3208 sends a notification message about the stream to Bob's client 3210.

In step 4, Bob's client 3210 sends an acknowledgement to the intermediate streaming server 3202.

In step 5, the intermediate streaming server 3202 forwards the acknowledgement to Alice's client 3206.

In step 6, Alice's client 3206 sends streaming data to the intermediate streaming server 3202.

In step 7, the intermediate streaming server 3202 relays streaming data to Bob's client 3210.

In step 8, Bob's client sends a stream:done notification to the intermediate streaming server 3202 when Bob's client 3210 has finished receiving the streamed data.

In step 9, the intermediate streaming server 3202 forwards the stream:done notification to Alice's client 3206.

Data Sharing and Encryption

A major issue historically for the adoption of secure communication systems (e.g. PGP (Pretty Good Privacy)) has been the challenge of distributing signing keys used to encrypt/decrypt information exchanged between entities. The @protocol solves this problem in a unique manner by making it easy to securely share information by permission to some other entity. For example, "publickey@alice" can be a common syntax and approach for sharing a public key, and "atsign://publickey@alice" can be a fully qualified endpoint URL that can be distributed. While a public key used for PKI (Public Key Infrastructure) encryption can be shared publicly, typically a user may securely share a public key only to specified users. The @protocol supports both public and private sharing of encryption keys. The @protocol provides a simple means of creating and distributing PKI keys. Distribution and sharing of public keys can come as a side effect of the fact that the protocol itself relies on key sharing capability to securely share data with others. The result is an Internet-scale directory for billions of @sign owners to easily publish and lookup PKI keys on the Internet. Thus the @protocol provides a means for distributing and managing PKI keys at a massive scale.

The @protocol can also provide a system for distributing and managing PKI keys that can provide different responses based on who is requesting a public key. For instance, in addition to distributing encryption keys as outlined above, the protocol can determine which respective encryption key to provide among multiple encryption keys in response to a request, wherein the respective encryption key to provide depends on an identity of a requestor. That is, the protocol can support polymorphic sharing and distribution of encryption keys. This capability can provide additional assurance that only an intended recipient is able to access shared information.

The @protocol's polymorphism capability can enable providing different responses to a query based on which @sign is requesting the data. Polymorphism can be applicable for public, as well as private, sharing. Polymorphism capabilities can have important implications for managing PKI keys and other types of data. For example, a protocol query such as publickey@alice can be responded to with a public key value that is shared without using the proof of life handshake, as a public value shared with all users or a response can include different values for a same publickey@alice query based on a "from" parameter as part of the pol handshake. A given user can share a different public key with each of multiple different other users, for example. For instance, @alice can share a first public key with @bob and a second public key with @sara, each in response to a lookup by @bob or @sara of a publickey@alice key, respectively, based on a determination by @alice for which public key to share with which user. Polymorphic responses to queries for keys can provide a simple, scalable system for managing public and private PKI keys.

Additionally, the @protocol can provide a system for distributing content to multiple recipients that is encrypted one time such that only the intended recipients can access the content by using those intended recipients' respective personal keys. In further detail, the @server sharing protocol can support encryption of information that is encrypted once with a shared symmetric key, and is then shared with any number of others in such a manner that only the recipient can decrypt the information using their private key with asymmetric decryption. Such sending can be subject to other privacy controls inherent in the @protocol. For example, decrypted information can be set to remain accessible for some defined time period after which it will be automatically deleted.

With the @protocol, a hybrid symmetric/asymmetric encryption scheme can be used wherein the information can be first encrypted using a shared symmetric key set by the sender. The shared symmetric key can then itself be encrypted using asymmetric encryption with the sender's private key and the recipient's public key from the recipient's @server. A result of the hybrid symmetric/asymmetric scheme can be that information that is shared by the sender can only be retrieved using the recipient's private key which can provide access to the shared symmetric key set by the sender. The recipient can then use the shared symmetric key to decrypt the information shared with the recipient.

FIG. 33 illustrates an example system 3300 for use of encryption keys. As indicated by a note 3301, a net result of a security approach can be that only user-encrypted data is stored on secondary servers and only authorized @sign users can access data based on sharing privileges granted by data owners.

As described in a note 3302, during setup for an @sign, a public/private key pair is created and a public key service is populated. For example, for an @alice user 3303, a key pair 3304 can be created on Alice's device 3304 and a publickey@alice value 3305 can be stored on Alice's secondary server 3306. As another example, for an @bob user 3307, a key pair 3308 can be created on Bob's device 3309 and a publickey@bob value 3310 can be stored on Bob's secondary server 3311.

In a first stage 3312 of a use case scenario, Alice wants to share a phone@alice value 3313 with the @bob user 3307.

In a second stage 3314, Alice's device 3304 generates a shared key (e.g., an Advanced Encryption Standard shared key) for the @bob user 3307.

In a third stage 3316, Alice's device 3304 requests that Alice's secondary server 3306 perform a lookup for the public key 3310 for the @bob user 3307 that is stored on Bob's secondary server 3311. Alice's device 3304 encrypts the shared key with Bob's public key and requests storage of an encrypted shared key 3318 on Alice's secondary server 3306.

In a fourth stage 3320, Alice's device 3304 encrypts the shared key with Alice's public key 3305, and stores an encrypted shared key 3322 on Alice's secondary server 3306.

In a fifth stage 3324 corresponding to Bob desiring to access Alice's phone number, Bob's device 3309 sends a lookup request to Bob's secondary server 3311 for Bob's secondary server 3311 to look up the shared encrypted key 3318. Bob's device 3309 uses a private key of the key pair 3308 to decrypt the encrypted shared key.

In a sixth stage 3326, Bob's device 3309 sends a lookup request to Bob's secondary server 3311 for Bob's secondary server 3311 to look up the phone@alice value 3313 from Alice's secondary server 3306. Bob's device 3309 receives the phone@alice value 3313 as an encrypted phone number. Bob's device 3309 uses the shared key obtained from decrypting the encrypted shared key to decrypt the encrypted phone number, to obtain an unencrypted phone number value (e.g., Alice's phone number she has shared with Bob).

FIG. 34 illustrates an example system 3400 for use of encryption keys. In step 1.1, a user Alice (e.g., corresponding to Alice's device 3402) decides to share a phone@alice value with a user Bob (corresponding to Bob's device 3404).

For instance, in step 1.2, Alice's device 3402 generates a shared key 3405 for the user Bob.

In step 1.3, Alice's device initiates a lookup of Bob's public key. Alice's device 3402 sends a lookup request 3406 to Alice's secondary server 3408. Alice's secondary server 3408 sends, on behalf of Alice's device 3402, a lookup request 3410 to Bob's secondary server 3412. Bob's secondary server 3412 sends a lookup response 3414 to Alice's secondary server 3408. Alice's secondary server 3408 forwards the lookup response 3414 as a forwarded response 3416 to Alice's device 3402. Alice's device 3402 receives a copy of Bob's public key 3418 in the forwarded response 3416.

In step 1.4, Alice's device 3402 encrypts the shared key 3405 with the copy of Bob's public key 3418 to generate an encrypted shared key 3420.

In step 1.5.1, Alice's device 3402 initiates storing of the encrypted shared key 3420 on Alice's device 3402.

For instance, in step 1.5.2, Alice's device 3402 sends an update request 3422 to Alice's secondary server 3408 to update @bob:key@alice with the encrypted shared key 3420.

In step 1.6.1, Alice's device 3402 encrypts a phone@alice value Alice has shared with Bob (e.g., as @bob: phone@alice), using the shared key 3405, to generate an encrypted phone value 3424.

In step 1.6.2, Alice's device 3402 sends an update request 3426 to Alice's secondary server 3408 to update an @bob: phone@alice key with the encrypted phone value 3424.

At a later time, in step 2.1, Bob wants to look up Alice's phone number.

In step 2.2.1, Bob's device 3404 initiates a lookup of the shared key shared between Bob and Alice.

For example, in step 2.2.2, Bob's device 3404 sends a lookup request 3428 to Bob's secondary server 3412 to lookup the shared key shared between Bob and Alice. Bob's secondary server 3412 forwards the lookup request 3428 to Alice's secondary server 3408, as a forwarded request 3430.

In step 2.2.3, Alice's secondary server 3408 sends an encrypted shared key to Bob's secondary server 3412. Bob's secondary server forwards an encrypted shared key 3432 to Bob's device 3404.

In step 2.3, Bob's device 3404 decrypts the received encrypted shared key 3432 using a private key stored on Bob's device 3404, to obtain an unencrypted shared key.

In step 2.4.1, Bob's device 3404 sends a lookup request to Bob's secondary server 3412 to look up Alice's phone number that Alice has shared with Bob. Bob's secondary server 3412 can forward the lookup request to Alice's secondary server 3408.

In step 2.4.2, Alice's secondary server 3408 sends an encrypted phone value to Bob's secondary server 3412. Bob's secondary server 3412 forwards an encrypted phone value 3434 to Bob's device 3404.

In step 2.5, Bob's device decrypts the encrypted phone value 3434, using the shared key, to obtain the phone value for Alice.

FIG. 35 illustrates an example system 3500 for key value retrieval.

At a first stage, a user 3502 (e.g., user2) desires to obtain a key of a user 3504 (e.g., user1). A request for the key can be sent from a device 3506 of the user 3502 to a secondary server 3508 associated with the user 3504.

In a second stage, the user 3502 proves that s/he is user2 (e.g., using a pol approach as described herein).

In a third stage, the secondary server 3508 locates an entry 3510 in a secondary storage 3512 that had been encrypted using an encryption key created by a settings application 3514 on a device 3516 of the user 3504. The entry 3510 can include a key code (e.g., Key123), for example.

In a fourth stage, the secondary server 3508 can send the entry 3510 (or a portion of the entry 3510) with a request to the device 3516 for the settings application 3514 to decrypt the entry 3510.

In a fifth stage, the settings application 3514 can locate, e.g., in local storage 3518, a key for the key code included in the entry 3510 and use the key to decrypt the entry 3510 (or to decrypt a value associated with the entry 3510). The decrypted value is sent by the device 3516 to the secondary server 3508. The secondary server can forward the value to the device 3506 so that the user 3502 can view the decrypted value (or otherwise use the decrypted value, e.g. in an application on the device 3506).

FIG. 36 illustrates approaches for spam protection. Various types of settings can be configured for controlling access to secondary servers. For example, some settings can relate to spam protection that can involve the use of an allow list 3602 and/or a block list 3604. In a first example 3606 in which an allow list 3608 includes @alice and @bob and a block list 3610 is empty, connections can be accepted from @alice and @bob. In a second example 3612 in which an allow list 3614 includes a wildcard character '*' and a block list 3616 includes @daniel, connections can be accepted from everyone except @daniel. In a third example 3618 in which an allow list 3620 includes @alice and @bob and a block list 3622 includes @daniel, connections can be accepted from @alice and @bob but not @daniel. In a fourth example 3624 in which an allow list 3626 includes @alice and a block list 3628 includes '*', connections from everyone except @alice can be rejected.

In some implementations, an @config verb can support adding and removing entries from allow or block lists. For example, a verb "@config:block:add @bob @daniel" can result in an adding of @bob and @daniel to a block list for the user. As another example, a verb "@config:allow:remove:@bob" can remove @bob from an allow list of the user. Other examples can include "@config:show:block" and "@config:show:allow" to receive a list of blocked or allowed @signs, respectively.

Local and Secondary Server Synchronization

FIG. 37 illustrates example synchronization operations 3700 for synchronizing local and cloud persistence. A settings application 3701 running on a user device 3702 can be involved in various synchronization operations.

For example, in step 1, the settings application 3701 can retrieve a last synced entry commit identifier from a local commit log 3704.

In step 2, the settings application 3701 can retrieve a latest server commit identifier from a secondary server 3706.

In step 3, the settings application 3701 can retrieve uncommitted entries from the local commit log 3704 based on the latest server commit identifier. As indicated in a note 3707, the settings application 3701 can determine that a local key store 3708 is ahead of (e.g., has more recent entries) than the secondary server 3706 if a local commit identifier is equal to a server commit identifier, the server commit identifier is a null value, or the local commit identifier is less than the server commit identifier and the number of uncommitted entries is greater than zero. As indicated by a note 3709, the settings application 3701 can determine that the secondary server 3706 is ahead of the local key store if the server commit identifier is greater than the local commit identifier.

In step 4, the settings application 3701 can retrieve values for uncommitted keys from the local key store 3708.

Steps 5 and 6 can be repeated for each uncommitted entry. In step 5, an update or delete command for a given uncommitted entry is sent by the settings application 3701 to the secondary server 3706. The secondary server 3706 can return a current server commit identifier.

In step 6, the local commit log 3704 is updated for the given uncommitted entry to reflect the current server commit identifier.

FIGS. 38A-C illustrate a synchronization scenario 3800 in which a local storage 3802 is ahead of (update-wise) storage on a secondary server 3804. In a first step, a value (e.g., value1) is inserted (e.g., as an entry 3806) into the local storage 3802 for a key1 key. An entry 3808 for the key1 key can be added to a commit log (e.g., located on a same user device as the local storage 3802). A secondary server time value 3810 for the commit log entry 3808 can be initially null, which can mean that the local storage entry 3806 needs to be committed to the secondary server 3804. The entry 3808 can include an indication (e.g., illustrated as "+") to represent an addition of a key value. Other indications can include an indication of deletion (e.g., "−") or an indication of metadata change (e.g., "#").

In a second step, a local server that manages the local storage 3802 can determine a latest "optime" (e.g., operation time) of the secondary server 3804. For instance, the local server can execute an @stat verb 3812. A return value of null can indicate that the local storage 3802 is ahead of the storage on the secondary server 3804.

In a third step, the local server can run an update command 3814 to commit changes in the local storage 3802 to the secondary server 3804. The update command 3814 can result in the secondary server 3804 adding an entry 3816 in e.g., cloud storage managed by the secondary server 3804. The secondary server 3804 can also add an entry 3818 to a server commit log. The server commit log entry 3818 can include the key1 key, a timestamp T1, and an operation time (e.g., counter, having a value of 1).

In a fourth step, the local server can update a cloud secondary time value 3820 in the commit log entry 3808.

In a fifth step, the local server performs additional operations that result in an addition of a key2 value (e.g., entry 3822) and modification or addition of metadata for a key3 value (e.g., entry 3824). Initially, secondary server time values 3826 and 3828 are empty for the key2 and key3 values, respectively.

In a sixth step and as shown in FIG. 38B, the local server performs an update command 3830 to commit the changes for the key2 key to the secondary server 3804. The update command 3830 results in addition of an entry 3832 to the secondary storage and addition of an entry 3834 to the server commit log.

The local server can run an @stat command 3836 to get a latest cloud secondary time (e.g., T2). Based on the output of the @stat command 3836, the local server can update a cloud secondary time value 3838 for the key2 key in the local commit log. Similarly, the local server can perform an update command 3840 to commit the changes for the key3 key to the secondary server 3804. The update command 3840 results in addition of an entry 3842 to the secondary storage and addition of an entry 3844 to the server commit log.

The local server can run an @stat command 3846 to get a latest cloud secondary time (e.g., T3). Based on the output of the @stat command 3846, the local server can update a cloud secondary time value 3848 for the key3 key in the local commit log.

In a seventh step and as shown in FIG. 38C, the local server deletes a key (e.g. key1) from the local storage. An entry 3850 is added to the commit log to represent the deletion.

In an eighth step, the local server executes a delete command 3852 to commit changes (e.g., including the key1 deletion) to the secondary server 3804. An entry 3854 is added to a server commit log, and after another @stat command by the local server, a latest server optime value 3856 is added to the local commit log, to keep the local storage and the cloud storage in sync.

FIG. 39 illustrates a synchronization scenario 3900 in which a local storage 3902 is behind (update wise) storage on a secondary server 3904. In a first step, the secondary server has inserted two new values (e.g., for a key2 key and a key3 key, as shown in server entries 3906 and 3908, respectively). Corresponding entries 3910 and 3912 have been added to a server commit log.

In a second step, a local server executes an @stat command 3914 to determine a latest operation time (e.g., "optime") of the secondary server. For instance, a T3 time corresponding to the entry 3912 is returned. The local server can compare the T3 latest server op time to a latest optime T1 3916 that is currently stored in a local commit log. Based on the T3 value being greater than the T1 value, the local server can determine that the secondary server 3904 has more recent data than the local storage 3902. In a third step, the local server executes a sync command 3918 that includes a reference to the T1 optime stored in the local commit log. The sync command 3918 requests data from the secondary server 3904 that has been stored on the secondary server 3904 since the T1 optime. Data returned from the sync command 3918 corresponds to data stored in the entries 3906 and 3908 on the secondary server 3904.

In a fourth step, the local server performs local update commands 3920 to add entries to the local storage 3902 for the key2 and key3 keys. Additionally, entries 3922 and 3924 are added to the local commit log, for the key2 and key3 keys, respectively. After the update commands 3920 are performed, the local storage 3902 is in sync with the secondary server 3904.

FIG. 40 illustrates a synchronization scenario 4000 in which a local storage 4002 becomes synchronized with a secondary server 4004 after data is deleted from the secondary server 4004.

In a first step, the local storage 4002 is in sync with secondary server 4004.

In a second step, the secondary server 4004 deletes a key2 key and adds an entry 4006 to a server commit log. Accordingly, the local storage 4002 is behind (update wise) the secondary server 4004.

In a third step, a local server executes an @stat command 4008 to retrieve a latest secondary optime value (e.g., T4) from the secondary server 4004. The local server can determine that the local storage 4002 is behind the secondary server 4004 based on the T4 latest server optime value being greater than a largest server optime value 4009 of T3 stored in a local commit log.

In a fourth step, the local server performs a sync command 4010 to retrieve changes since the T3 optime value. The sync command 4010 results in the local server receiving key2 deletion information corresponding to the server commit log entry 4006.

In a fifth step, the local server executes a local update command 4012 that includes information received from execution of the sync command 4010, to delete a key2 entry from local entries 4014. The local server also adds an entry 4016 to the local commit log to reflect deletion of the key2 key from the local storage. The entry 4016 includes a T4 optime value reflecting a time of execution of the local update command 4012.

FIG. 41 illustrates a synchronization scenario 4100 in which a local storage 4102 becomes synchronized with a secondary server 4104 after data is deleted from the secondary server 4104 and added to the local storage 4102.

In a first step, the local storage 4102 is in sync with the secondary server 4104.

In a second step, the secondary server 4104 deletes a key2 key and adds a corresponding entry 4106 to a server commit log. A local server adds a key3 key to the local storage 4102 (e.g., an entry 4108) and adds a corresponding entry 4110 to a local commit log.

In a third step, a local server executes an @stat command 4112 to retrieve a latest secondary optime value (e.g., T3) from the secondary server 4104. The local server can determine that the local storage 4102 is behind the secondary server 4104 based on the T3 latest server optime value being greater than a largest server optime value 4114 of T2 stored in the local commit log.

In a fourth step, the local server performs a sync command 4116 to retrieve changes since the T2 optime value. The sync command 4116 results in the local server receiving key2 deletion information corresponding to the server commit log entry 4106.

In a fifth step, the local server executes a local delete command 4118 that includes information received from execution of the sync command 4116, to delete a key2 entry from local entries 4119. The local server also adds an entry 4120 to the local commit log to reflect deletion of the key2 key from the local storage 4102. The entry 4116 includes a T4 optime value reflecting a time of execution of the local update command 4112. The local server also sends an update command 4122 to the secondary server 4104 for the secondary server 4104 to add a key3 value to the secondary server 4104 (e.g., as shown by an entry 4124). The secondary server 4104 also adds an entry 4126 to the server commit log to reflect addition of the key3 key. The local server updates an entry 4128 in the local commit log with a T5 value corresponding to a time of execution of the update command 4122.

FIGS. 42A-B illustrate a synchronization scenario 4200 in which a local storage 4202 becomes synchronized with a secondary server 4204 after data is deleted from the local storage 4202 and added to the secondary server.

In a first step, the local storage 4202 is in sync with the secondary server 4204.

In a second step, a local server deletes a key2 key from the local storage 4202 and adds a corresponding entry 4206 to a local commit log. The secondary server 4204 adds a key3 key (e.g., an entry 4208) and a corresponding entry 4210 to a server commit log.

In a third step, a local server executes an @stat command 4212 to retrieve a latest secondary optime value (e.g., T3) from the secondary server 4204. The local server can determine that the local storage 4202 is behind the secondary server 4204 based on the T3 latest server optime value being greater than a largest server optime value 4214 of T2 stored in a local commit log.

In a fourth step, the local server performs a sync command 4216 to retrieve changes on the secondary server 4204 since the T2 optime value. The sync command 4216 results in the local server receiving key3 addition information corresponding to the server commit log entry 4210.

In a fifth step, the local server executes a local update command 4218 that includes information received from execution of the sync command 4216, to add a key3 entry to the local storage 4202. The local server also adds a corresponding entry 4222 to the local commit log to reflect addition of the key3 key to the local storage 4202.

In a sixth step, the local server executes a local update command 4224 to update a commit log entry 4226 for the key3 key. The local server 4202 sends a delete command 4228 to the secondary server 4204 for the secondary server 4204 to delete the key2 key. The secondary server deletes the key2 key and adds a corresponding entry 4230 to the server commit log. The local server sends an update command 4232 to the secondary server 4204 for the secondary server 4204 to add a server commit log entry 4234 for the key3 key, to reflect a time of adding the key3 key to the local storage 4202. The local server updates a local commit log entry 4236 to reflect a time of deletion of the key2 key.

FIG. 43 illustrates an example system 4300 for synchronizing keys across user devices and a secondary server 4302. For instance, a user 4304 has a first user device 4306 and a second user device 4308. The first user device 4306 has a local storage 4310 that includes an entry 4312 for a key123 key. The second user device 4308 has a local storage 4314 that includes an entry 4316 for a key456 key. The user can use a settings application 4318 on the first user device 4306 and/or a settings application 4320 on the second user device 4308 to execute a sync keys command. Execution of the sync keys command(s) can result in an added entry 4322 in the local storage 4310 for the key456 key and an added entry 4324 in the local storage 4314 for the key123 key. In some implementations, synchronization can involve using data from an entry 4326 and/or an entry 4328 in secondary storage 4330 on the secondary server 4302.

FIGS. 44A-B illustrate an example system 4400 for synchronizing keys across applications and a secondary server 4402. In a first stage, a first application 4404 (e.g., an @me application) has added entries 4406 and 4408 for phone.me@alice and location.me@alice keys, respectively, to local storage 4410. Corresponding entries 4412 and 4414 have been added to a local commit log. A server commit log 4416 is currently empty.

In a second stage, a local server executes an @stat command 4418 to get a latest server optime. In this example, a null value is returned. Accordingly, the local server can determine that the local storage 4410 has more recent data than the secondary server 4402. The local server can send an update command 4420 to the secondary server 4402 for the secondary server 4402 to add the phone.me@alice key. Accordingly, the secondary server 4402 has added an entry 4422. The local server can update the local commit log entry 4412 to include an optime of one. The local server can send an update command 4426 to the secondary server 4402 for the secondary server 4402 to add the location.me@alice key. Accordingly, the secondary server 4402 has added an entry 4428. The local server can update the local commit log entry 4414 to include an optime of two.

In a third stage and as shown in FIG. 44B, a second application 4432 (e.g., an @buzz application) has added an entry 4434 to a local storage 4436 and a corresponding entry 4438 to a local commit log. The local storage 4436 can be a different portion of a same storage area as the local storage 4410, or can be a different storage repository. As another example, the second application 4432 can be running on a different device than the first application 4404 and the local storage 4410 and the local storage 4436 can reside on respective devices. Accordingly, each respective device can run a different, respective local server. If the two applications are running on the same device, each application can have a different local server instance. Additionally, each application can have a different local commit log (or can access different portions of a same local commit log).

In a fourth stage, the local server executes an @stat command 4440 to obtain a latest server optime. Based on a results on the @stat command 4440, the local server can determine that the secondary server 4402 has more recent data than the local storage 4436. Accordingly, the local server can send a sync command 4442 to the secondary server 4402 to obtain a data update from the secondary server 4402. As indicated by a note 4444, the local server can determine that data returned from the sync command 4442 does not include any keys used by or associated with the second application 4432. Accordingly, the local server does not update the local commit log or the local storage 4436. The local server can send an update command 4446 to the secondary server 4402 for the secondary server 4402 to add an email.buzz@alice key based on information in the entry 4434. Accordingly, the secondary server 4402 has added an entry to secondary storage for the email.buzz@alice key and a corresponding entry 4448 to the server commit log. The local server can add an optime value 4450 the local commit log entry 4438.

FIG. 45 illustrates an example sync response message 4500. The sync response message 4500 includes a first portion 4502 for a first operation 4504 and a second portion 4506 for a second operation 4508. The first operation 4504 corresponds to a key 4512 having a value 4514. The second operation 4508 corresponds to a key 4516 having a value 4518. An expires-at value 4520 (e.g., a TTL value) can indicate that the value expires at a specified time point. An available-at value 4522 (e.g., TTB value) can indicate that the value 4518 becomes available at a certain time point.

Design

FIG. 46 illustrates example entities for verb handling. A secondary server entity 4602 can be associated with a verb handler manager 4604 and a verb executor 4606. The verb handler manager 4604 can manage one or more verb handler entities 4608. A verb handler entity 4608 can handle a verb 4610. A verb 4610 can be received at the secondary server entity 4602 using an inbound connection 4612. A verb can be executed at the secondary server entity 4602 by the verb executor 4606. The verb handler entity 4608 can store output from verb execution, e.g., as may be produced by some verbs, in a secondary store 4614. As another example, the verb handler entity 4608 can retrieve information from the secondary store 4614, e.g., for use during verb execution. When execution of the verb results in output to be provided to a requestor, the verb handler entity 4608 can provide generated output to the requester, e.g., using an outbound connection 4616.

FIG. 47 illustrates an example class diagram 4700. A key store manager interface 4702 can be based on a common interface 4704 that represents commonality between a read only key store interface 4706 and a writable key store interface 4708. A common library 4710 (used by some or all depicted interfaces) can include key store operations 4712 and exception handling functionality 4714.

FIG. 48 illustrates client design criteria goals 4800. A first goal 4802 specifies that a developer of a protocol application need not be exposed to internal @protocol internals or terminology. For instance, a lookup interface in an @protocol API may be designed to be more simple than a get interface included in other API(s). More precisely, a goal 4804 can specify an approach of designing for simple method signatures. Signature and other method considerations can include use (or avoidance) of exception handling, return values, and callbacks. A third goal 4806 specifies that developers be aware of what interface may result in execution on an @user's secondary server or on a user's device. A fourth goal 4808 specifies that designing for widget (UI) usability is desired.

Notifications

The @protocol can provide a method for secure, surveillance-free, P2P notifications with privacy control features. Other notifications that may be sent over the Internet generally require an intermediate service to manage queueing, routing, and delivery. Such existing services can rely on possession of unique endpoint identifiers (e.g., phone numbers) to determine routing. Such factors can result in surveillance and tracking of notifications which is not desirable. In contrast, the @protocol includes a mechanism for pushing notifications between @sign servers the instant a data change event has occurred for a data item of interest. These automatic notifications can provide an essential element of creating a P2P application model with data distributed amongst @servers. The @protocol can also provide a general purpose notification service that application developers can use for application functionality to securely and safely push notifications to other @signs as part of application behavior.

The @protocol is designed to give data owners control over who can access their data. With the @protocol, a requester's identify is verified before data of a data owner is released to the requester. The @protocol is thus different from existing protocols which do not have such verification. With other protocols, unwanted communication (e.g., spam) is a continuing concern and disadvantage.

The @protocol can manage notifications regarding updates to information. Particularly, the @protocol distributes updates differently than other protocols and existing techniques. For example, consider when a user, Alice, changes her location. Although a user Bob can look up Alice's location through a previously known @protocol address, such as location@alice, Bob may not know if Alice's location has changed unless he looks it up again. However, it can be unreasonable to expect Bob to constantly be checking Alice's location on the off chance that Alice's location may change. As an alternative approach, push notifications can be used.

Push notifications can allow Alice to alert Bob when her location or other Alice-owned data has changed. Currently, most organizations update customers by pushing out emails, phone calls, and SMS, which may result in spam. Not only may spam be annoying and time-wasting for recipients, spam also (unfairly) consumes receiver's resources. A more fair approach may be to have a sender bear the cost of sending updates (e.g., similar to real-world postal mail). Accordingly, the @protocol can provide real time notifications of updates with the sender/data owner generally incurring a cost of sending and storage. With the @protocol, users only have to update information in one place.

The @protocol can use an approach that may be similar to raising a flag on a receiver's mailbox as an indication of updated data. That is, @protocol notifications can involve sending notification flags to other @signs. The receiver can decide whether to respond to the notification. If the receiving @sign is interested in the notification, the receiving @sign can choose to review the details of that notification. As described below, the @protocol can handle notifications for both online and offline devices.

Various considerations and goals can apply to notifications. For example, if Alice wants to connect to Bob, then she can notify Bob of that intent using the @protocol, and Bob can be notified of that intent and be able to respond to the notification. As another example, Bob may or may not want to respond to requests from @signs he does not have a relationship with, or maybe Bob only wants to respond to @signs to which he had given permission. As yet another example, some users may desire to automatically agree to connections, but using a particular persona (e.g., a public persona) in those instances, thereby providing some basic information without providing more private or otherwise non-public information. In general, the @protocol is designed to avoid and protect from mass spamming of requests from @signs. Some notifications, such as request notifications, can be used after a "connection" between two parties has been established. Request notifications can have a particular context. For example, Alice may want to send a message to Bob, and a context in this case is a need to send a message. A response can be or include a response of accept, reject, ignore, or further context in reply. For example, a reply with further context can be, "I can't message now, but call me in 10 minutes using messaging application ABC."

FIG. 49 illustrates an example system for an accept notification. A user @alice 4902 wants to connect with a user @bob 4904. A device 4906 of the @alice user 4902 can send an invitation to connect notification 4908 to the @bob user 4904. The invitation to connect notification 4908 can be provided to a device 4910 of the @bob user 4904. As described below, Alice's secondary server and/or Bob's secondary server can be involved in distribution of notifications. The @bob user 4904 can choose whether to accept and/or respond to the invitation to connect notification 4908. If the @bob user 4904 accepts the invitation to connect notification 4908, the device 4910 can send an accept notification 4912, which can be provided to the device 4906 for viewing by the @alice user 4902.

FIG. 50 illustrates an example system 5000 for an update notification. A user Alice (@alice 5002) may update a key, such as phone@alice. The @alice user 5002 may or may not want to notify other users of that change, or may want to notify only certain users. Alice may choose to send individual notifications to particular users, or may instead send group- or persona-based notifications. For instance, Alice may get a new phone number and may choose to notify groups of friend or work colleague users, or users to which a friend or work persona has been shared. In this example, Alice may choose to notify an @bob user 5004 of the new phone number.

A device 5006 of the @alice user 5002 can send an update notification 5008 to the @bob user 5004 regarding a change to the phone@alice key. The update notification 5008 can be provided to a device 5010 of the @bob user 5004. The @bob user 5004 can choose whether to respond to the update notification 5008. If the @bob user 5004 chooses to respond to the update notification 5008, the device 5010 can send a response message 5012, which can be provided to the device 5006 for viewing by the @alice user 5002.

FIG. 51 illustrates a peer-to-peer network 5100 for group notifications. Some notifications can be sent to all members of a group. Devices 5102, 5104, 5106, 5108, and 5110 of group users can be configured to be in a peer-to-peer relationship, where each device in the group is trusted by the other devices and can therefore be used to send messages to the devices in the group. A consideration for a peer-to-peer network is maintenance of group member lists by each device in the network. An alternative approach for group management is a reflector architecture.

FIG. 52 illustrates an example reflector network 5200. The reflector network 5200 can include a reflector device 5202. The reflector device 5202 corresponds to an entity that is trusted by everyone in the group. Group members (corresponding to devices 5204, 5206, 5208, and 5210) do not need to know or have any relationship to each other, beyond each trusting the same reflector. The @protocol can use a reflector architecture, where a group owner adds members to the group and everyone in the group can receive notifications from the reflector device 5202.

FIG. 53 illustrates information 5300 describing a notification verb 5302. The notification verb 5302 can be used to notify another user's secondary server of some activity (e.g., the notification verb can be provided by the @protocol as a method for secondary servers to notify other secondary servers about certain events). A notification can turn into some kind of action by the recipient.

A syntax 5304 of the notification verb can be: notify: send<whom_to_notify>:<key>@<owner>.

For instance, an example notification verb can be: notify: send@kevin:phone@colin.

An overall flow 5306 of notification processing can include specification of whom to notify, what to notify about, enabling an action, or just sending to inform, where action(s) in response to a notification can be automated or manual.

Example notification scenarios 5308 include an @bob user sharing a persona with @alice and notifying @alice when a value in the persona has changed. Other examples include the @bob user can notifying one or more users of a new chat message or a new email message.

Notification verb features 5310 include that notifications should not spam recipient(s), notifications can be streamed (e.g., to application(s) to enable application reaction(s), notifications can have an expiration, automatic notifications can be supported, and a notification can be represented as a reference (e.g., using an atsign:// link).

FIG. 54 illustrates an example system 5400 for notifications. Rather than simple polling or push notifications schemes, the @protocol can use secondary servers to capture notifications from other @signs in real time and create a queue of notifications on a sender's secondary server. Notifications can be polymorphic in that acted-on notifications can refer to a same or different locations in a notifier's namespace. In the example of FIG. 54, a user Bob 5402 (@bob) wants to let a user Alice 5404 (@alice) know he has a new phone number listed at phone@bob.

In a first stage 5406, the user Bob 5402 authenticates to an @bob secondary server 5408. The user Bob 5402 makes an update to his phone@bob key (e.g., by sending an update command to the @bob secondary server 5408 from a device 5410) to reflect his new phone number. The user Bob 5402 then uses the device 5410 to send a notification verb to @alice.

In a second stage 5412, the @bob secondary server 5408 connects to an @alice secondary server 5414 on behalf of @bob, authenticates as @bob to the @alice secondary server 5414 (e.g., using from and pol verbs), and then submits a notification verb that includes phone@bob to notify @alice of an update to phone@bob.

In a third stage 5416, a device 5418 for the @alice user 5404 synchronizes to the @alice secondary server 5414. As part of synchronization, the notification for phone@bob can be provided to the device 5418. If the notification is related to a root namespace, a settings application on the device 5418 can automatically handle the notification. As another example, if the notification is in a registered application namespace, an application associated with the namespace can handle the notification. Other examples include a notification message being displayed on the device 5418.

In a fourth stage 5420, a notification flag can be cleared, for example, in response to a time out or in response to the @alice secondary server 5414 looking up the phone@bob key.

FIG. 55 illustrates an example system 5500 for notifications. In an example scenario, a user Bob 5502 (@bob) wants to notify a user Alice 5504 (@alice) of a new message. The user Bob 5502 can update a key message@bob and notify the user Alice 5504. A device 5506 of the Alice user 5504 can be powered on and monitoring for real time updates.

In further detail, in step 1, the device 5506 for Alice authenticates two sessions to an @alice secondary server 5508 using a pkam verb.

In step 2 and in the first session, the device 5506 issues a monitor verb to the @alice secondary server 5508. The monitor verb can be submitted without arguments. In general, once a monitor verb is invoked, a connection/channel can be established with a secondary server and notifications can be sent directly over the connection. Notifications on the channel can be treated as events that can be acted on immediately by an application or ignored. After the device 5506 invokes the monitor verb, a stream of real-time notifications can be sent to the device 5506. The format of a notification sent by a monitor can be "data:<service>@<entity>" (e.g., data:message@bob).

In step 3 and in the second session, the device 5506 can perform a lookup on the @alice secondary server 5508 for a q.alice@alice key to determine whether there are any notifications that have been received by the @alice secondary server 5508 while the device 5508 was offline. For example, if a notification of data:message@bob had been received by the secondary server 5508 when the device 5506 was offline, the lookup:q.alice@alice command can return data:message@bob. However, if multiple notifications are in the queue for @alice, then the lookup:q.alice@alice command can return a list:reply, such as list:5 message@bob, which can indicate that the queue holds five messages and a first value is message@bob. A next invocation of the lookup command may return, for example, list:4 message@sara, for example, with a second item in the queue being a notification about a message from @sara. Once a list is exhausted then a lookup command can return data:null.

In step 4, the device 5508 is ready and listening for real time notifications. As an example, the user Bob 5502 has a notification to send corresponding to an update to a key @alice:message@bob. For instance, the user Bob 5502 may want to notify the user Alice 5504 of a message targeted for Alice. Bob can send notifications manually, or, in some implementations, notifications can be sent automatically (e.g., after a config:notify:auto configuration). Before sending the notification, a device 5510 for @bob authenticates to an @bob secondary server 5512 using the pkam verb.

In step 5, the device 5510 issues a notify:@alice: message@bob verb.

In step 6, the @bob secondary server 5512 authenticates to the @alice secondary server 5508 using the from and pol verbs. In step 7, the @bob secondary server 5512 issues a notify:message@bob verb to the @alice secondary server 5508. In step 8, based on the monitoring channel with the device 5506, a real time update of data:message@bob is made using the monitoring connection from the @alice secondary server 5508 to the device 5506.

In step 9, and in response to the real time update, the device 5506 triggers an event for an @protocol application on the device 5506. The application is interested in (e.g., has subscribed to) the notification, and can, for example, store the notification for later processing (e.g., for when Alice 5504 may want to acknowledge the notification and have the application process the event). As another example, the application can perform a lookup (e.g., looking up a value for message@bob that is shared by @bob with @alice) so that the contents of the message are ready for presentation to Alice when Alice next uses the application.

In step 10, either the application on the device 5506 or the Alice user 5504 wants to know more about the notification. The device authenticates to the @alice secondary server 5508 using the pkam verb. In step 11, the device 5506 issues a lookup:message@bob request to the @alice secondary server 5508. In step 12, the @alice secondary server 5508 authenticates to the @bob secondary server 5512 using the from and pol verbs. In step 13, the @alice secondary server 5508 issues a lookup:message@bob verb to the @bob secondary server 5512. In step 14, the @bob secondary server 5512 looks up the message@bob key shared with @alice and sends a looked up value (e.g., "Hi Alice") to the @alice secondary server 5508, e.g., as "data:Hi Alice." As another example, if the message@bob value shared with @alice is a list, a list indicator (and first list item), such as "list:10 Hi Alice" can be provided. The @alice secondary server 5508 can forward the received value for the message@bob key to the device 5506, for use by or presentation in an application on the device 5506. If a list is returned, the @alice secondary server can cycle through the items in the list and provide each list item to the device 5506.

EXAMPLE APPLICATIONS

An ability of the @protocol to locate edge resource endpoints that securely store a user's data gives rise to a new class of applications that can communicate with each other directly (e.g., P2P). This is an important capability in that it removes a scenario for some intermediary (e.g., typically called a server, but could also be a more nefarious man in the middle scenario) being used to store data and manage interactions with other users that want to access stored data. Additionally, end-to-end encryption ensures that all data and traffic only flows between the involved parties and is not susceptible to surveillance. Accordingly, the @protocol can support a new generation of true P2P applications that can securely share information between permitted users without fear of surveillance by intermediaries, infrastructure providers, or others. Additionally, registering for a new protocol-enabled application can be a simple process for users, because a user can register using their @sign which can reduce sign-up/registration steps and can enable user-controlled access of data to application providers/developers, rather than a user having to separately and repeatedly provide multiple specific items of user information each time a user installs or registers for an application.

FIG. 56 illustrates an example system 5600 for P2P applications. An application 5602 running on a device 5604 of a user @bob can request data for an @alice user stored, e.g., in a personal directory 5606 of a secondary server 5608 and/or a personal directory 5610 on a device 5612 of @alice. Similarly, an application 5614 running on the device 5612 of @alice can request data for the @bob user stored, e.g., in a personal directory 5616 of a secondary server 5618 and/or a personal directory 5620 on the device 5604 of @bob. Specific application examples are described in more detail below.

Data sharing between the device 5604 and the device 5612 (e.g., and/or between the application 5614 and the application 5602) can be conducted without a need of or actual surveillance by a central server. P2P application functionality can be configured with no central server or entity being able to track a user's use of or sharing of data. Data that a user or user application determines to share with another user or application is encrypted, as described above. Also as described above, one client application of one @protocol user can be notified about a change in data for another @protocol user. As described in more detail below, an example P2P application can be a contacts application, in which each user is responsible for maintaining their own data, and interested parties/applications can be automatically notified about changes in, for example, subscribed-to data. Another example application is the file sharing application described above. Yet another example application is a data sharing application for use by an executive and an executive assistant.

FIGS. 57A-B are conceptual diagrams 5700 and 5701 that illustrate an example P2P application for sharing data between an executive and an executive assistant. As shown in FIG. 57A, an executive 5702 may occasionally have a need to share data with an executive assistant (EA) 5704. For example, the executive 5702 may have various sensitive items of information, such as a social security number 5706, travel information 5708, family information 5710, passwords 5712, or credit card information 5712. The EA 5704 may occasionally need, when supporting the executive 5702, a sensitive item of information of the executive 5702, such as for making a reservation for the executive 5702 or performing some other type of transaction on behalf of the executive 5702, such as filling out a visa application. Prior, insecure solutions for sharing sensitive information between an executive and an EA may include using paper file folders, notes, or other types of paper exchanges, e-mail messages or vCards (virtual cards), which could inadvertently or maliciously be forwarded, or an electronic file, which could also be shared to or accessed by unauthorized individual. These prior approaches are not sufficient in terms of securing sensitive information of the executive 5702.

As an alternative for sharing data between the executive 5702 and the EA 5704, an @protocol-enabled P2P data sharing application can be used where the executive 5702 owns and controls her data and can give access to select individuals, such as the EA 5704, for a period of time and/or on an as-needed basis. Data requests and accesses can be logged, thereby enabling review by the executive 5702.

The data sharing application can have an executive mode or variant for running on an executive device 5716, and an EA mode or variant for running on an EA device 5718. The EA 5704 can use the EA application variant on the EA device 5718 to generate a request for sensitive information of the executive 5702 (e.g. a request 5722 for a credit card number). As shown in FIG. 57B, in response to a validation of the request 5722, requested data 5724 can be provided to the EA device 5718 and presented on the EA device 5718, e.g., for a limited period of time. The @protocol-enabled P2P data sharing application is further described below.

FIG. 58 illustrates an example configuration user interface 5800 for a P2P data sharing application. The configuration user interface 5800 can be presented upon first use of the P2P data sharing application, for example. The user can perform a role selection by selecting either an executive option 5802 or an EA option 5804.

FIG. 59 illustrates an example executive assistant list user interface for a P2P data sharing application. The executive assistant list user interface 5900, which can be available for an executive user of the P2P data sharing application with an executive role, presents a list of EAs that may support the executive user. For example, the list of EAs includes Larry Martin 5902, June Siegel 5904, and Jen Waterly 5906. The executive can select a particular EA to view information about the EA and/or to configure access for the EA.

FIG. 60 illustrates an example executive assistant permissions user interface 6000 for a P2P data sharing application. The executive assistant permissions user interface 6000 presents permissions that have been (or that can be) granted to a selected executive assistant by an executive user of the P2P data sharing application. For example, data that can be shared with the Jen Waterly EA includes a social security number 6002, Visa credit card information 6004, American Express credit card information 6006, and travel site login information 6008. Toggle controls 6010, 6012, 6014, and 6016 can be used to toggle access to the social security number 6002, the Visa credit card information 6004, the American Express credit card information 6006, and travel site login information 6008, respectively.

FIG. 61 illustrates an example executive list user interface 6100 for a P2P data sharing application. The executive list user interface 6100, which can be available for an EA user of the P2P data sharing application with an EA role, presents a list of executives that the EA supports. For example, the list of executives includes Jan Lorel 6102, Mark Wayfair 6104, and Lauren James 6106. The EA can select a particular executive to view information about the executive and/or to view information about items that the executive has shared with the EA or to request access to a certain item of information.

FIG. 62 illustrates an example data access user interface 6200 for a P2P data sharing application. The data access user interface 6200, which can be available for an EA user of the P2P data sharing application with an EA role, presents a list of shared data items that a selected executive has shared with the EA. For example, the list of shared data items includes a shared social security number 6202, shared Visa credit card information 6204, shared American Express credit card information 6206, and shared travel site login information 6208. The EA can select a particular shared item to view a shared data item. In some implementations, a shared data item is masked so that the EA cannot view the actual value. The data sharing application may enable the value to be copied (e.g. into another application, which may also mask the value) but not viewed, for example. As mentioned, data access can be logged. In some implementations or for some data items or data sharing, a shared data item may be accessible for a limited period of time.

FIG. 63 is a block diagram illustrating an example system 6300 for execution of a P2P data sharing application. An executive data sharing application 6302 can be installed, with an executive role, on an executive mobile device 6304, e.g., for an executive protocol user @lauren. The @lauren executive user can be a registered @protocol user, and the mobile device 6304 can include a personal directory 6306 that is synchronized with a personal directory 6308 on a secondary server 6310 configured for @lauren. The personal directories 6306 and 6308 can include shared travel login information 6312 or 6314, respectively, that has been shared, for example, through the executive data sharing application 6302 with an EA user (e.g., @larry) associated with an EA mobile device 6316. The EA mobile device 6316 includes an executive data sharing application 6318 running with an EA role.

The @protocol can enable the @lauren executive user to share, using the executive data sharing application 6302, sensitive information, such as the shared travel login information 6308, with the @lauren user. The @protocol can enable the @lauren user to access the shared data using the executive data sharing application 6318. The @lauren user can also be a registered @protocol user, with a configured secondary server 6320 and a personal directory 6322 (that can be synchronized with a personal directory 6324 on the EA mobile device 6316).

The executive data sharing application 6318 can use the @protocol to send a request, over a network 6326, to the secondary server 6320, for the secondary server 6320 to request an item of information, such as the shared travel login information 6308, that the @lauren user has shared with the @larry user. The secondary server 6320 for @larry can send a lookup request to the secondary server 6310 for @lauren. The secondary server 6310 for @lauren can validate the request, and if the requested executive data has indeed been shared with the EA @larry user, the secondary server 6310 can provide the shared information to the secondary server 6320, for forwarding on to the executive data sharing application 6318. The @larry user can view the shared data in the executive data sharing application 6318, and/or use the shared data in another application 6328 (e.g., a travel reservation application).

FIG. 64 illustrates a user interface 6400 for an improved contacts application. With traditional contacts applications, data stored by the contact application generally becomes progressively out of date. For instance, a first user may receive contact information from another user, but a responsibility for maintaining the contact information on a device of the first user generally falls to the first user. This can be problematic because the first user may not know that the other user's contact information has changed. The problem can be compounded because the first user may have contact information for many other users, with each set of contact information potentially (or eventually) becoming out of date. Additionally, when the first user's own contact information changes, the first user may not remember who they have shared their contact information with, so may not know who to provide updated contact information.

To solve these and other problems, users can use the improved contacts application, which can be a surveillance free P2P protocol-enabled application used by each user. Each user can choose to whom to share contact and other information. Each user can automatically view current contact information from other users, each time contact information is accessed.

The user interface 6400 presents information for an @chloe user 6402. The improved contacts information, which may have a name of "@buzz," uses a theme based on bees. A waggle dance area 6404 shows invitation-related messages, such as invitations 6406 to connect or share from other protocol users, event invitations 6408, or other invitations. A swarming area 6410 corresponds to groups or topics to which the @chloe user 6402 belongs or subscribes. For example, the @chloe user 6402 is a member of a stats study group 6412, is interested in a set of topics 6414, and participates in e.g., a group chat 6416. A reminders area 6424 provides indications of contacts the user 6402 has not recently contacted.

The user interface 6400 may be a home screen for the improved contacts application. The user 6402 can navigate to the home screen by selecting a "for you" item 6426 in a navigation pane 6428. A user can view more information about relationships with other protocol users by selecting a relationships item 6430. Relationships with groups of connected users can be explored by selecting a hives item 6432. Additional information regarding groups to which the user 6402 belongs can be explored by selecting a swarms item 6434. A settings interface for the improved contacts application can be displayed in response to selection of a settings item 6436. In some implementations, a bee 6438 can be selected as a shortcut for a particular operation. For instance, the bee 6438 can be selected to initiate creation of a new swarm (group) of users.

FIG. 65 illustrates an example invitation user interface 6500 for the improved contacts application. The invitation user interface 6500 can be displayed in response to selection of invitations 6406 on the user interface 6400 described above with respect to FIG. 64. The invitations user interface 6500 is displaying invitations 6502 from other protocol users (e.g., as part of a people area 6504). For example, the invitations 6502 include an invitation 6505 from an @naomi user. Invitations from organizations or groups can be displayed in response to selection of an organizations item 6508 or a hives item 6510, respectively.

FIG. 66 illustrates an example relationship user interface 6600 for displaying relationship information for the improved contacts application. The relationship user interface 6600 can be displayed in response to selection of a relationships item 6602 in a navigation pane 6604. An invitation area 6606 displays connection or sharing invitations, such as an invitation 6608 from the @naomi user. A reminders area 6610 provides indications of contacts the user has not recently contacted. A suggestions area 6612 displays suggestions for connecting to other protocol users (e.g., based on common connections). The user may respond to a particular invitation in the invitations area 6606 by selecting the invitation. For example, may select the invitation 6608 to respond to an invitation from @naomi.

FIG. 67 illustrates an example persona selection user interface 6700. The persona selection user interface 6700 can be displayed in response to accepting an invitation to connect with another protocol user (e.g., the @naomi user). The persona selection user interface 6700 enables the user to select, from among a set of personas the user has configured, a particular persona to share with the requesting user. A persona can be a group of items or sharing settings that the user wishes to define for sharing as a group of items (e.g., a particular phone number, whether to share location, whether to share social media activity, etc.). The user can share a particular persona with multiple connections that the user views similarly. For example, the user has defined a Ruby's human persona 6702 (e.g., rubys-human.profile@chloe), a BFF (Best Friends Forever) persona 6704 (e.g., bff.profile@chloe), a social media persona 6706 (e.g., social.profile@chloe), a family persona 6708 (e.g., family.profile@chloe), and a school persona 6710 (e.g., schoo.profile@chloe), for sharing, e.g., settings for dog park acquaintances, close friends, other social media acquaintances, family members, and school friends, respectively. For connecting with @naomi, the user can select one of the configured personas to share with @naomi. For instance, based on meeting @naomi at a dog park, the user can select the Ruby's human persona 6702.

FIG. 68 illustrates an example user interface for viewing personas. As described above, a user may define different personas for sharing different sets of information or establishing different sharing settings, for different situations or for different connected users or sets of users. The user has selected a Ruby's human persona 6802. Other personas include a BFF persona 6804, a social media persona 6806, a family persona 6808, a school persona 6810, a Linked-in persona 6812, an Instagram persona 6814, and a Facebook persona 6816. For the selected Ruby's persona x02, an interaction count 6818, a relationship count 6820, and a hives count 6822 are displayed. The persona 6802 can include or be associated with an image 6824 and a description 6826. Further information and settings for the persona 6802 can be viewed by selecting a control 6828.

FIG. 69 illustrates an example persona user interface 6900. The user can use the persona user interface 6900 to configure a persona 6902. For example, a control 6904 can be selected to configure a persona profile picture 6906. As another example, a control 6908 can be selected to configure a persona description 6910. The user can configure other settings that can control what information is shared with users to which the persona 6902 is shared. For example, a calls setting 6912 can be used to configure whether the user will accept calls from users to which the persona is shared. Social media 6914, messages 6916, and photo/video 6918 settings can be selected to configure whether social media information, messages, or photo/video content is shared with users to which the persona is shared, respectively. As another example, a location setting 6920 can be configured that can control whether the user's location is shared with users to which the persona has been shared and/or whether those users are notified when the user is at a same location. In addition to the displayed settings, the user can configure whether respective data items, such as a phone number or address, are shared when the persona is shared. In summary, the persona 6902 represents a group of settings that can be shared, as a group, to various protocol users or entities. When the user wants to share a same set of information to different users, the persona 6902 can be a convenient, efficient approach.

FIG. 70 illustrates an example relationships user interface 7000. The relationships user interface 7000 can display, for example, information regarding which personas have been shared with which protocol users. For instance, a BFFs area 7002 indicates users 7004 to which a BFF persona 7006 has been shared. Sharing the BFF persona 7006 with the users 7004 can result in sharing of photos 7008, videos 7010, posts 7012, and messages 7014, for instance. As another example, a family area 7016 indicates users 7018 to which a family persona 7020 has been shared. Sharing the family persona 7020 with the users 7018 can result in sharing of messages 7022, mail 7024, and calendar data 7026, for example.

FIG. 71 illustrates an example group creation user interface 7100. A nearby users area 7102 displays protocol users who have been detected to be within a proximity of the user. The nearby users area includes users 7104, 7106, 7108, 7110, 7112, 7114, and 7116, for example. The user can select which users to include in a new group. For instance, the user has selected the users 7104, 7106, 7108, 7110, 7112, and 7114.

FIG. 72 illustrates an example group creation user interface 7200. The user interface 7200 can be used to create a group (e.g., swarm) of users based on proximity, for example. An item 7202 can be selected to send a notification (e.g., broadcast message, using, e.g., low power Bluetooth) to nearby users, as an invitation to join a new group. Items 7204 or 7206 can be selected to send an invitation using a QR (Quick Response) code or short code, respectively. An item 7208 can be selected to select which person to share with the new group.

FIG. 73 illustrates an example group creation user interface. A group users area 7302 displays users that are included in a new group. The group users area 7302 includes users 7304, 7306, 7308, 7310, 7312, and 7314, for example. The user can select which persona is shared with the users of the new group.

FIG. 74 illustrates an example system 7400 for attestations. The @protocol can support trusted attestations. Attestations are evidence or proof of a claim made by a claimant (e.g., a claimant that is an @alice @protocol user with a mobile device 7402 and a secondary server 7404). The claimant may provide claims such as of a pattern of "claim1@alice" or "claim2@alice" as attestations. A self-attestation can return a response by value. For example, a requester (e.g., a requester @protocol user who may be e.g., @bob, with a client device 7406 and a secondary server 7408) may submit a lookup 7409 of an attestation such as claim1@alice. The secondary server 7404 for @alice can provide a response value 7410, which can be provided, e.g., to the secondary server 7408 and then to the client device 7406. The response value 74110 can be polymorphically determined, e.g., having a value determined based on an identity of the requester.

An attestation may be deemed to be more trustworthy when a value for the attestation is provided by a reliable third party, such as a trusted entity 7412. The trusted entity 7412 can provide a value or can provide proof of some claim (e.g., an attestation) without the need for exposing the underlying data that the claim relies upon. For example, The U.S. Department of State might attest that @alice holds a valid passport without having to divulge any further information other than that the passport for @alice exists and is valid. In general, a trusted service 7414 provided by the trusted entity 7412 can validate a claim by any appropriate means available to the trusted entity 7414. The appropriate means can include whatever appropriate tests or validations the trusted entity 7414 deems as necessary to validate the attestation. Example attestations that may be serviced by the trusted entity 7412 (or another trusted entity) can include attestations for which the trusted entity 7412 returns a true or false answer, such as ishuman@alice, isAdult@alice, hasSSN@alice, hasDriverLicense@alice, etc.

The @protocol can enable a protocol user to create a trusted entity attestation using reference value(s). For example, in response to a lookup 7416 for claim2@alice, the secondary server 7404 can be configured to return a reference 7418 such as "atsign://claim2.alice@trustedservice" which can be provided to the requester. The requester can parse the reference 7418 and then perform a secondary lookup 7420 which can be provided to the trusted entity 7412. The trusted entity 7412 can return a response 7422 to the requester. The response 7422 can be a value or can be another reference (e.g., to establish a chain of references) that can be further resolved. The response 7422 can be polymorphically determined, e.g., having a value determined based on an identity of the requester.

In some implementations, a response to the lookup 7416 may include more than one third party reference that the requestor can choose from or match against. For example, the secondary server 7404 can return, in response to the lookup 7416, a response of ["atsign://claim2.alice@service1", "atsign://claim2.alice@service2", "atsign://claim2.alice@service3"]. The requester can choose a given attester/service provider over other(s), should one service provider be preferable to (e.g., more trusted by) the requestor.

The @protocol can support anonymous attestations. For example, the @protocol can support providing proof of some claim (e.g., an attestation) while the claimant remains anonymous to the receiving entity/requester. For example, the trusted entity 7412 can provide, in some context, an anonymous response 7424 to an authorized requesting entity without divulging the @sign associated with the anonymous response 7424. For example, within some context, an attestation of a "credit score"; e.g., 800 for some user has been validated by the trusted entity 7412 without exposing anything that could identify the user associated with the credit score. Such information might be very useful for a receiving entity to decide how best to respond or proceed in the given context. Anonymous attestations can be a portion of an Internet permissioning system that can simultaneously provide both accountability and anonymity on the Internet. Anonymous attestations can be implemented using two features of the @protocol: 1) the @protocol scheme ("atsign://") which allows for the expression of a URL endpoint (e.g. "atsign://creditscore@trustedservice") which might be an attestation; and 2) the polymorphic nature of @protocol responses.

Attestations can be used for various other purposes. For example, attestation can be used for @protocol-enabled application certification. For example, an application developer can publish a checksum for an application/revision distribution package as a self-attestation that can be looked up and evaluated. For example, a lookup of e.g., myappversion5.8checksum@appdeveloper can return a checksum value, which can be compared to a checksum computed for received application code, to ensure that checksums match and that checksum or application code has not been altered.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
a physical user computing device of a first user;
a first protocol server associated with the first user comprising a first decentralized resource directory;
a second protocol server associated with a second user comprising a second decentralized resource directory; and
a namespace directory server;
wherein the user computing device is configured to:
send a first lookup request to the namespace directory server for first connection information for the first protocol server;
wherein the namespace directory server is configured to receive the first lookup request from the user computing device, determine the first connection information for the first protocol server, and provide the first connection information to the user computing device;
wherein the user computing device is further configured to use the first connection information to send a first authentication request to the first protocol server;
wherein the first protocol server is configured to receive the first authentication request, generate a key challenge, and send the key challenge to the user computing device in response to the first authentication request;
wherein the user computing device is further configured to generate a first key challenge response and send the first key challenge response to the first protocol server;
wherein the first protocol server is further configured to verify the first key challenge response and send a first authentication success indication to the user computing device; and
wherein the user computing device is further configured to send a second lookup request to the first protocol server for a value of a requested key stored in the second decentralized resource directory;
wherein the first protocol server is further configured to receive the second lookup request and send a third lookup request to the namespace directory server for second connection information for the second protocol server;
wherein the namespace directory server is further configured to receive the third lookup request, determine the second connection information for the second protocol server, and send the second connection information to the first protocol server;
wherein the first protocol server is further configured to receive the second connection information and use the second connection information to send a second authentication request to the second protocol server;
wherein the second protocol server is configured to receive the second authentication request, generate an authentication challenge, and send the authentication challenge to the first protocol server;
wherein the first protocol server is further configured to receive the authentication challenge, store an authentication challenge value in the first decentralized resource directory for an authentication challenge key, and send a confirmation for the authentication challenge to the second protocol server;
wherein the second protocol server is further configured to receive the confirmation for the authentication challenge and send a fourth lookup request for third connection information, for the first protocol server, to the namespace directory server;
wherein the namespace directory server is further configured to receive the fourth lookup request, determine the third connection information for the first protocol server, and send the third connection information to the second protocol server;
wherein the second protocol server is further configured to use the third connection information to send a fifth lookup request to the first protocol server for a stored value for the authentication challenge key, receive the stored value for the authentication challenge key, verify the stored value for the authentication challenge key, and send a second authentication success indication to the first protocol server in response to a successful verification of the authentication challenge key that indicates successful authentication to the second protocol server as the first user;
wherein the first protocol server is further configured to receive the second authentication success indication and forward the second lookup request, to the second protocol server, on behalf of the user computing device;
wherein the second protocol server is further configured to receive the second lookup request, determine that the first user has access to the requested key, retrieve the value for the requested key, and send the value for the requested key to the first protocol server;
wherein the first protocol server is further configured to receive the value for the requested key and forward the value for the requested key to the user computing device; and
wherein the user computing device is further configured to receive the value for the requested key.

2. The system of claim 1,
further comprising a registration server;
wherein the user computing device is further configured to receive a shared secret from the registration server during a registration process and store the shared secret;

wherein the first protocol server is configured to receive the shared secret from the registration server and store the shared secret; and wherein the shared secret is used during a bootstrap process performed by the user computing device and the first protocol server.

3. The system of claim 2, wherein the shared secret is used in a cryptographic response authentication mechanism.

4. The system of claim 2, wherein the user computing device is further configured to generate, after the bootstrap process, a private key and a public key corresponding to the private key, store the private key on the user computing device, and send the public key to the first protocol server; and wherein the first protocol server is further configured to receive the public key and store the public key at the first protocol server.

5. The system of claim 4, wherein the first protocol server is further configured to use the public key to generate the key challenge;

wherein the user computing device is further configured to use the private key to generate the first key challenge response; and wherein the first protocol server is further configured to use the public key when verifying the first key challenge response.

* * * * *